United States Patent
Murakowski et al.

(10) Patent No.: US 11,855,692 B2
(45) Date of Patent: Dec. 26, 2023

(54) PHASED-ARRAY MAPPING FOR BEAMSPACE PROCESSING AND BEAMSPACE PROCESSOR

(71) Applicant: PHASE SENSITIVE INNOVATIONS, INC., Newark, DE (US)

(72) Inventors: Janusz Murakowski, Bear, DE (US); Garrett Schneider, New Castle, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 501 days.

(21) Appl. No.: 17/160,676

(22) Filed: Jan. 28, 2021

(65) Prior Publication Data

US 2021/0257729 A1    Aug. 19, 2021

Related U.S. Application Data

(60) Provisional application No. 62/966,996, filed on Jan. 28, 2020.

(51) Int. Cl.
*H04B 10/25* (2013.01)
*H04R 9/08* (2006.01)
(Continued)

(52) U.S. Cl.
CPC ..... *H04B 10/2575* (2013.01); *G02B 6/12019* (2013.01); *G02B 6/29344* (2013.01); *H04R 9/08* (2013.01); *H04B 2210/006* (2013.01)

(58) Field of Classification Search
CPC ............ H04B 10/2575; G02B 6/12019; G02B 6/29344
(Continued)

(56) References Cited

U.S. PATENT DOCUMENTS 6,020,850 A    2/2000 Ji et al.
7,773,942 B2 *  8/2010 Hudson ............ H04B 7/18515
                                                                455/430
(Continued)

FOREIGN PATENT DOCUMENTS

AU    2017203545 A1 *  6/2017  ............ A61B 5/015
WO    WO2021155021      1/2021
WO          4097876      8/2022

OTHER PUBLICATIONS

U.S. Appl. No. 17/160,676, filed Jan. 28, 2021, Janusz Murakowski.
(Continued)

*Primary Examiner* — Harry K Liu
(74) *Attorney, Agent, or Firm* — Muir Patent Law, PLLC

(57) ABSTRACT

An apparatus and method is provided to correlate radiation beams, such as RF beams, optical beams, and/or acoustic beams. A plurality of sensors are distributed according to a first pattern and disposed adjacent to a first interference region. The plurality of sensors may capture incoming radiation and convert the incoming radiation to a plurality of signals. A plurality of radiating elements are distributed according to a second pattern that differs from the first pattern and are disposed adjacent to a second interference region. A plurality of channels are connected between the sensors and the radiating elements, each channel connecting a corresponding sensor to receive a corresponding signal. Each of the radiating elements is in communication with a corresponding one of the plurality of channels to provide an outgoing radiation corresponding to the signal received by the channel. The second pattern has a relationship to the first pattern such that first and second beams of incoming radiation in the first interference region captured by the plurality of sensors are respectively mapped to corresponding first and second beams of outgoing radiation emitted by the (Continued)

plurality of radiating elements into the second interference region.

31 Claims, 82 Drawing Sheets

(51) Int. Cl.
  *H04B 10/2575* (2013.01)
  *G02B 6/12* (2006.01)
  *G02B 6/293* (2006.01)

(58) Field of Classification Search
  USPC .......................................................... 342/359
  See application file for complete search history.

(56) References Cited

U.S. PATENT DOCUMENTS

| | | | |
|---|---|---|---|
| 10,484,081 | B1* | 11/2019 | Chang ...................... H04N 7/20 |
| 2005/0003763 | A1 | 1/2005 | Lastinger et al. |
| 2015/0341091 | A1 | 11/2015 | Park et al. |
| 2017/0041068 | A1 | 2/2017 | Murakowski et al. |
| 2017/0085323 | A1 | 3/2017 | Schuetz et al. |
| 2018/0309515 | A1 | 10/2018 | Murakowski et al. |
| 2019/0190599 | A1 | 6/2019 | Murakowski et al. |
| 2019/0319356 | A1 | 10/2019 | Shi et al. |
| 2019/0319368 | A1 | 10/2019 | Fillion |
| 2019/0372219 | A1* | 12/2019 | Schneider ............... G02F 2/004 |
| 2021/0257729 | A1 | 8/2021 | Murakowski et al. |

OTHER PUBLICATIONS

U.S. Appl. No. 17/894,072, filed Aug. 23, 2022, Janusz Murakowski.

Akiyama et al., "Two-Dimensional Optical Signal-Processing Beamformer Using Multilayer Polymeric Optical Waveguide Arrays", IEEE Transactions on Microwave Theory and Techniques, vol. 49, No. 10, Oct. 200.

Koepf, "Optical Processor for Phased-Array Antenna Beam Formation", Proc. SPIE 0477, Optical Technology for Microwave Applications I, (Nov. 1, 1987); doi: 10.1117/12.942616.

Ogawa et al., "Two-Dimensional Multiple Beam Forming Using Slab-Waveguide-Implemented Photonic Beam Forming Network," 1996.

Shelton, "Multibeam Planar Arrays", Proceedings of the IEEE, vol. 56, No. 11, Nov. 1968.

Shelton, "On the Equivalence of Two-Dimensional and Three-Dimensional Multibeam Microwave Lenses", Naval Research Lab, Jul. 1981.

Shibata et al., "Spatial Optical Beam-Forming Network for Receiving-Mode Multibeam Array Antenna-Proposal and Experiment",IEEE Transactions on Microwave Theory and Techniques, vol. 50, No. 5, May 2002.

International Search Report dated Jun. 23, 2021 for PCT application No. PCT/US2021/015526.

* cited by examiner

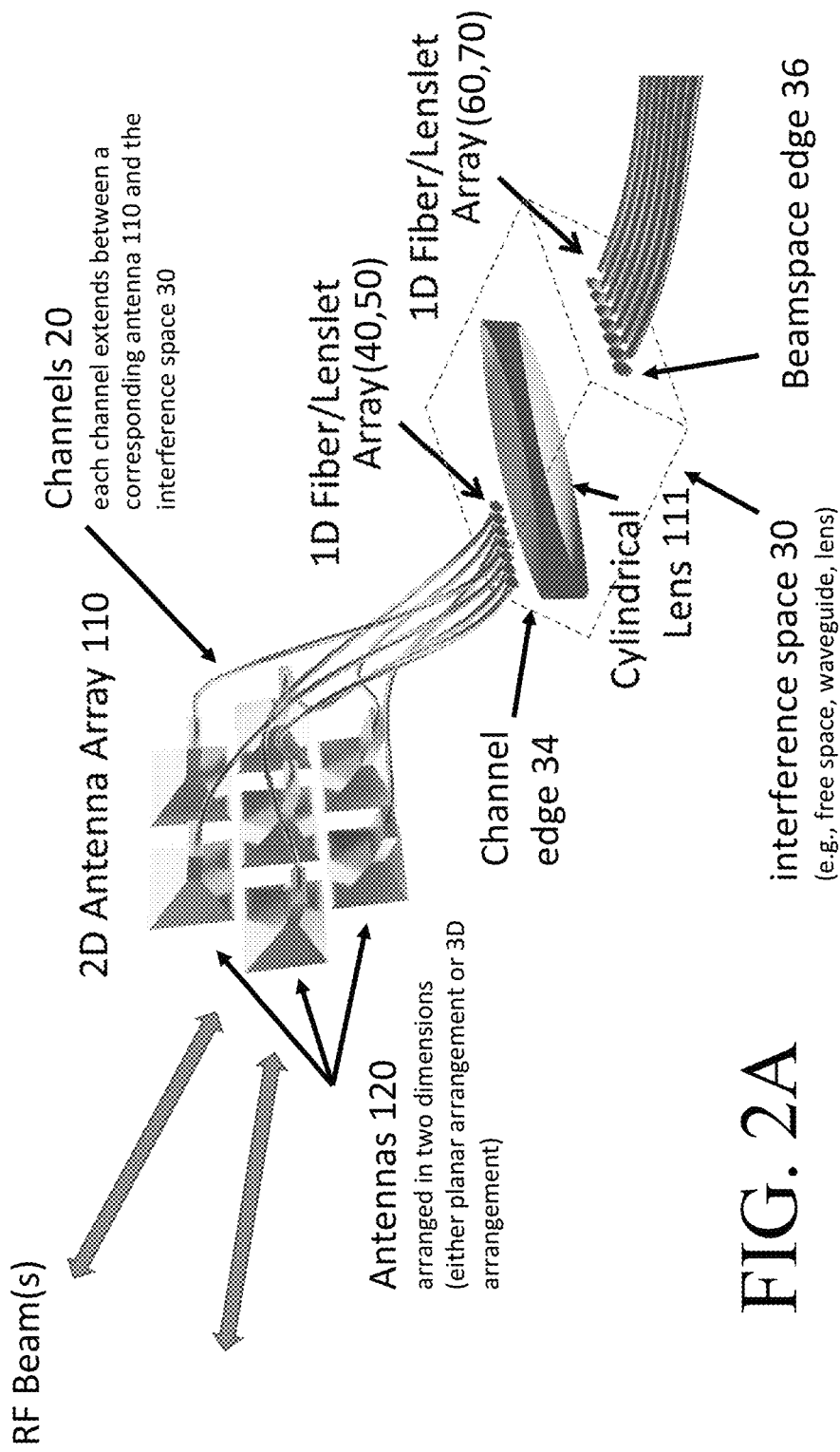

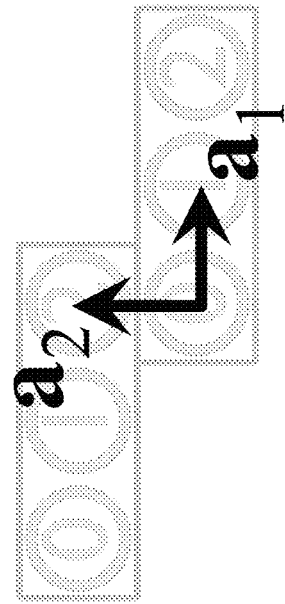
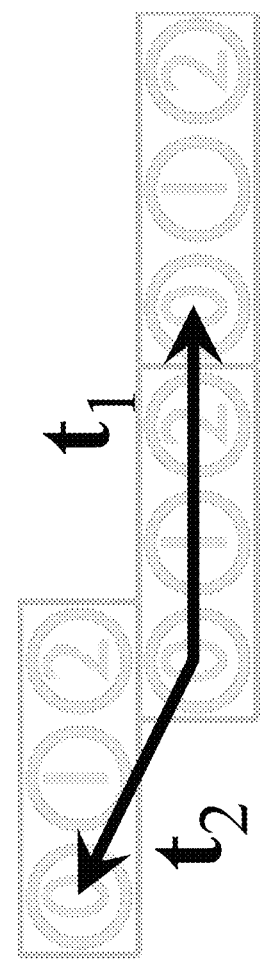
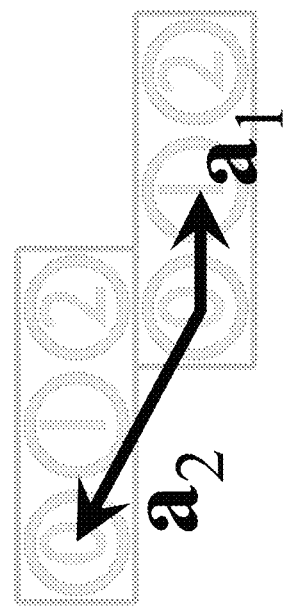
FIG. 25A
FIG. 25B
FIG. 25C
FIG. 25D
FIG. 25E

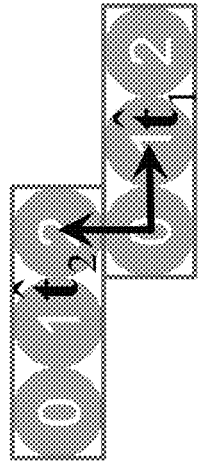
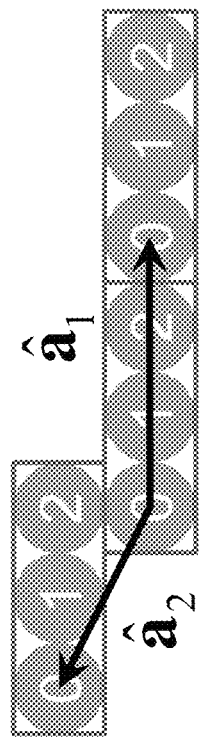
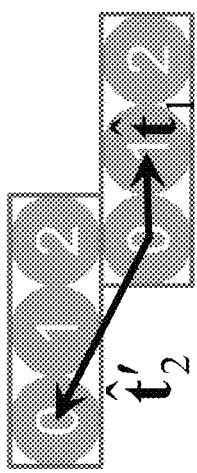
FIG. 29A  FIG. 29B  FIG. 29C  FIG. 29D  FIG. 29E

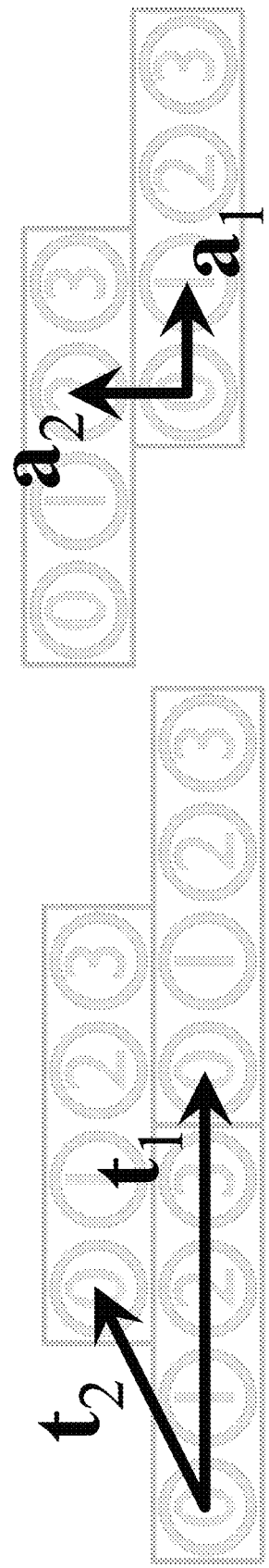
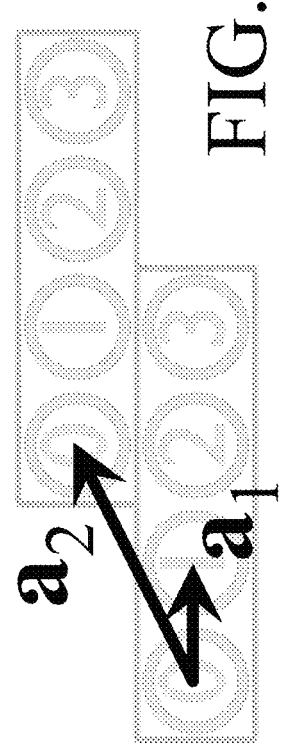
FIG. 34A  FIG. 34B  FIG. 34C  FIG. 34D  FIG. 34E

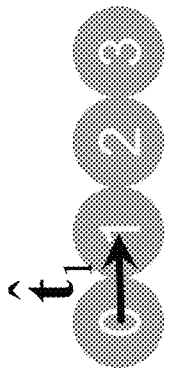
FIG. 38A
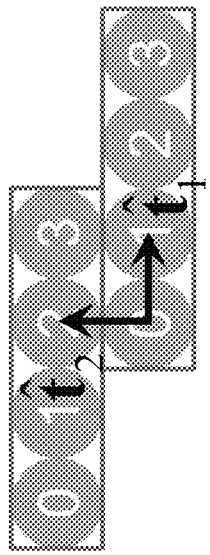
FIG. 38B
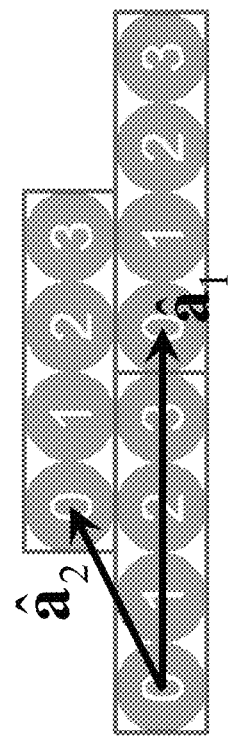
FIG. 38C
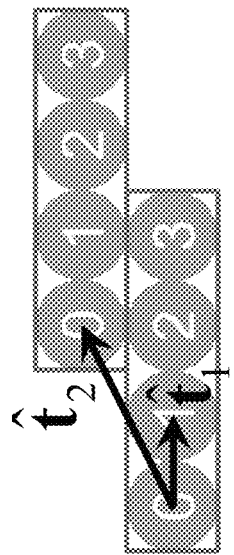
FIG. 38D
FIG. 38E

PHASED-ARRAY MAPPING FOR BEAMSPACE PROCESSING AND BEAMSPACE PROCESSOR

RELATED APPLICATIONS

This application is a non-provisional application of Provisional Application No. 62/966,996 filed Jan. 28, 2020, the entire contents of which are hereby incorporated by reference.

TECHNICAL FIELD

This disclosure relates generally to wireless communication, and, in particular embodiments to transmit and receive signals using antenna phased arrays.

BACKGROUND

The invention relates to a processor, such as an array/beamspace transformer, that may transform physical beams having a first relative positional relationship to a second set of physical beams having a second relative positional relationship different from the first relative positional relationship. Such a transformer may be implemented with an optical processor, such as an optical imaging processor (e.g., used in a millimeter-wave passive imager), a receiver (e.g., FIG. 3A), as well as a transmitter (e.g., where an optical lens is used for RF beam forming) (e.g., FIG. 3C).

As shown in FIG. 1, conventionally, the geometry (spatial arrangement) of the optical-fiber array mimics the geometry of the front-end array of antennas, such that the position of the end of each fiber in the fiber array (the fiber array that is connected to the antennas) corresponds to the position of the respective antenna in the antenna array to which that fiber is operatively connected. Thus, in the conventional optical processor, a 2D arrangement of antennas is connected to a 2D arrangement of the fibers of the fiber array operatively connected to the antennas. Such array correspondence leads to optical beam forming that maps directly, one-to-one, to the RF beam forming, e.g., in a receiver, for every incoming RF beam captured by the front-end antenna array there is a respective optical beam produced by the optical-fiber array. Such spatial mapping of the RF to optical beams offers numerous benefits in signal processing, simplified system architecture, and low power consumption, to name a few.

However, the approach is not without limitations. For example, two-dimensional RF beam forming, where both azimuth and elevation of the received or transmitted beams are to be properly mapped to the optical domain requires two-dimensional antenna arrays, which, in turn, necessitates the use of two-dimensional fiber arrays followed by three-dimensional optical beam processing. 3D optical processors are based on conventional free-space optics (optical devices) that include discrete optical elements such as lenses, beam splitters, wave plates, filters, mirrors, etc. The optical processors are normally assembled and aligned by hand and as a result are costly to manufacture. Although automatic assembly is also possible, such automatic assembly may require specialized tooling. Even with specialized tooling, automatic assembly may still be relatively expensive due to the complexity of placing and aligning the optical elements. For instance, each optical element may be placed in the system in sequence, one at a time, and should be properly aligned to achieve the desired functionality.

Technology employed in the fabrication of electronic integrated circuits allows simultaneous patterning of millions of elements. The parallel element fabrication enabled the digital revolution we have been experiencing over the past several decades. Integrated-circuit fabrication is often based on planar rather than volumetric approach. The planar approach allows optical projection of an image of multiple elements (e.g., through photolithography) to assemble entire circuits on a flat substrate (e.g., a semiconductor wafer substrate) to define the system. In this context, the manual assembly of individual optical components into an optical processor may be compared to the vacuum-tube technology of yore. To take advantage of planar fabrication techniques, with its massive scalability, the optical processor should be mapped into a plane, and the 2D optical fiber array into a 1D linear array. Here, we describe a practical approach to such mapping that preserves the beam-forming ability and offers additional benefits as described below.

SUMMARY

An apparatus and method are provided to correlate radiation beams, such as RF beams, optical beams, and/or acoustic beams. A plurality of sensors, which may be transducers, are distributed according to a first pattern and disposed adjacent to a first interference region. The plurality of sensors may capture incoming radiation and convert the incoming radiation to a plurality of signals. A plurality of radiating elements are distributed according to a second pattern that differs from the first pattern and are disposed adjacent to a second interference region. A plurality of channels are connected between the sensors and the radiating elements, each channel connecting a corresponding sensor to receive a corresponding signal. Each of the radiating elements is in communication with a corresponding one of the plurality of channels to provide an outgoing radiation corresponding to the signal received by the channel. The second pattern has a relationship to the first pattern such that first and second beams of incoming radiation in the first interference region captured by the plurality of sensors are respectively mapped to corresponding first and second beams of outgoing radiation emitted by the plurality of radiating elements into the second interference region. The sensors may be arranged in a two dimensional array and ends of the channels may be arranged adjacent the second interference region in a one dimensional array.

In certain embodiments, the first interference region or the second interference region may be in the form of an interference region of a wave processor, such as an optical processor, and the other of the first interference region and second interference region may correspond to a region external to the wave processor.

According to some embodiments, an antenna array comprises a plurality of antenna elements configured to receive RF beams and provide corresponding RF electrical signals, the plurality of antenna elements being arranged in a first pattern; a plurality of electro-optic modulators, each electro-optic modulator being in communication with a corresponding one of the plurality of antenna elements to receive a corresponding RF electrical signal, the plurality of electro-optic modulators being configured to generate a corresponding modulated optical signal by mixing the corresponding RF electrical signal with an optical carrier signal; a plurality of channels, each channel being in communication with a corresponding one of the plurality of electro-optic modulators to receive and transmit a corresponding modulated optical signal, wherein ends of the channels are arranged in a second pattern; an interference space to receive the plurality of modulated optical signals transmitted by the plurality of channels at a first edge of the interference space, the modulated optical signals forming a plurality of optical beams in the interference space, each optical beam corresponding to a received RF beam, the interference space having one or more lenses to spatially separate the plurality of optical beams; and a sensor array comprising a plurality of sensors arranged at a second edge of the interference space to receive the spatially separate optical beams at respective sensors of the sensor array. The first pattern of the antenna elements is different from the second pattern of the ends of the channels. For example, the antenna elements may be arranged in a two dimensional array, while the ends of the channels may be arranged in a one dimensional array.

According to some embodiments, an RF transmitter comprises an interference space configured to receive N modulated optical signals transmitted at a first edge of the interference space to a second edge of the interference space, the N modulated optical signals forming N optical beams in the interference space that are superimposed with each other at the second edge of the interference space (N being an integer greater than 1); a plurality of channels at the second edge of the interference space to capture the N optical beams as corresponding virtual beams within the channels; a plurality of photodetector each in communication with a corresponding channel to convert an optical signal received by the corresponding channel to a corresponding RF electrical signal; and an antenna array comprising a plurality of antenna elements each connected to a corresponding photodetector and configured to receive the corresponding RF electrical signal of the photodetector to generate a corresponding electromagnetic RF signal. The antenna elements of the antenna array are arranged in a first pattern, and ends of the channels are positioned at the second edge of the interference space and are arranged in a second pattern that is different from the first pattern. For example, the antenna elements may be arranged in a two dimensional array, while the ends of the channels may be arranged in a one dimensional array. Methods of operation of the RF transmitter are also disclosed.

The plurality of antenna elements and the plurality of channels may form an array/beamspace transformer configured to correlate a 2D beamspace array to a 1D beamspace array, each beamspace representing a set of resolvable beams of the transmitter in reciprocal space. The array/beamspace transformer may form part of a beamspace processor. Portions of the beamspace processor may be formed with a semiconductor chip.

BRIEF DESCRIPTION OF THE DRAWINGS

For a more complete understanding of this disclosure, and the advantages thereof, reference is now made to the following descriptions taken in conjunction with the accompanying drawings, in which:

FIGS. 2A through 2C show configurations with an optical processor and a 1D (linear) fiber/lenslet array for 2D beam forming.

FIGS. 25A through 25E show a 3-element linear array with appropriate choices of lattice basis and tessellation-lattice basis.

FIGS. 29A through 29E show a 3-element linear beamspace array with appropriate choices of beamspace basis $\hat{t}_1$, $\hat{t}_2$ and grating-lobe basis $\hat{a}_1$, $\hat{a}_2$.

FIGS. 34A through 34E show a 4-element linear array with appropriate choices of lattice basis and tessellation-lattice basis.

FIGS. 38A through 38E show a 4-element linear beamspace array with appropriate choices of beamspace basis $\hat{t}_1$, $\hat{t}_2$ and grating-lobe basis $\hat{a}_1$, $\hat{a}_2$.

DETAILED DESCRIPTION

Figure 1:
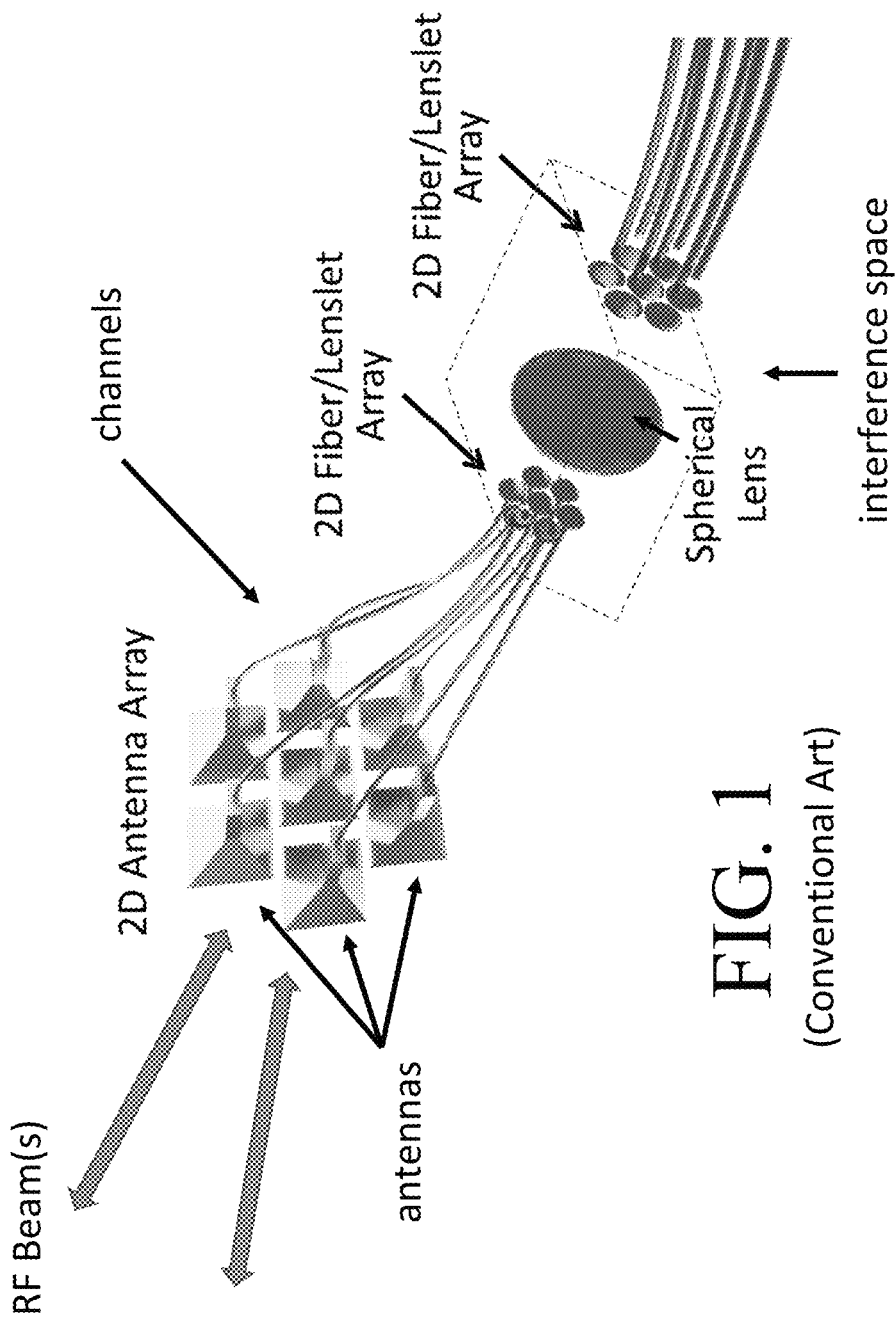
FIG. 1 shows a conventional configuration of optical processor for beam forming.

The present disclosure now will be described more fully hereinafter with reference to the accompanying drawings, in which various exemplary implementations are shown. The invention may, however, be embodied in many different forms and should not be construed as limited to the exemplary implementations set forth herein. These example exemplary implementations are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

Like numbers refer to like elements throughout. Reference numeral use of lowercase suffix "m" or "n" in this application may refer generically to any one of M or N similar elements (although, similar generic references may also avoid use of a "m" or "n" suffix). Though the different figures show variations of exemplary implementations, these figures are not necessarily intended to be mutually exclusive from each other. Rather, as will be seen from the context of the detailed description below, certain features depicted and described in different figures will be understood to be used with other features illustrated in other figures to result in various exemplary implementations.

FIG. 2A shows an embodiment including an optical processor 10 connected to a 2D antenna array 110. The optical processor 10 has a configuration to map the 2D antenna array 110 to a 1D fiber array (40). For example, the optical processor 10 may be an optical processor for a receiver to receive and spatially filter (in two dimensions) RF beams received in corresponding two dimensions, may be an optical processor for a transmitter for 2D beam forming or for passive imager. Although the description is in connection with an optical processor, the invention is not limited thereto and applies to other processors that process signals in realms other than optical (e.g., acoustic, electrical, etc.) For example, the invention also applies to all-electronic systems where a 2D antenna array is mapped into a 1D array of channels, e.g., RF waveguides or RF transmission lines which terminate along a line or curve, and then are processed in an RF interference space using planar techniques, e.g., with a Rotman lens or Butler matrices.

Figure 2B:
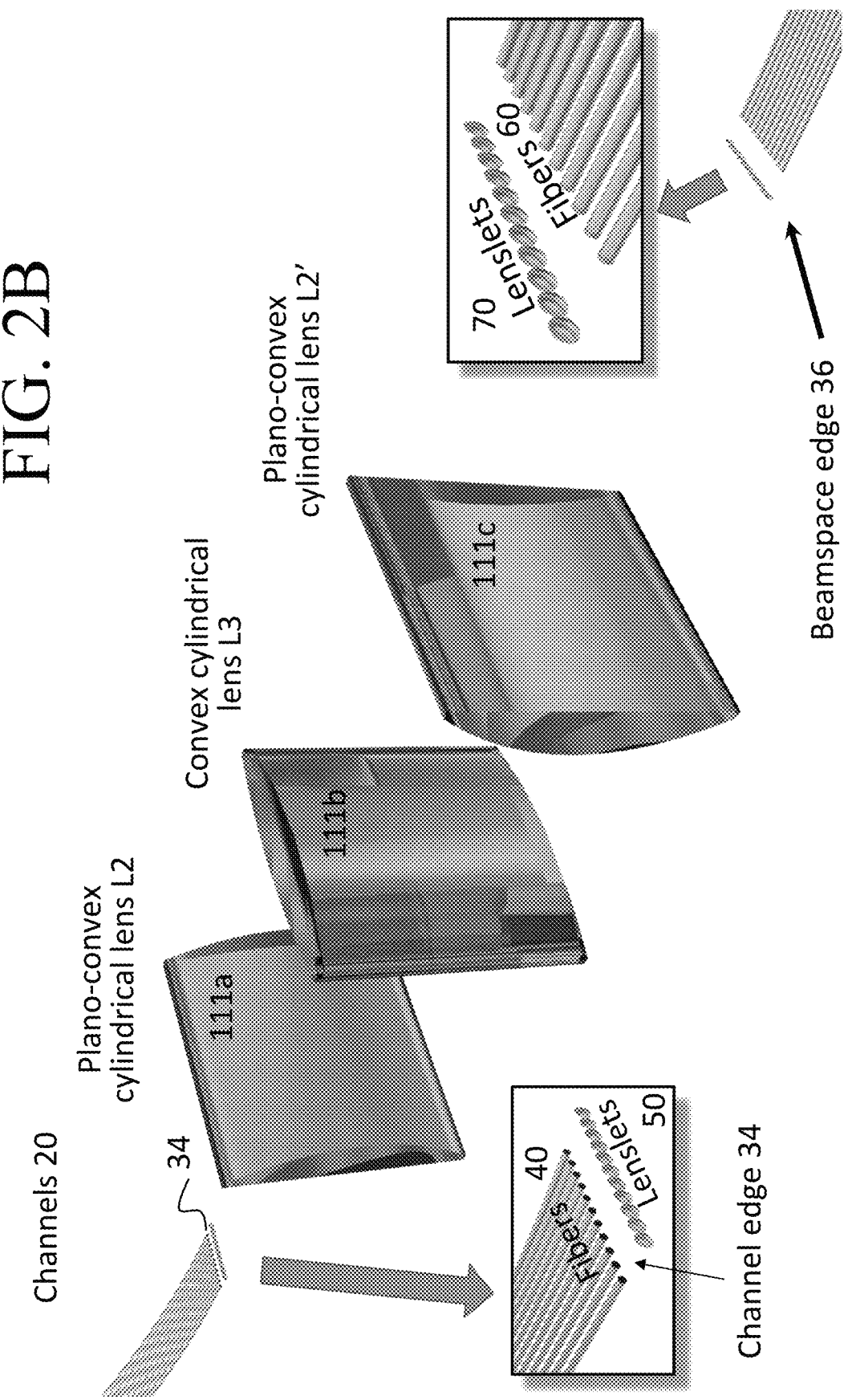
Figure 2C:
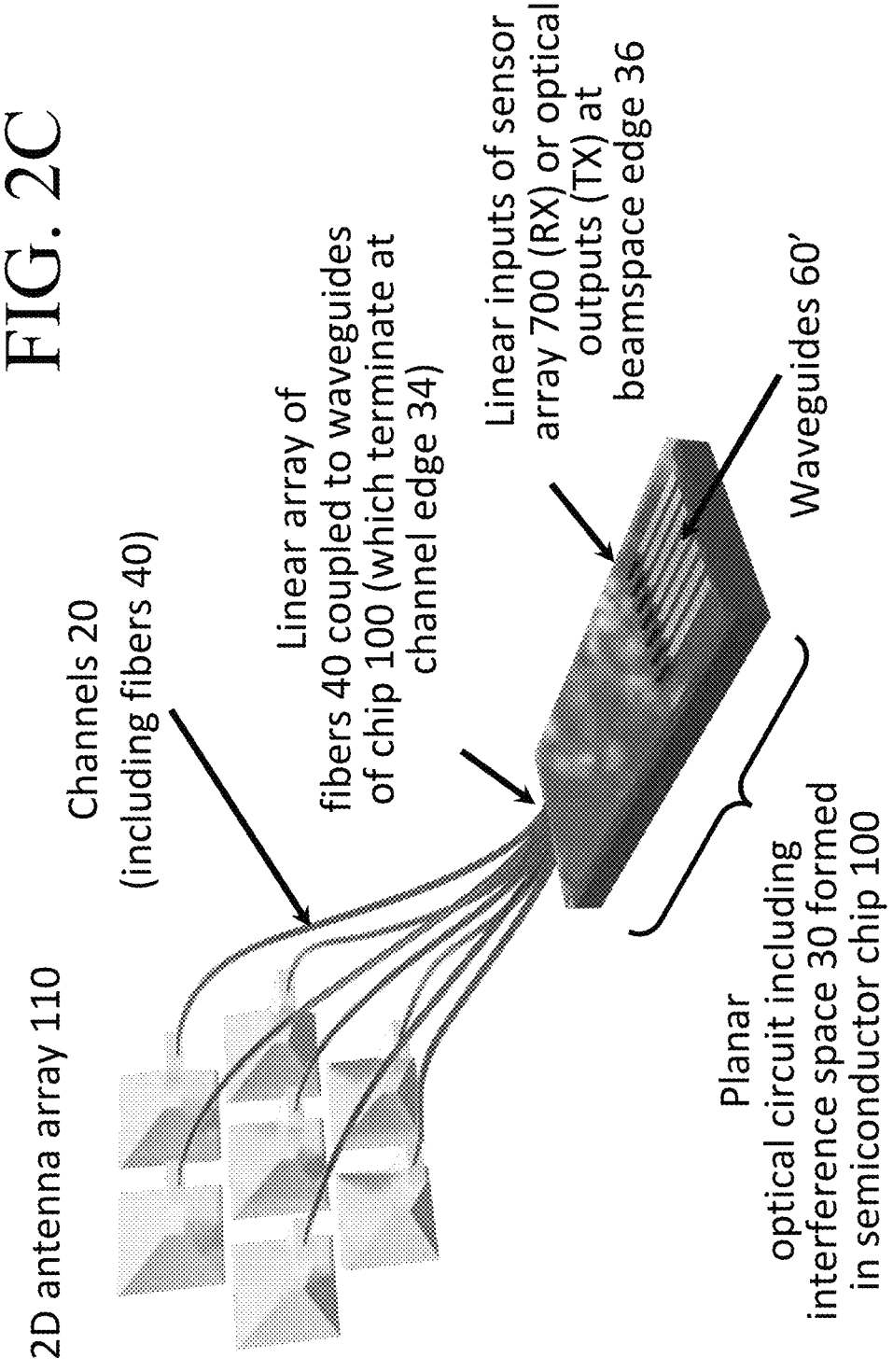

As discussed elsewhere herein, the optical processor 10 or other type of wave processor may be formed within a single semiconductor chip, such as being implemented with a planar optical circuit of a semiconductor chip (as shown in FIG. 2C) to take advantage of the massive parallelism of planar fabrication employed, e.g., in the semiconductor industry or in the fabrication of planar lightwave circuits (PLC) (also known as integrated optical or optoelectronic devices). Such fabrication relies on wafer-scale lithography on planar substrates, material deposition and/or etching to define the requisite optical circuitry. Similarly, when implemented as an all-electronic system without an optical processor, the invention may be implemented at the chip level with a single semiconductor chip. It should also be appreciated that the invention (whether using an optical processor or as an all-electronic system) may be implemented using several interconnected semiconductor chips and/or at package level or by patterning and formation of its elements (e.g., of waveguides and interference space) in a printed circuit board.

FIG. 2A illustrates a 2D antenna array 110 formed of a plurality of antennas 120 (horn antennas in this example) arranged in at least two dimensions. Note that the antennas 120 may be arranged in two dimensions in a single plane (i.e., restricted to two dimensions) or may be arranged in three dimensions, such as regularly arranged on a curved surface, such as on a hull of an aircraft or vehicle. In addition, the array arrangement may include the temporal dimension by employing different delays in different-length optical fibers or waveguides, as disclosed in U.S. Pat. No. 10,009,098, or U.S. Pat. No. 10,218,438, or U.S. Pat. No. 10,313,012. Unless context indicates otherwise, reference to a 2D antenna array herein should be understood to refer to an arrangement of antennas distributed in at least two dimensions, but need not be confined to only two dimensions (i.e., refers to both an arrangement of antennas distributed in two dimensions in a plane or an arrangement of antennas in three dimensions). It should be appreciated that the 2D antenna array 110 formed of a plurality of antennas 120 may also be referred to itself as an antenna (e.g., a phased array antenna). For clarification, the individual antennas of an antenna array may also be referred to herein as "antenna elements," while "elements" by itself may refer generically to transducers/sensors/radiating elements that may be antenna elements or may be other types of transducers/sensors/radiating elements.

As illustrated in FIGS. 2A to 2C, the antennas 120 are communicatively coupled to an interference space 30 via corresponding channels 20. For example, the optical processor 10 maybe implemented in a receiver where electromagnetic radiation (e.g., RF beams) are captured by the antennas 120 and converted to RF electric signals, which are then upconverted to optical signals by electro-optic modulators (not shown) and transmitted to the interference space 30 by optical fibers 40 (or other optical waveguides). For example, the optical processor may be implemented in a transmitter where optical signals transmitted through the interference space 30 are captured by channels 20 (which transmit the same in parallel), downconverted to a corresponding RF signal by photodetectors (not shown) which drives and/or controls antennas 120 to output a corresponding RF electromagnetic signal and form RF beams. The interference space 30 may be free space (e.g., air or a vacuum as in FIGS. 2A and 2B), a waveguide (e.g., slab waveguide as in FIG. 2C) or other medium that allows transmission of the optical signals to allow the optical signals within the interference space 30 to interfere with one another. A reference optical beam (not shown), offset in frequency from the information-carrying optical signals (e.g., encoded signals) is combined with the information carrying optical signal to heterodyne the same to facilitate conversion of the information-carrying optical signals to corresponding RF electrical signals. Such information-carrying signals may be, e.g., in a receiver, information provided by the antennas 120 and conveyed in parallel via channels 20, including fibers 40, and in a transmitter, information provided with optical inputs into the interference space 30 for transmission by the antennas 120). The reference optical beam may be provided before the interference space, within the interference space, or at or after the interference space 30 (see e.g. U.S. Pat. No. 9,525,489 and USP Pub. 2019/0372219 for exemplary details of providing a reference optical beam and exemplary sensor array implementations).

The light transmitted through the interference space 30 is captured and downconverted to an RF electrical signal by photodetectors. In the context of a receiver, the interference of light within the interference space 30 provides an interference pattern at a beamspace edge 36 (e.g., a focal surface or an image plane), at which a sensor array 700 is arranged (at which the lenslets of the 1D fiber/lenslet array of sensor array 700 are arranged). The interference pattern of light thus captured by sensor array 700 is converted to corresponding RF signals by photodetectors (such as photodiodes—not shown), each corresponding to the intensity and phase of an RF beat signal resulting from interference of the reference optical beam and the upconverted optical signals.

In the context of a transmitter, the light transmitted into the interference space 30 by optical outputs at beamspace edge 36 is captured at channel edge 34 and input to channels 20. The optical signals transmitted by channels 20 are each converted to a corresponding RF signal by photodetectors (not shown) which is then used to operate a corresponding one of the antennas 120 of antenna array 110.

Figure 2D:
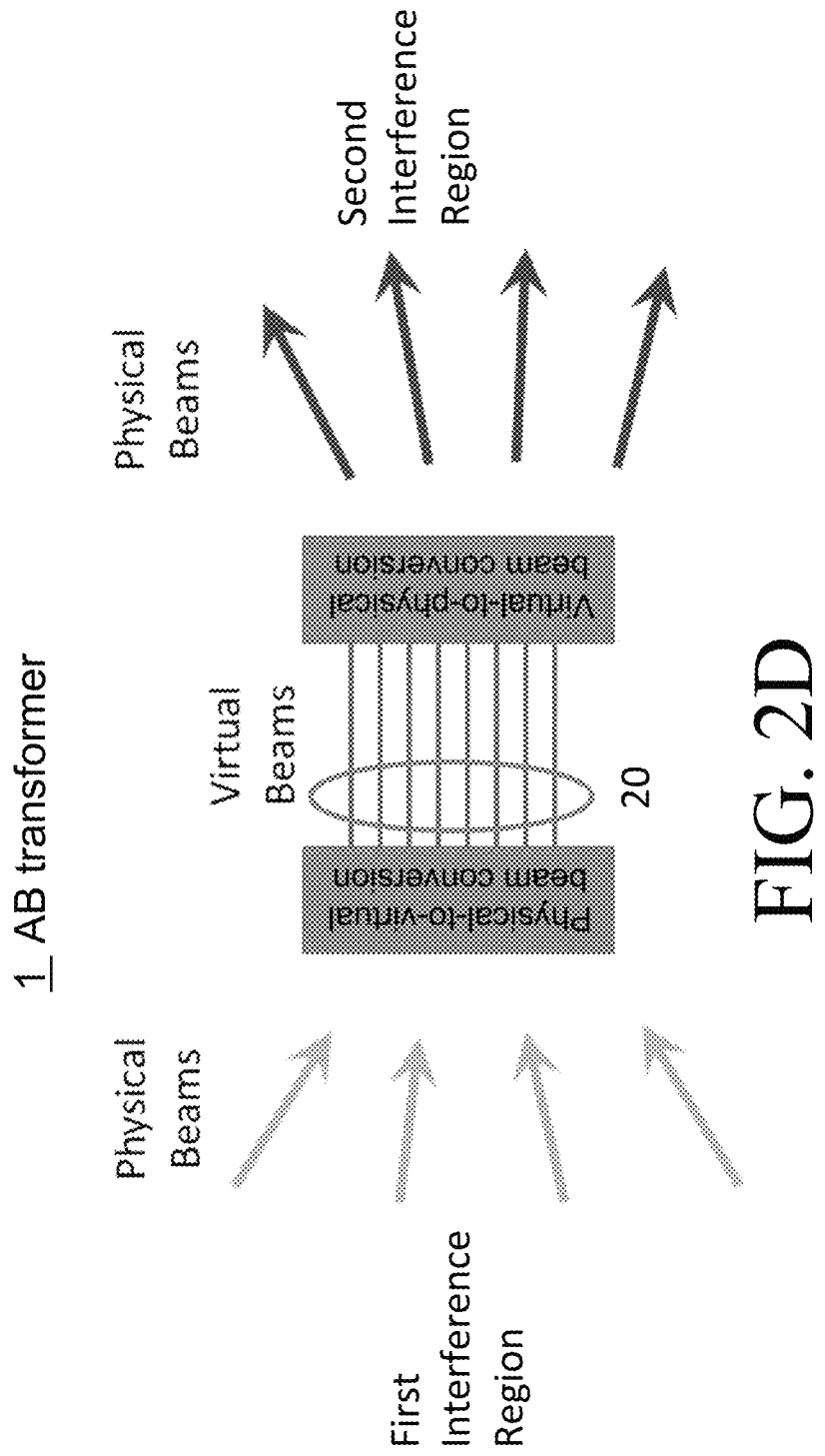
FIG. 2D depicts an array/beamspace transformer (AB transformer).

FIG. 2D is a block diagram of an array/beamspace transformer (AB transformer) 1 according to an embodiment of the invention. The AB transformer 1 of FIG. 2D may interface with an optical processor 10 such as described herein, whether part of a receiver, a transmitter, or an imager. Alternatively, the AB transformer 1 of FIG. 2D may interface with another type of processor, such as an all-electronic version as described herein that provides an interference space (e.g., 30' of FIGS. 47 and 50) that transmits and allows interference of RF electrical signals, or an acoustic version that provides an interference space 30 that transmits and allows interference between acoustic signals. Furthermore, the waves at the input (sensed) and at the output (generated) by the AB transformer 1 need not be RF electromagnetic waves, but may be other types of waves such as acoustic, surface acoustic, light, deBroglie, magnetic, gravitational, stress, waves in Bose-Einstain condensate, or surface water waves. Further, the input wave type and output wave type may be the same or different. All of these alternatives will be understood to be applicable to this invention and may be implemented with the embodiments described herein when modified to use appropriate sensors/transducers to capture and generate the appropriate alternative waves.

As shown in FIG. 2D, first physical beams in a first interference region are captured by first sensors. The first physical beams may be waves of a first type. When the AB transformer 1 that interfaces with an optical processor 10 described herein is implemented in a receiver (e.g., as described with respect to FIGS. 3A and 3D), the first physical beams may include RF waves received by an antenna array 110 (with the antennas 120 that may comprise the first sensors). The first sensors of the AB processor 1 may be transducers that sense waves other than RF waves (e.g., microphones). When the AB transformer 1 interfacing with optical processor 10 described herein is implemented in a transmitter (e.g., as described with respect to FIGS. 3B-3C), the first physical beams may be optical beams transmitted through interference space 30 and captured by channels 20 (with lenslets 50 or other inputs to optical fibers 40 forming the first sensors).

Each captured first physical beam is transmitted as a corresponding virtual beam via channels 20, see FIG. 2D. Multiple virtual beams may be simultaneously transmitted by channels 20 via superimposition of signals forming the virtual beams in the channels 20. Each virtual beam is then transmitted by radiating elements and converted into a second physical beam in a second interference region. When the AB transformer interfacing with an optical processor 10 described herein is implemented in a receiver, the second physical beams may be corresponding optical beams emitted by channels 20 into interference space 30 (with ends of optical fibers 40 followed by lenslets 50 comprising radiating elements). When the AB transformer interfacing with an optical processor 10 described herein is implemented in a transmitter, the second physical beams may be RF beams transmitted by antenna array 110 after downconverting the optical signals of channels 20 to corresponding RF electrical signals (that feed corresponding antennas 120 of antenna array 110) and the antennas 120 may be comprise the radiating elements.

The arrangement of the ends of channels 20 at interference space 30 may be regularly spaced apart (e.g., regularly spaced in a 1×N array) along a line (a straight line or a curved line). However, the arrangement of the antenna elements 120 may be regularly spaced apart in two dimensions (e.g., regularly spaced apart in each of two directions of a two dimensional array forming antenna array 110). It should be noted that for ease of description, the arrangement of the ends of channels 20 at interference space 30 may simply be referenced as the "channel arrangement" or similar description (although it will be recognized that channels 20 need not maintain this arrangement along the entire length of the channels 20). Similarly, unless context indicates otherwise, reference to the ends of channels 20 (or similar description) will be understood to refer to the ends of the channels 20 at the interference space 30. While the relative positions of the antenna elements 120 and those of the ends of channels 20 do not correspond to each other, the information processed by the optical processor 10 is maintained as if they did correspond to each other. As described in herein, although the arrangement of the channels 20 may be different from the arrangement of the antenna elements 120, the relative positions of the inputs of the channels 20 (e.g., the ends of receiving fiber array of fibers 40 and lenslets 50) may be determined by (e.g., be a function of) the relative positions of the antenna elements 120 to which they provide their signals. For example, referring to FIG. 2D, the relative physical arrangement of sensor elements in the 'Physical-to-virtual beam conversion' block may differ from the relative physical arrangement of radiating elements in the 'Virtual-to-physical beam conversion' block. However, the relative positions of the sensing elements may be related to the relative positions of the radiating elements, as described herein, in a way that preserves the information processed by the optical processor 10 as if the arrangements did correspond to each other.

The channels 20 (i.e., ends of channels 20 corresponding to the lenslets 50 in this example) may be arranged along a line (a straight line or a curved line) that lies within a first plane and a propagation direction of optical signals within the optical processor 10 may also lie within this first plane. For example, when all or part of the optical processor 10 is formed as part of a semiconductor chip (such as shown in FIG. 2C), propagation direction(s) of optical signals within the semiconductor chip may be in parallel to the substrate of the semiconductor chip (e.g., the propagation directions of the optical signals may be confined to two dimensions, e.g., confined to horizontal transmission when a direction perpendicular to the substrate of the semiconductor chip is considered to be the vertical direction). The optical processor 10 need not require three dimensional optical processing and thus may be more easily formed in a semiconductor chip or other planar optical circuit.

Figure 3A:
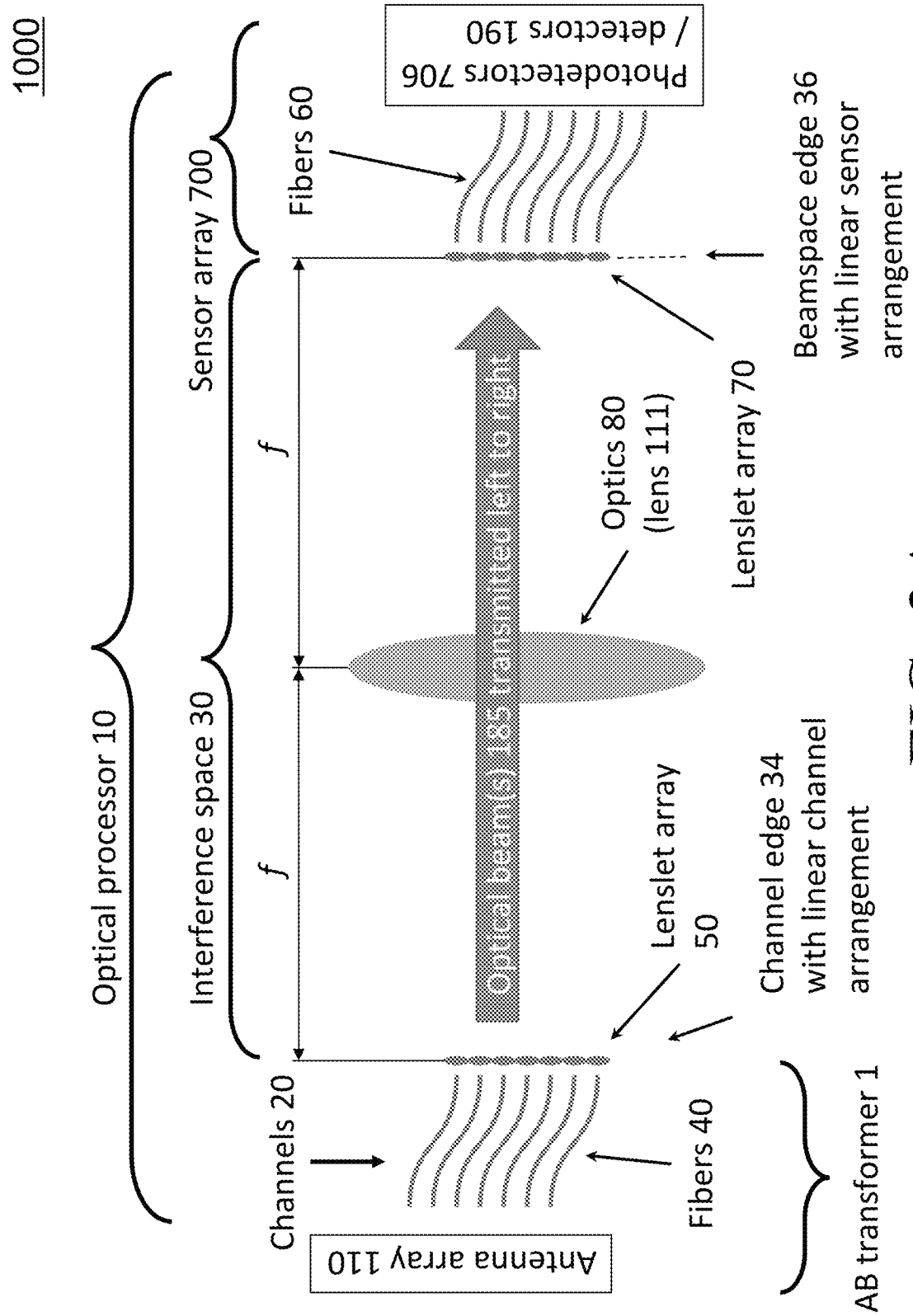
FIGS. 3A to 3E show receiver and a transmitter implemented with optical processor.
Figure 3B:
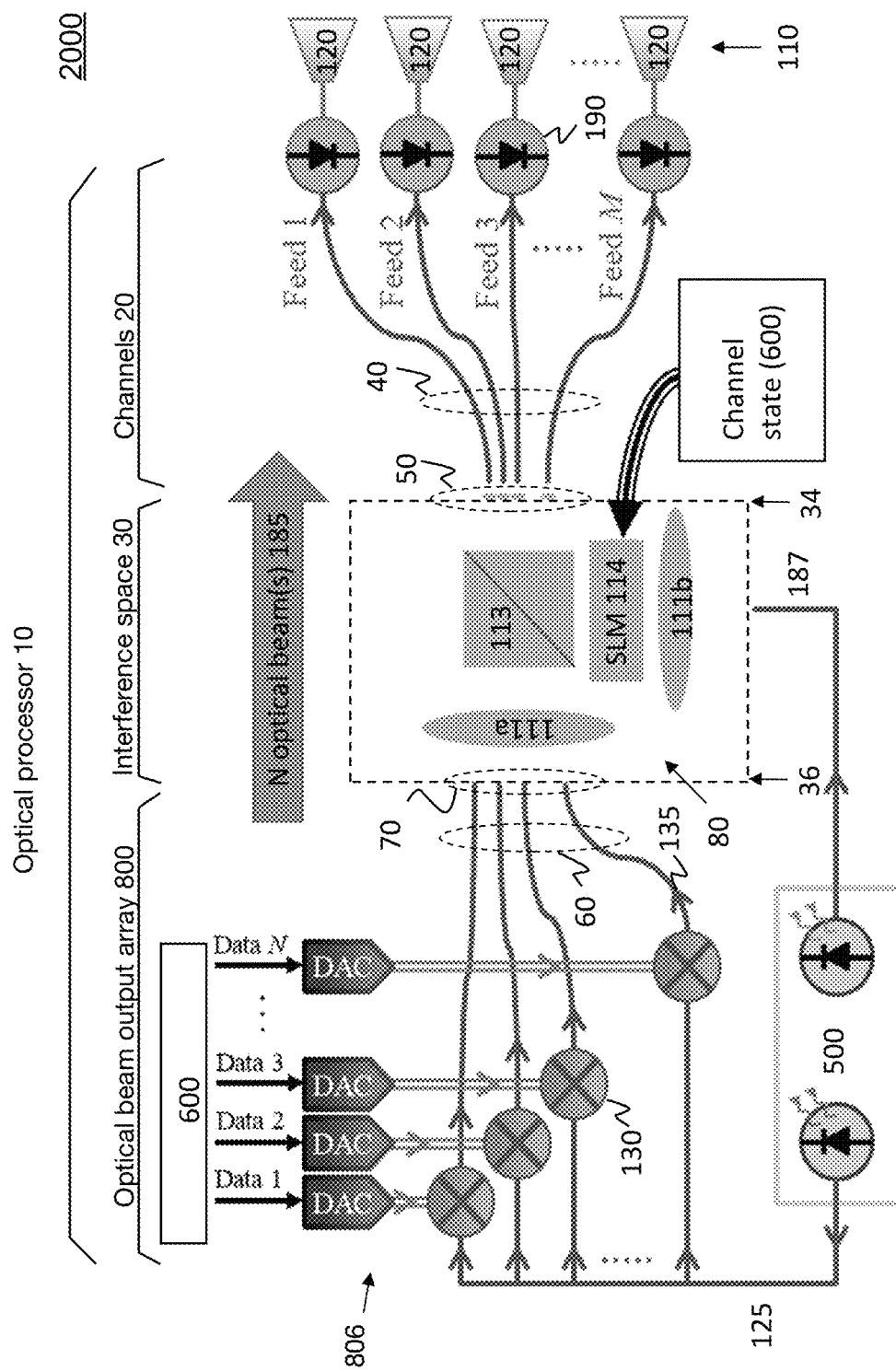
Figure 3C:
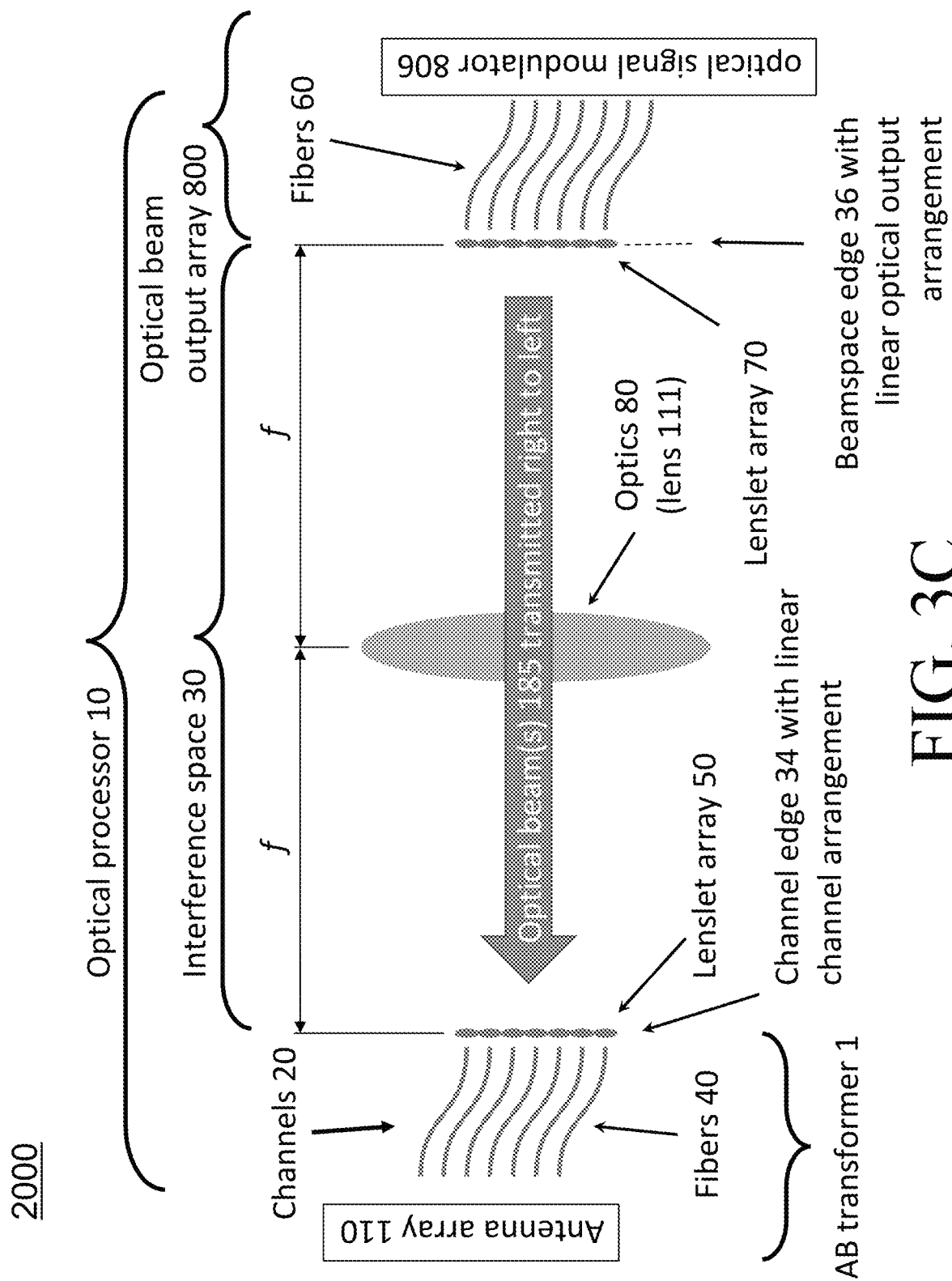
Figure 3D:
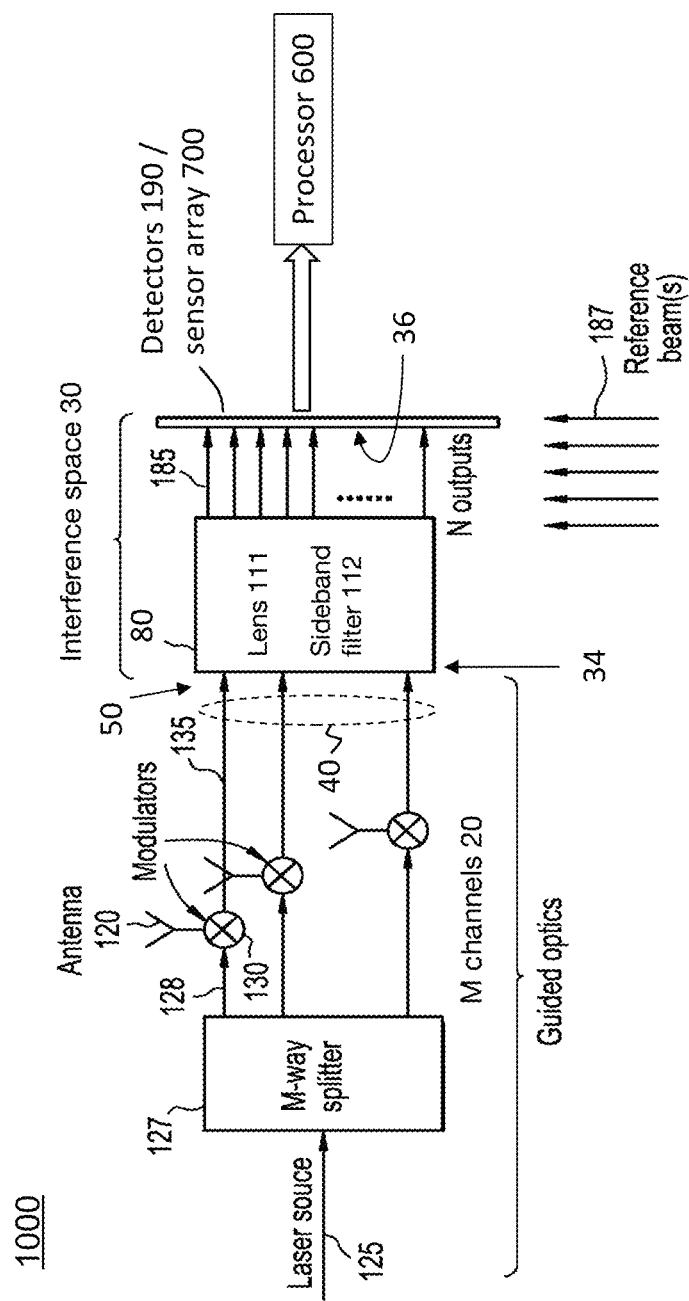
Figure 3E:
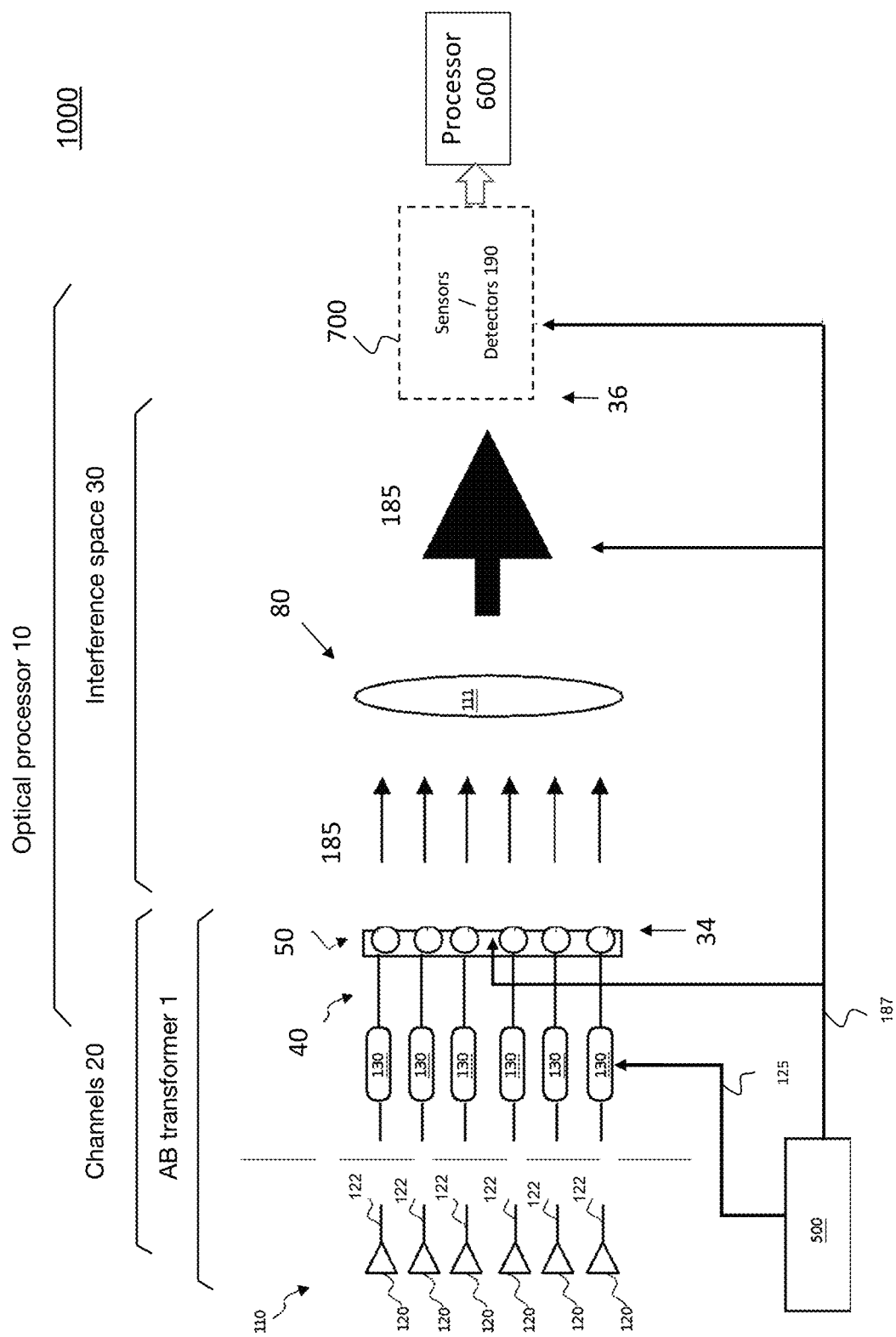

FIGS. 3A, 3D and 3E illustrate an exemplary embodiment of a receiver 1000 having an optical processor 10, which may include the same structure as that described with respect to FIGS. 2A to 2D. FIGS. 3A, 3D and 3E may illustrate different structure of receiver 1000 absent for others of these figures for ease of description. The receiver 1000 may be a modified version (e.g., modified to include the AB transformer 1 described herein) of receiver described in U.S. Pat. No. 9,800,346 and/or as described in U.S. Patent Publication 2019/0372219—both of these patent documents being incorporated by reference in their entirety for their teaching of an exemplary structure and operation thereof that may be implemented with the receiver 1000.

A single laser source 125 is split M ways by a splitter 127 and the resulting beams 128 are routed through modulators 130 coupled to antennas 120 capturing the RF radiation (e.g., capturing one or more RF beams from corresponding RF sources in the real world external to the receiver 1000). The output 135 of each modulator 130 is a modulated optical signal containing the laser carrier wavelength (corresponding to the wavelength of the laser source 125) and sidebands with imprinted the RF signal provided by the corresponding antenna 120 to which the modulator 130 is connected (such RF signal corresponding to the RF radiation captured by that antenna 120). The outputs 135 are conveyed by optical fibers 40 to a linear lenslet array 50 coupled to the outputs of the fibers 40 that are arranged in a linear pattern. The optical fibers 40 and lenslet array 50 may be collectively referred to herein as a fiber/lenslet array. The linear lenslet array 50 is arranged at an edge 34 of the interference space 30 at which channels 20 terminate (e.g., termination of optical fibers 40 at lenslet array 50) which may be referred to herein as a channel edge.

The signal path between an antenna 120 and a corresponding lenslet of the lenslet array 50 that is operatively coupled to such antenna 120 forms a channel 20. Ends of the plurality of channels 20 may be linearly arranged in an order related to the 2D arrangement of the antennas 120 as discussed elsewhere herein. It should be appreciated that reference herein to linear may include curvilinear and similarly, reference herein to a line may encompass both a straight line and a curved line, unless context indicates otherwise.

At the ends of the plurality of channels 20 (the outputs of the optical fibers 40/the lenslet array 50), the optical signals output by each optical fiber 40 propagate in interference space 30 (e.g., free space). As such, these optical signals are no longer guided by the optical fibers 40 and may thus interfere with each other and form one or more optical beams 185 in the interference space 30 (each optical beam 185 corresponding to an RF beam captured by the antenna array 110). While the embodiment of FIGS. 3A, 3D and 3E shows conventional optical fibers 40 between the electro-optic modulators 130 and interference space 30, those of skill in the art will appreciate that other optical waveguides or channels may also or instead be used.

Upon transmission into the interference space 30, each optical beam 185 may have the form of a plane wave with a direction of propagation determined by the corresponding RF beam to which it corresponds. The optical beams 185 formed in the interference space 30 may be subject to various optical devices 80 (e.g., lenses, filters, beam splitters, beam combiners, etc.). For example, optics 80 may include a one or more lenses 111 that focus the optical beams 185 formed in the interference space 30 to produce one or more spatially separated optical beams 185. The spatially separated optical beams 185 may be focused on a beamspace edge of the interference space 36 (which may correspond to a focal plane or an image plane of the optical processor) and detected with corresponding sensors of a sensor array 700. Mixing the optical beam(s) 185 with reference beam(s) 187 allows for the extraction of information carried in the optical beam(s) 185 modulated with incoming RF signal(s).

The optical outputs 135 of the modulators 130 may be filtered with a filter 112 to allow only a single sideband corresponding to the captured RF radiation to pass (using filter 112 in each of the channels 20 or in the interference space 30, e.g.). The filter 112 may be part of optics 80 in the interference space 30 downstream of the lenslet array 50. In alternative embodiments, the filter 112 can be placed anywhere between the modulators 130 and the detectors 190. Furthermore, in some embodiments, especially for frequencies lower than ~5 GHz, a Mach-Zehnder modulator (MZM) may be used for filter 112 to filter out the sideband energy from the optical carrier energy. Such modulators can, under appropriate bias conditions, interferometrically suppress the carrier while passing the (odd-ordered) sidebands, thereby suppressing the carrier in a frequency-independent manner.

Inputs of sensors of sensor array 700 may be linearly arranged at the beamspace edge 36 of interference space 30. Each sensor of the sensor array 700 may include one of the detectors 190 and, in some examples, optics, such as lenslets 70 and/or optical fibers 60. The optical fibers 60 and lenslet array 70 may be collectively referred to herein as a fiber/lenslet array Each optical beam 185 may be captured by a corresponding one of the sensors at the beamspace edge 36 (e.g., at a focal plane of the optical processor 10) and be detected by a corresponding one of the detectors 190 (which may form part or all of the sensor). Each detector 190 may be a photodiode or another type of photodetector. Sensors of sensor array 700 may have different forms such as being formed of detectors only (positioned at the beamspace edge 36), a lenslet/detector combination (positioned at the beamspace edge 36) and a lenslet (positioned at the beamspace edge 36) coupled to a detector via an optical fiber. FIG. 3A illustrates sensor array 700 comprising a lenslet array 70 coupled to photodetectors 706 via output fibers 60.

In the receiver 1000, optical processor 10 may comprise the fiber/lenslet array 40/50 (forming part of channels 20) that convey the modulated signals 135 output by modulators 130, the interference space 30 and optics 80 formed therein, and any optical transmission path of sensory array 700 (e.g., the fiber/sensory array 60/70 of sensor array 700 when implemented with the same). In the receiver 1000, the AB transformer 1 may comprise antenna array 10, channels 20 and the fiber/lenslet array 50. Together, the structure of the optical processor 10 and AB transformer 1 of the receiver 1000 may be referred to as a beamspace processor.

To extract or recover information encoded in an RF beam captured by the antenna array 110, the corresponding optical beam 185 (also containing this encoded information) is combined with a reference laser beam 187 for heterodyne detection by photodiode 706/detector 190. A few examples of non-spatial information encoded into an RF signal that may be detected by a photodiode 706/detector 190 include amplitude, phase, and/or frequency modulation of an RF carrier with an information-bearing signal. The information-bearing modulating signal may be analog or digital. The information may be contained in frequency-division multiplexed, time-division multiplexed, or code division multiple access signals (FDM, TDM or CDMA respectively; using telecommunication examples for more specificity for each, e.g., OFDM, GSM, or WCDMA signals). For example, each photodiode 706/detector 190 may receive an optical beam 185 corresponding to a different RF beam received by the antenna array, with each RF beam providing an OFDM signal comprising multiple carrier signals that are orthogonal to each other. A single photodiode 706/detector 190 of sensor array 700 may extract the multiple carrier signals as an RF electrical signal which may be appropriately demodulated (e.g., to baseband) to extract data (e.g., a digital data comprising binary bits of 0's and 1's). Each OFDM signal received by each photodiode 194 may comprise multiple channels of data, each associated with a different transmission (e.g., each associated with a different audio signal or different video signal). As is known, a channel of digital data need not be carried by a single carrier but may be spread across multiple ones of these carriers (e.g., via frequency hopping or interleaving). The RF carriers of the same frequency (e.g., of the OFDM signals) may be simultaneously transmitted by the RF sources and captured by different sensors of sensor array 700; interference amongst the simultaneously received OFDM signals may be avoided due to the spatial separation of the resulting optical beams 185 at beamspace edge 36. Each OFDM signal received by each photodiode 706/detector 190 may correspond to an OFDM RF signal transmitted by one or more of the RF sources and received by antennas 120 (e.g., in the millimeter wavelength RF range, or in a range of 3 to 300 GHz, or between 0.5 to 300 GHz, such as 0.5-110 GHz, or in the HF band of 3 to 30 MHz, or in VHF band of 30 to 300 MHz, or in UHF band of 300 MHz to 1 GHz). Thus, for example, antennas 120 may receive multiple OFDM RF signals (via corresponding RF beams) each having multiple channels to carry multiple transmissions of digital data on multiple signal carriers, such as digital audio (e.g., MP3, MPEG), digital images, digital video (e.g., MP4), data in TCP/IP format, etc. Optical conversion and processing (as described herein) may convert each of these RF OFDM signals to a corresponding one of optical signals 185 at the beamspace edge 36 to a different one of the sensors of sensor array 700. Thus, even when implemented with the same carrier frequency, different RF beams from different RF sources may be simultaneously captured by the antenna array 110 and provided to a different corresponding photodiode 706/detector 190 as a converted optical beam 185 (corresponding to one of the captured RF beams). Thus, a plurality of received RF beams with corresponding RF signals (e.g., OFDM signals) can be processed simultaneously to extract or recover information from these RF signals.

As shown in FIGS. 3E and 3D, the RF signal(s) extracted by photodiodes 706/detectors 190 may be provided to processor 600 after being converted to digital form by an analog to digital converter (not shown) and/or downconverted to a baseband signal by a mixer (not shown). Processor 600 may be a general purpose processor (e.g., a computer, microprocessor, CPU, GPU, etc.) or special purpose processor (e.g., a digital signal processor), and may be hardware configured by software or hardware circuitry (e.g., an integrated circuit). Processor 600 may be formed of by one processor or several interconnected processors. Processor 600 may determine the RF beam angle of arrival (at the antenna array 110) based upon the photodiode 706/detector 190 that provides the RF signal to the processor 600. That is, the optical processor 10 is configured such that a predetermined relationship exists between the location of an optical beam 185 as focused on the sensory array 700 at the beamspace edge 36 (e.g., a focal plane of the optical processor 10)—which may correspond to a location of a sensor of the sensor array 700—and the angle of arrival of the RF beam to thus allow the processor 600 to determine the angle of arrival of the RF beam. Thus, a location of an optical beam 185 at the beamspace edge 36 (e.g., formed as a discrete spot) along the linear arrangement of the sensor of the sensor array 700 may be used to determine the angle of arrival of the RF beam by the processor 600.

FIG. 3E shows antenna elements 120 may be connected to a corresponding electro optic modulators 130 via a plurality of RF transmission lines 122 through respective RF connectors (illustrated by the dashed line intersecting antenna RF transmission lines 122). The optional use of RF connectors 1010 may facilitate the reconfiguration of the receiver 1000 so that the receiver 1000 may be used with other antennas that operate at different RF carrier frequencies (i.e., e.g., antenna array 110 may be replaced with another antenna array by a user and the receiver 1000, using a new antenna array may operate using the same optical processor 20).

FIG. 3E also illustrates an optical source 500 configured to generate the optical carrier signal 125 (e.g., a primary laser) and the reference optical signal 187 (as secondary laser). The optical carrier signal 125 has a first frequency and the reference optical signal 187 has a second frequency. The first frequency and second frequency differ by a set amount (where this difference in frequency may be set by an input to the optical source 500, such as by a user input (e.g., programmed)). In addition, the optical carrier signal 125 and the reference optical signal may be phase-locked to each other. The optical source 500 may be a tunable optical pair source (TOPS) such as disclosed in "Radiofrequency signal-generation system with over seven octaves of continuous tuning," authored by Schneider et al., and published in Nature Photonics, online Jan. 20, 2013, and/or as disclosed in U.S. patent application Ser. No. 16/847,417, filed Apr. 13, 2020, the contents of each of which is hereby incorporated by reference in its entirety.

The reference optical beam 187 may be combined with beams 185 in different ways (illustrated by three branches of dashed lines 187). Only one of these options need be implemented in the receiver 1000. In the first branch, the reference beam 187 may be split and each split portion of reference beam 187 individually combined with a corresponding output 135 of a modulator 130 (e.g., with a corresponding optical combiner (not shown) spliced into an optical fiber 40 of the corresponding channel 20). Alternatively, in the first branch, the reference beam 187 may be transmitted with an optical fiber that is part of the fiber bundle of fibers 40 that transmit the modulated optical signals 135 output from the modulators 130, such a fiber bundle terminating at the interference space 30 to transmit both the reference beam 187 and the modulated optical signals 135 into interference space 30 where they may interfere with each other. Alternatively, as shown in the second branch, the reference beam 187 may combine via an optical combiner (part of optics 80 and not shown in FIG. 3A or 3D, but similarly implemented in FIG. 3B) with the beams 185 output into interference space 30. Alternatively, as shown in the third branch, the reference beam 187 may combine with beams 185 after they are captured (e.g., passively captured) by sensors of sensor array 700 at the beamspace edge 36 (e.g., at the focal plane of processor 10) but prior to their conversion to an electrical signal by a photodetector 706/detector 190 (e.g., for each beam 185, reference beam 187 may be combined with a corresponding optical combiner (not shown) spliced into an optical fiber 60 of the corresponding sensor of sensor array 700).

FIGS. 3B and 3C illustrate an exemplary embodiment of a transmitter 2000 having an optical processor 10, which may include the same structure as the optical processor 10 described with respect to FIGS. 2A to 2C. For clarity, each of FIGS. 3A and 3B may illustrate different portions of the structure of the exemplary transmitter 2000. As shown in FIG. 3A, the optical processor 10 of the transmitter 2000 may include much of the same structure (including illustrated and alternative structure) as described with respect to the optical processor 10 of the receiver 1000 of FIGS. 3A, 3C and 3D and thus, repetitive description may be omitted.

It will be appreciated that the optical path through the optical processor 10 of the transmitter 2000 is in the opposite direction as compared to the optical processor 10 of the receiver 1000 (e.g., as represented in FIG. 3A and FIG. 3C). Thus, although some structure of the optical processors 10 of receiver 1000 and transmitter 2000 may be the same, nomenclature may be different in order to recognize this difference. Although optical path through the optical processor 10 of transmitter 2000 is shown as right to left in FIG. 3C, it should be appreciated that this optical path extends in the opposite direction (left to right) in FIG. 3B.

FIGS. 3B and 3C show the architecture of an optically fed transmitter 2000 for a multi-user MIMO network. An optical source 500 (which, as described herein, may be tunable optical paired source (TOPS)) generates two beams of laser light 125 and 187 having wavelengths offset by the desired RF carrier frequency; the lasers are injection phase-locked to ensure pure RF-tone generation with low phase noise. One of these optical beams 125 is split N ways with an optical splitter (interposed between the TOPS and electro-optic modulators—not shown), where N is the number of spatial sectors (e.g., spatially separate locations in the region external to the transmitter 2000) covered by the transmitter 2000 and represents the number of distinct RF beams that may be simultaneously generated by the antenna array 110. Each of the N optical beams is modulated by a corresponding electro-optic modulator 130 in phase and/or amplitude with a respective data stream (Data 1, Data 2, . . . Data N) provided by processor 600 that are encoded into a desired I/Q constellation such as OOK, QPSK, 16QAM, or higher order modulation schemes. The encoding of discussed herein with respect to receiver 1000 may also apply to the encoding employed by transmitter 2000 and details thereof need not be repeated. The electro-optic modulators 130 used in this example may be of single-sideband suppressed carrier (S3C) variety.

The outputs of modulators 130 are each transmitted by a corresponding input optical fiber 60, the group of optical fibers 60 forming a fiber bundle that terminates at the beamspace edge 36 of the interference space 30. Beamspace edge 36 (and the termination of the optical fibers 60) may be located a focal plane of lens 111a. Each fiber 60 may serve effectively as a point source to the optical lens system (e.g., optics 80) which produces a collimating plane wave that impinges on the receiving lenslet-and-fiber array (40, 50) (at the channel edge 34 of the interference space 30) with linear phase distribution across the receiving array (40, 50). If needed, an additional RF mixer (not shown) may be used prior to electro-optic modulation to shift the individual data streams from baseband to a sub-carrier or intermediate frequency IF. As a result, N optical beams 185 may be formed in interference space 30, with each optical beam 185 illuminating lenslet array 50 to be captured by the lenslets of the lenslet array 50 and transmitted by corresponding fibers 40 (and corresponding channels 20 formed by the fibers 40). A single optical beam 185 provides a set of optical signals that is captured by the lenslet array 50 and transmitted by the output fibers 40 and may be referenced herein as a virtual beam. Thus, the N optical beams 185 may form N virtual beams (superimposed on each other) within channels 20. Each of the N optical beams (and N virtual beams) may contain a single modulation sideband corresponding to a data stream (one of Data 1, Data 2, . . . Data N) to be formed by the antenna array 110 as a corresponding RF beam destined for the respective sector.

The light of the other optical beam 187 (of different wavelength) generated by the optical source 500 (e.g., TOPS) serves as a reference and is routed to the input focal plane of a second lens 111b placed at the other input port of the beam combiner 113. Prior to combining the reference beam 187 with the N modulated optical beams 185, the wave-front of the reference light 187 may be additionally modified (e.g., phase shifted and/or amplitude modulated) with a spatial light modulator (SLM) 114 that takes into account the channel state in the RF environment. The channel state configuration of the SLM 114 may be provided by a processor 600. In some examples, the SLM may be not be used. In the absence of an SLM, the reference beam 187 produces a flat phase across the lenslet-and-fiber array (50, 40) at the channel edge 34; in the absence of an SLM 114, the portions of the reference beam 187 input to each of the M feeds of the receiving fiber array (e.g., at each of the lenslets and/or fibers) may be in phase. In the absence of SLM 114, channel state configuration may be provided via processor 600 in data streams (Data 1, Data 2, ... Data N). Thus, each of the M optical fibers 40 at the output of the beam combiner 113 (forming the receiving fiber array) receives the optical reference light 187 (provided by lens 111b—which may or may not be modulated by the SLM 114) and portions of each of the N modulated optical beams 185 (provided by lens 111a).

The relative positions of the inputs of the channels 20 (e.g., the ends of receiving fiber array of fibers 40 and lenslets 50) may be determined by the relative positions of the antenna elements 120 to which they provide their signals (as described elsewhere herein). However, the arrangement of the inputs of the channels 20 may be different from the arrangement of the antenna elements 120; the arrangement of inputs of channels 20 may be arranged linearly (e.g., regularly spaced in a 1×N array) and the arrangement of antenna elements 120 to which these channels 20 are connected may be arranged in two dimensions (e.g., regularly spaced apart in each of two directions of a two dimensional array forming antenna array 110). The arrangement of channel inputs 20 may be arranged along a line (a straight line or a curved line) that lies within a first plane and a propagation direction of each of the optical beams 185 may also lie within this first plane. When the optical processor 10 is formed as part of a semiconductor chip and/or the interference space 30 and inputs of channels 20 are formed as part of as a semiconductor chip, this first plane may be parallel to a substrate of the semiconductor chip. The arrangement of the antennas 120 may be confined to two dimensions within a second plane where at least some of the transmission directions of the RF beams lie outside of (or are not parallel to) this second plane.

The optical path lengths of each optical path of the optical fibers 40 may be the same and may be formed by the optical path length of the corresponding fiber 40 only or by the optical path length of the corresponding fiber 40 and an adjustable optical delay element (or adjustable phase delay), such as lithium niobate, interposed in the optical path.

Through the optical lens 111a, each one of the N modulated beams is collimated into a corresponding plane wave. Upon being input to the fibers 40 at channel edge 34, for each one of the N modulated beams 185, portions thereof are phase offset in dependence on the optical path length through the interference space 30 of these different portions of each modulated beam 185. For example, each modulated beam 185 may have a linear phase offset with respect to its portions distributed across the inputs of channels 20 at the channel edge 34. Each of the M optical fibers 40 (forming the receiving fiber array) may receive a corresponding combined beam comprising corresponding portions of each of the N modulated beams 185 with a corresponding linear phase offset (with respect to its neighboring optical fiber 40) and reference light 187 with flat phase (e.g., reference light 187 in phase at each of the inputs of the channels 20/inputs to the fibers 40 of receiving fiber array).

Each of the fibers 40 feed such a corresponding combined optical beam to a corresponding one of the detectors 190 (e.g., photodiodes 706). Each of the detectors 190 is coupled to a corresponding antenna element 110 (e.g., a corresponding horn antenna) of an antenna array 120. Each detector 190 converts a corresponding combined optical beam to an RF electrical signal (e.g., with an RF frequency equal to the frequency offset of the two beams of laser light 185, 187 produced by optical source 500).

The detectors 190 (photodiodes 706) generate RF signals that contain information of all data streams (Data 1, Data 2, ... Data N) to form RF beams in free space. Each of the RF beams may radiate in directions different from one another (i.e., in different sectors and thus may be referred to as an RF sector beam). This way, each of the optical beams 185 formed in optical domain in interference space 30 becomes an RF beam transmitted by the antenna array 110. The wavefront of the RF beams may be additionally modified (e.g., as discussed herein) to take RF channel state information into account when forming the RF beams.

Thus, each modulated optical signal 135 output on a fiber 60 of may produce a corresponding RF sector beam in real space such that multiple RF sector beams (which may have the same carrier frequency) are simultaneously formed and emitted from the antenna array 110 that point towards corresponding sector directions (and thus may not interfere with each other in real space). There is thus a one to one correspondence of the N modulated optical signals 135 and the N corresponding RF sector beams. Adding an additional modulated optical beam 135 will produce an additional RF sector beam in real space that is independent of other RF sector beams. All RF sector beams may be formed independently from each other and simultaneously with each other.

In the transmitter 2000, optical processor 10 may comprise the fiber/lenslet array 60/70 that convey the modulated optical signals 135 into interference space 30, the interference space 30 and optics 80 formed therein, and the fiber/lenslet array 40/50 (forming part of channels 20). In the transmitter 2000, the AB transformer 1 may comprise antenna array 110, channels 20 and the fiber/lenslet array 40/50. Together, the structure of the optical processor 10 and AB transformer 1 of the transmitter 2000 may be referred to as a beamspace processor.

The receiver 1000 and transmitter 2000 described herein may operate and communicate with a wide range of radio frequencies, such as millimeter wave (e.g., about 30 to 300 GHz), microwave (e.g., 1 to 170 GHz), SHF (3 GHz to 30 GHz), UHF (300 MHz to 3 GHz), VHF (30 to 300 MHz), to radio frequencies as low as 300 KHz or even 30 KHz. It should be appreciated that while receiver 1000 and transmitter 2000 may dynamically change the range of frequencies that may be transmitted, real time alteration of the carrier frequency will be limited by the type of antenna 120 of the antenna array 110 (although, these may be physically replaced with other antennas by a user and/or automatically switched to one of several existing different arrays).

The light beams 185 and 187 described herein may be visible light or invisible light (e.g., infrared, ultraviolet). Use of other waveguides other than a fiber optics may also be implemented, however widespread availability and ease of use of fiber optics may make such waveguides preferable for optical waveguides.

The embodiments disclosed herein may be related to phased arrays and, in particular, phased arrays with regularly distributed elements. Concepts of such phased arrays are summarized below. Although the discussion below may refer to certain features of a phased antenna array (e.g., antenna elements), it should be emphasized that the invention is not limited to use with antennas and other types of transducers may be implemented according to the invention (as discussed herein).

Resolution Vs. Size and Array-Element Distribution

The resolution of any imaging system, including phased arrays, may be fundamentally determined by the diffraction limit. Thus, an aperture having a width A may be capable of resolving features separated by angle $$\delta\phi = \frac{\lambda}{A}, \quad (1)$$

where λ is the wavelength of detected radiation. For a two-dimensional rectangular aperture, the resolution in each dimension, e.g. azimuth and elevation, δϕ, δθ, may be determined by the size of the aperture in the respective dimension, width and height, A, B, i.e.

$$\delta\phi = \frac{\lambda}{A}, \delta\theta = \frac{\lambda}{B}. \quad (2)$$

Relations (2) may hold for continuous apertures as well as for apertures consisting of several discrete antenna elements, i.e., for phased arrays. In case of phased arrays, the (effective) dimensions of an individual antenna element may determine the array's field of regard or field of view. Thus, if each element is effectively an a×b-sized rectangle, the field of regard may be $$\Delta\phi \times \Delta\theta, \text{ where } \Delta\phi = \frac{\lambda}{a}, \Delta\theta = \frac{\lambda}{b}. \quad (3)$$

Figure 4:
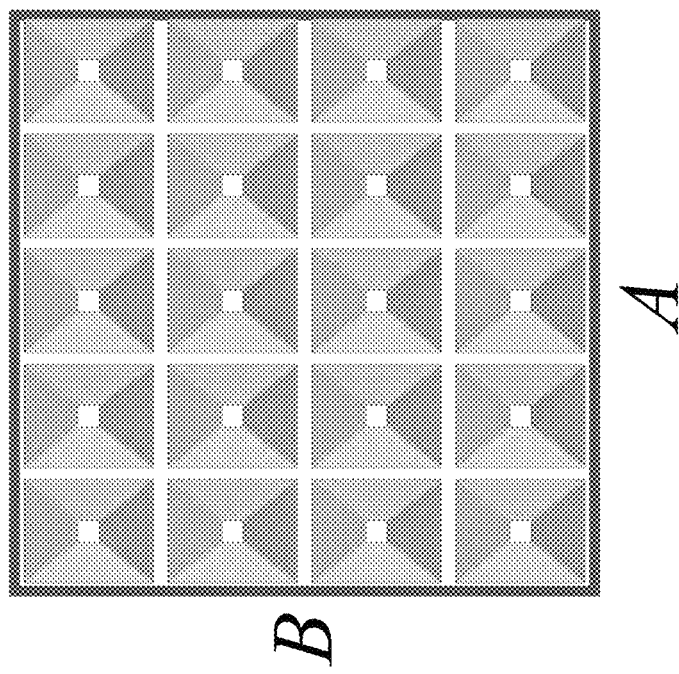
FIG. 4 illustrates how array and element geometry may determine the resolution and the field of regard.

Relations (2) and (3) are illustrated in FIG. 4. Combining (2) and (3) yields the following:

$$\frac{\Delta\phi}{\delta\phi} \times \frac{\Delta\theta}{\delta\theta} = \frac{\lambda/a}{\lambda/A} \times \frac{\lambda/b}{\lambda/B} = \frac{A}{a} \times \frac{B}{b}, \quad (4)$$

where the left-hand side is equal to the number of beams resolvable by the array, $N_\phi \times N_\theta$, whereas the right-hand side equals the number of antenna elements in the array $N_x \times N_y$. As a result, (4) leads to the following relation between the number of elements in the array and the number of beams the array may be capable of resolving:

$$N_\phi \times N_\theta = N_x \times N_y. \quad (5)$$

The set of beams that are simultaneously resolvable by a given aperture forms an array, which is represented in the reciprocal space as an array of points that will be referred to as a beamspace array. The number of beams represented by a beamspace array may be the maximum number of beams that are simultaneously resolvable. In the example above, a phased array with $N_x \times N_y$ elements may give rise to a beamspace array with $N_\phi \times N_\theta$ resolvable beams.

Note that although (5) indicates that the number of elements in the beamspace array equals the number of elements in the antenna array and that their distributions are directly related, as in $N_\phi = N_x$ and $N_\theta = N_y$, there exists no natural correspondence between the resolvable beams and the array elements. Indeed, the entire array may contribute to the formation of each beam.

Figure 5:
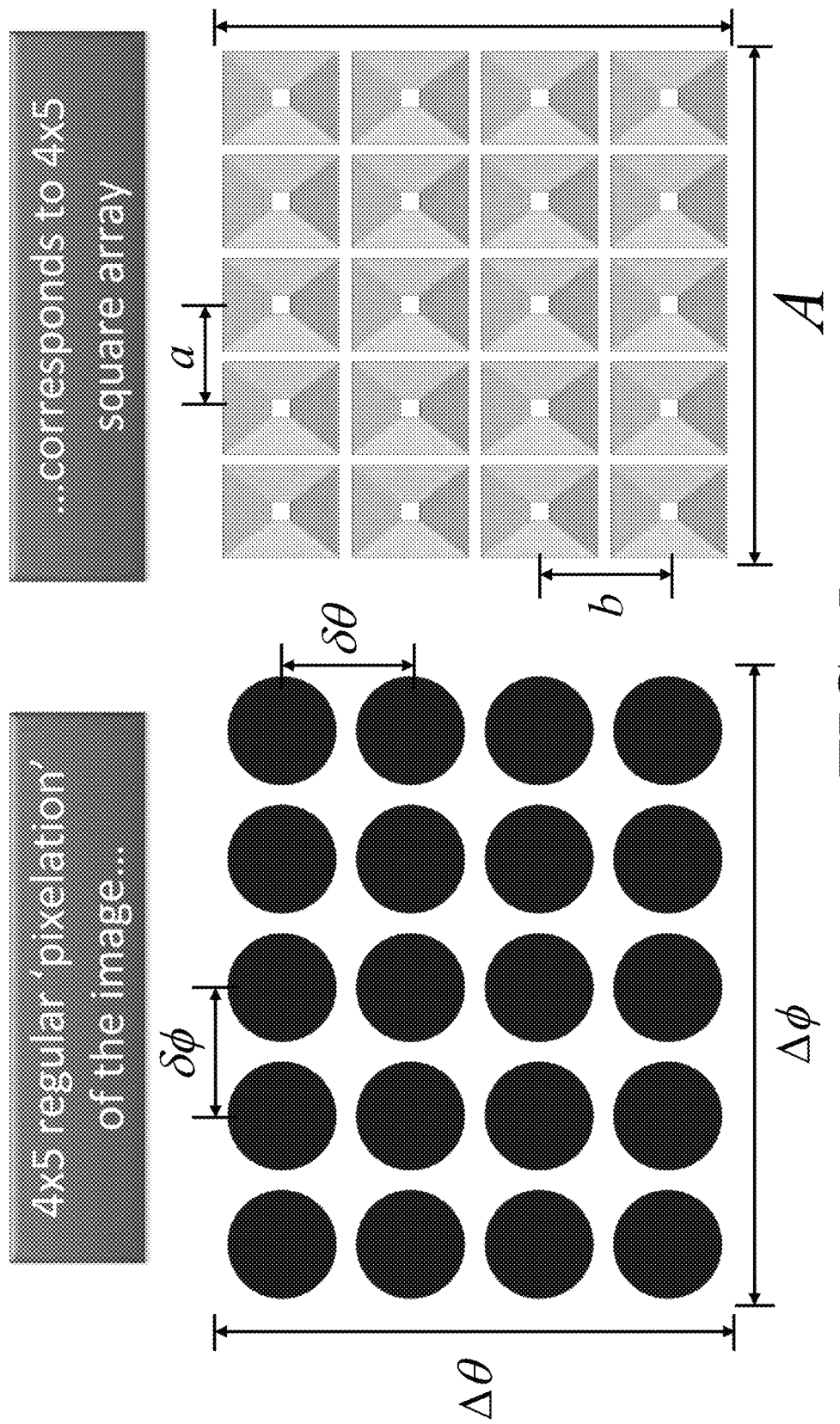
FIG. 5 shows the relation between the aspect ratio of the beam pattern and the array/element geometry. Left: Pattern of resolvable beams (beamspace array). Right: Corresponding antenna array.

An additional direct consequence of (2) and (3) is the following relation between the aspect ratios of the beam pattern (beamspace array) and the aspect ratios of the array and of the array element:

$$\frac{\delta\phi}{\delta\theta} = \frac{B}{A}, \frac{\Delta\phi}{\Delta\theta} = \frac{b}{a}, \quad (6)$$

which is illustrated in FIG. 5. Note that according to (6), the aspect ratio of the entire array may determine the resolution aspect ratio whereas the aspect ratio of the array element may determine the aspect ratio of entire beamspace array. In other words, the 'large' features of the antenna array may determine the 'small' features of the beamspace array, and vice versa. This relation is consistent with the understanding that whereas the array and array elements reside in the real space, the beams are represented as points in the reciprocal space; the latter will be also referred to as a beamspace, and the points in beamspace may be simply referred to as beams.

Beam

The common term 'beam' may be endowed with subtly different meanings depending on context where it occurs. Therefore, here we discuss the variations of the term as it may occur in this disclosure.

Commonly, 'beam,' as in 'beam of light,' may be understood as electromagnetic radiation that is confined laterally in space and propagating in a particular direction to form, for example, a straight line in free space. Since physics may prohibit perfect lateral confinement in homogeneous linear media over arbitrary propagation lengths, we deviate slightly from this 'common' understanding, and allow for beam divergence along the propagation direction. Thus, for an incoming beam detected by a receiver antenna, 'beam' may be understood as a propagating wave that appears approximately as a plane wave at the receiving antenna location and antenna extent. Similarly, a beam transmitted by a transmitting antenna may be understood as having approximately flat phase, similar to a plane wave, in the vicinity of the antenna but allowing for amplitude variation in the plane perpendicular to the direction of propagation, the amplitude variation consistent with the lateral extent of the transmitting antenna.

Practical considerations of phased arrays, and finite aperture size in general, may introduce additional complexities to the beam shape, i.e., the amplitude and phase variation of the electromagnetic field in the plane perpendicular to the direction of beam propagation. For example, phased arrays with a regular (periodic) distribution of radiating elements may produce grating lobes, i.e., waves propagating in directions inversely related to the element spacing; or side lobes, i.e., waves propagating in directions related to the lateral extent of the aperture and variation in amplitude and phase of the signals radiated by the individual elements, in addition to the 'main lobe' which is the wave transmitted in the intended direction. Although the collection of all the lobes, i.e. the main lobe, the grating lobes, and the side lobes, may be considered to constitute a transmitted beam, it should be understood that reference to the direction of such a transmitted beam herein corresponds to the direction of the main lobe, unless context indicates otherwise. By reciprocity, a receiving antenna array may be characterized using the same concepts of main lobe, grating lobes and side lobes.

A convenient framework for the notion of a beam is provided by the concept of k-space. Formally, the distribution of electromagnetic field in space and time, i.e., time-dependent field, may be expressed as a superposition of plane waves by performing Fourier transformation of the 4-dimensional field distribution. Fourier transform of a field distribution may contain all the information carried by the original spatio-temporal distribution of the field and as such may provide an equivalent description of the field. In other words, the spatio-temporal field distribution may be equivalently thought of as a field distribution in four dimensions spanning the one dimension of temporal frequency ω and three spatial-frequency dimensions of a k-vector k. Furthermore, given the relation $\omega=c|k|$ that ties plane wave's frequency $\omega$ to its wave-vector (k-vector) k, in the Fourier domain it is sufficient to specify the distribution over the three dimensions where k resides.

Using the concept of k-space, a 'beam' may be understood as a field distribution in k-space that is mostly concentrated around one or several points. As an example, a single plane wave would be represented in Fourier domain (frequency domain) as a spike at one value of k and zero everywhere else. A beam having a single dominant frequency and direction of propagation, and a limited lateral extent would be represented in Fourier domain as a field distribution concentrated around one value of k and tending to zero away from it. A beam comprising grating lobes, e.g. a beam produced by a regular phased array, might have a distribution in Fourier domain characterized by a dominant peak around a value of k corresponding to the main lobe and additional lower peaks corresponding to grating lobes periodically distributed in k-space with generally diminishing amplitudes as their separation from the main peak increases.

According to the description above, beams may be identified by the field distribution in k-space. The main lobe may correspond to the dominant peak in the k-space distribution, and the vector k, at which the dominant peak occurs may point in the propagation direction of the beam, whereas the length of k relates to the dominant frequency $\omega$ of the beam via $\omega=c|k|$. If the beam is associated with a TX or RX antenna or light emitter, one may refer to the position of the main peak in k-space as aiming or steering the beam in the respective direction (and corresponding to the direction of the beam).

A plane wave may be mathematically represented as $$E\exp[-i(\omega t - k \cdot x)], \quad (7)$$

where E is the wave amplitude, $\omega$ is its frequency, k is the wave-vector, and x is the position in space; polarization is ignored in (7). If the position of an antenna element is $x_n$, then it will receive a signal proportional to $$E\exp[-i(\omega t - k \cdot x_n)]. \quad (8)$$

Therefore, antenna elements positioned at $x_0$, $x_1$, $x_N$ will receive signals proportional to $$E\exp[-i(\omega t - k \cdot x_0)], E\exp[-i(\omega t - k \cdot x_1)], \ldots, E\exp[-i(\omega t - k \cdot x_{N-1})], \quad (9)$$

respectively. According to (9), the time-dependent signals received by the N antenna elements of a phased array are identical, $\exp(i\omega t)$, except for the phase shift $\phi_n = k \cdot x_n$ that depends on the antenna-element position $x_n$ in space. One can introduce a notion of a beam B, associated with an antenna array, and dependent on the incoming or outgoing wave(s), as $$B \equiv \begin{pmatrix} E_0 e^{i\phi_0} \\ E_1 e^{i\phi_1} \\ \vdots \\ E_{N-1} e^{i\phi_{N-1}} \end{pmatrix}, \quad (10)$$

where $E_0$, $E_1$, ..., $E_{N-1}$ are the amplitudes and $\phi_0$, $\phi_1$, ..., $\phi_{N-1}$ are the phases of the received or transmitted signals (e.g., the set of N received or transmitted signals received or transmitted by N antennas or corresponding versions thereof). Beam B of (10) may be considered a "virtual beam." Note that since the RF-to-optical up-conversion process in an imaging RX is spatially coherent, phase relations of (10) are preserved between the RF and optical domains and thus a virtual beam B is representative of both a captured RF plane wave by the antenna array and the corresponding optical beam formed by the optical processor in response to such capture and representing the captured RF plane wave in the optical realm; the situation is similar for TX using an interference-space-based optical processor where a virtual beam B is representative of both an RF beam radiated by the antenna array and the optical beam formed in the optical processor used to generate that RF beam. Hence, optical beam forming of RF beams is possible in these systems. Note also that Eq. (10) describing a virtual beam, and the dot product (11) below, may be used with arbitrary distributions of amplitudes $E_0$, $E_1$, ..., $E_{N-1}$ and phases $\phi_0$, $\phi_1$, ..., $\phi_{N-1}$ that in general need not be in the form $\phi_n = k \cdot x_n$. For two virtual beams $B^a$ and $B^b$ corresponding to plane waves having the same frequency $\omega$, generally different amplitudes $E^a$, $E^b$, and wave-vectors $k^a$ and $k^b$, one can define an inner, or dot, product between the virtual beams as $$\langle B^a, B^b \rangle = \sum_{n=0}^{N-1} E_n^a E_n^b \exp[-i(\phi_n^a - \phi_n^b)]. \quad (11)$$

Two virtual beams are said to be orthogonal if the dot product (11) between them vanishes. In view of (11), 'distinguishing' of the virtual beams may be understood to represent orthogonality (or its functional equivalent in the operation of a phased array).

For virtual beams $B^a$, $B^b$ corresponding to waves having different frequencies $\omega^a$, $\omega^b$, one may construct an analog of the dot product (11) that becomes time dependent $$\langle B^a e^{i\omega^a t}, B^b e^{i\omega^b t} \rangle = e^{-i(\omega^a - \omega^b)t} \sum_{n=0}^{N-1} E_n^a E_n^b \exp[-i(\phi_n^a - \phi_n^b)]. \quad (12)$$

In this case, the notion of orthogonality between virtual beams is still well defined since the time dependence comes in (12) in the form of a factor $\exp[-i(\omega^a-\omega^b)t]$, which is immaterial if the remaining term vanishes. The notion of orthogonality between virtual beams corresponding to different frequencies may become particularly relevant when considering extending the aperture to the temporal dimension by implementing different delays between the elements of the RX or TX array interfacing with the free space and the elements of the array interfacing with the interference space. In this case, virtual beam (10) at the antenna array may correspond to virtual beam $$\begin{pmatrix} E_0 e^{i(\phi_0 + \omega \Delta t_0)} \\ E_1 e^{i(\phi_1 + \omega \Delta t_1)} \\ \vdots \\ E_{N-1} e^{i(\phi_{N-1} + \omega \Delta t_{N-1})} \end{pmatrix} \quad (13)$$

at the array interfacing with the interference space, where w is the frequency of the wave, and $\Delta t_n$ is the time delay in the $n^{th}$ channel for $n=\{0, 1, \ldots, N-1\}$. Dot product (12) that may define orthogonality between virtual beams is then modified accordingly.

Beam Steering

Figure 6:
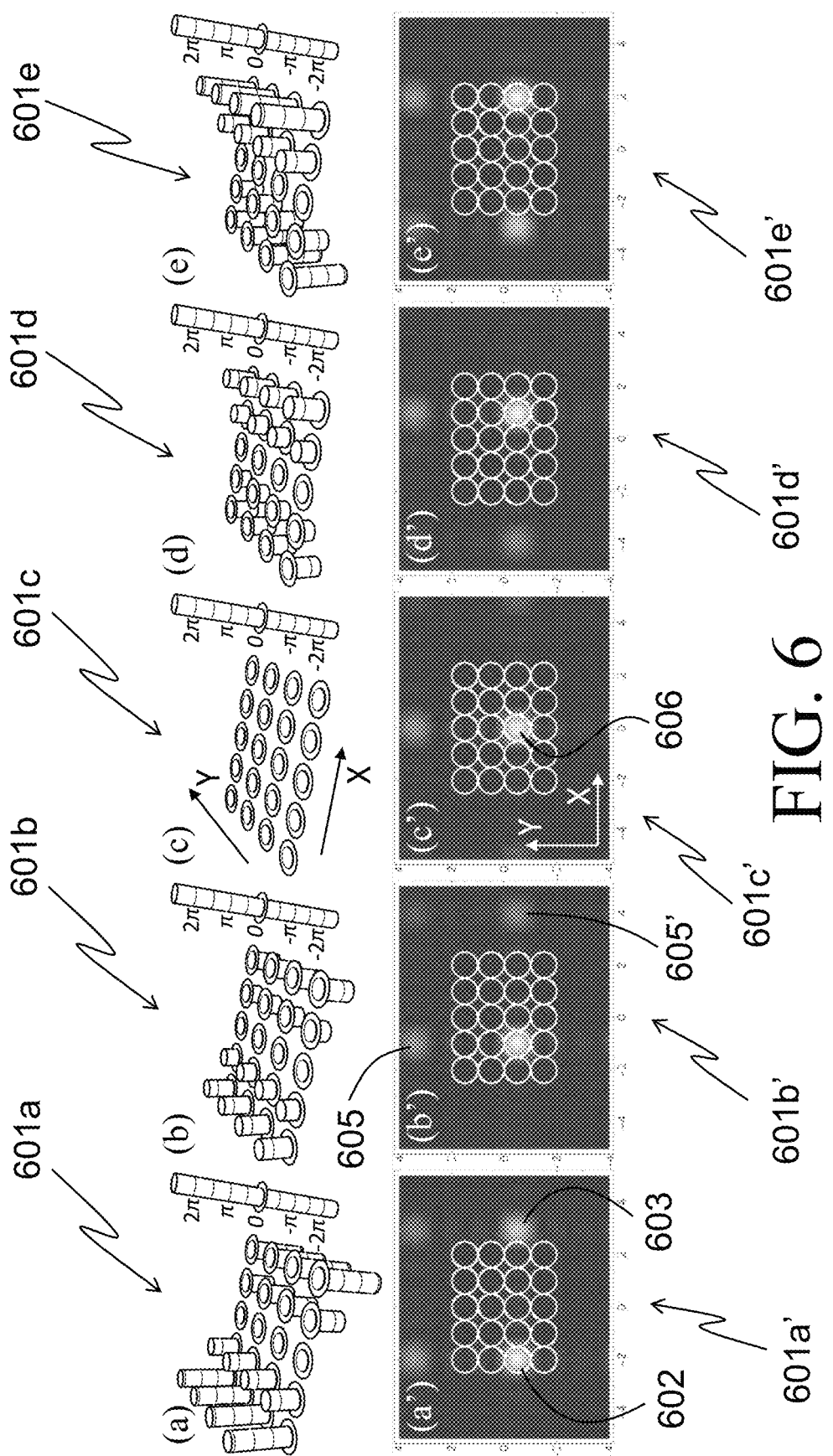
FIGS. 6 and 7 show how phasing elements in the array may effect the aiming of the beam.

As indicated above when discussing (5) and (6), all elements of the entire array may participate in forming each of the beams. What determines the direction in which the formed beam is aimed or steered, may be the relative phases of the signals captured, or transmitted, by the elements of the array. FIG. 6 shows an example of a 4-by-5 regular array that, according to the analysis above, is capable of resolving a 4-by-5 pattern of beams, (an exemplary beamspace array), as in FIG. 5. Top panels 601*a* through 601*e* of FIG. 6 show graphically the phase offsets to the signals corresponding to the elements of the array, with the column length (height) proportional to the phase angle; the scale bar to the right of each panel shows how the column length maps to the phase angle. Note that phase angles differing by an integer multiple of $2\pi$ may be considered identical due to the periodicity of the trigonometric functions. Bottom panels 601*a*' through 601*e*' show the corresponding positions (steering) of the beam in the form of bright spots against a dark background as in, for example, 601*a*' where numeral 602 labels the main lobe of the beam and 603 is one of the grating lobes; the 4-by-5 regular pattern of circles delineate the resolvable beam positions (the beamspace array) in the array's field of view, similar to those displayed in the left panel of FIG. 5. For example, according to panels 601*c* and 601*c*' of FIG. 6, flat phase across the array may aim the main lobe 606 of the beam toward one of the central positions in the marked grid. Applying a linear blaze to the phase profile along the X direction may shift the beam left, as in 601*b*/601*b*' and 601*a*/601*a*', or right, as in 601*d*/601*d*' and 601*e*/601*e*'. Slope of the linear phase blaze may determine the amount of beam shift as may be ascertained by comparing 601*a* to 601*b*, or 601*d* to 601*e*, while observing the corresponding beam positions in the bottom panels. Note that although the illustration shows the main lobe of the steered beam landing on the grid only, it should be clear that continuous beam shift may be possible by applying the proper blaze (forming so-called "interstitial" beams, where the main lobe is located between the discrete positions of the beamspace array). Also, for clarity, FIG. 6 and other figures show only a single beam aimed in various directions whereas the phased array may be generally capable of processing multiple beams simultaneously, whether in RX or TX mode, by linear superposition of signals corresponding to the individual beams. Thus, it will be appreciated that the descriptions regarding a single beam throughout this disclosure apply equally to each of several such beams that may be processed simultaneously.

Figure 7:
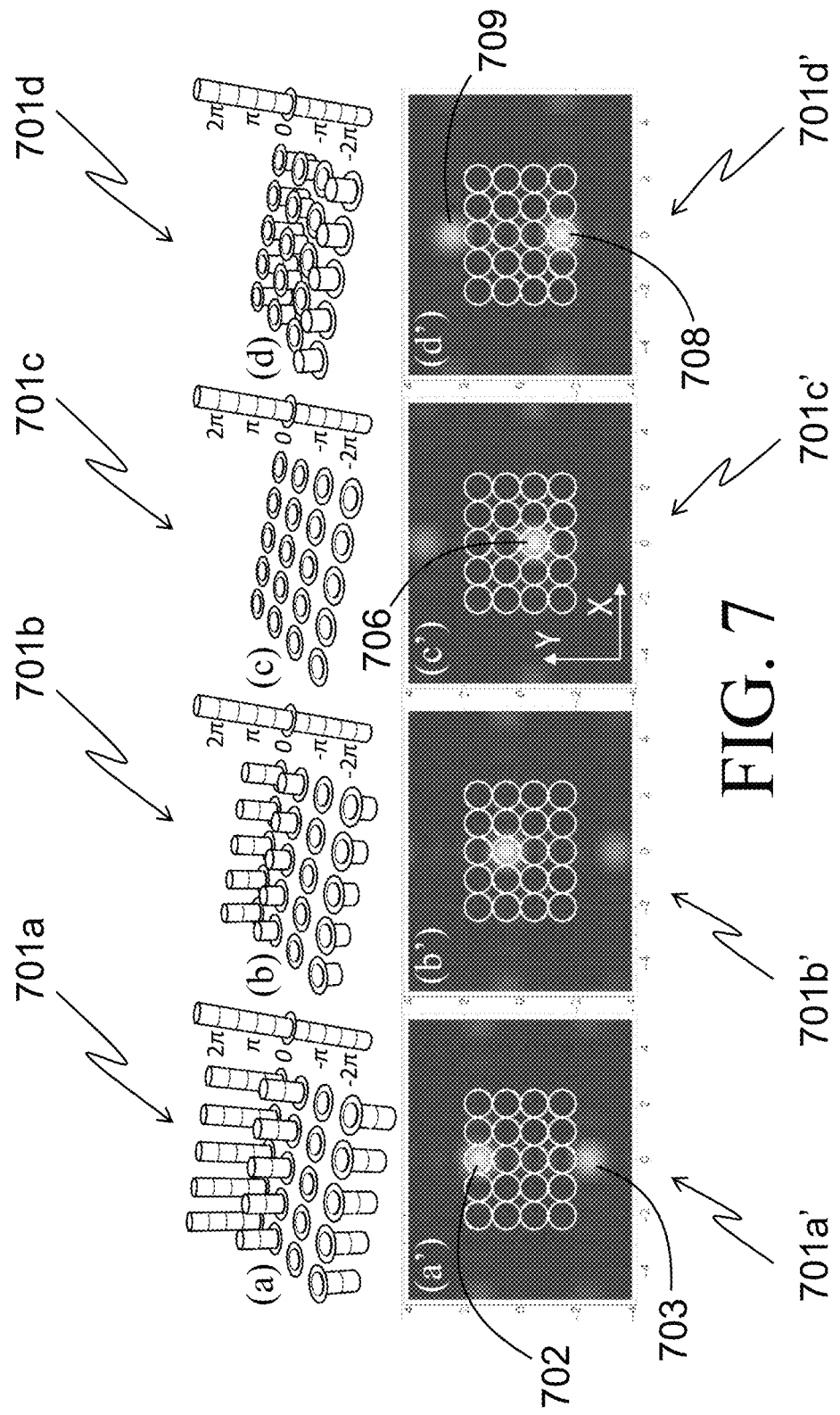

To shift the beam up or down, the linear phase blaze may be applied along the Y direction as in FIG. 7. If we start with the central beam position as in panel 701*c*' where the phase is flat, 701*c*, then applying the linear phase blaze along the Y direction may shift the beam up, 701*b*/701*b*' and 701*a*/701*a*', or down, 701*d*/701*d*'.

Applying a linear phase blaze along other directions may steer the beam arbitrarily within the field of regard.

Note that in the RX phased array, the incoming beam has a direction (aim) determined by the position of the source relative to the phased array. In this case, the phasing of the signals captured by the array elements as described above may happen as a result of the direction of the incoming beam. I.e., the logical flow in the RX array is: The incoming beam arrives from a direction as in a bottom panel (601*a*' through 601*e*' (FIG. 6) 701*a*' to 701*e*' (FIG. 7)) and as such it may induce in the array elements signals with phase offsets as in the corresponding top panel (601*a* to 601*e* (FIG. 6) 701*a* to 701*e* (FIG. 7)). Thus, it will be understood that details provided herein of the relationships between a beam, its positions and phasing of the signals of the array elements applies to both receiving an RF beam in an RX phased array and transmitting an RF beam in a TX phased array.

Grating Lobes

Figure 8:
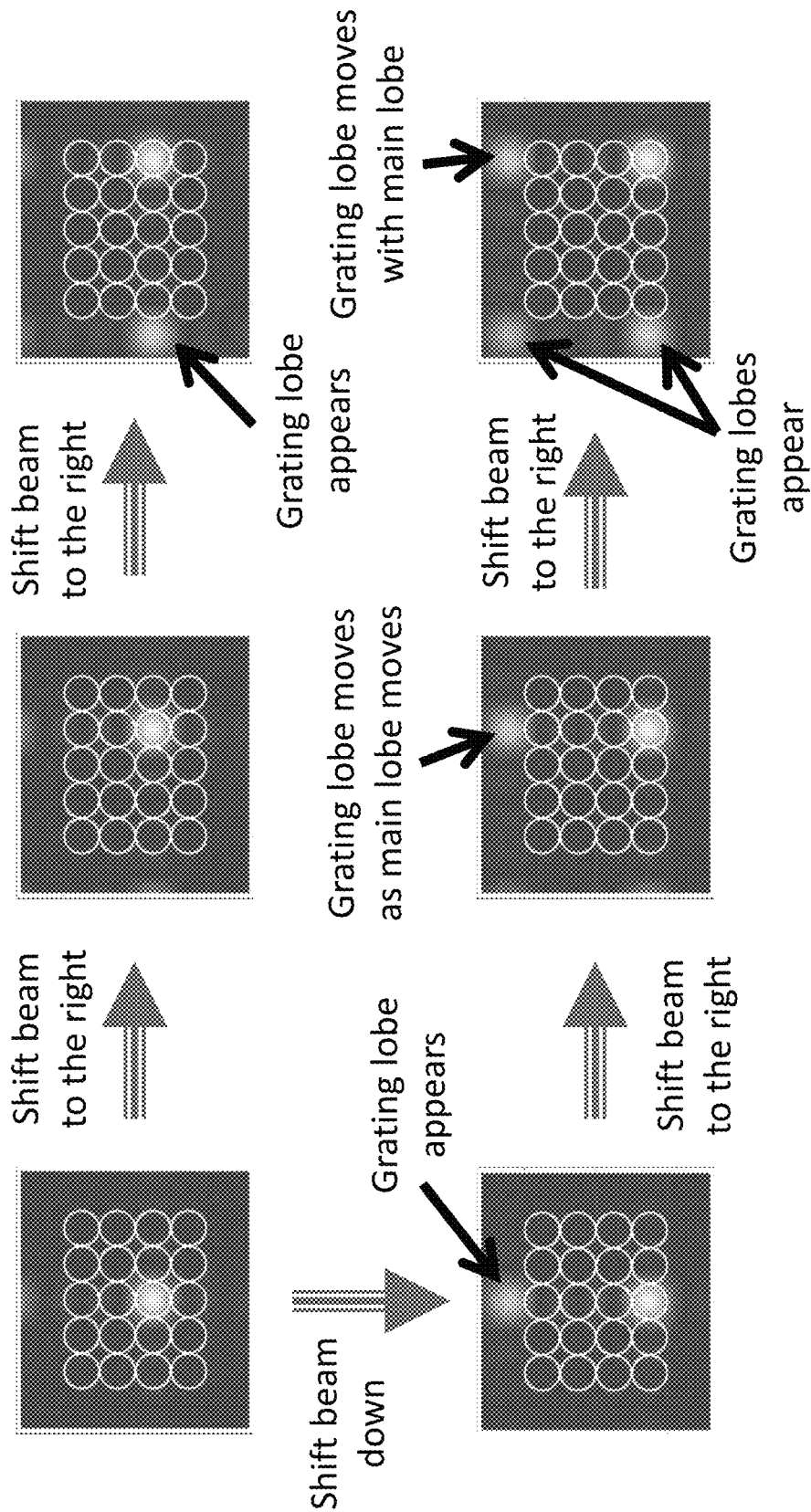
FIG. 8 illustrates grating lobes that accompany the main lobe of a beam formed in a regular phased array.

A close inspection of the bottom panels of FIG. 6 or 7 reveals that as the beam is steered so that the main lobe is close to the boundary of the grid outlining the beamspace array and indicating the field of view of the array, another bright spot appears on the opposite side, just outside of the field of view of the array. For example, in panel 601*a*' of FIG. 6, as the main lobe 602 lands at the intersection of the third row from the top and the first column from the left, a bright spot 603 appears along the third row just outside of the last column. In FIG. 7, panel 701*d*', as the beam is steered so that the main lobe 708 lands the intersection of the last row and the middle column, another bright spot 709 appears above the first row and in line with the middle column. These additional bright spots are grating lobes that may accompany the main lobe of the beam due to the regular (periodic) arrangement of elements in the array. FIG. 8 illustrates the emergence of grating lobes in further detail. As the main lobe shifts toward the edge of the field of view, a grating lobe may appear along the opposite edge. Beam steered toward a position such that the main lobe is in the corner of the field of regard may bring into view three grating lobes: two outside the opposite edges and one outside the opposite corner.

It is noted that for regular arrays, grating lobes may always accompany the main lobe, not only when the latter is steered toward the edge of the field of regard. Indeed, close inspection of FIGS. 6 and 7 reveals their presence even when the beam is away from the edge as in the bottom panels of FIG. 6, i.e. 601*b*' where the grating lobes are labeled with numerals 605 and 605', and similarly in panels 601*c*', 601*d*', or in FIG. 7 bottom panels 701*b*', 701*c*'. However, grating lobes may be less visible when they form farther from the field of regard as the intensity may fall off rapidly outside of the antenna-element main lobe, or for the Gaussian beam profile of the optical fiber mode.

Figure 9:
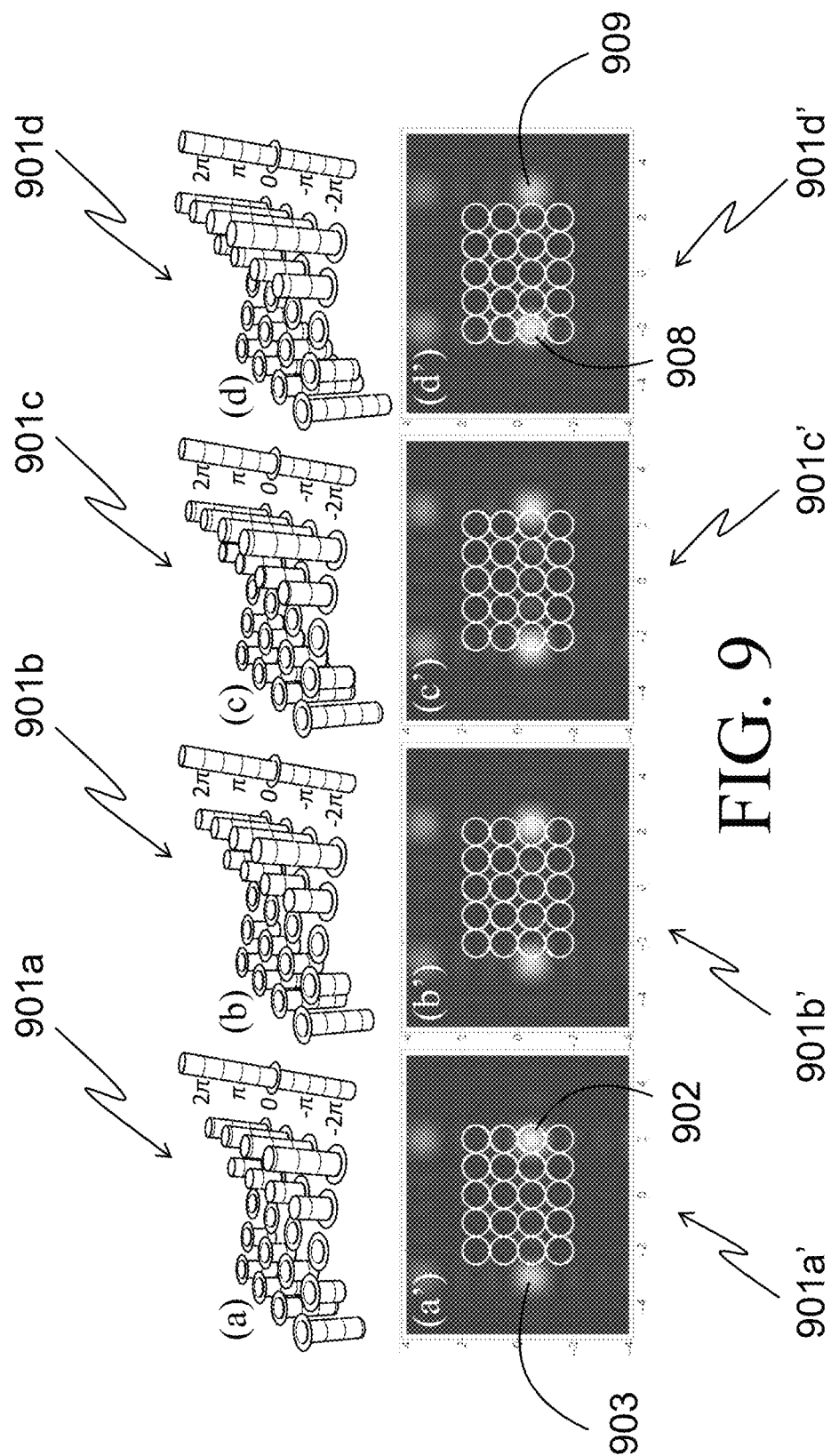
FIG. 9 shows how shifting the beam outside of the field of view brings the grating lobe inside.

The grating lobes may move in sync with the main lobe of the beam, and this movement may coincide with the change of the linear phase blaze across the phased array. The phase blaze steepness may continue to increase to an amount so as to steer the main lobe beyond the edge of the field of view. FIG. 9 shows an example of this situation where, from left to right, the main lobe of the beam is steered beyond the right edge of the field of regard by increasing the steepness of the phase blaze: as the main lobe 902 moves outside of the right edge of the field of regard to become a grating lobe 909, the grating lobe outside of the left edge 903 moves in to become the main lobe 908.

Figure 10:
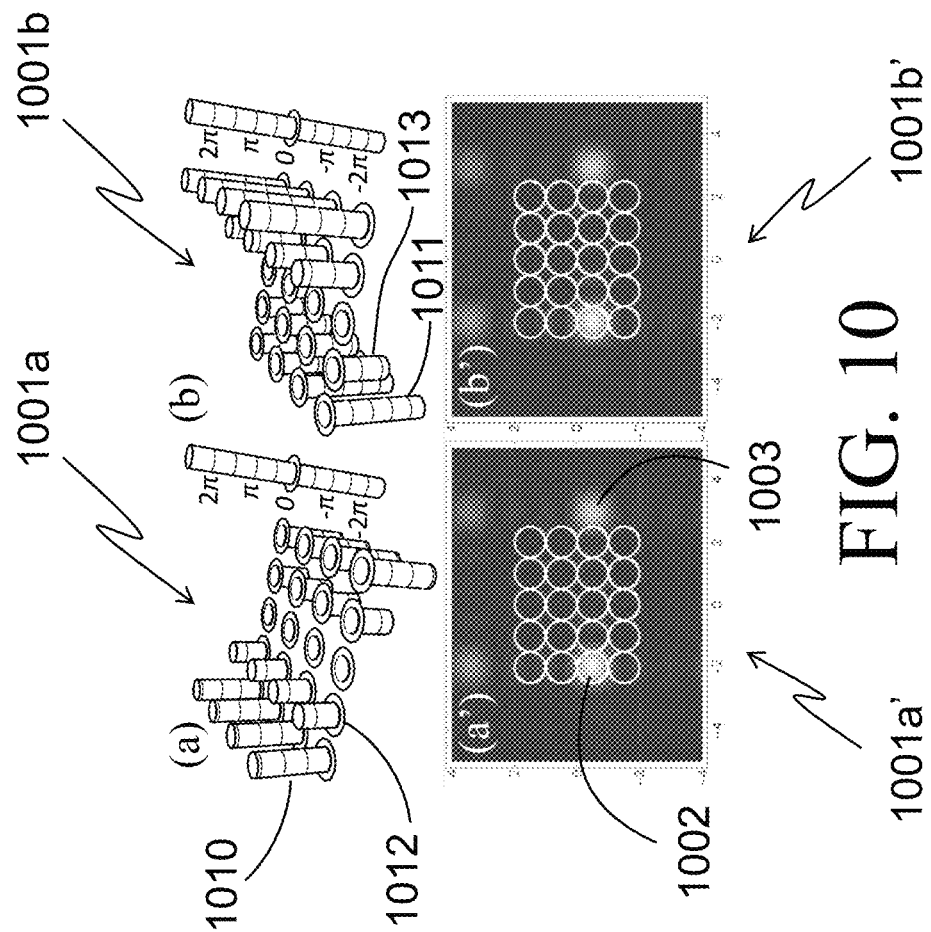
FIG. 10 shows an example of beam steering where apparently different phase profiles yield the same beam configuration.

If the slope of the phase blaze in FIG. 9 were to continue increasing, the 'new' main lobe 908 would keep shifting to the right and eventually exit the field of regard out of the right edge while the next grating lobe would enter from the left. This movement, with new grating lobes taking place of the main lobe in the field of regard may continue indefinitely—in principle. Note that in the process of shifting the beam, the phases may be determined only up to an integer multiple of $2\pi$. Therefore, instead of increasing the slope of the phase blaze indefinitely, we can 'wrap' it modulo $2\pi$ to return the relative phase offsets to values corresponding to the 'old' beam. To see how this 'wrapping' process works, note that in FIG. 10, apparently different phase offsets, i.e., different column heights in panels 1001*a* and 1001*b*, yield the same beam configuration 1001*a*' and 1001*b*'. However, upon close inspection of panels 1001*a* and 1001*b*, and in particular the heights of the columns representing the phase offsets corresponding to the individual channels, we see that the corresponding signals in fact have the same phase angles modulo $2\pi$. For example, according to the column height, the phase offset labeled as 1010 in 1001$a$ is approximately $3\pi/2$ whereas the phase offset for the same element in 1001$b$ labeled as 1011 is approximately $-5\pi/2$. The difference between the two is $3\pi/2-(-5\pi/2)=4\pi=2(2\pi)$, i.e., an integer multiple of $2\pi$. Similarly, the difference between the phase offsets 1012 and 1013 is $2\pi$.

One can imagine a hypothetical infinite lattice of grating lobes distributed periodically in the plane. As the phase blaze changes to steer the beam, a different portion of the lattice may come to view so that at any given time one of those grating lobes may land within the field of regard to become the main lobe. The presence of this infinite lattice of grating lobes can be exploited to change the shape of the beamspace array and provide for the mapping between 2D and 1D arrays for beamforming.

Beamspace Mapping-Co-Prime Arrays

Figure 11:
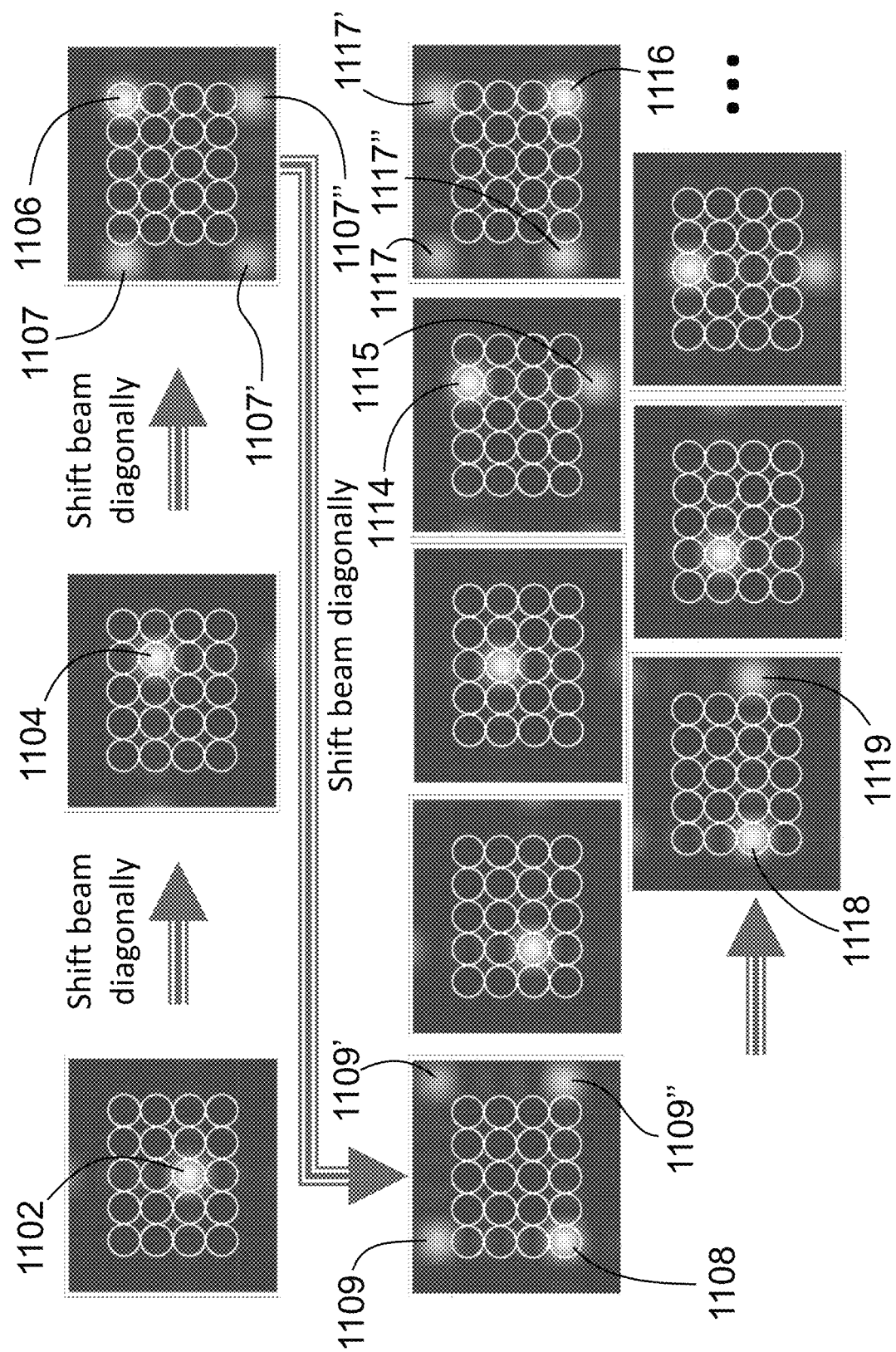
FIG. 11 details the diagonal beam shifting using an example of a 4-by-5 phased array.

An infinite lattice of grating lobes may enable changing the shape, and even the dimension, of the beamspace array. FIG. 11 illustrates an example where a beam is steered diagonally. As shown in FIG. 11, the beam is initially steered so that the main lobe 1102 is in the third row and third column as in the upper-left portion of FIG. 11, similar to the main lobe 606 in FIG. 6, panel 601$c'$, or 706 in FIG. 7, panel 701$c'$. By applying a linear phase blaze along a diagonal direction, we may shift the main lobe to the second row and fourth column of the beamspace array, 1104 shown in upper-middle panel of FIG. 11. We then may continue increasing the slope of the linear phase blaze to shift the main lobe to the upper right corner, 1106 in the upper-right panel of FIG. 11. At this point, three grating lobes, 1107, 1107', and 1107", come into view just outside of the field of regard delineated by the 4-by-5 grid of circles representing the beamspace array. If we were to continue increasing the slope of the phase blaze in the same direction, the main lobe 1106 would exit the field of regard from the upper right corner to become a grating lobe 1109', and the grating lobe 1107' just outside the lower left corner may enter the field of regard to become the main lobe 1108 as in the left-most panel in the middle of FIG. 11; grating lobes 1107 and 1107" shift diagonally to become 1109 and 1109", respectively. Continuing to increase the slope of the phase blaze may keep shifting the main lobe diagonally within the field of regard as in the next three panels in the middle of FIG. 11. When the main lobe 1114 reaches the upper edge of the field of regard, a grating lobe 1115 comes into view below the bottom edge along the same column. Continuing to increase the slope of the phase blaze may push the main lobe outside of the field of regard where it becomes grating lobe 1117', and bring the grating lobe 1115 inside, where it may land on the lower right corner as in the last panel in the middle of FIG. 11 to become the new main lobe 1116. At this point, three grating lobes come into view. As the beam continues to move diagonally and the new main lobe 1116 shifts outside of the field of regard and become grating lobe 1119, the grating lobe 1117" outside of the left edge may enter in the first column and third row as in the first panel at the bottom of FIG. 11 to become main lobe 1118. Continuing this diagonal shift may have the effect of steering the beam so that a lobe moves across each of the 20 (4-by-5 beamspace array) resolvable beams the array may be capable of forming.

Figure 12:
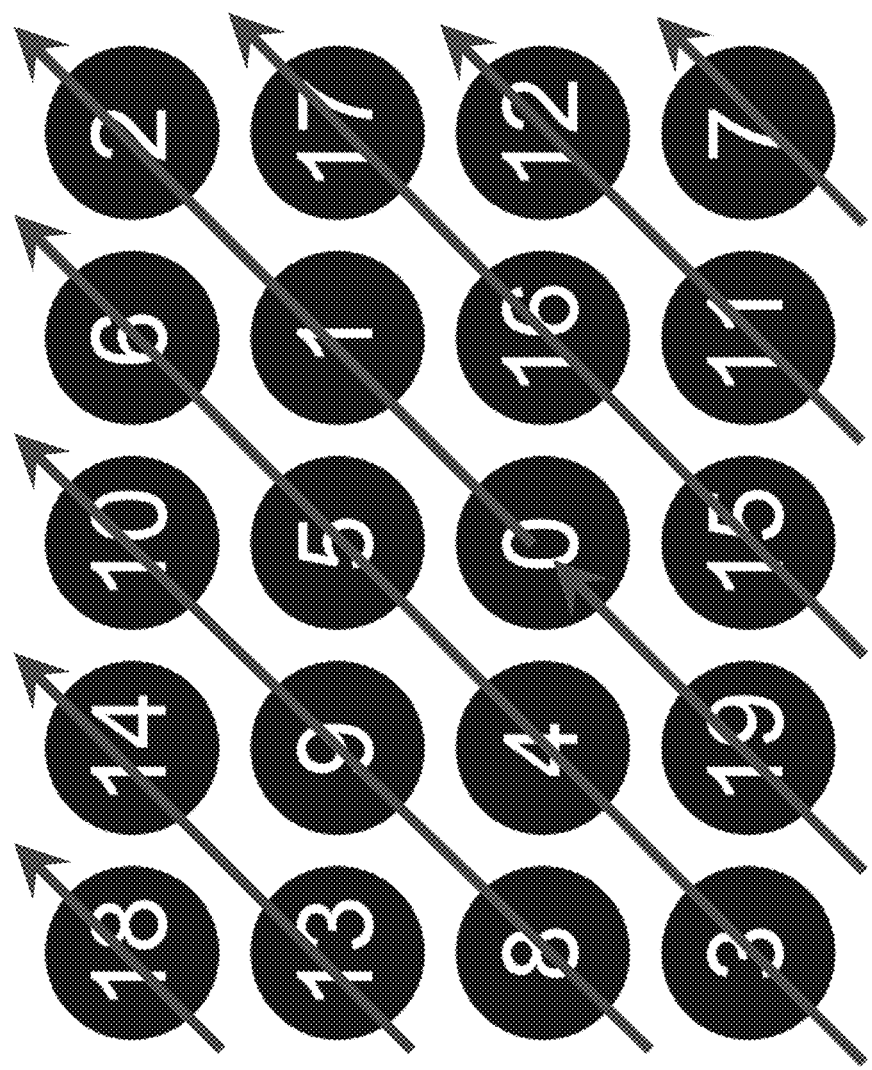
FIG. 12 shows the scanning sequence of beams scanned as in FIG. 11.

The beam-steering process described above may be summarized in as in FIG. 12, which shows the distribution of resolvable beams (beamspace array) in the field of regard. The numbers indicate the sequence, in which each element of the beamspace array is visited by the main lobe as the beam is steered, and the arrows emphasize the scanning direction.

Notably, in this example, the direction of the beam shift is always the same: diagonal. Yet, the main lobe of the beam is effectively steered toward each one of the resolvable elements of the beamspace array in the field of view by taking advantage of the infinite lattice of grating lobes. Since the beam shift is linear, rather than two-dimensional, a linear array may be implemented that may effect the exact same main-lobe trajectory.

Figure 13:
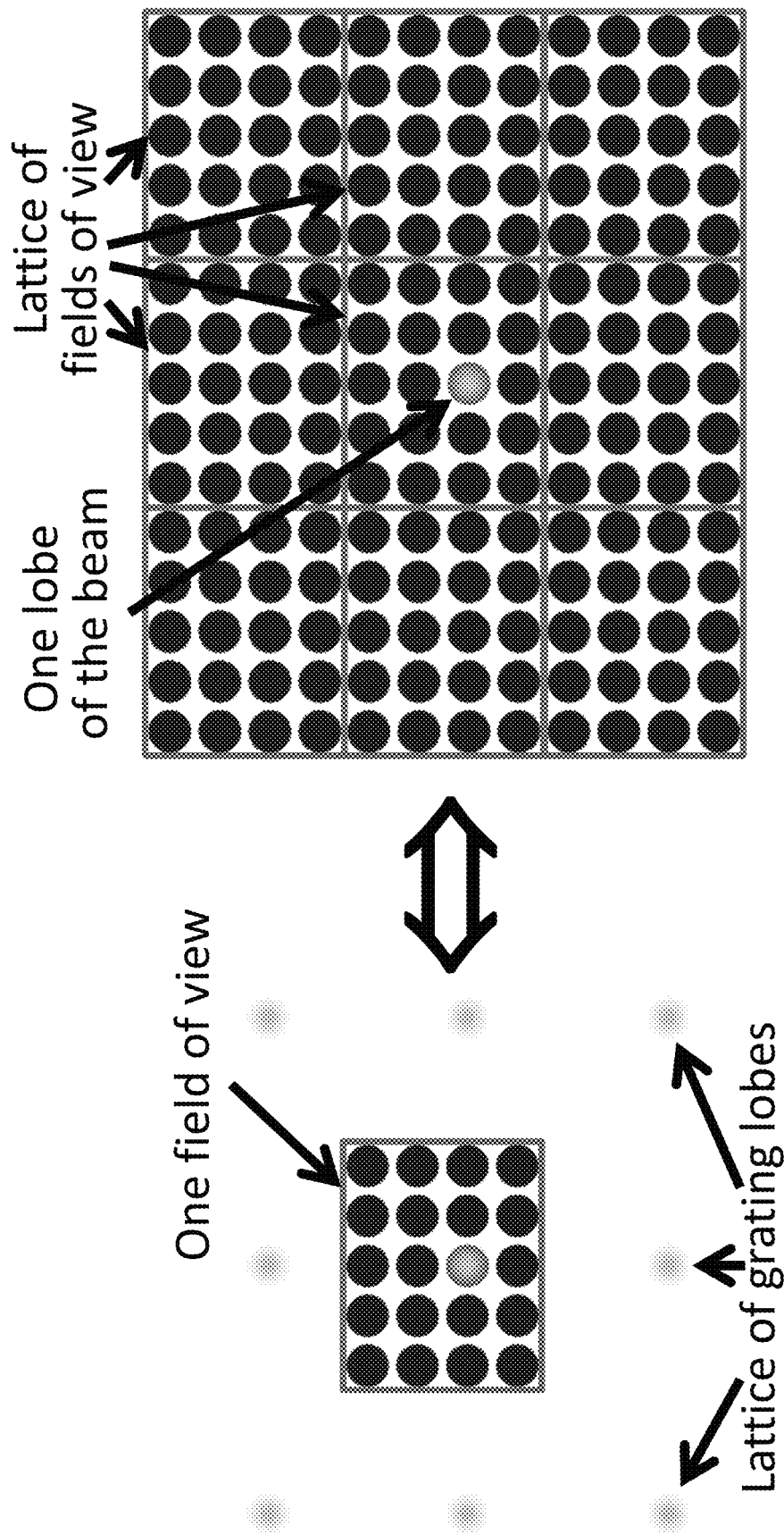
FIG. 13 shows an alternative and equivalent views of the grating lobes and the field of regard where instead of considering a single field of regard illuminated by a lattice of grating lobes, one may periodically extend the field of regard and have a beam consisting of a single (main) lobe.

An alternative, and equivalent, way to view the steering of the beam across the field of view is by reversing the roles of grating lobes and the field of view, as represented in FIG. 13. As shown on the right side of FIG. 13, the field of view is virtually extended periodically in two dimensions whereas the grating lobes collapse to a single main lobe that now constitutes the beam. As the beam is steered beyond one field of view, it immediately enters an adjacent copy so as to always illuminate the field of view. It may be verified that as the beam crosses the boundary, equivalent resolvable elements of the beamspace array are illuminated as when considering a lattice of grating lobes.

Figure 14:
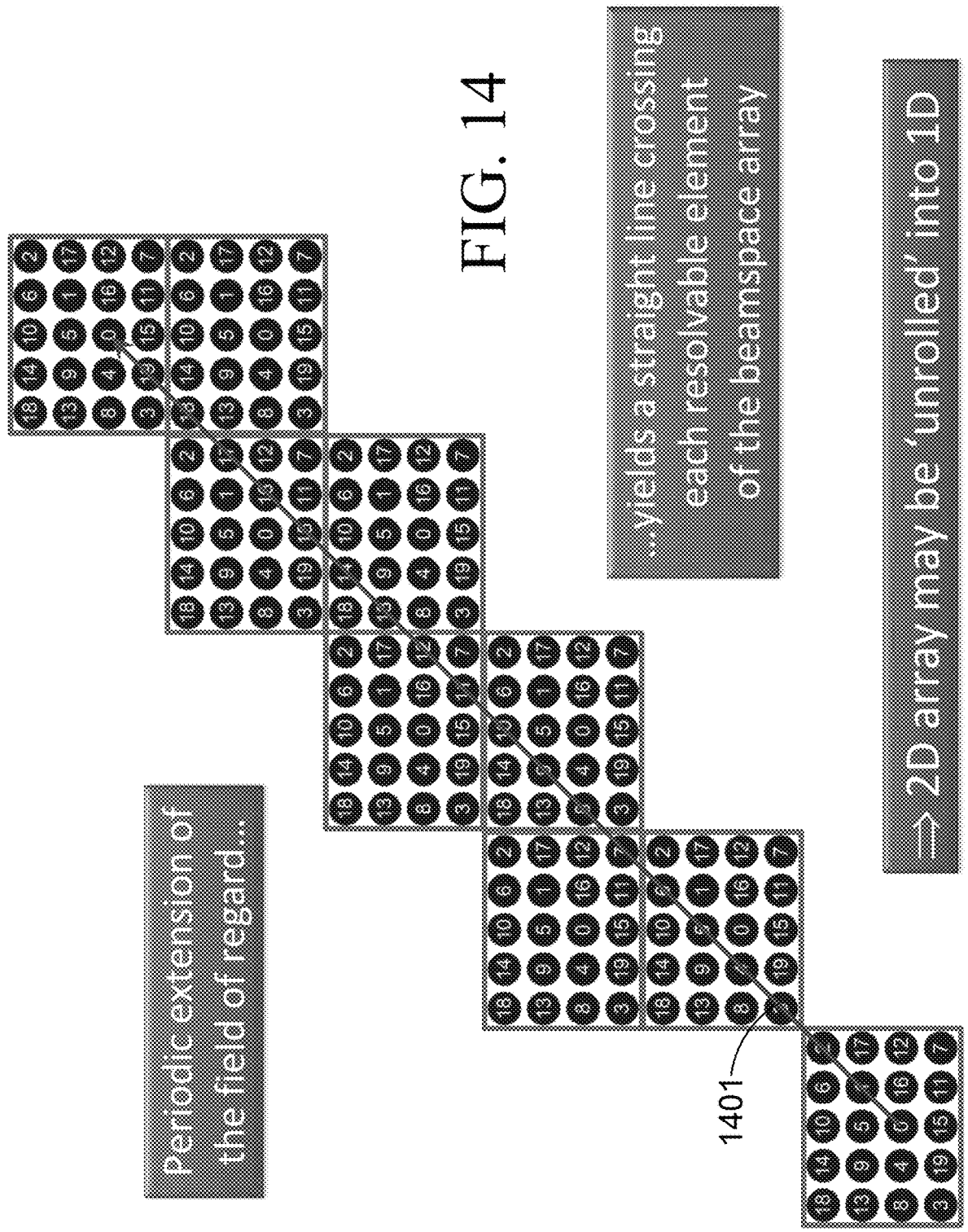
FIG. 14 illustrates an equivalent way of viewing the scanning of the beam across the field of regard.

FIG. 14 illustrates this alternative view for the linear scanning of the beam analyzed above; in FIG. 14, the periodic extension of the field of regard is limited to only the relevant copies for clarity. This illustration makes it evident that the beam scanning may be one dimensional, since the long arrow is straight, and that the labeling of resolvable elements is proper, since the visited numerals are ordered sequentially.

In the present disclosure, the periodic extension of the beamspace array may be referred to as tessellation and the resulting lattice may be referred to as a beamspace lattice.

Figure 15:
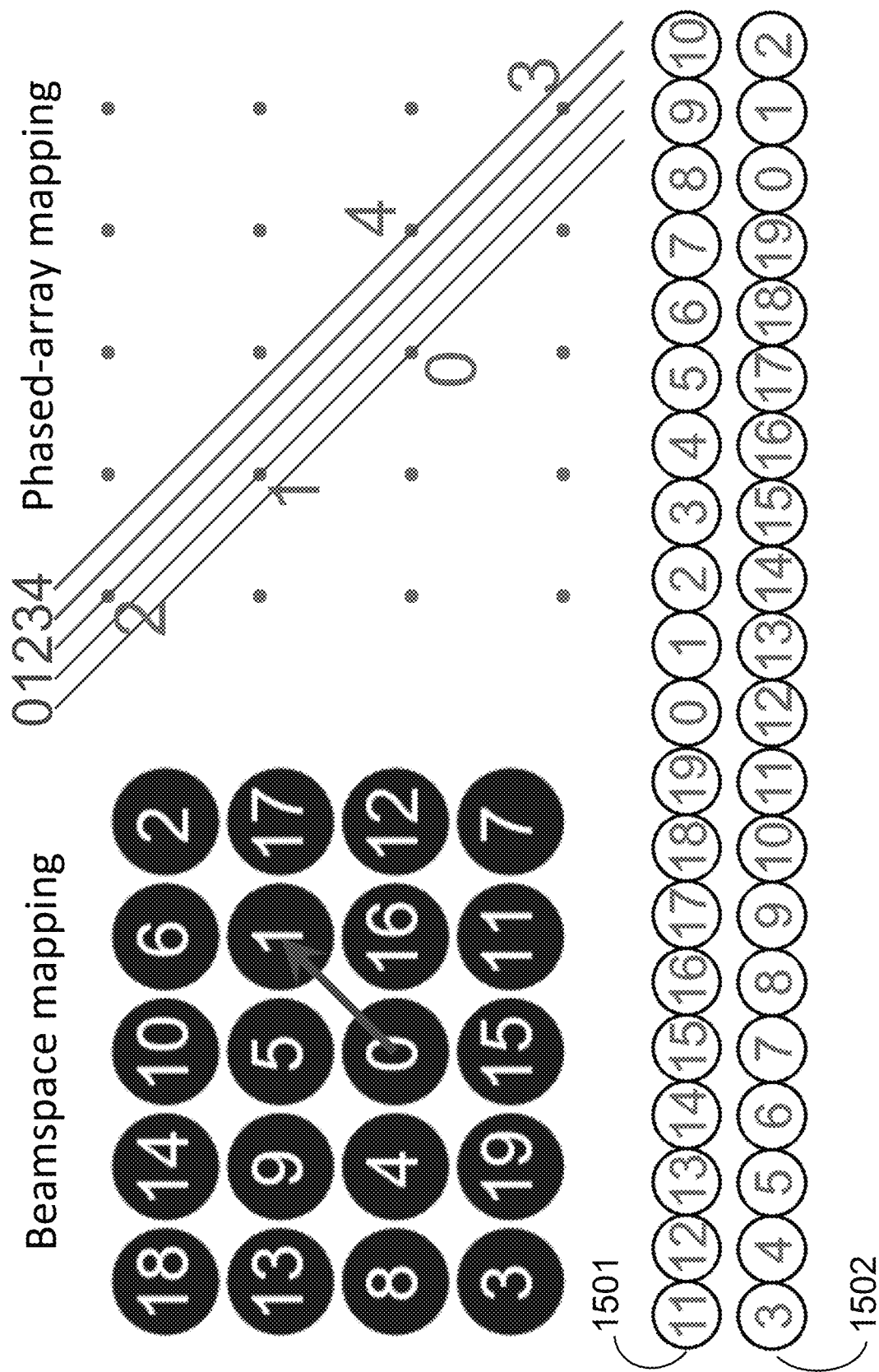
FIG. 15 describes the construction of the linear-array sequence from a 2D array and a corresponding 2D beamspace array.

To find the sequence of the optical fibers that yields a linear distribution of resolvable elements of FIG. 14, recall that the beam may be steered by applying linear phase blaze to the signals of the array elements. This linear phase blaze may be associated with lines of constant phase as the beam propagating in free space intersects with the plane of the phased array, and these lines are perpendicular to the beamshift direction in the field of view. In other words, the lines of constant phase are perpendicular to the arrows of FIGS. 12 and 14 (to achieve the beam steering represented in FIGS. 12 and 14). To identify the array-element sequence, we may first draw a single line of constant phase through an element of the array; this is our element '0,' see the right panel of FIG. 15. Then, to find the next element, we may draw another line of constant phase as close as possible to the first line and such that it crosses another element of the array. This is the element '1.' We may continue this process of drawing constant-phase lines that cross array elements until each element of the array has a line of constant phase crossing it. The right panel of FIG. 15 shows the first several steps. Once we label all elements in the phased array this way, we may identify the equivalent organization of the fibers in a linear array as having a sequence corresponding to the sequentially identified elements according to this process, such as linear array 1501 or linear array 1502 of FIG. 15. Note that cyclic permutations of the elements in the linear array, as exemplified by the two linear arrays, may be allowed since each such cyclic permutation would yield beam forming. However, some cyclic permutations may be preferred over others to, for example, facilitate the construction of the system or to improve the formation of interstitial beams or to adjust (e.g., equalize) the optical power captured by elements of a linear fiber array.

The procedure of beamspace and array-element mapping from 2D to 1D described above works for rectangular phased arrays having co-prime side lengths. For example, in addition to the 4-by-5 array described above, a 3-by-4, 9-by-4, or 19-by-21 would be amenable to this approach. The procedure also extends to arrays of dimension higher than 2, for example 3D, as long as the array sides are pairwise co-prime. However, a more general procedure of beamspace and array-element mapping described below allows a wider class of phased arrays with various geometries to be linearized. In this more general case, it may be preferred that: (1) the array is regular (e.g. 2D periodic) so that grating lobes are well defined, and (2) the array admits tessellation (without gaps or overlaps) over the infinite lattice. These preferences may be relaxed in some cases.

Figure 16:
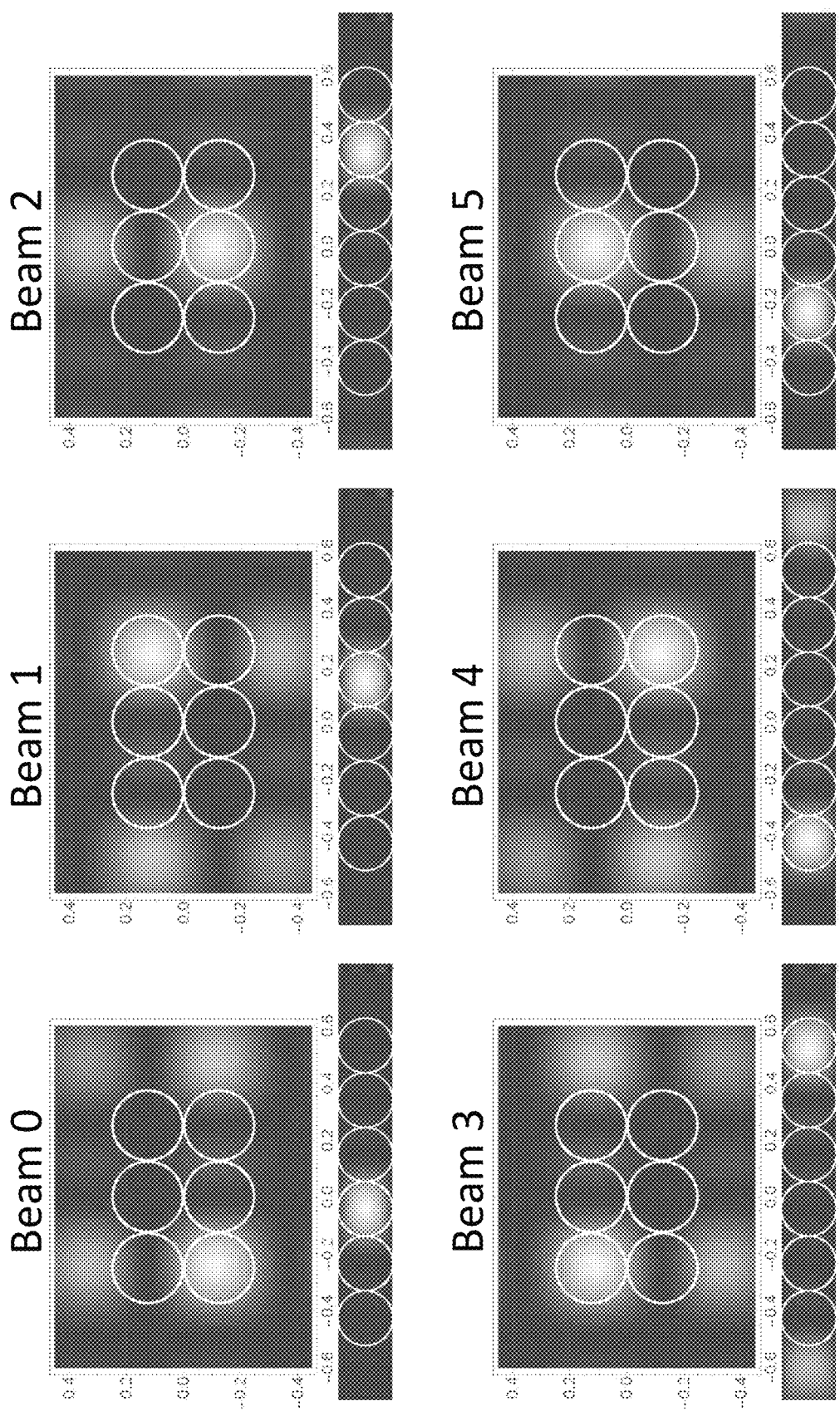
FIG. 16 shows an example of 2D-to-1D beamspace mapping.

FIG. 16 shows an explicit example of 2D-to-1D beamspace mapping. It shows that for every resolvable beam formed by a two-dimensional array there exists a corresponding beam formed by a linear array. Specifically, the bright spots of FIG. 16 may represent the location of a beam 185 at the beamspace edge 36 of the interference space 30 (see FIGS. 3A to 3E) while the white circles of FIG. 16 may represent the location of lenslets (e.g., location of a sensor or location of an optical output into interference space 30 which may correspond to lenslets 70 for the linear array of white circles of FIG. 16). For each of six beams (Beam 0 to Beam 5), a bright spot shown in the upper panel (with a 2D array of circles) may represent the optical beam 185 at the beamspace edge 36 of a corresponding conventional optical processor, while the bright spot shown in the corresponding lower panel may represent the optical beam 185 in the optical processor 10 disclosed herein. As noted herein, each optical beam 185 may correspond to an RF beam, and thus each of the six beams (Beam 0 to Beam 5) corresponds to an RF beam (transmitted or received by the antenna array 110). As the correlation between an RF beam and the optical beam 185 at the beamspace edge 36 may be the same for a transmitter and a receiver, the bright spot of Beam n may represent a modulated optical signal forming an optical beam 185 at beamspace edge 36 to form a corresponding RF beam transmitted by antenna array 110 (e.g., in transmitter 2000), as well as a beam 185 focused within the interference space 30 at beamspace edge 36 and captured by a corresponding sensor of sensory array 700 (e.g., in receiver 1000).

In a receiver, each of the optical beams 185 (Beam 0 to Beam 5) may be discretely formed to be spatially separated (e.g., spatially filtered) from each other at the beamspace edge 36 (even if corresponding to RF beams having the same carrier frequency that are simultaneously received by the receiver). In a transmitter, each of the beams 185 (Beam 0 to Beam 5) may form an RF beam by antenna array 110 in corresponding sectors (such that the transmitted RF beams are transmitted in different directions and do not affect each other, even if having the same carrier frequency).

Systems (e.g., transmitter or receiver) implementing the 2D and 1D arrays may use the same phasing of the signals (e.g., in an optical processor of such a system) in the arrays to form the respective beams. Thus, the upper panels (having the 2D arrangement of white circles) may also represent a corresponding RF beam and its direction with respect to the antenna array 110 (in conventional optical processors, the positional relationship of RF beams (e.g., with respect to positions denoted in an angle of arrival (AoA) plot) and the location of the optical beams 185 is preserved). Thus, the bright spot in the linear array 70 in the bottom panel may have a predetermined relationship with the bright spot of the corresponding top panel. Thus the location of an optical beam 185 along the array 70 may be used to determine the direction of the corresponding RF beam at the antenna array 110 (in both receivers and transmitters).

Figure 17:
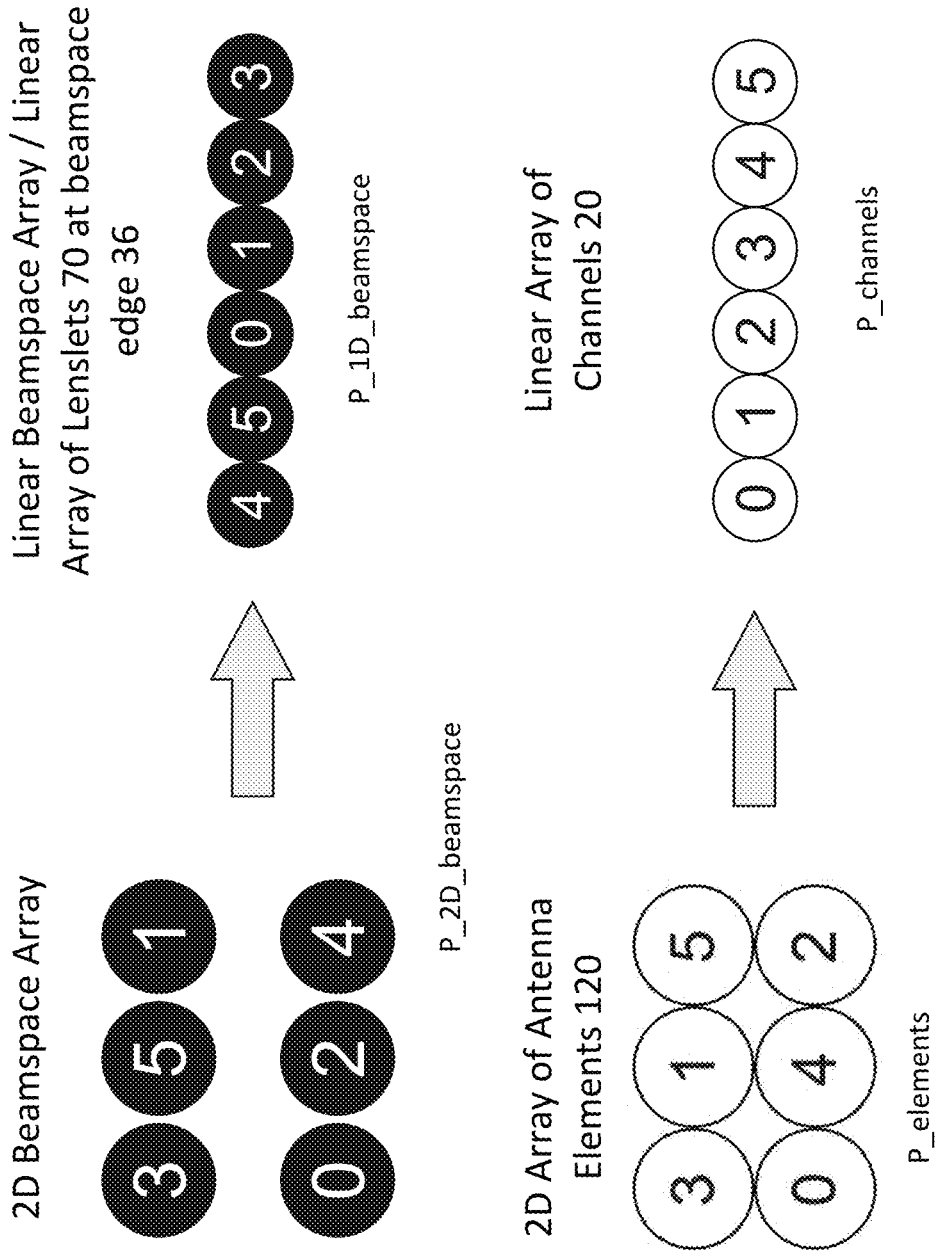
FIG. 17 shows beam-steering and array-element correspondence in 2D-to-1D mapping of a 2-by-3 array.

FIG. 17 shows schematically the correspondence between the beams in the 2D and 1D beam arrays simulated in FIG. 16 as well as the mapping between the phased-array elements. FIG. 17 and the description is in context of the beams in terms of embodiments of FIGS. 3A to 3E to help with the understanding of the same. However it should be understood that this disclosure is applicable to other embodiments (e.g., embodiments without an optical processor and/or with respect to processing (sensing or generating) other waves as described elsewhere herein.

FIG. 17 illustrates for patterns P_2D_beamspace, P_1D_beamspace, P_elements and P-channels. Patterns P_2D_beamspace and P_1D_beamspace are respectively an exemplary 2D arrangement and 1D arrangement of beams in reciprocal space. Pattern P_elements is an exemplary 2D arrangement of elements and pattern P_channels is an exemplary 1D arrangement of channels. For example, in the context of FIGS. 3A to 3E, pattern P_elements may represent the 2D arrangement of six antennas elements 120 (individually identified in pattern P_elements as 0 to 5). The 2D arrangement of the six antenna elements 120 may be constricted to two dimensions or extend in three dimensions, in which case the pattern P_elements of FIG. 17 may correspond to a projection of such a 3D arrangement). The pattern P_channels is a linear arrangement corresponding to the ends of channels 20 and to the 1D array of lenslets 50 at the channel edge of interference space 30. The six channels 20 represented by pattern P_channels are individually identified as 0 to 5 and are respectively in communication with the antenna elements 120 0 to 5 of pattern P_elements. Thus, channel 0 connects to antenna 0, channel 1 to antenna 1, etc. (e.g., as described herein with respect to FIGS. 3A to 3E for a receiver or a transmitter).

Pattern P_1D_beamspace represents a 1D array of the resolvable beams in beamspace that form the beamspace array. Pattern P_1D_beamspace represents the beamspace array in reciprocal space (i.e., as a set of points in reciprocal space). However, as the beamspace array may be represented in real space, pattern P_1D_beamspace also represents the pattern of spots formed at the beamspace edge 36 of interference space 30. That is, the solid circles 0 to 5 of pattern P_1D_beamspace correspond to resolvable beams of the beamspace array and may be represented in the real space as focused spots of optical beams 185 on sensors 700 of the receiver 1000 or transmitted beams 185 of output by the output optical array 800 of the transmitter 2000. Thus, solid circles 0 to 5 of pattern P_1D_beamspace may correspond to the location of lenslets 70 (or equivalent structure disclosed herein) for both the receiver 1000 and transmitter 2000 of FIGS. 3A and 3E.

Pattern P_2D_beamspace represents the resolvable beams in 2D. Solid circles 0 to 5 of P_1D_beamspace respectively correspond to solid circles 0 to 5 of P_2D_beamspace to represent the same beams. For example, the solid circle 0 of P_1D_beamspace and the solid circle 0 of P_2D_beamspace represent the same beam. Thus, the optical beam 185 at beamspace edge 36 corresponding to the solid circle 0 of P_1D_beamspace also corresponds to the corresponding solid circle 0 of P_2D_beamspace. As such, in a receiver, the location of a focused beam 185 on the 1D sensory array 700 at beamspace edge 36 identifies a beam both in 1D and in 2D (i.e., to identify the RF beam AoA received by the antenna array 110 based on its position within the pattern P_2D_beamspace). In a transmitter, the location at the beamspace edge 36 of a transmitted beam 185 determines the direction of the transmitted RF beam for the antenna array 110. For example, a beam 185 at beamspace edge 36 corresponding to pattern element 0 of the linear array of pattern P_1D_beamspace may correspond to an RF beam corresponding to pattern element 0 of the P_2D_beamspace (e.g., and have a direction that intersects with the 2D antenna array 110 that is relatively down and left as compared to beams 1 to 5).

It will be understood that the linear arrangement of channels 20 (at channel edge 34) in the pattern P_channel will provide optical spots (focused optical beams 185) at the beamspace edge 36 at locations corresponding to circles 0 to 5 of P_1D_beamspace (such spots being discrete and spatially separated and may be received and processed simultaneously). Thus, processor 600 may be configured to determine the corresponding RF beam and its AoA of each received beam as a function of the location of the corresponding optical spot of the optical beam at beamspace edge 36. As noted, the patterns of FIG. 17 are exemplary and additional patterns and/or relationships between such patterns may be provided. The following discussion provides further examples of the same. It will be understood that the representations and relationships between patterns and their elements are represented similarly as in FIG. 17 including: white circles represent elements in real space (e.g., 2D arrangements of white circles may represent the arrangement of antenna elements 120 of antenna array 110, and the 1D linear arrangement of white circles may represent the channel arrangement of channels 20 (the ends of these channels 20) at interference space 30 (with corresponding numbers indicating the correspondence of channels 20 to antenna elements 120); solid circles illustrate elements of the beamspace (in reciprocal space); it is noted that if the 1D linear arrangement of the 1D beamspace array is omitted or shown separately, elements of the 1D linear arrangement may be sequentially arranged in accordance with their numbering (and thus provide correspondence to the 2D beamspace array).

Beamspace Mapping—Hexagonal Arrays

Figure 18:
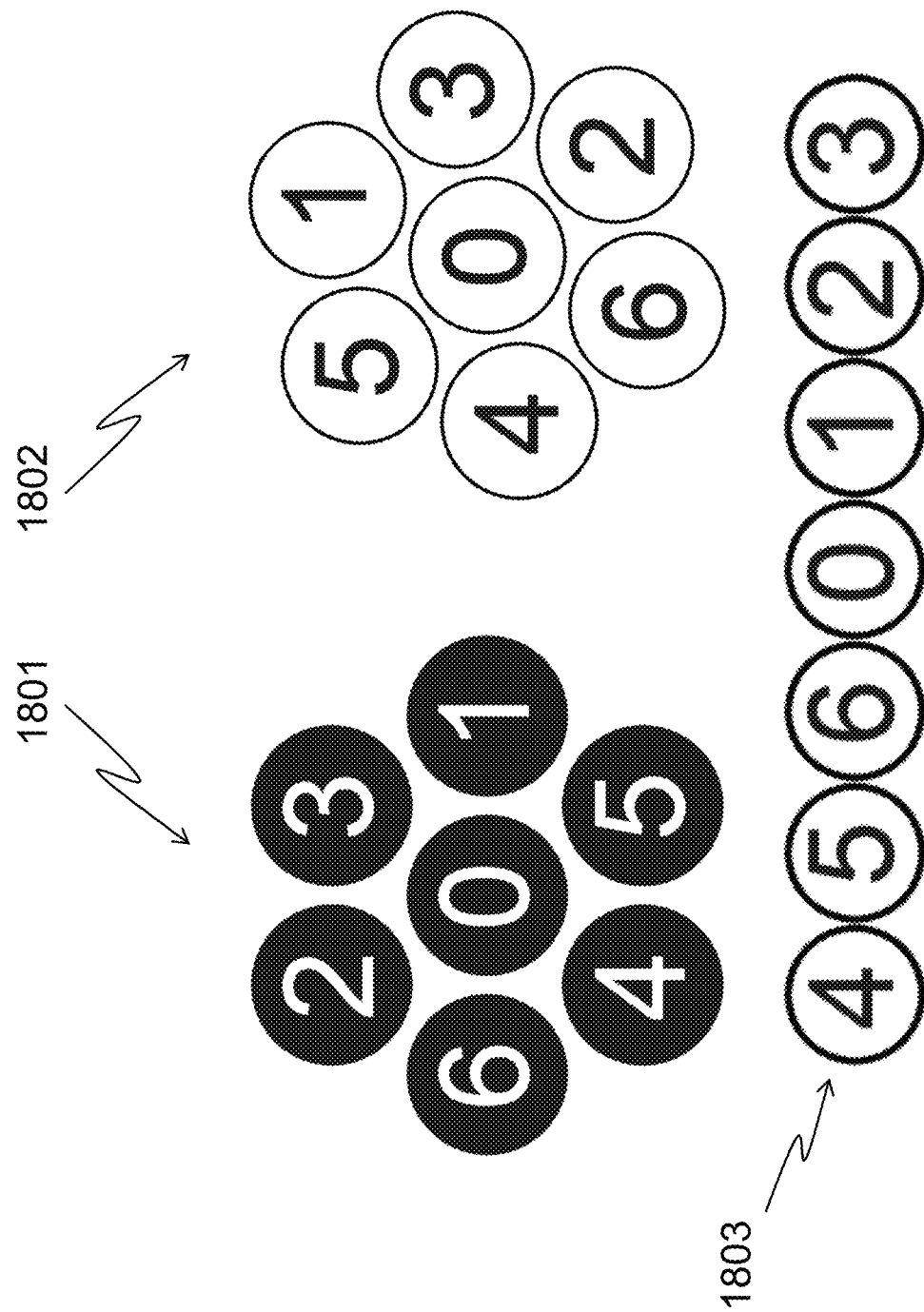
FIG. 18 shows a hexagonal beamspace array as well as the corresponding hexagonal and linear arrays.
Figure 19:
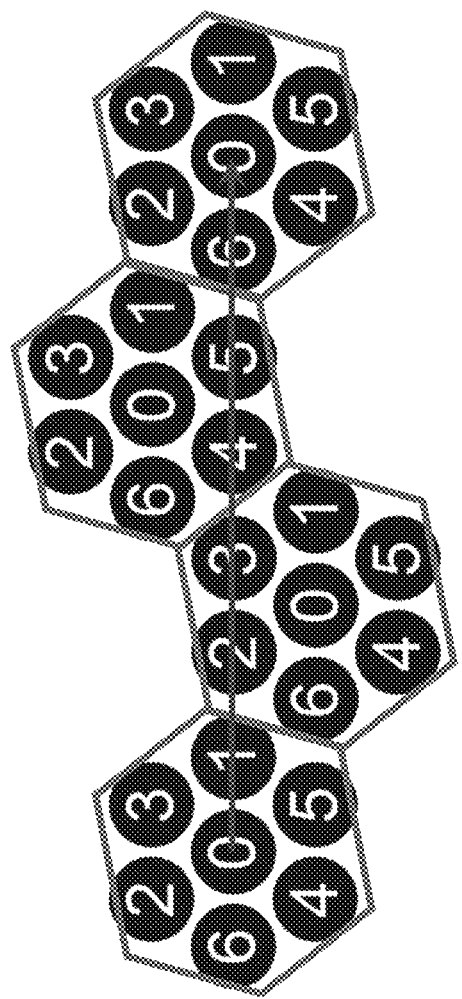
FIG. 19 illustrates linear scan across tessellated hexagonal beamspace array.
Figure 20:
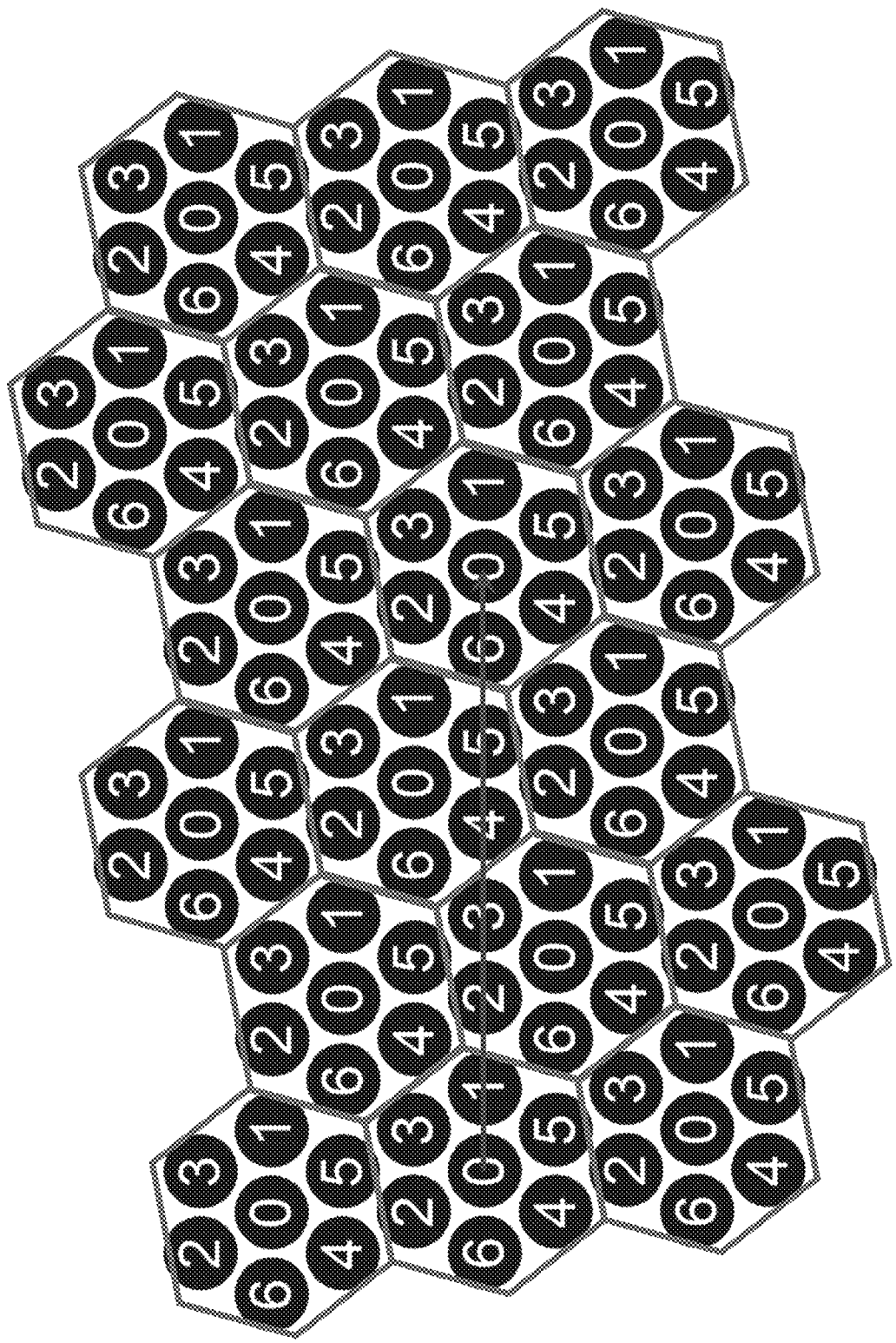
FIG. 20 shows a larger portion of the 7-element hexagonal beamspace array tessellation.

The construction of 2D-to-1D beamspace mapping in the case of rectangular co-prime arrays carries over to hexagonal arrays with minor modifications to take account of the array geometry. FIG. 18 shows a 7-element hexagonal beamspace array 1801 and the corresponding 2D array 1802 that may be capable of forming the beams distributed in two dimensions. With the labeling of the array and beamspace-array elements as in 1802 and 1801, respectively, the 2D array may be 'unrolled' to a linear array 1803 while preserving the 2D beam-forming abilities. Similar to the case of rectangular arrays, the arrangement of the elements in the linear array 1803 may be changed by cyclic permutation while preserving the beamforming abilities of the array. The mapping of the hexagonal beamspace array 1801 to a linear beamspace array may be confirmed with the help of FIG. 19, which shows a portion of the lattice tessellation with the hexagonal beamspace array, wherein the elements of the beamspace array align in sequence from 0 to 6, analogous to the linear distribution of beamspace-array elements shown in FIG. 14. FIG. 20 shows a larger portion of the tessellation to illustrate that it is indeed possible to tessellate the entire lattice with the 7-element beamspace array without gaps or overlaps. The labeling of the elements in the array 1802 with numerals from 0 to 6, that allows the mapping of the 2D array 1802 to a linear array 1803, has been obtained using the method described above with the help of FIG. 15.

Figure 21:
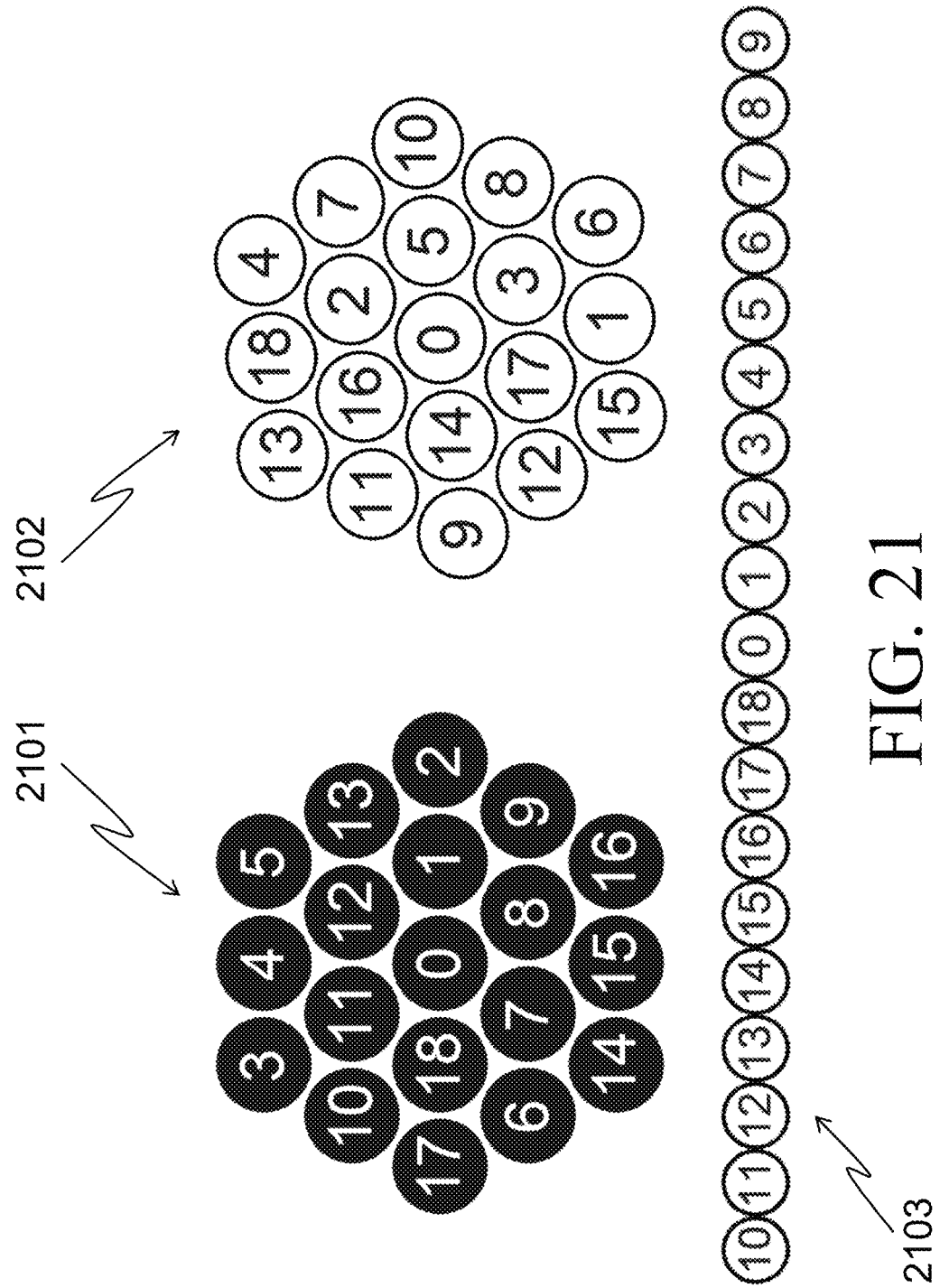
FIG. 21 shows a 19-element hexagonal beamspace array in addition to the corresponding hexagonal and linear arrays.
Figure 22:
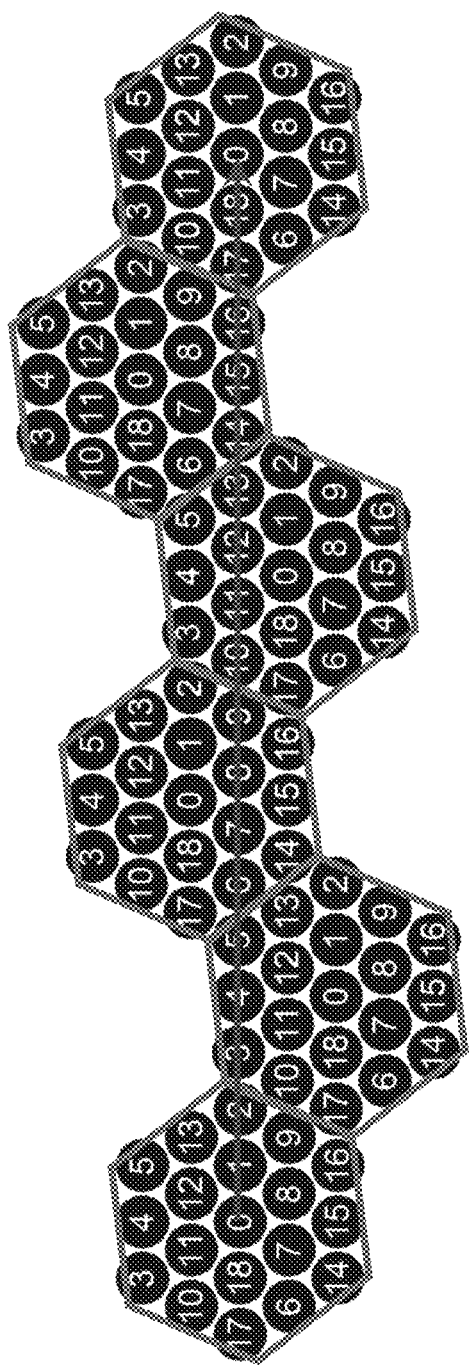
FIG. 22 illustrates linear scan across tessellated 19-element hexagonal beamspace array.
Figure 23:
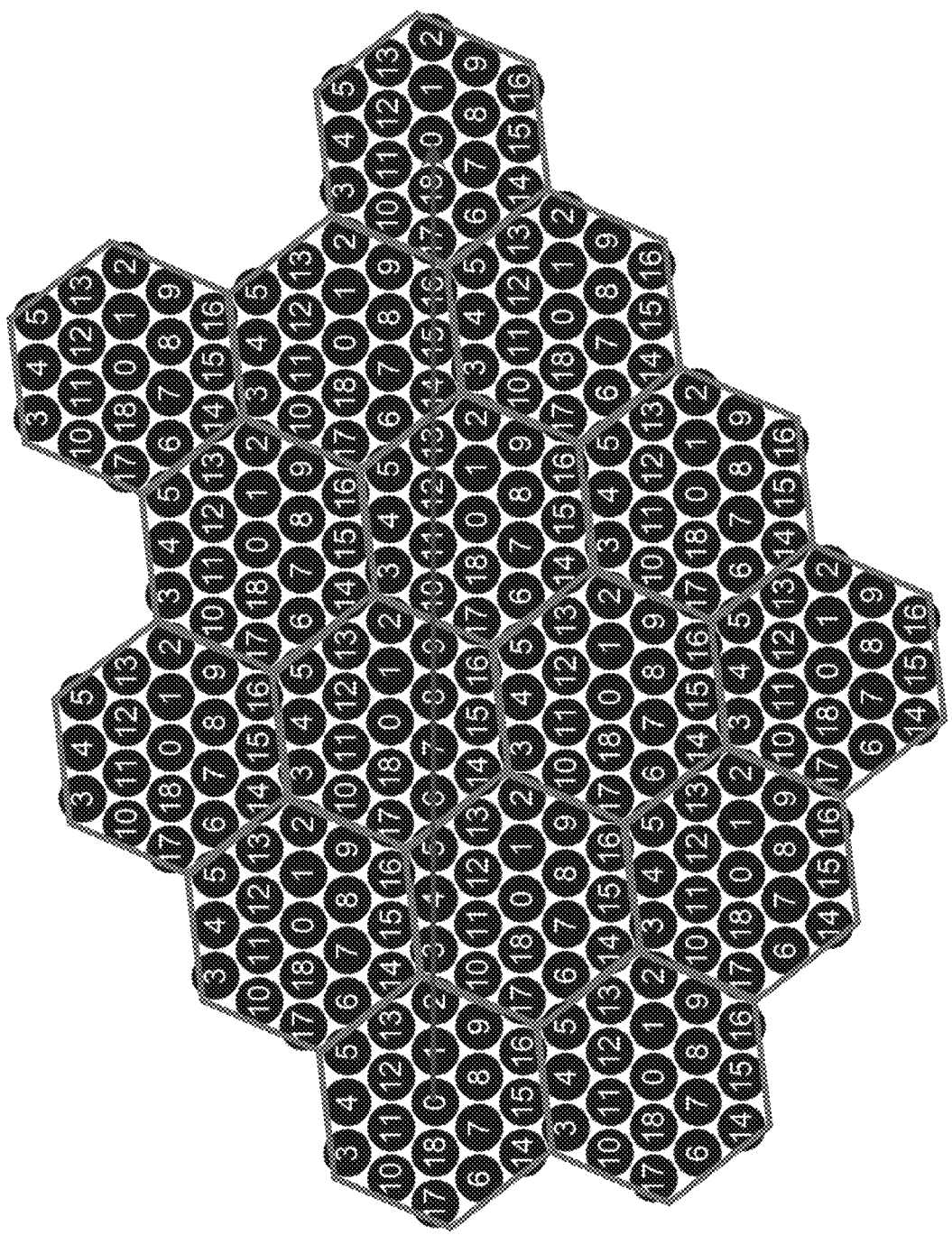
FIG. 23 shows a larger portion of the 19-element hexagonal beamspace array tessellation.
Figure 24:
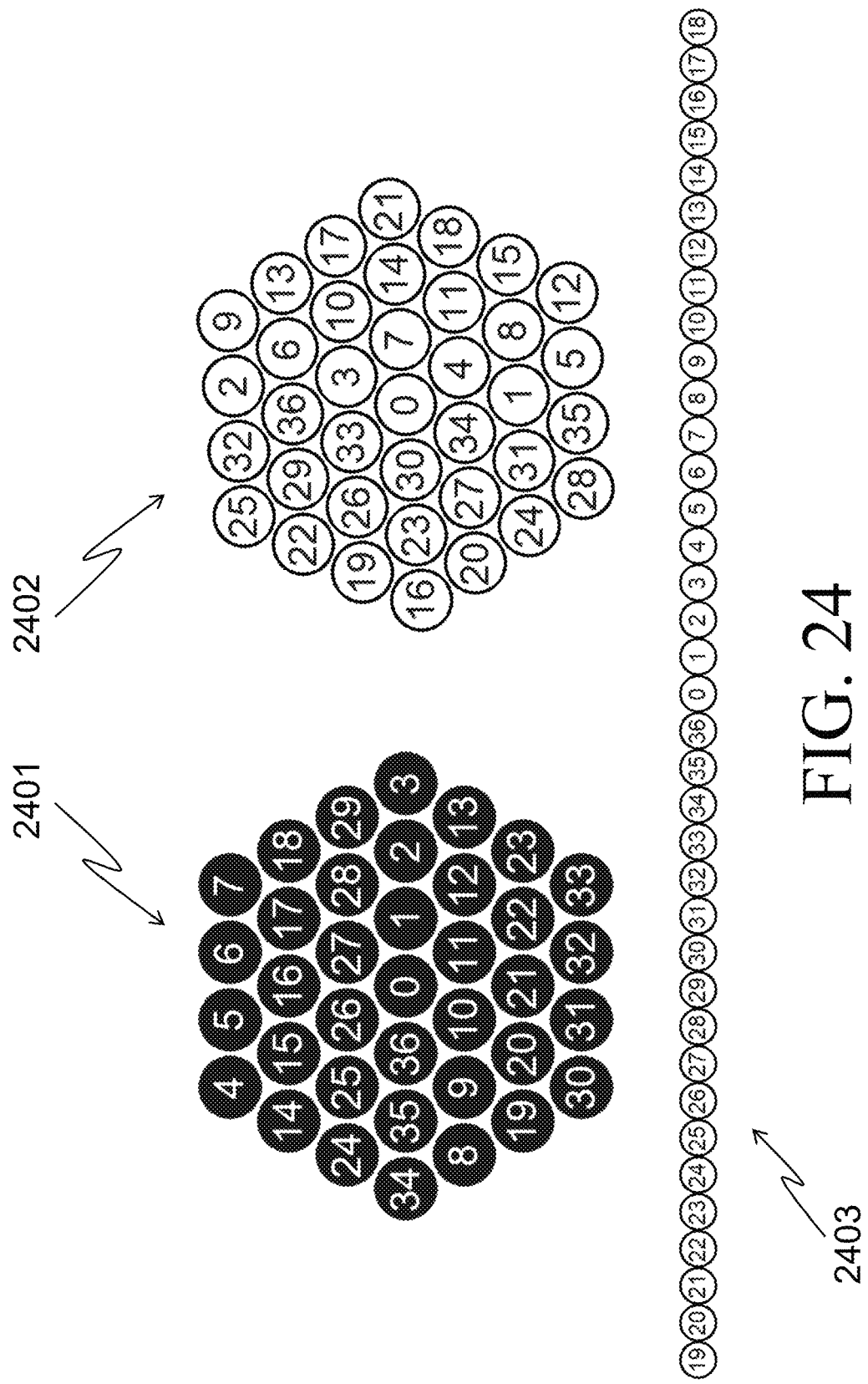
FIG. 24 shows a 37-element hexagonal beamspace array in addition to the corresponding hexagonal and linear arrays.

The method extends to larger hexagonal arrays as illustrated in FIG. 21 that shows a 19-element beamspace array 2101 and the corresponding array 2102 that may be used to form the two-dimensional beam pattern. The labeling with numerals 0 through 18 of the array 2102 has been obtained following the method described above with the help of FIG. 15, whereas the elements of the beamspace array 2101 are labeled so as to ensure a linear sequential distribution of beamspace-array elements in the tessellation as shown in FIG. 22. FIG. 23 shows a larger portion of the tessellation to illustrate that it is indeed possible to tessellate the entire lattice with the 19-element beamspace array without gaps or overlaps. The 2D-to-1D mapping of an even larger hexagonal array, counting 37 elements, is illustrated in FIG. 24 where the numbering schemes of the array and the beamspace array are shown in 2402 and 2401, respectively, with the linear unrolling of the array elements shown in 2403. The presence of a sequential linear distribution of beamspace-array elements in the tessellation may be verified in a way analogous to that presented above.

It shall be appreciated by those skilled in the art, that the construction of, and the ordering of the elements in, the hexagonal arrays and the corresponding beamspace arrays may be extended to larger element counts by following the examples provided above.

Beamspace Mapping—General Construction

Above, we taught how a rectangular phased array with co-prime side lengths may be 'unrolled' to 1D while preserving the beam-forming ability for beamspace processing. The method relies on the presence of grating lobes associated with regular (periodic) placement of elements in the phased array. The interaction of an infinite lattice of grating lobes with the field of view may be 'flipped around' and equivalently understood as the interaction of one, main lobe of the beam with a periodic extension of the field of view (or beamspace array). If such a periodic extension of the field of view allows for drawing a straight line through each resolvable element of the beamspace array, or its equivalent copy in the periodic extension, then one-dimensional beam processing to achieve two-dimensional beam steering may be possible. One-dimensional beamspace processing needs only a one-dimensional array, and we provided a method to organize array elements in a straight line for such processing.

Note that in the above construction, care must be taken when designing the phased array to ensure the existence of a linear arrangement of resolvable beams or elements in the periodic extension of the array's field of regard. An alternative approach that guarantees the existence of such a linear arrangement is to begin with the linear arrangement and proceed 'backward' to generate a 2D, or higher-dimensional, array. It should be appreciated that such a 'backward' construction ensures that the resulting 2D array always has a 1D representation of the beamspace—the very beamspace that was 'rolled up' from 1D to 2D to construct the 2D array. In addition, the construction need not begin with a 1D beamspace, but instead may start with a linear distribution of the array itself, and 'roll up' this 1D array to form a 2D array.

Below, we provide several examples of such constructions, which we follow with a general description of the method.

Three-Element Array

The smallest phased array that may be used for 2D beam steering has three elements. To ensure the ability to 'unroll' the 2D array to 1D, we start with a linear 3-element array as shown in FIG. 25. The placement of the array elements is schematically illustrated in FIG. 25A with the elements labeled using numerals 0, 1, and 2. The array is regular, meaning the array elements are placed on a regular one-dimensional lattice defined by a lattice basis vector $a_1$ shown in FIG. 25B. Formally, the array may be thought of as a set $$X=\{x_0, x_1, x_2\}=\{x_0, x_0+a_1, x_0+2a_1\}, \quad (14)$$

where $x_0$, $x_1$, $x_2$ are the positions of the array elements. Such an array supports three orthogonal virtual beams and, accordingly, may resolve, or distinguish, three beams. The k-vectors of the three resolvable beams are collinear since the elements of the array itself are collinear.

To construct a 3-element 2D array capable of two-dimensional beam steering that shares the virtual orthogonal beams with the linear array, we first periodically extend the linear array using vectors $t_1$, $t_2$ shown in FIG. 25C as a tessellation basis. Vectors $t_1$, $t_2$ are chosen so that the lattice defined by vectors $a_1$, $a_2$ of FIG. 25D, (or equivalently FIG. 25E) i.e., the set $$x_0+^{\{a_1, a_2\}}=\{x_0+n_1a_1+n_2a_2|n_1,n_2\in\}, =0,\pm1,\pm2, \ldots, \quad (15)$$

may be tessellated (completely covered, with no gaps or overlaps) by the copies of the array X defined in (14). Formally, the last statement may be expressed as (1) $x_0+^{\{a_1,a_2\}}=X+\{^{t_1,t_2}\}\equiv\{x+n_1t_1+n_2t_2|x\in X, n_1\in, n_2\in\}$ (2) $(X-X)\cap^{\{t_1,t_2\}}=\{0\}$, where $(X-X)=\{x-x'|x,x'\in X\}$. (16)

Figure 26A:
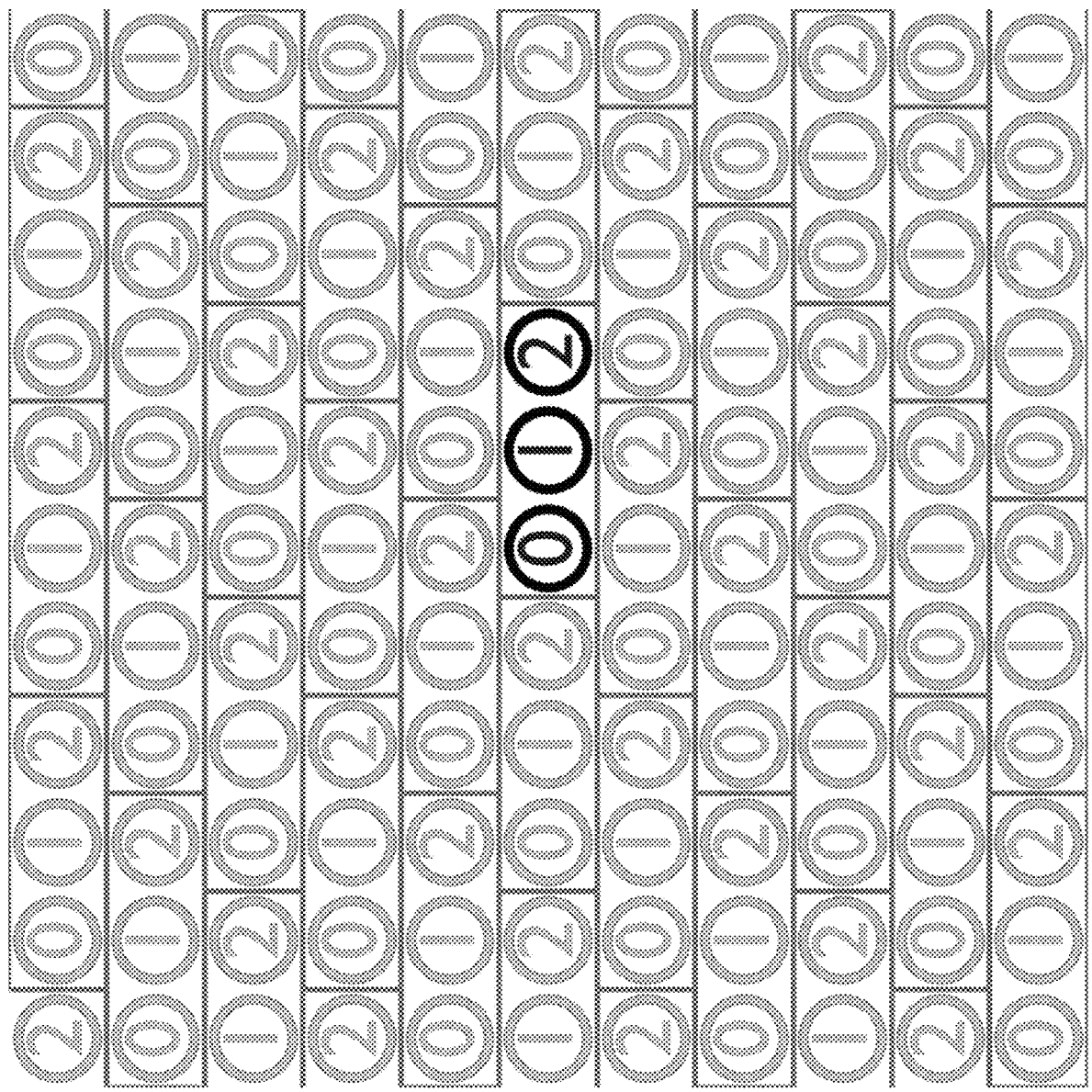
FIGS. 26A-26B illustrate the tessellation of a 2D lattice with a linear array.
Figure 26B:
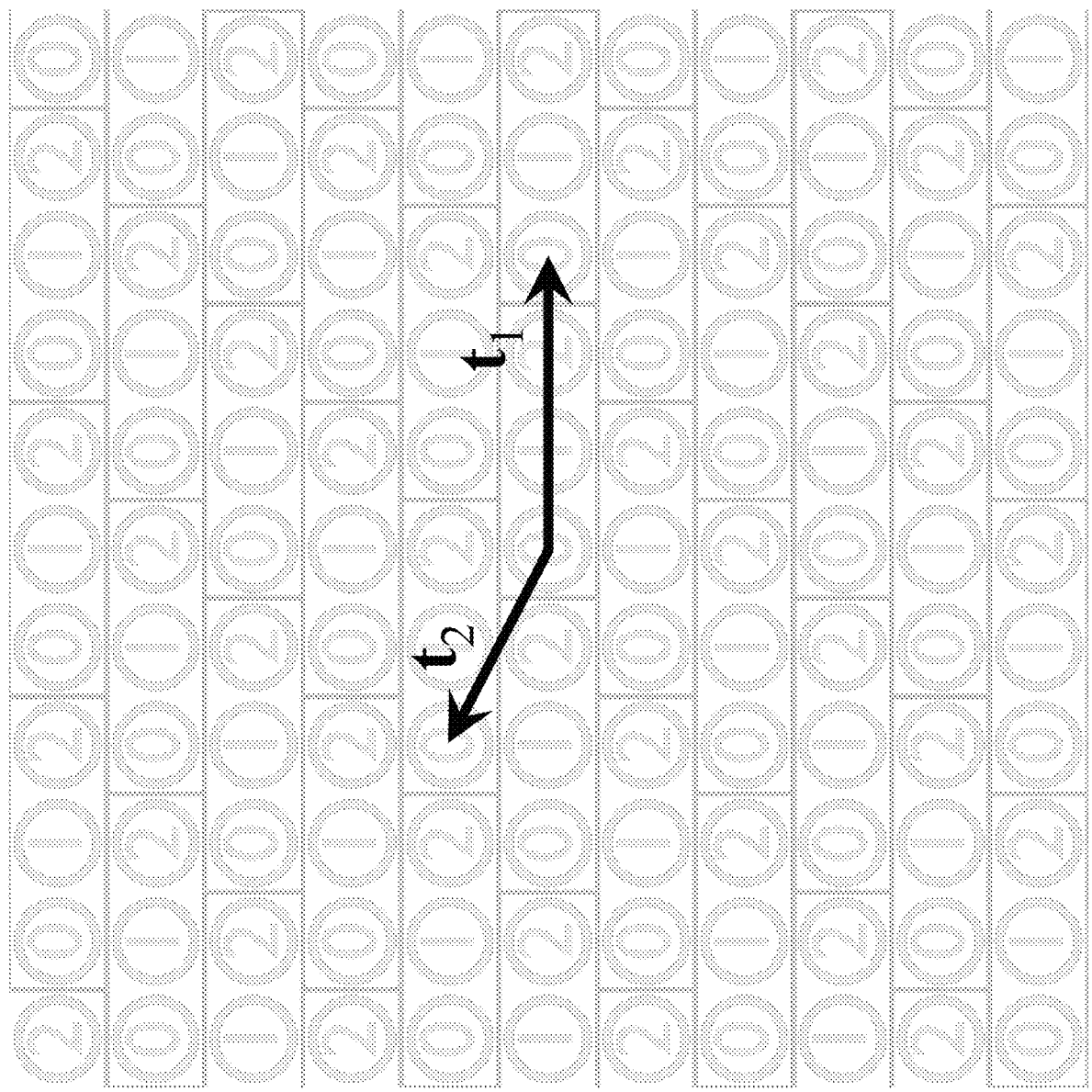

In (16), condition (1) indicates full coverage of lattice $x_0+^{\{a_1, a_2\}}$ with copies of X, whereas condition (2) indicates no overlap in said coverage; $^{\{t_1,t_2\}}$ is referred to as a tessellation lattice. FIG. 26 shows the tessellation of the linear array over a 2D lattice, where FIG. 26A highlights the original 3-element array and FIG. 26B shows explicitly the tessellation basis vectors $t_1$, $t_2$.

From FIGS. 25C and 25D, the basis $a_1$, $a_2$ and the tessellation basis $t_1$, $t_2$ may be identified as $$a_1 = \begin{pmatrix}1\\0\end{pmatrix}, a_2 = \begin{pmatrix}0\\1\end{pmatrix}, t_1 = \begin{pmatrix}3\\0\end{pmatrix}, t_2 = \begin{pmatrix}-2\\1\end{pmatrix} \quad (17)$$

in suitably chosen units. Alternatively the basis $a_1$, $a_2$ may be chosen as illustrated in $$a_1 = \begin{pmatrix}1\\0\end{pmatrix}, a_2 = \begin{pmatrix}-2\\1\end{pmatrix}, \quad (18)$$

which yields a particularly simple relation between the basis $a_1$, $a_2$ and the tessellation basis $t_1$, $t_2$ $$t_1=3a_1, t_2=a_2. \quad (19)$$

If we think of the array and its elements as residing in the 'real' space, i.e., the space that we experience as being occupied by real objects, people, etc., then the beams may be thought of as residing in the 'reciprocal' space, i.e., the space of k-vectors. (A more detailed discussion of the meaning of the term 'beam' is presented above under the heading 'Beam.') The dot product between an element (vector) x belonging to the real space and an element (vector) k belonging to the reciprocal space, x·k, yields a number that may be identified as the phase (offset) of a plane wave having k-vector k at a position x in space.

Figure 27A:
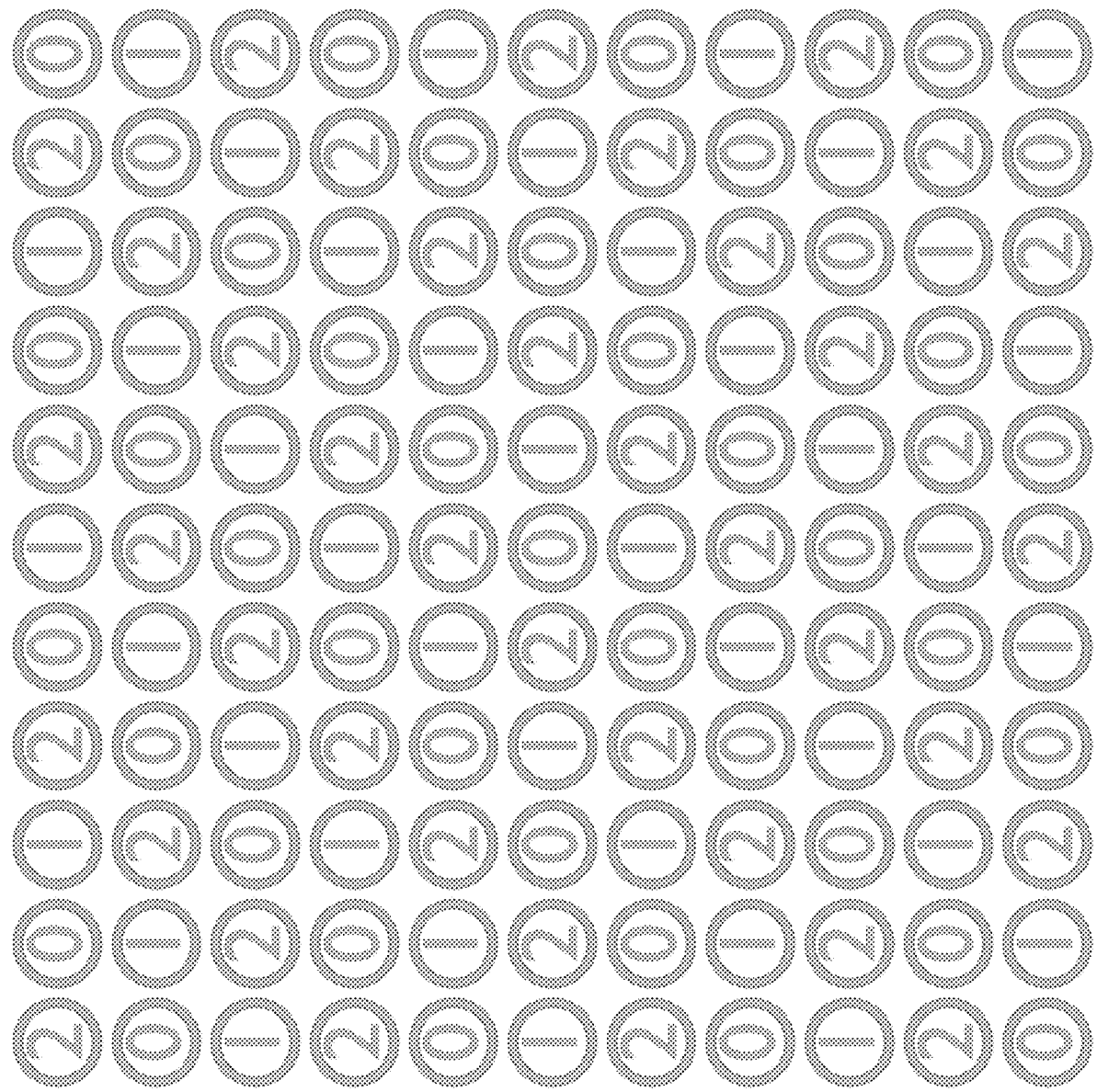
FIGS. 27A-27B show an alternative, two-dimensional, selection of array from the lattice.
Figure 27B:
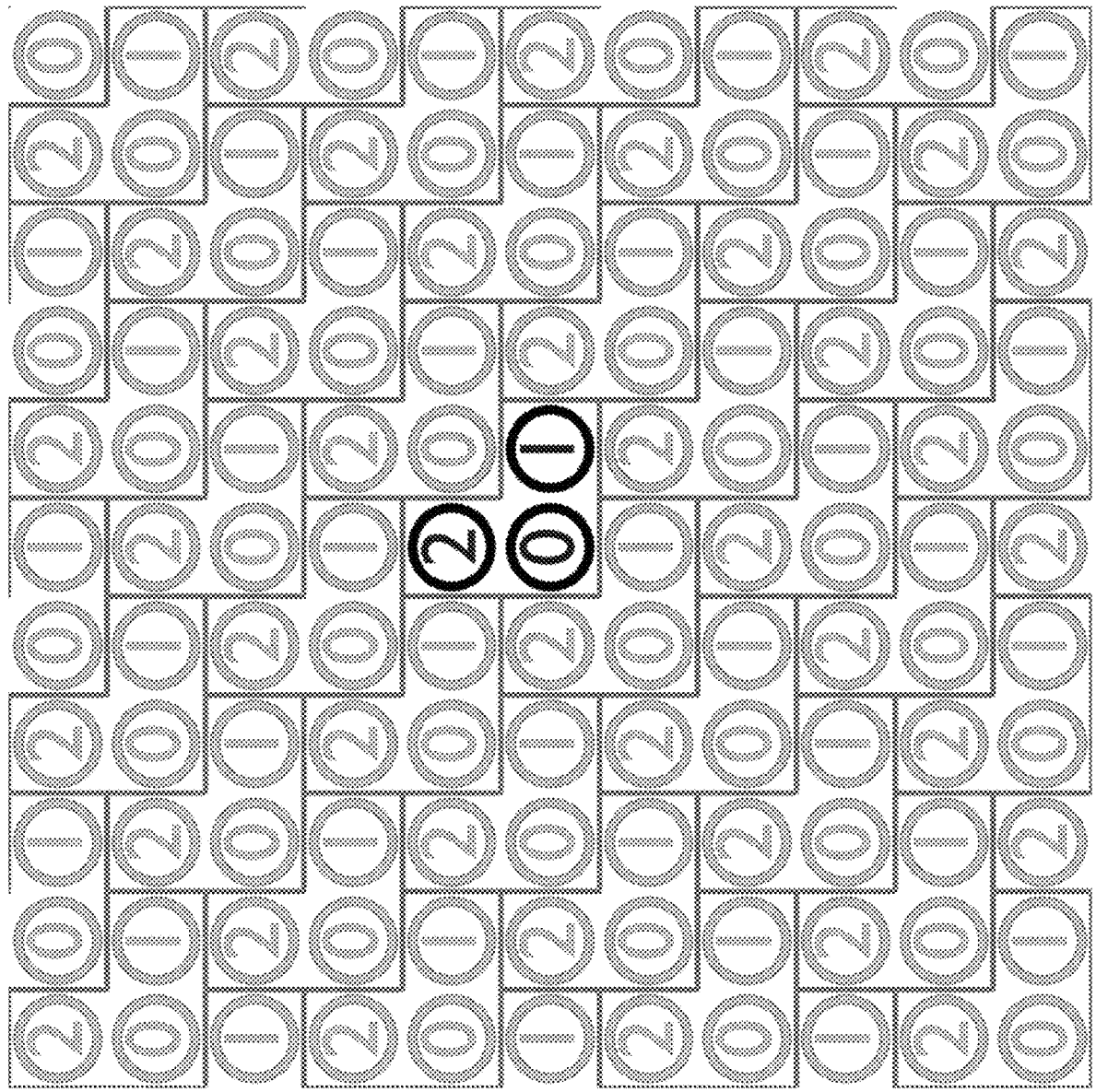

In the context of phased arrays, steering a beam in two dimensions requires at least a two-dimensional array. Such an array may be selected from the lattice of FIG. 26, which is copied in FIG. 27A sans the outlines of the linear-array tessellation. Careful inspection of the element labeling confirms that the periodic array extensions of FIG. 26 and FIG. 27A are identical. When displayed this way, the illustration shows that the linear array is not the only possible array that may be tessellated over the periodic extension. Indeed, FIG. 27B shows an alternative choice of an array that: (1) uses on the same basis vectors $a_1$, $a_2$ for array-element placement, (2) may be tessellated over the lattice using the same tessellation basis $t_1$, $t_2$, and (3) is two-dimensional (as opposed to linear). Note that in the alternative choice of the array, each element label (0, 1, and 2) appears exactly once. This allows the one-to-one mapping between different arrays, such as an antenna array for capturing or transmitting RF waves, which may be two-dimensional, and a fiber array for beam forming and beamspace processing (e.g., at channel edge 34 and beamspace edge 36), which may be one-dimensional.

Note that any choice of three elements from the lattice of FIG. 27A such that each element label (0, 1, and 2) appears exactly once may be a valid choice for an array in the sense that such an array may be tessellated over the entire lattice using the tessellation basis $t_1$, $t_2$ of (17).

FIG. 28 shows the lattice of distinguishable beams, i.e., the beamspace lattice, that may be generated by the 3-element phased array and its periodic extension to two dimensions discussed above. The basis vectors $\hat{t}_1$, $\hat{t}_2$ (beamspace basis) as well as $\hat{a}_1$, $\hat{a}_2$ (grating-lobe basis) of this beamspace lattice, shown in FIG. 28B, may be obtained from the tessellation basis $t_1$, $t_2$ and the basis $\hat{a}_1$, $\hat{a}_2$ of (17) using relations:

$$\hat{a}_i \cdot a_j = 2\pi\delta_{ij}, \hat{t}_i \cdot t_j = 2\pi\delta_{ij}, i, j \in \{1, 2\}, \text{ where} \quad (20)$$

$$\delta_{ij} = \begin{cases} 1 \text{ for } i = j \\ 0 \text{ otherwise} \end{cases}$$

Figure 28A:
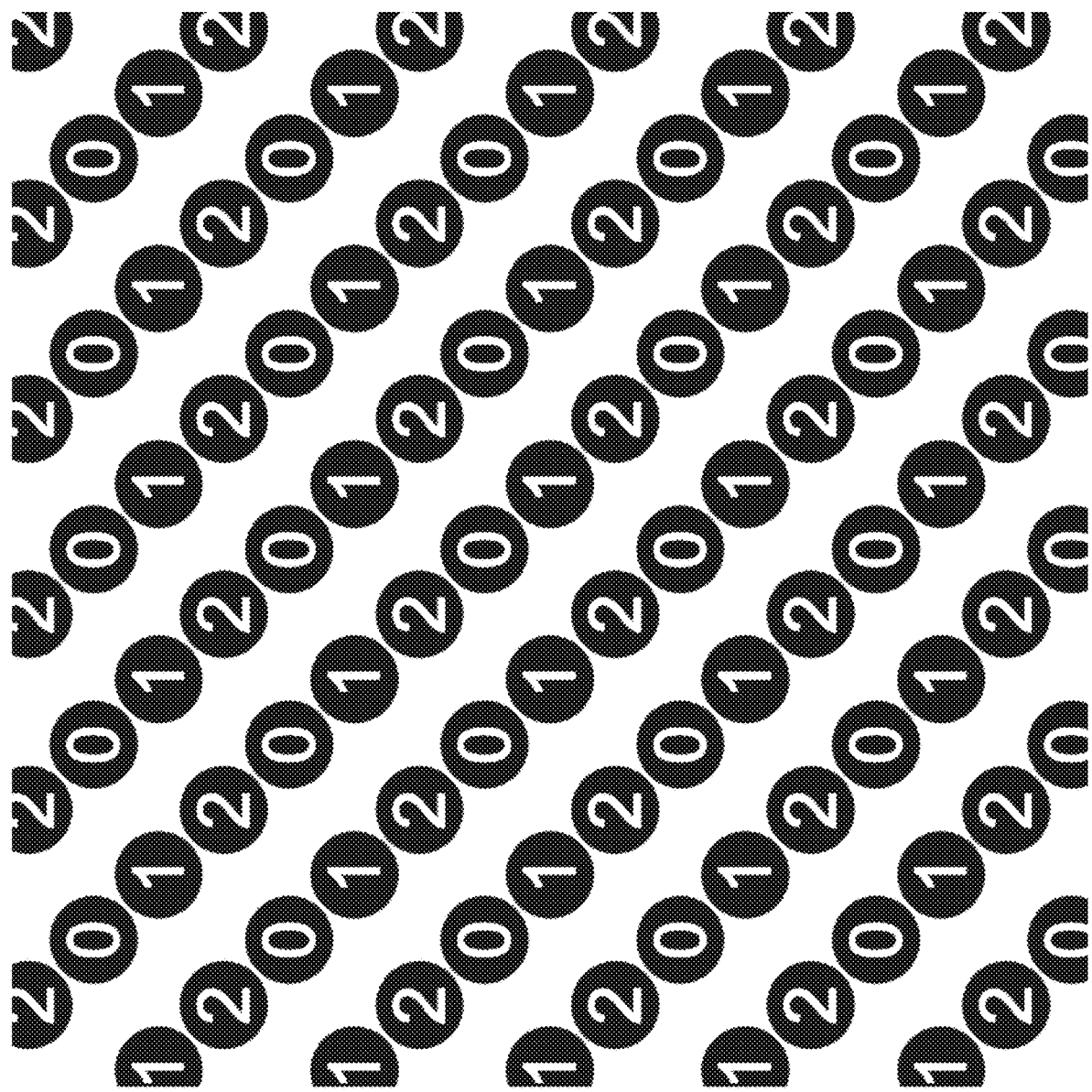
FIGS. 28A through 28D show the beamspace lattice that may correspond to a 3-element phased array of FIG. 25 periodically extended to the lattice of FIGS. 26 and 27.
Figure 28B:
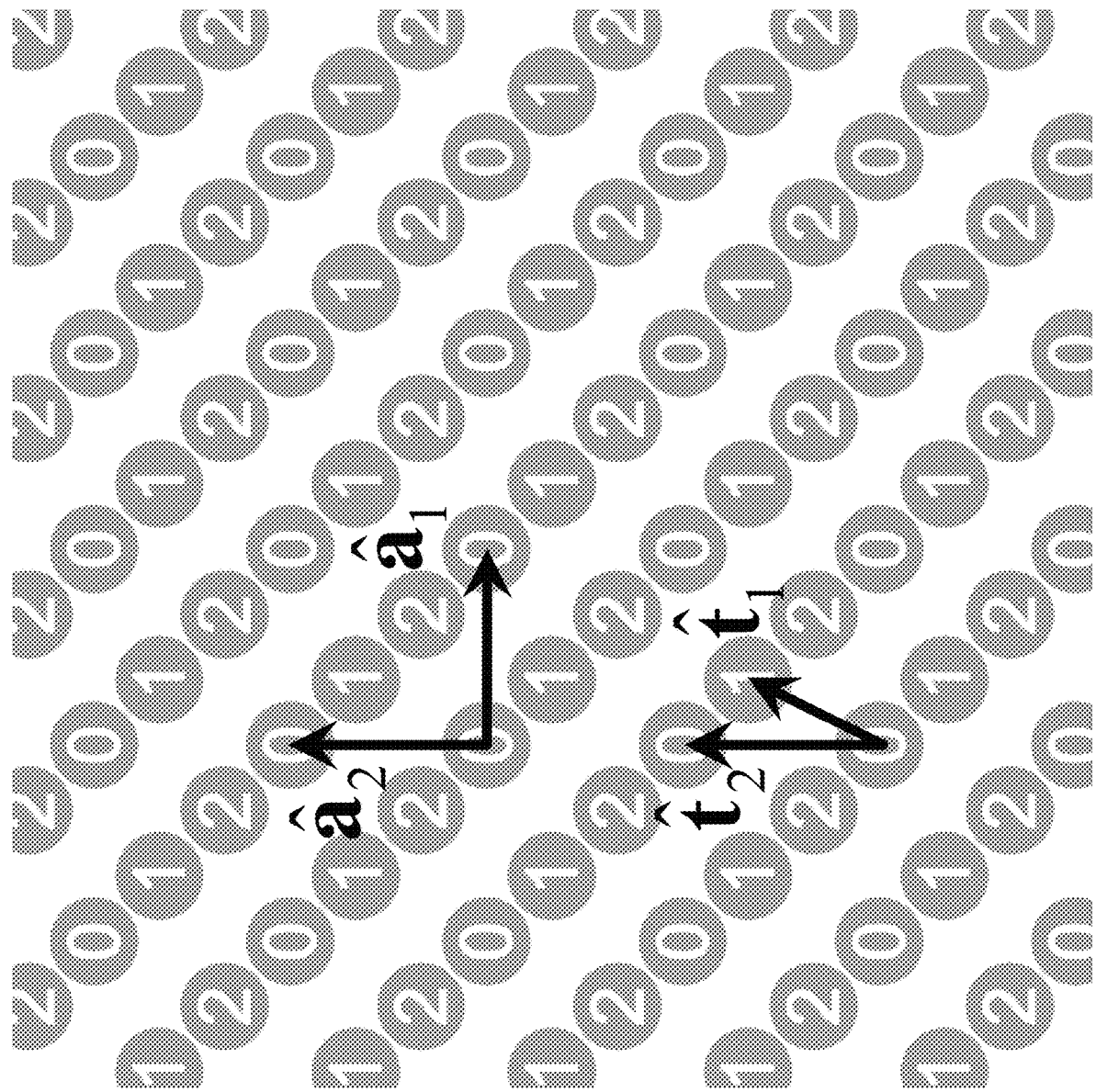
Figure 28C:
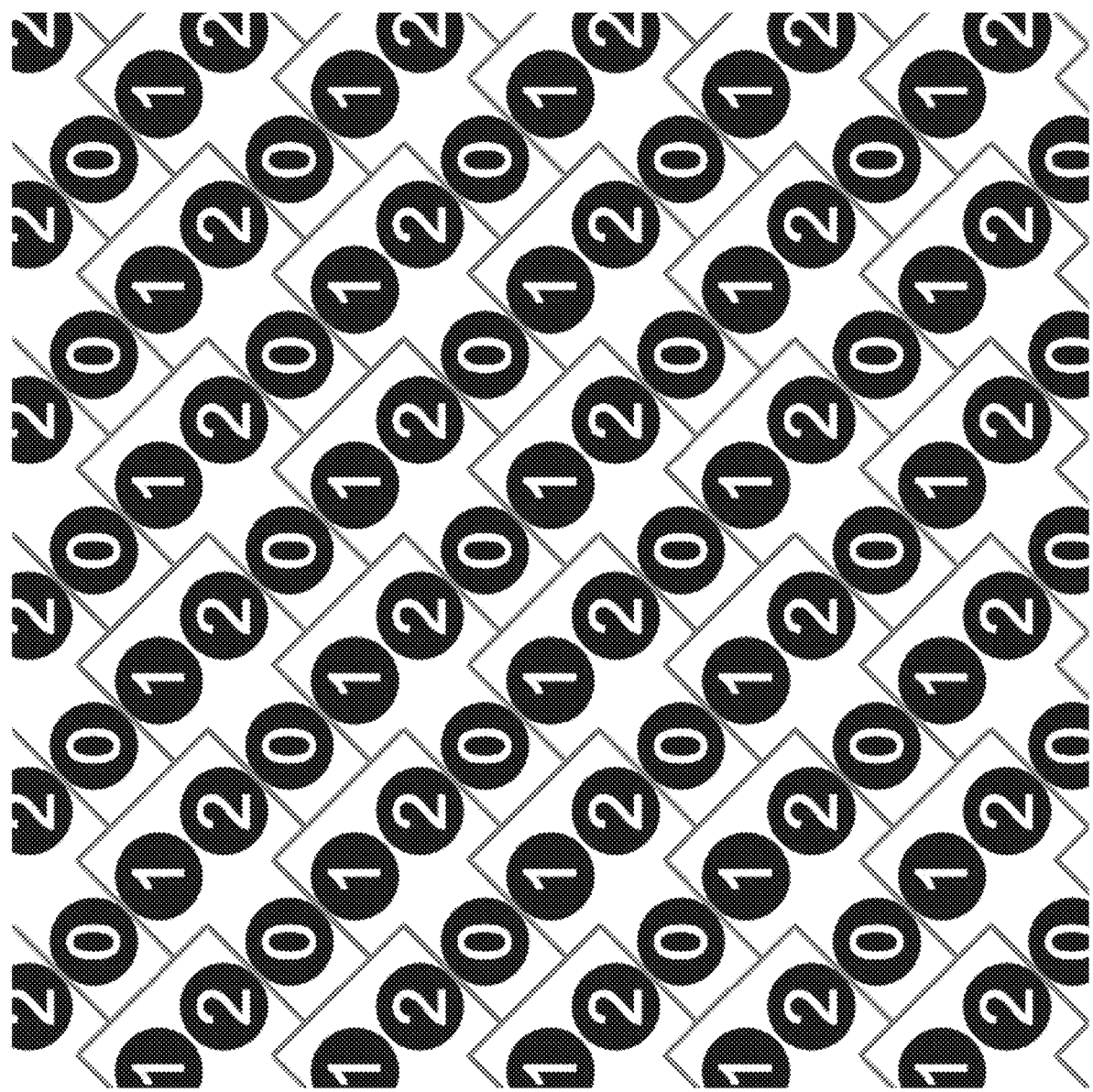
Figure 28D:
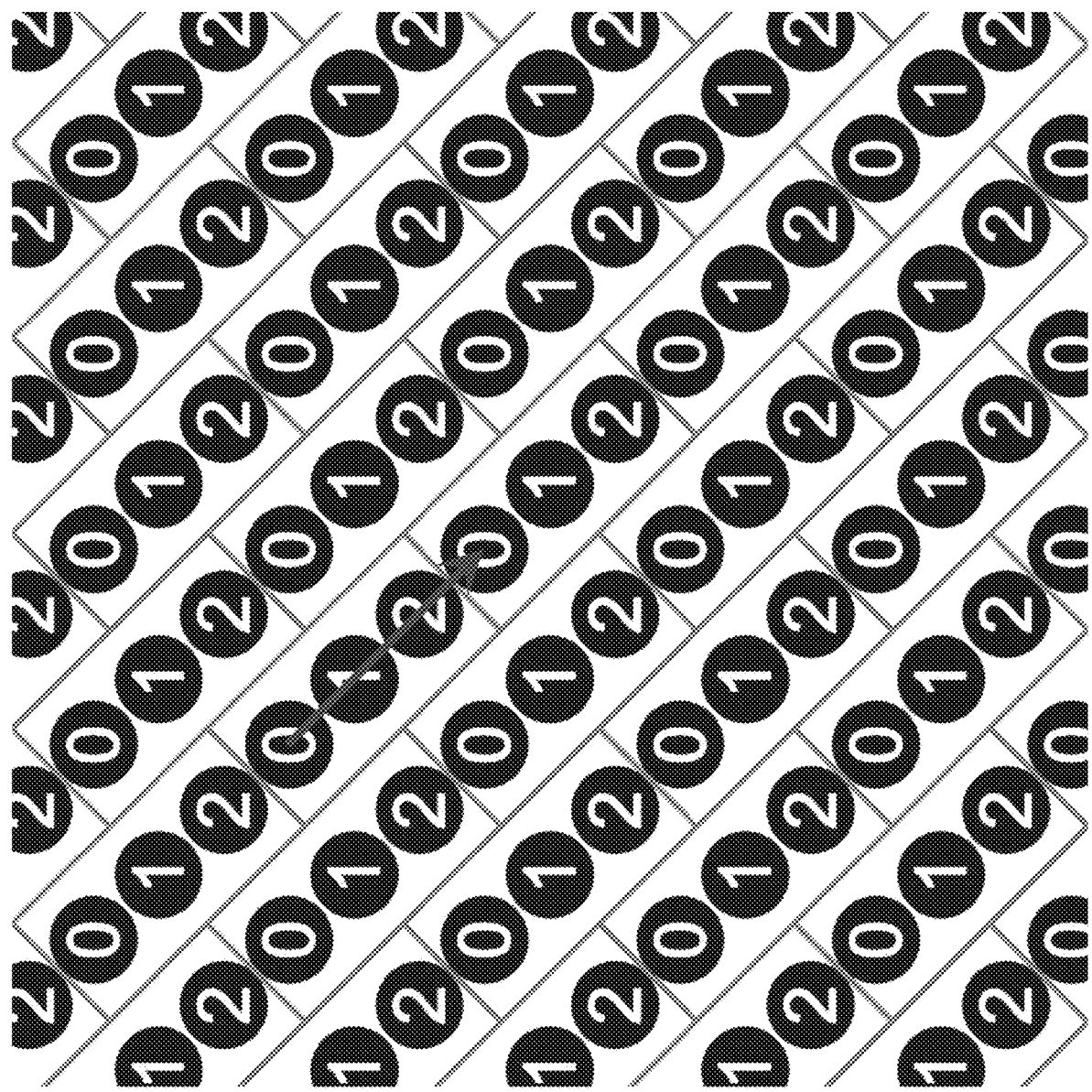

FIGS. 28C and 28D show that the same beamspace lattice may be tessellated using a 2D beamspace array, as in FIG. 28C, or a linear beamspace array, as in FIG. 28D. This means that a linear array, e.g. the one of FIG. 25A, may be used to form all beams resolvable by a 2D array, e.g., the one highlighted in FIG. 27B. The arrow in FIG. 28D shows a possible linear scan direction that may achieve this beam forming.

Figure 30A:
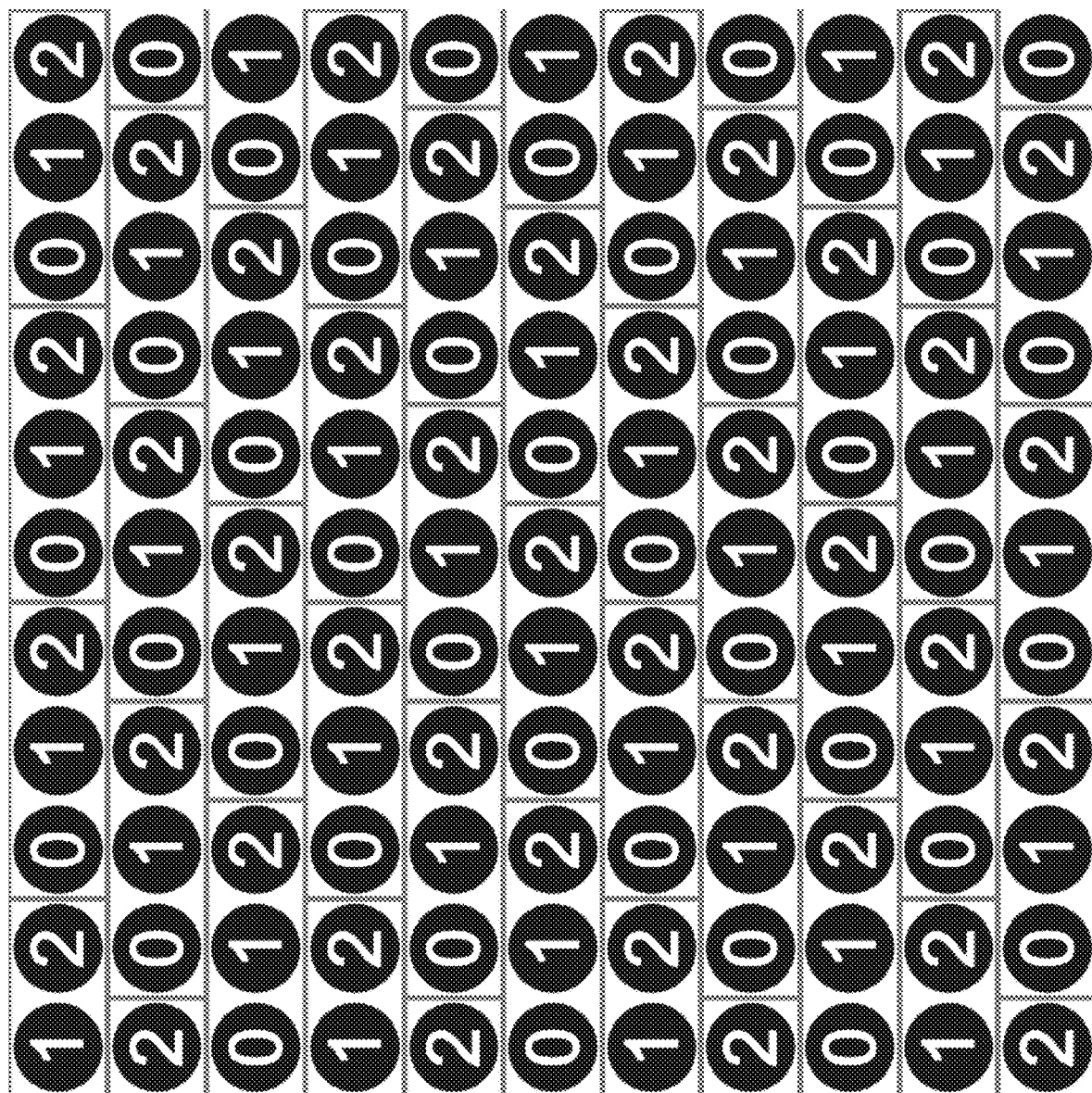
FIGS. 30A-30B show beamspace lattice tessellated with the linear 3-element beamspace array of FIG. 29.

An alternative construction starts with a linear distribution of beams in a beamspace array, and its periodic extension to a 2D reciprocal lattice. To this end, consider a linear array of three distinguishable beams (beamspace array) as shown in FIG. 29A. The beamspace basis vector $\hat{t}_1$ defines the beamspace array pitch as in FIG. 29B. This linear beamspace array may be extended periodically to two dimensions using grating-lobe lattice basis $\hat{a}_1$, $\hat{a}_2$, as in FIG. 29C, and the second beamspace basis vector $\hat{t}_2$ defined in FIG. 29D. Thus defined beamspace basis $\hat{t}_1$, $\hat{t}_2$ and the grating-lobe basis $\hat{a}_1$, $\hat{a}_2$ may periodically extend the 3-element linear beamspace array to 2D and tessellate the 3-element beamspace array over a regular square beamspace lattice. FIG. 30A shows such a tessellation of a regular 2D beamspace lattice with a linear, three-element beamspace array whereas FIG. 30B highlights the beamspace basis $\hat{t}_1$, $\hat{t}_2$ and the grating-lobe basis $\hat{a}_1$, $\hat{a}_2$.

FIG. 29E shows an alternative choice for the beamspace basis $\hat{t}_1$, $\hat{t}_2$, where $3\hat{t}_1=\hat{a}_1$, $\hat{t}_2=\hat{a}_2$, that yields the same beamspace lattice.

Figure 30B:
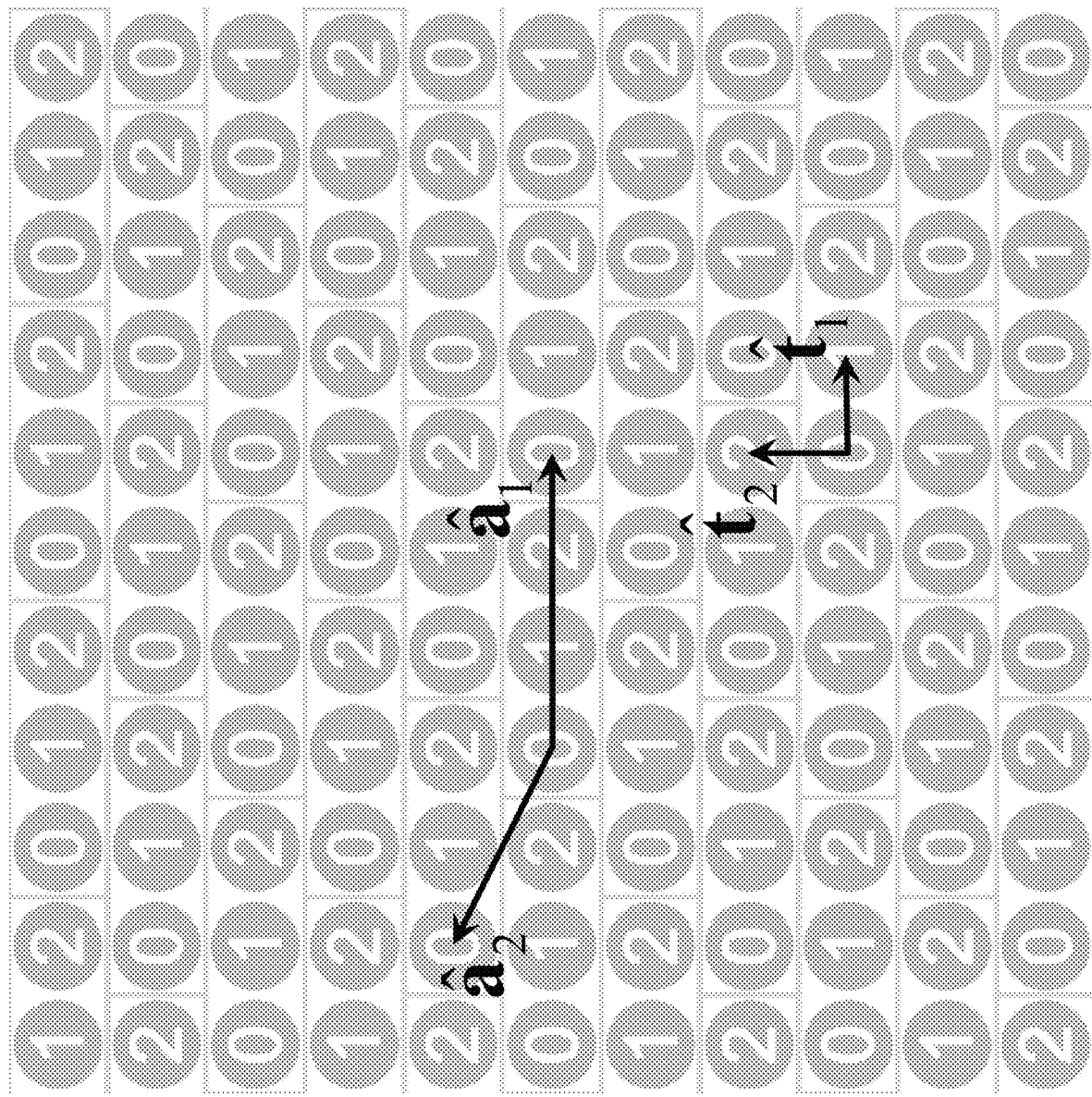
Figure 31:
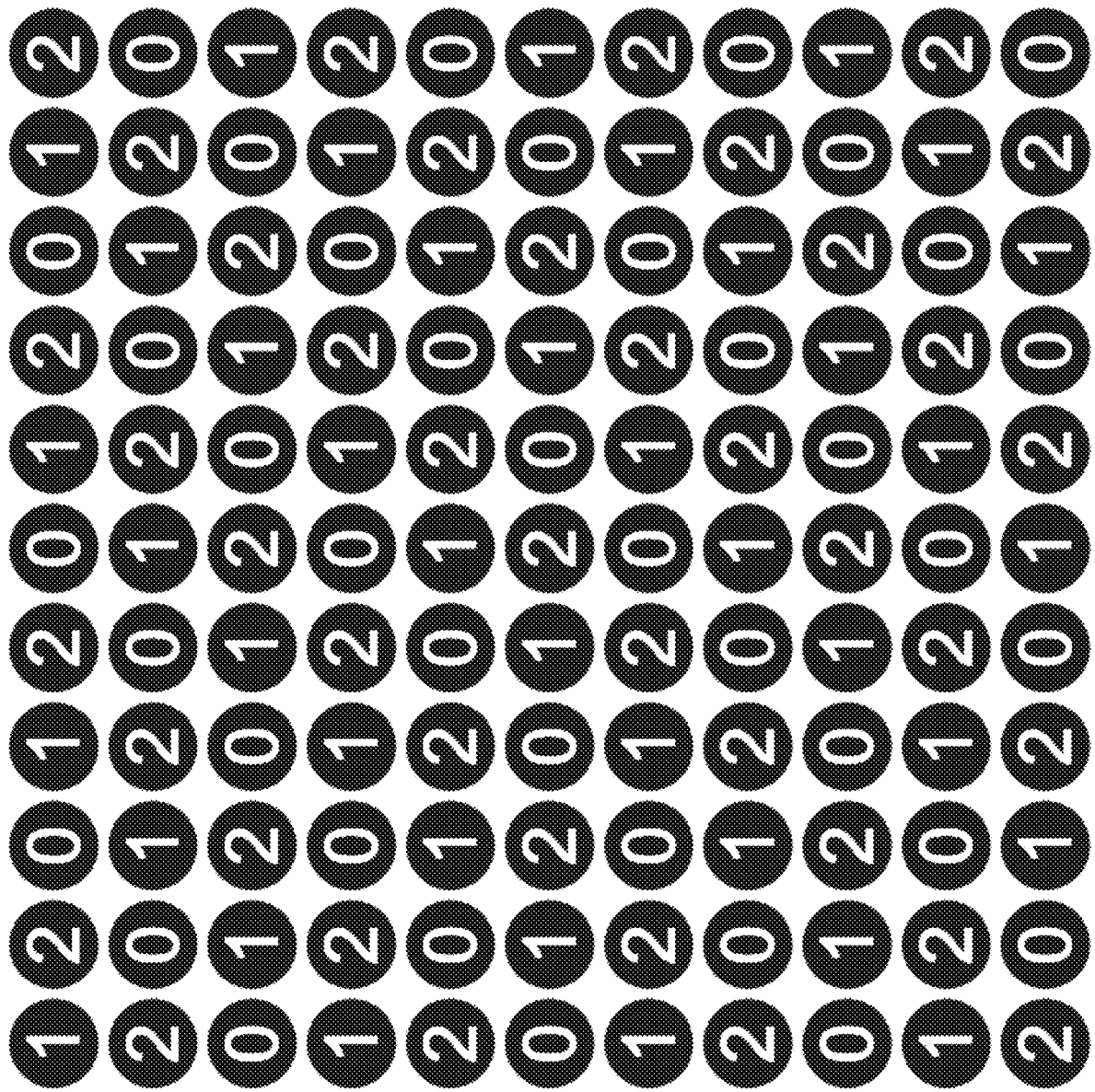
FIG. 31 illustrates the beamspace lattice of FIG. 30 sans the tessellation.
Figure 32:
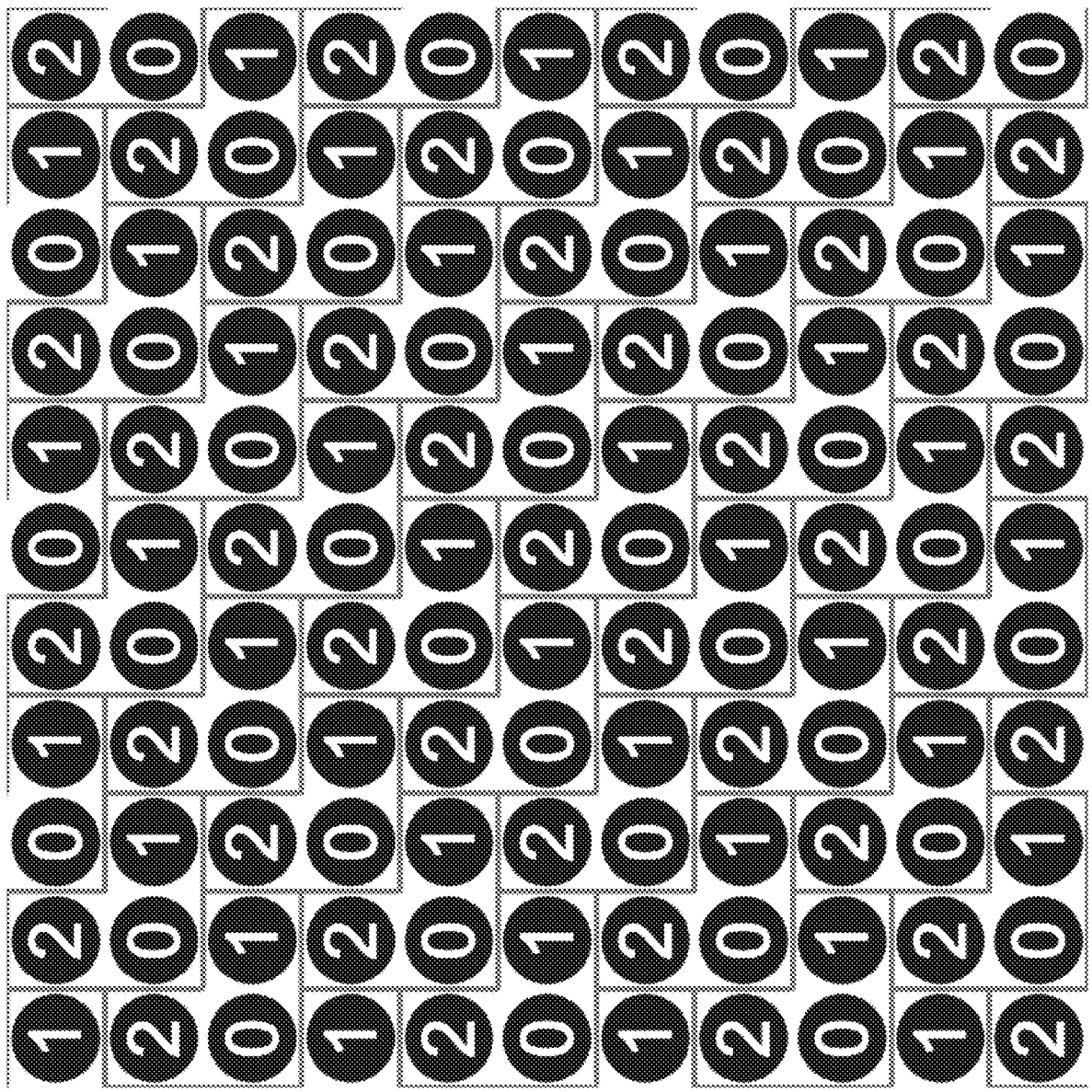
FIG. 32 illustrates an alternative tessellation of beamspace lattice with a two-dimensional 3-element beamspace array.

With the beamspace lattice constructed as in FIG. 30, an alternative 2D beamspace array may be sought. FIG. 31 shows the beamspace lattice sans the tessellation outlines whereas FIG. 32 shows an alternative tessellation using a two-dimensional beamspace array. To find arrays that may be used to produce the linear beamspace array of FIG. 29 or the 2D beamspace array used in tessellation of FIG. 32, we first construct the lattice using a basis reciprocal to the grating-lobe basis $a_1$, $a_2$ identified in FIG. 29C and FIG. 30B:

$$\left. \begin{array}{l} \hat{a}_1 = 2\pi \begin{pmatrix} 3 \\ 0 \end{pmatrix}, \hat{a}_2 = 2\pi \begin{pmatrix} -2 \\ 1 \end{pmatrix} \\ \hat{a}_m \cdot a_n = 2\pi \delta_{mn} \end{array} \right\} \Rightarrow a_1 = \frac{1}{3}\begin{pmatrix} 1 \\ 2 \end{pmatrix}, a_2 = \begin{pmatrix} 0 \\ 1 \end{pmatrix}. \quad (21)$$

The tessellation basis $t_1$, $t_2$ is found from the beamspace basis $\hat{t}_1$, $\hat{t}_2$ identified in FIGS. 29D and 30B:

$$\left. \begin{array}{l} \hat{t}_1 = 2\pi \begin{pmatrix} 1 \\ 0 \end{pmatrix}, \hat{t}_2 = 2\pi \begin{pmatrix} 0 \\ 1 \end{pmatrix} \\ \hat{t}_m \cdot t_n = 2\pi \delta_{mn} \end{array} \right\} \Rightarrow t_1 = \begin{pmatrix} 1 \\ 0 \end{pmatrix} = 3a_1 - 2a_2, \quad (22)$$

$$t_2 = \begin{pmatrix} 0 \\ 1 \end{pmatrix} = a_2.$$

Figure 33A:
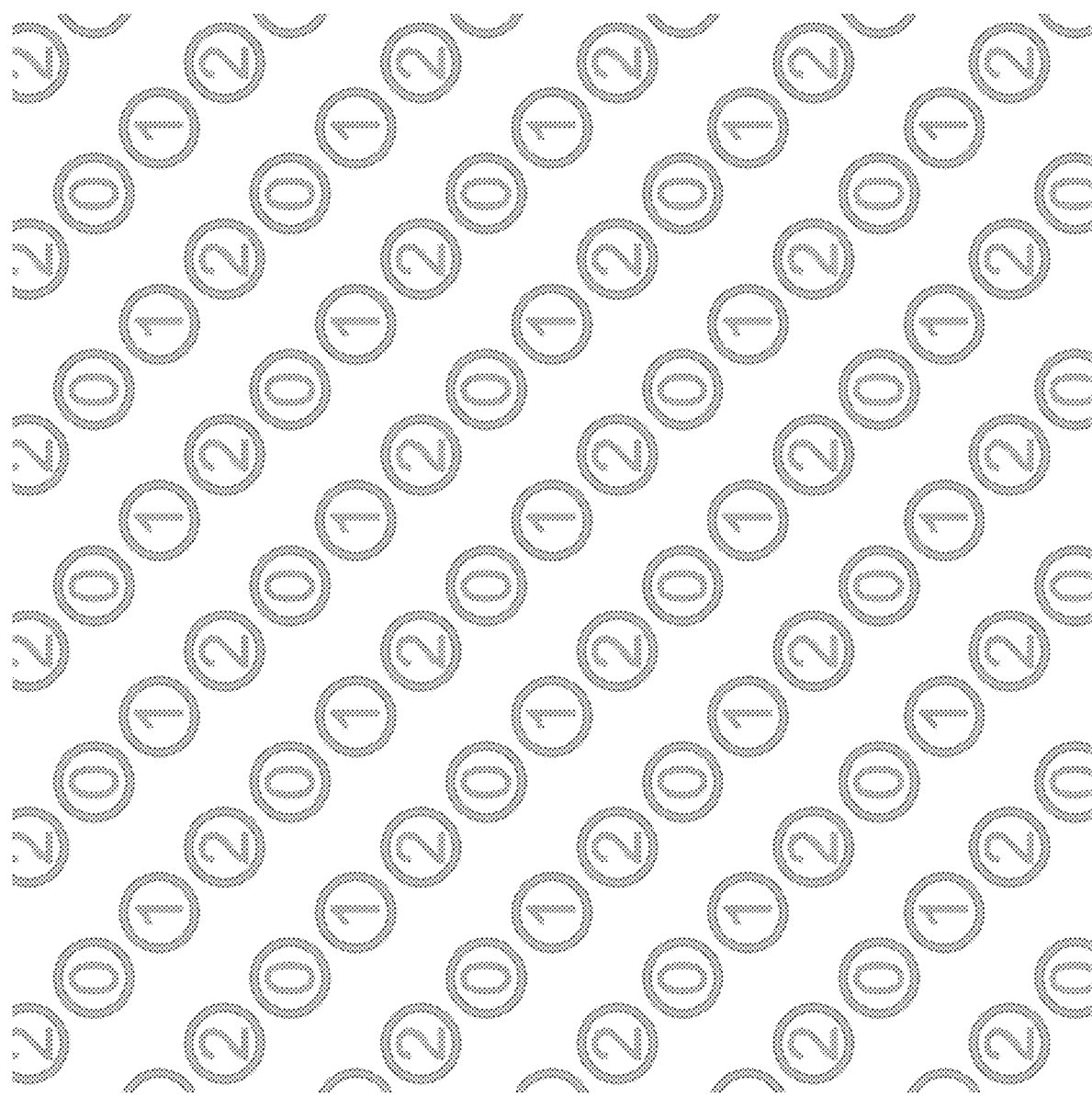
FIGS. 33A through 33D show the lattice corresponding to the beamspace lattice of FIGS. 30 through 32.
Figure 33B:
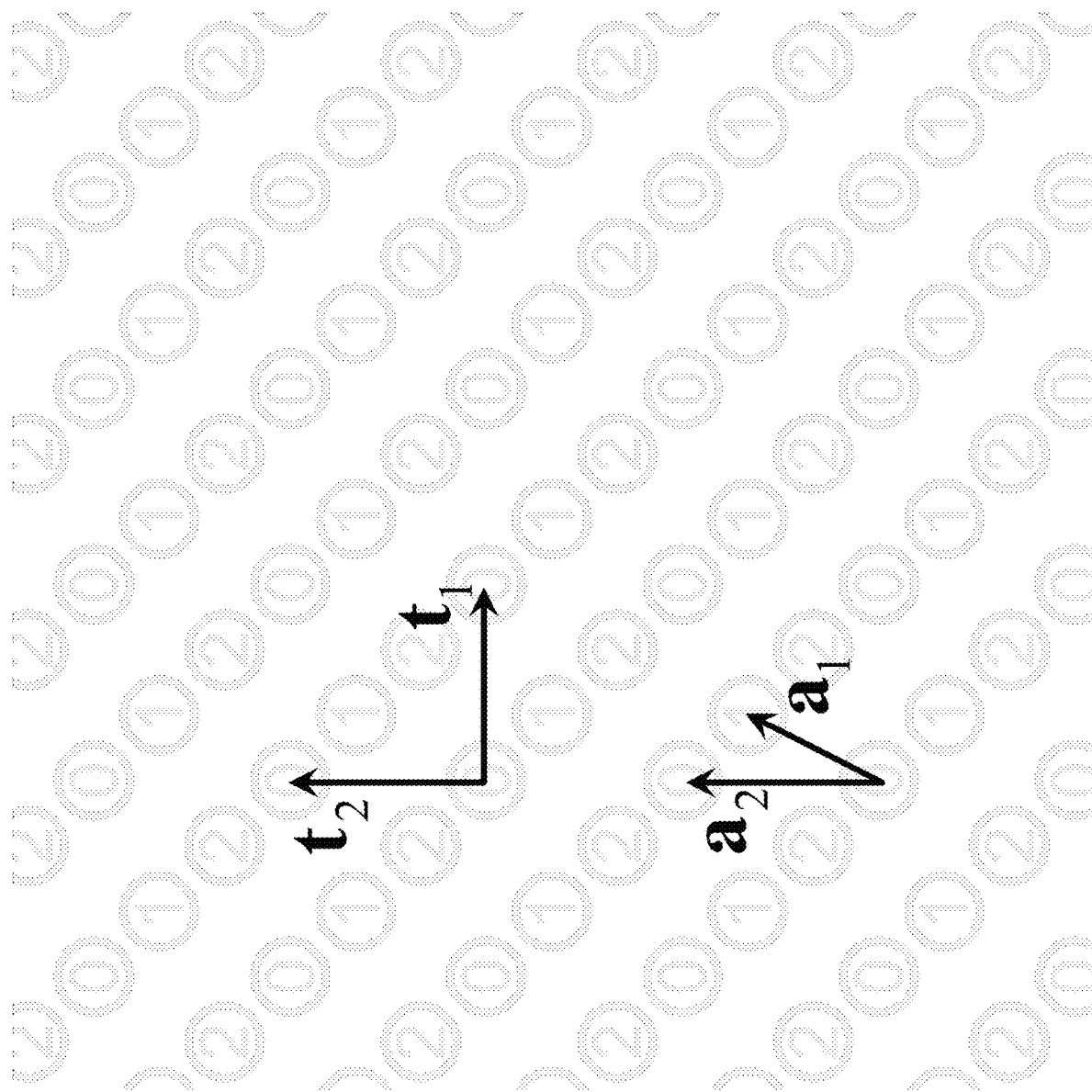

FIG. 33A shows a lattice obtained using basis $a_1$, $a_2$ and tessellation basis $t_1$, $t_2$ of (21) and (22), respectively, whereas FIG. 33B highlights the basis vectors. Numerical labels of the lattice elements are obtained using a procedure analogous to that described above when discussing FIG. 15. To this end, we draw a line through one of the lattice elements, the line being perpendicular to the beamspace basis vector $\hat{t}_1$ (which makes it parallel to $\hat{t}_2$ according to (22)). This element, along with all the other elements that this line passes through, is labeled 0. Then, we draw another line parallel to the 0-element line, the new line passing through another element of the lattice, as close as possible to the 0-element line, and offset from the 0-element line in the direction of the beamspace basis vector $\hat{t}_1$. The elements, through which this new line passes are labeled 1. We continue the process of drawing close parallel lines offset in the direction of beamspace basis vector $\hat{t}_1$, and labeling lattice elements until all elements of the lattice are labeled.

Figure 33C:
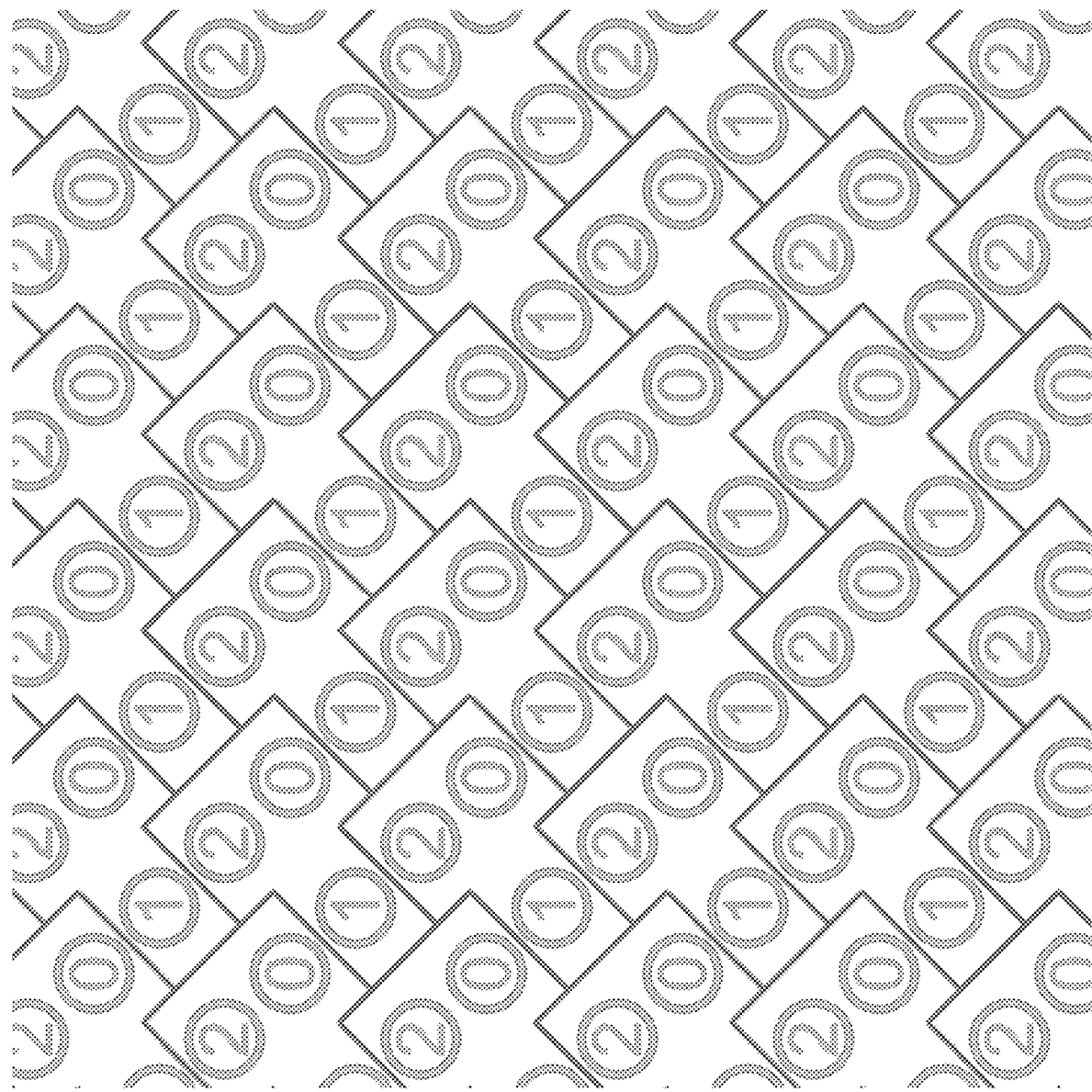
Figure 33D:
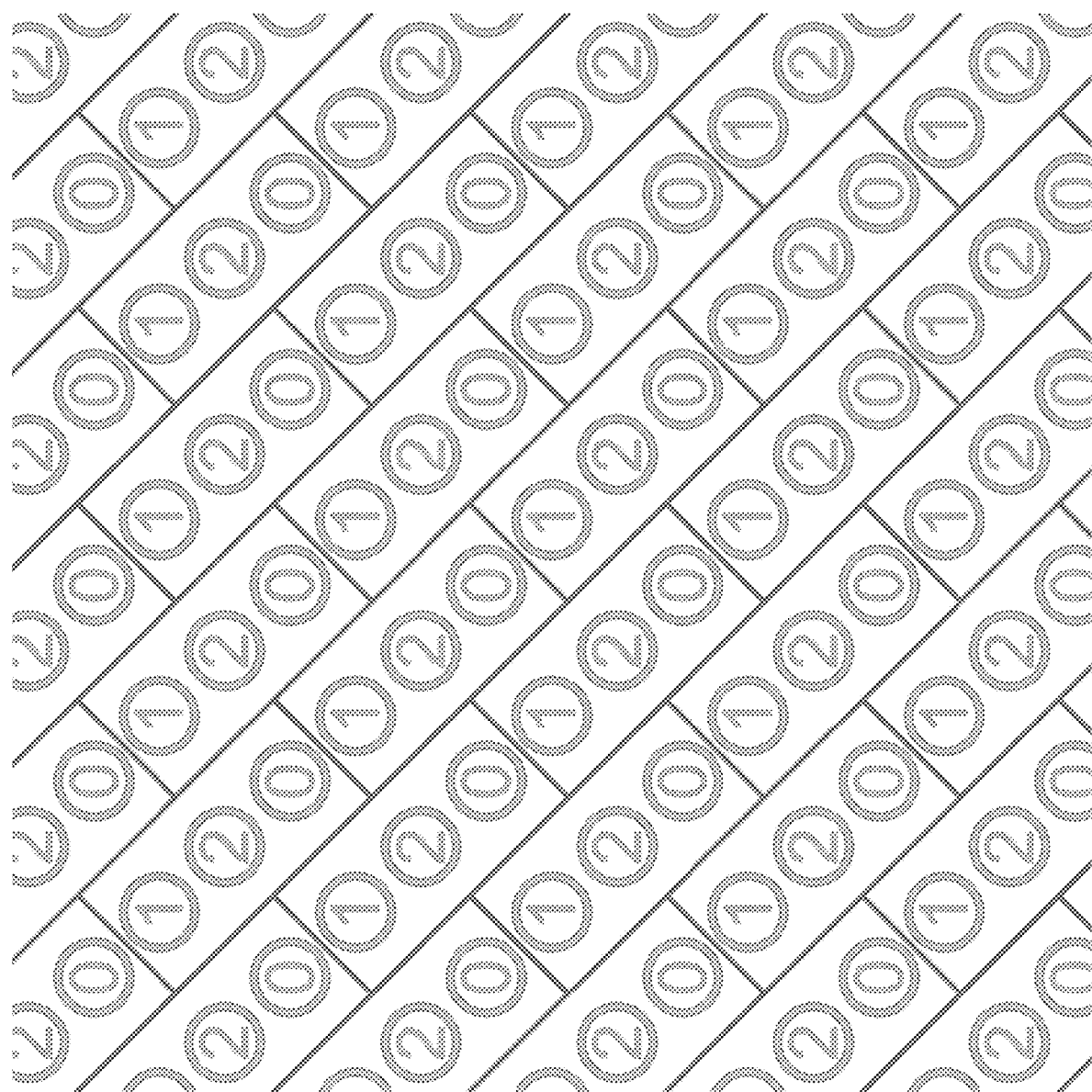

Having constructed the lattice as in FIG. 33A, we may identify possible tessellations by selecting an array from among lattice elements, the array containing each numeral exactly once. FIG. 33C shows a tessellation of the lattice using a three-element array distributed in two dimensions whereas FIG. 33D shows the same lattice tessellated using a linear array.

Accordingly, the construction disclosed above provides for mapping between a linear 3-element (beamspace) array and a two-dimensional 3-element (beamspace) array. As a result, it provides for two-dimensional beam steering (in, e.g., 2D antenna array) using one-dimensional beam forming (in, e.g., PLC).

2-by-2 Array

The construction described above for a 3-element array may be applied to larger arrays. Consider an array comprising four elements. We first arrange these elements in a linear regular array as in FIG. 34A. The array is regular, with a pitch defined by basis vector $a_1$ as shown in FIG. 34B. Such an array supports four orthogonal virtual beams and, accordingly, may resolve, or distinguish, four beams. The k-vectors of the four resolvable beams are collinear since the elements of the array itself are collinear.

Figure 35A:
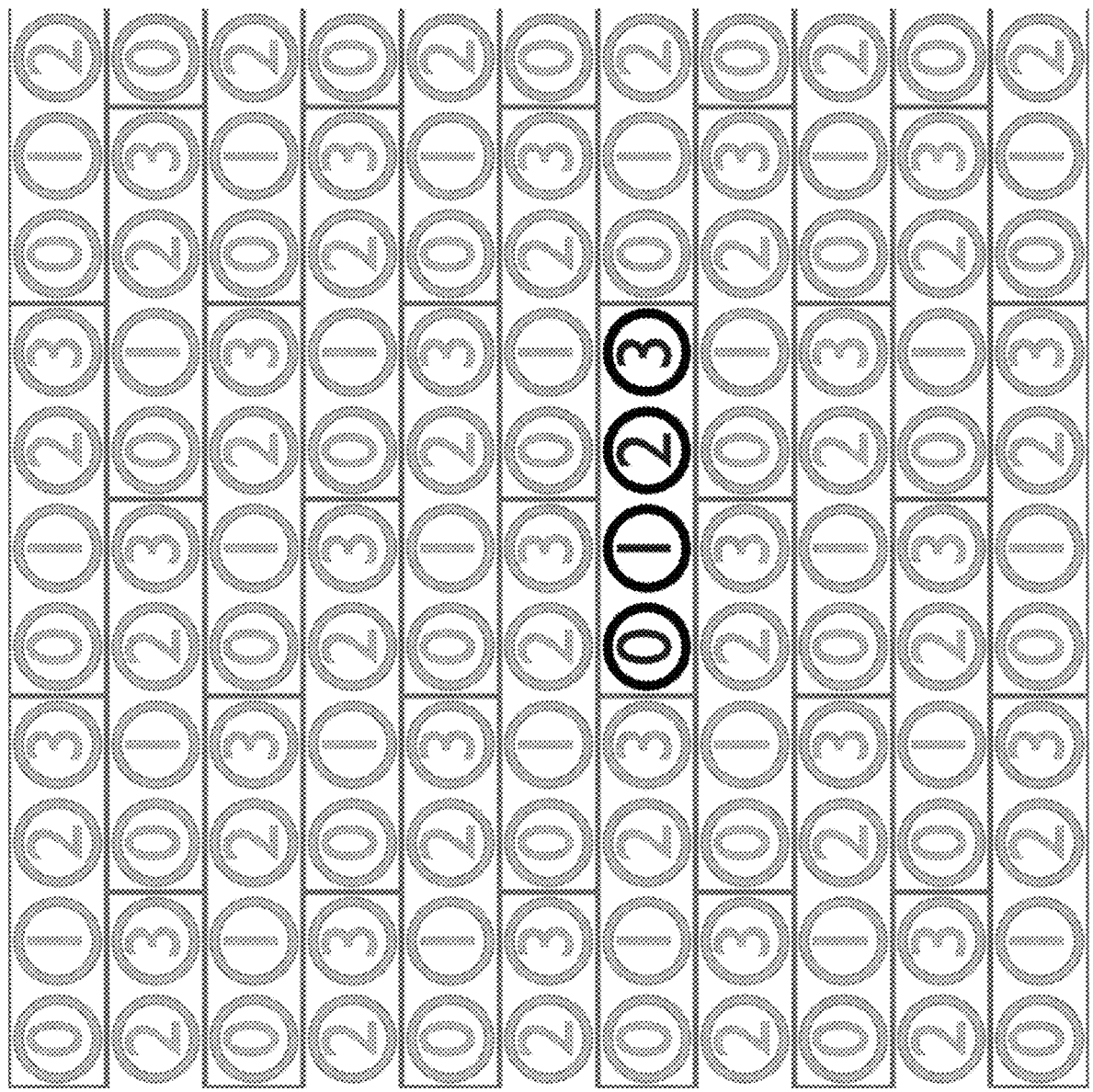
FIGS. 35A-35B illustrate the tessellation of a 2D lattice with a 4-element linear array.
Figure 35B:
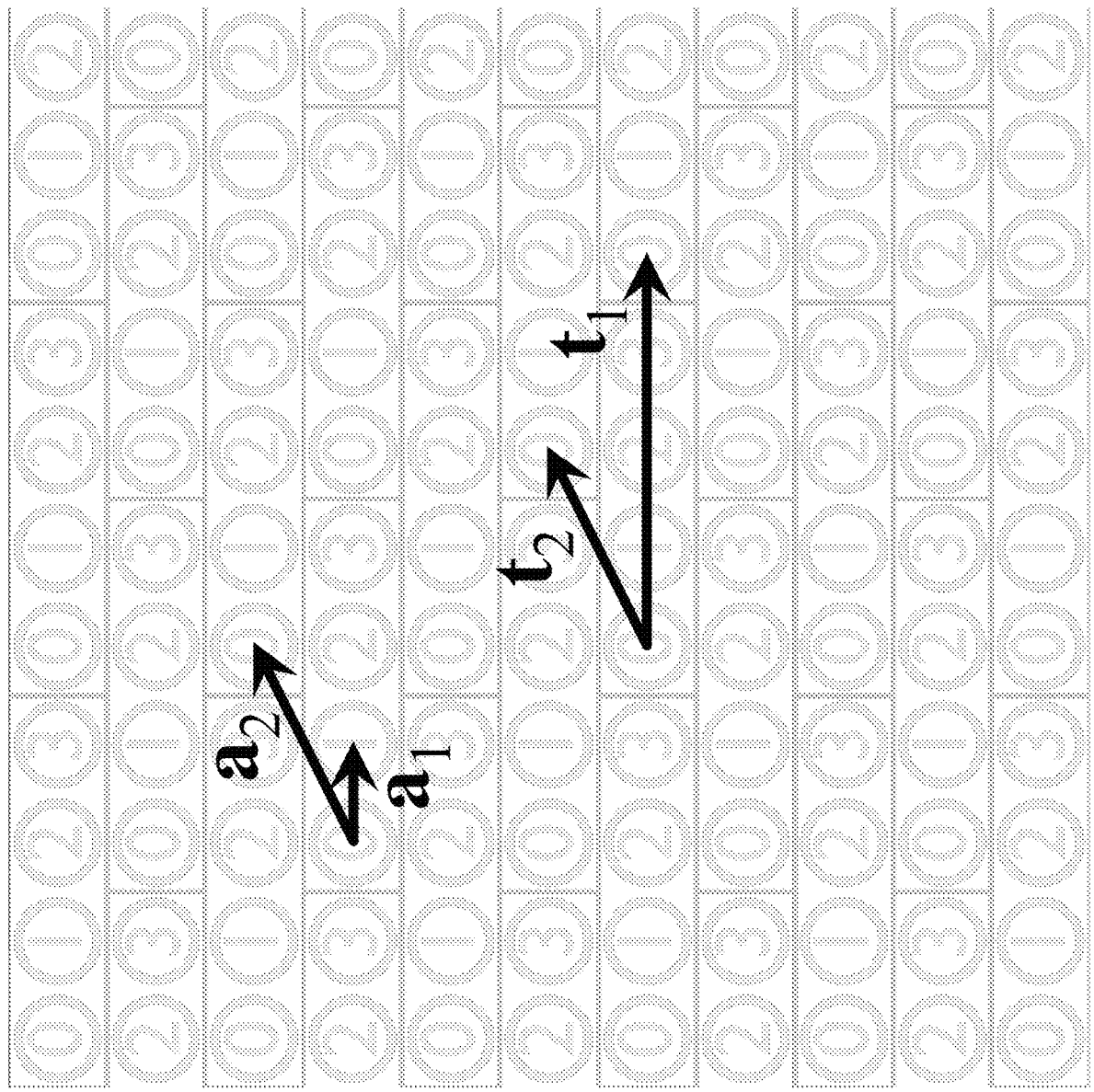

To construct a 4-element 2D array capable of two-dimensional beam steering that shares the virtual orthogonal beams with the linear array, we first periodically extend the linear array using vectors $t_1$, $t_2$ shown in FIG. 34C as a tessellation basis. Vectors $t_1$, $t_2$ are chosen so that the lattice defined by vectors $a_1$, $a_2$ of FIG. 34D may be tessellated (completely covered, with no gaps or overlaps) by copies of the array shown in FIG. 34A. FIG. 34E shows an alternative choice of basis $a_1$, $a_2$ that defines the same lattice while providing for a simplified relation between the lattice basis and the tessellation basis $t_1=4a_1$, $t_2=a_2$. FIG. 35 shows the tessellation of the linear array over a 2D lattice, where FIG. 35A highlights the original 4-element array and FIG. 35B shows explicitly the tessellation basis vectors $t_1$, $t_2$ and the lattice basis vectors $a_1$, $a_2$ of FIGS. 34C and 34E, respectively.

Figure 36A:
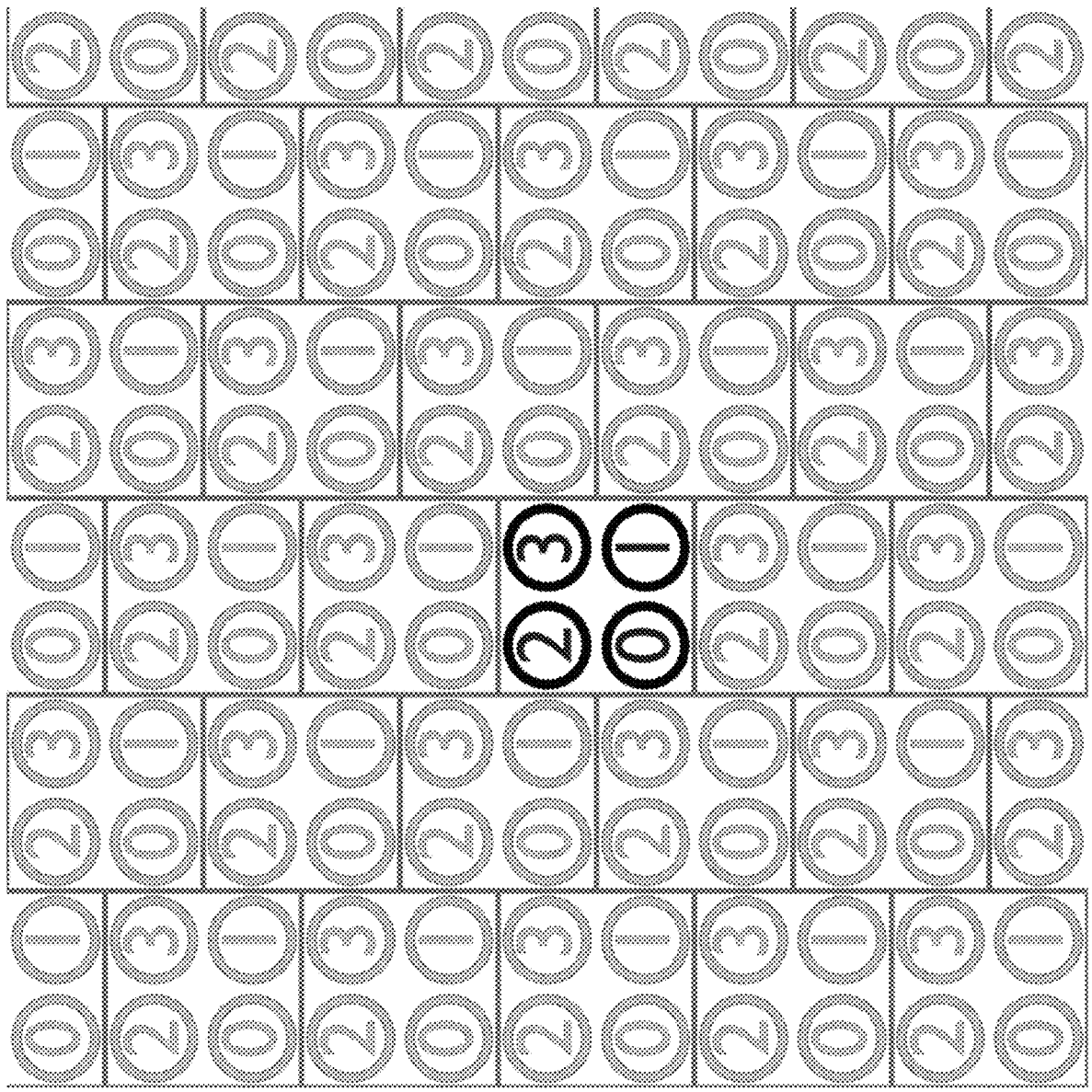
FIGS. 36A-36B show an alternative, two-dimensional, selection of array from the lattice of FIG. 35.
Figure 36B:
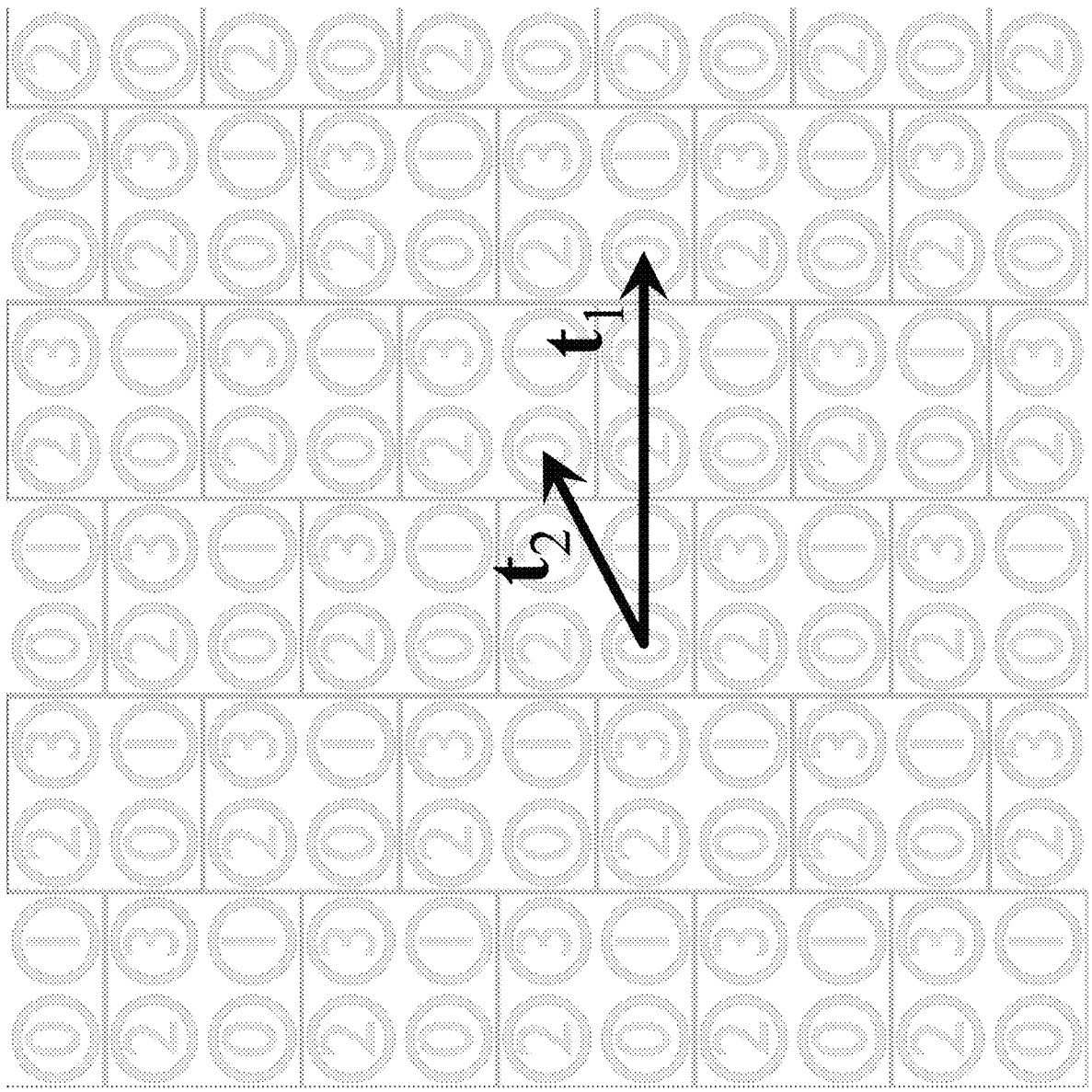

The linear array is not the only possible array that may be tessellated over the 2D lattice. FIG. 36A shows an alternative choice of an array that: (1) uses on the same basis vectors $a_1$, $a_2$ for array-element placement, (2) may be tessellated over the lattice using the same tessellation basis $t_1$, $t_2$, as shown in FIG. 36B, and (3) is two-dimensional (as opposed to linear). Note that in the alternative choice of the array, each element label (0, 1, 2, and 3) appears exactly once. This allows the one-to-one mapping between different arrays, such as an antenna array for capturing or transmitting RF waves, which may be two-dimensional, and a fiber array for beam forming and beamspace processing, which may be one-dimensional.

Figure 37A:
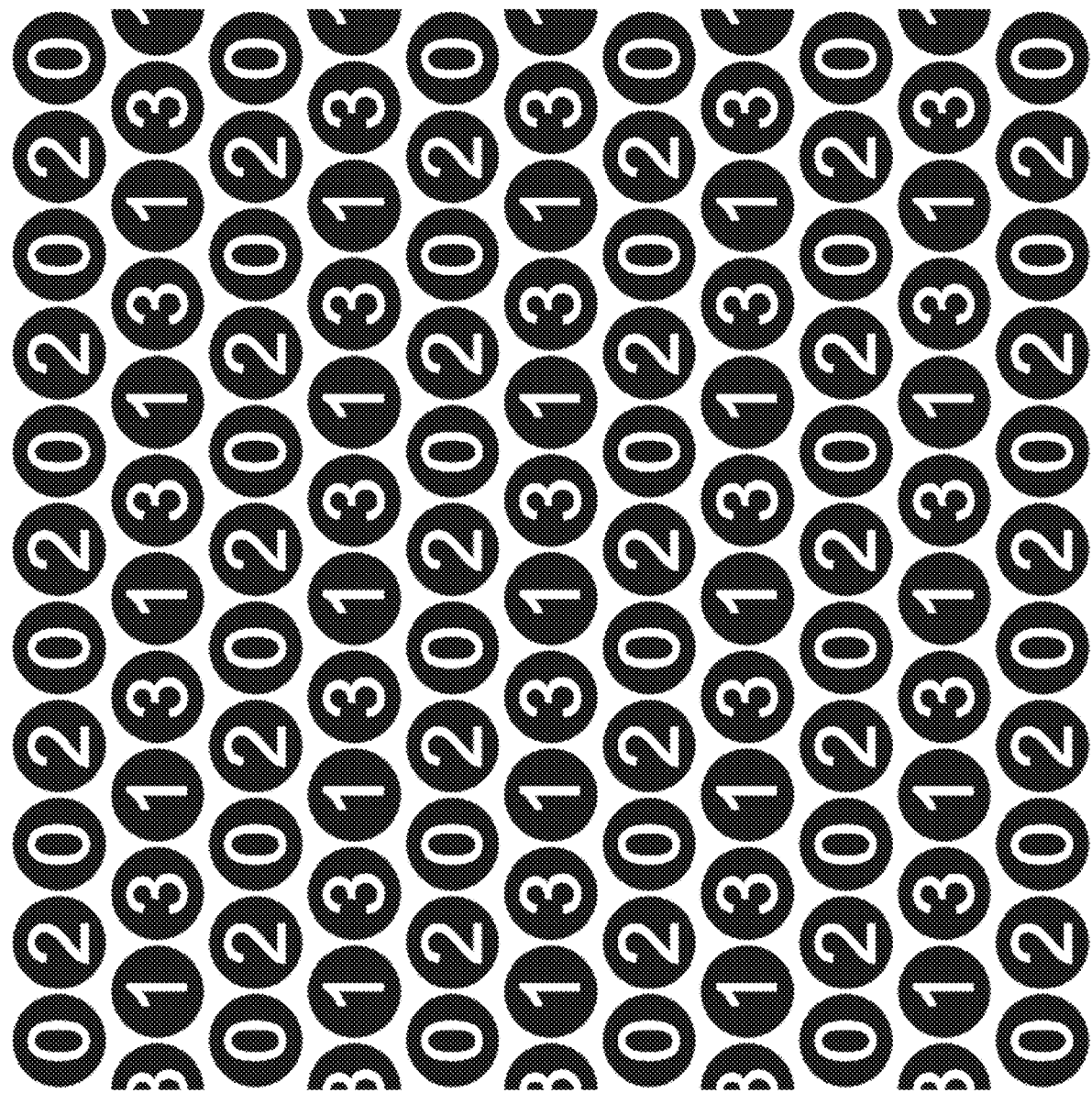
FIGS. 37A through 37D show the beamspace lattice that may correspond to a 4-element phased array of FIG. 34 periodically extended to the lattice of FIGS. 35 and 36.
Figure 37B:
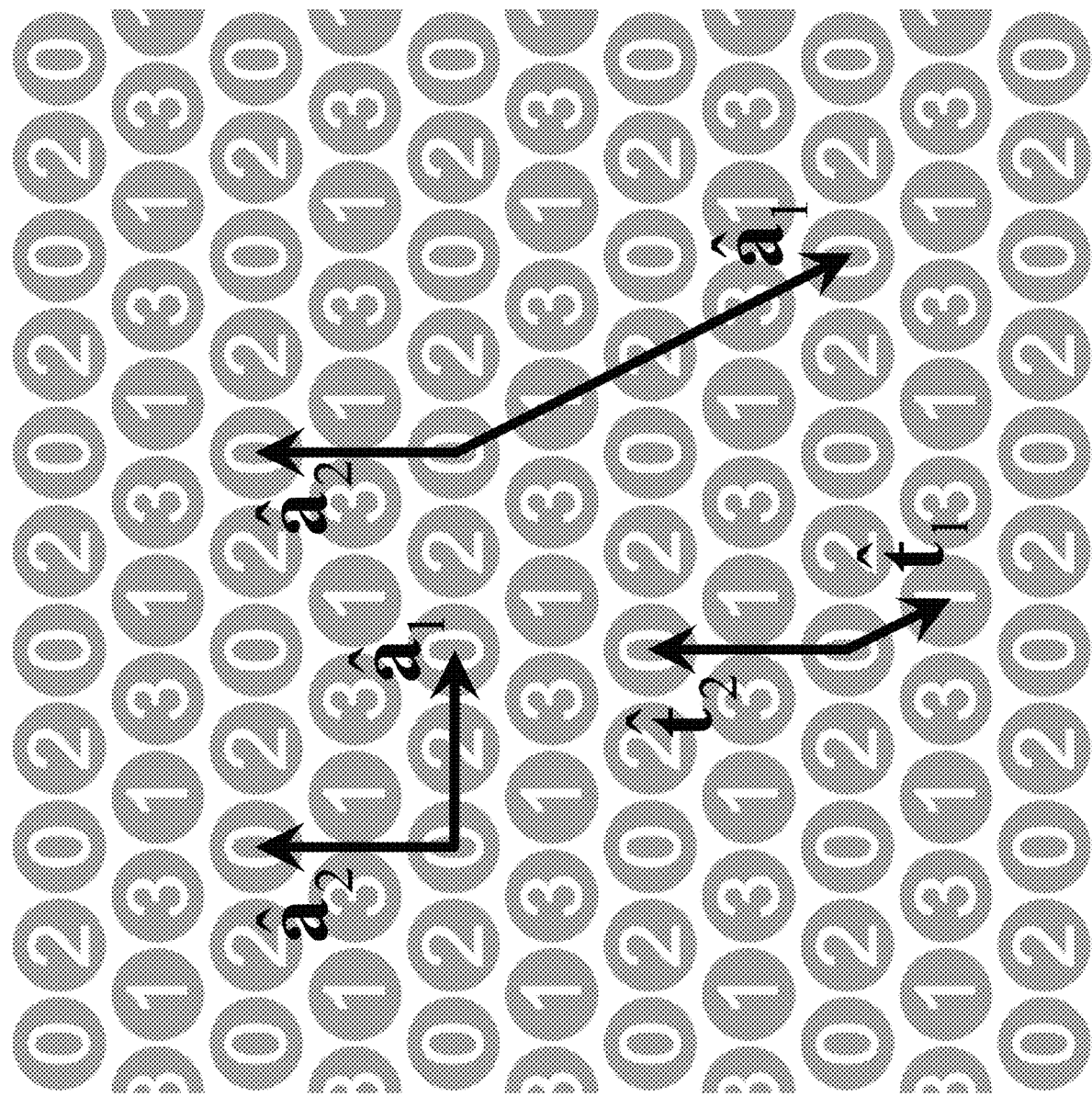

FIG. 37A shows the beamspace lattice that may be generated by the 4-element phased array and its periodic extension to two dimensions outlined above. The beamspace basis $\hat{t}_1$, $\hat{t}_2$ as well as grating-lobe basis $\hat{a}_1$, $\hat{a}_2$ of this reciprocal lattice may be obtained from the tessellation basis $t_1$, $t_2$ and the basis $a_1$, $a_2$ of FIG. 34 using relations (20). FIG. 37B shows these bases including the two choices for $\hat{a}_1$, $\hat{a}_2$ corresponding to the two choices of $a_1$, $a_2$ in FIGS. 34D and 34E. The labeling of the beamspace lattice with numerals 0 through 3 may be obtained using the graphical method described when discussing FIGS. 15 and 33, or, more formally by following the direction of the beamspace basis vector $\hat{t}_1$. To this end, we first assign numeral 0 to one of the elements of the beamspace lattice. Adding vector $\hat{t}_1$ to the position of element 0 yields element 1. Adding $2\hat{t}_1$ to the position of element 0 yields element 2. Etc. Elements that differ from the labeled elements by a linear combination of grating-lobe basis vectors $\hat{a}_1$, $\hat{a}_2$ with integer coefficients are assigned the same label.

Figure 37C:
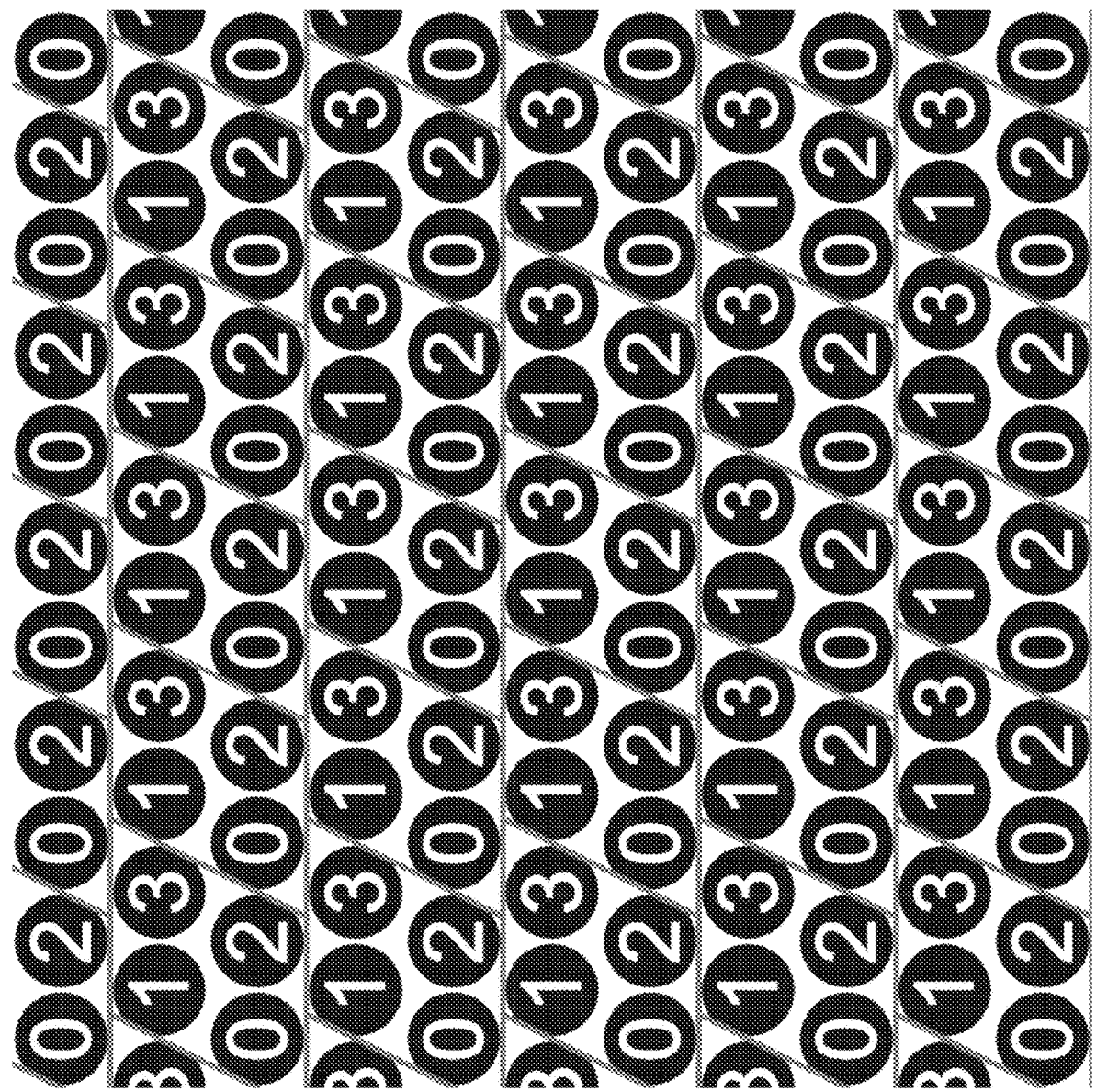
Figure 37D:
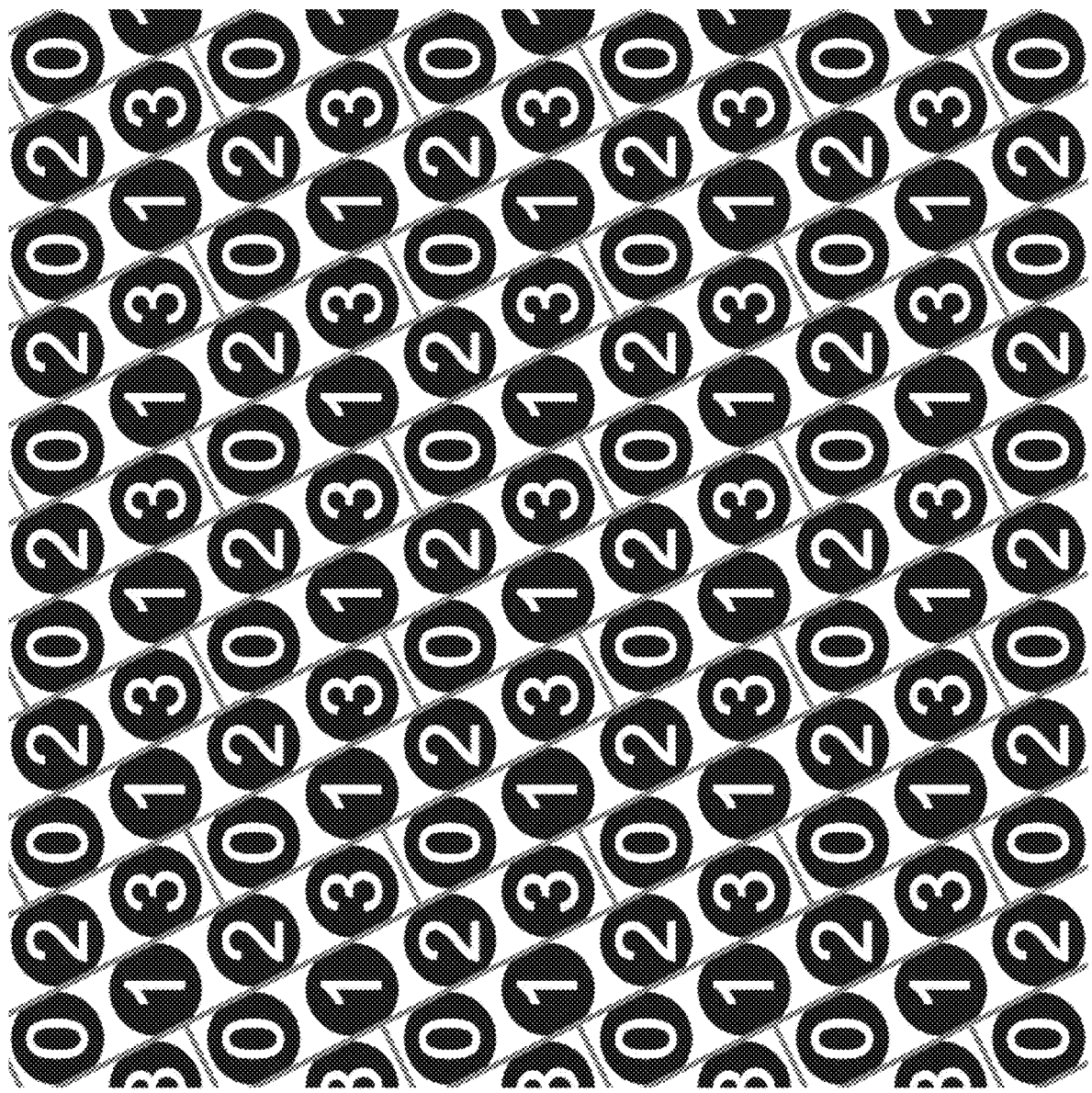

FIGS. 37C and 37D show that the same reciprocal lattice may be tessellated using a 2D beamspace array, as in FIG. 37C, or a linear beamspace array, as in FIG. 37D. This means that a linear array, e.g. the one of FIG. 34A, may be used to form all beams resolvable by a 2D array, e.g., the one highlighted in FIG. 36A.

Figure 39A:
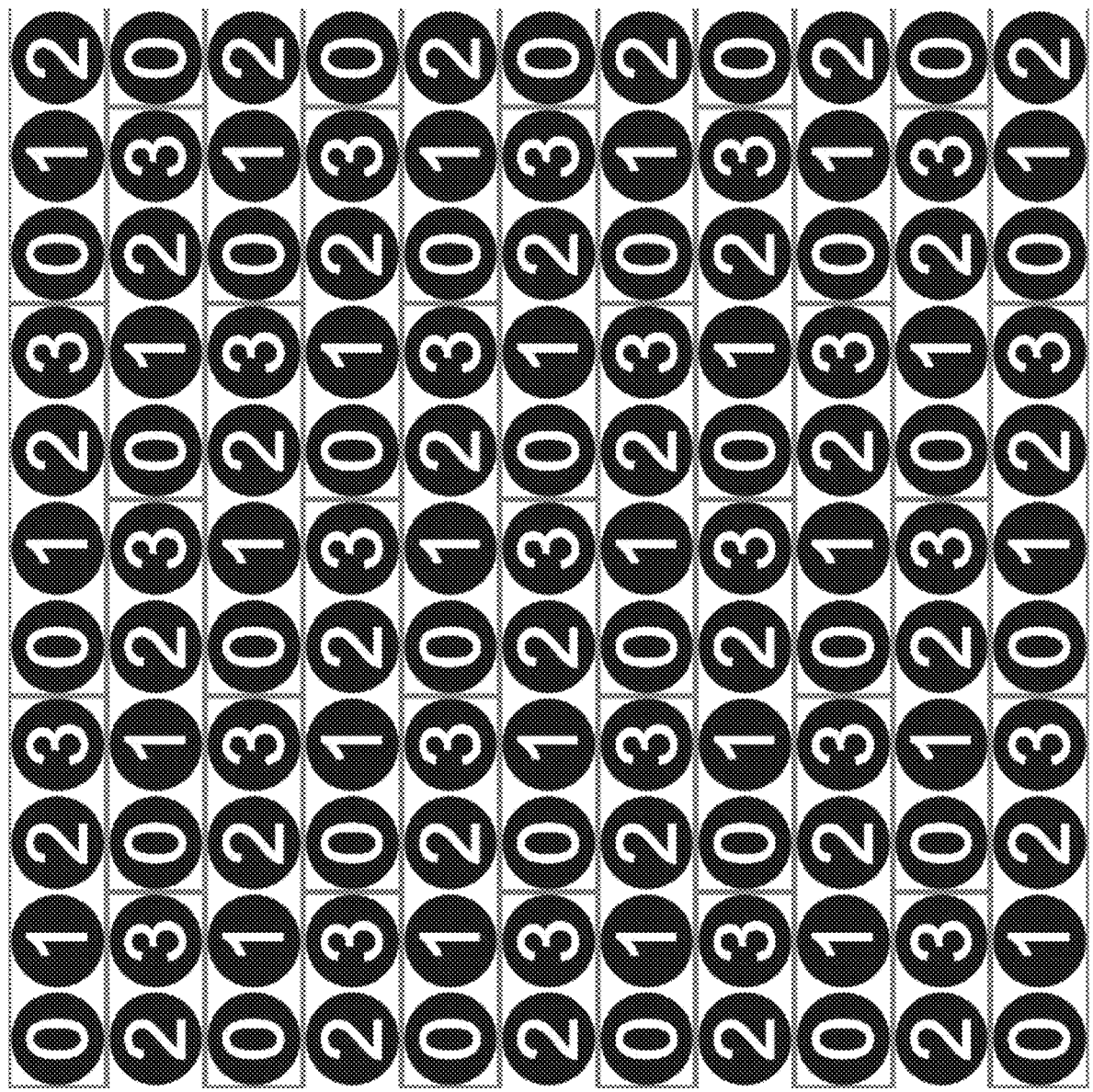
FIGS. 39A-39B show beamspace lattice tessellated with the linear 4-element beamspace array of FIG. 38.

An alternative construction starts with a linear distribution of beams in a beamspace array, and its periodic extension to a 2D reciprocal lattice. To this end, consider a linear array of four distinguishable beams (beamspace array) as shown in FIG. 38A. The beamspace basis vector $\hat{t}_1$ defines the beamspace array pitch as in FIG. 38B. This linear beamspace array may be extended periodically to two dimensions using grating-lobe lattice basis $\hat{a}_1$, $\hat{a}_2$ as in FIG. 38C, and the second beamspace basis vector $\hat{t}_2$ defined in FIG. 38D. Thus defined beamspace basis $\hat{t}_1$, $\hat{t}_2$ and the grating-lobe basis $\hat{a}_1$, $\hat{a}_2$ may periodically extend the 4-element linear beamspace array to 2D and tessellate the 4-element beamspace array over a regular square beamspace lattice. FIG. 39A shows such a tessellation of a regular 2D beamspace lattice with a linear, three-element beamspace array whereas FIG. 39B highlights the beamspace basis $\hat{t}_1$, $\hat{t}_2$ and the grating-lobe basis $\hat{a}_1$, $\hat{a}_2$.

FIG. 38E shows an alternative choice for the beamspace basis $\hat{t}_1$, $\hat{t}_2$, where $4\hat{t}_1=\hat{a}_1$, $\hat{t}_2=\hat{a}_2$, that yields the same beamspace lattice.

Figure 39B:
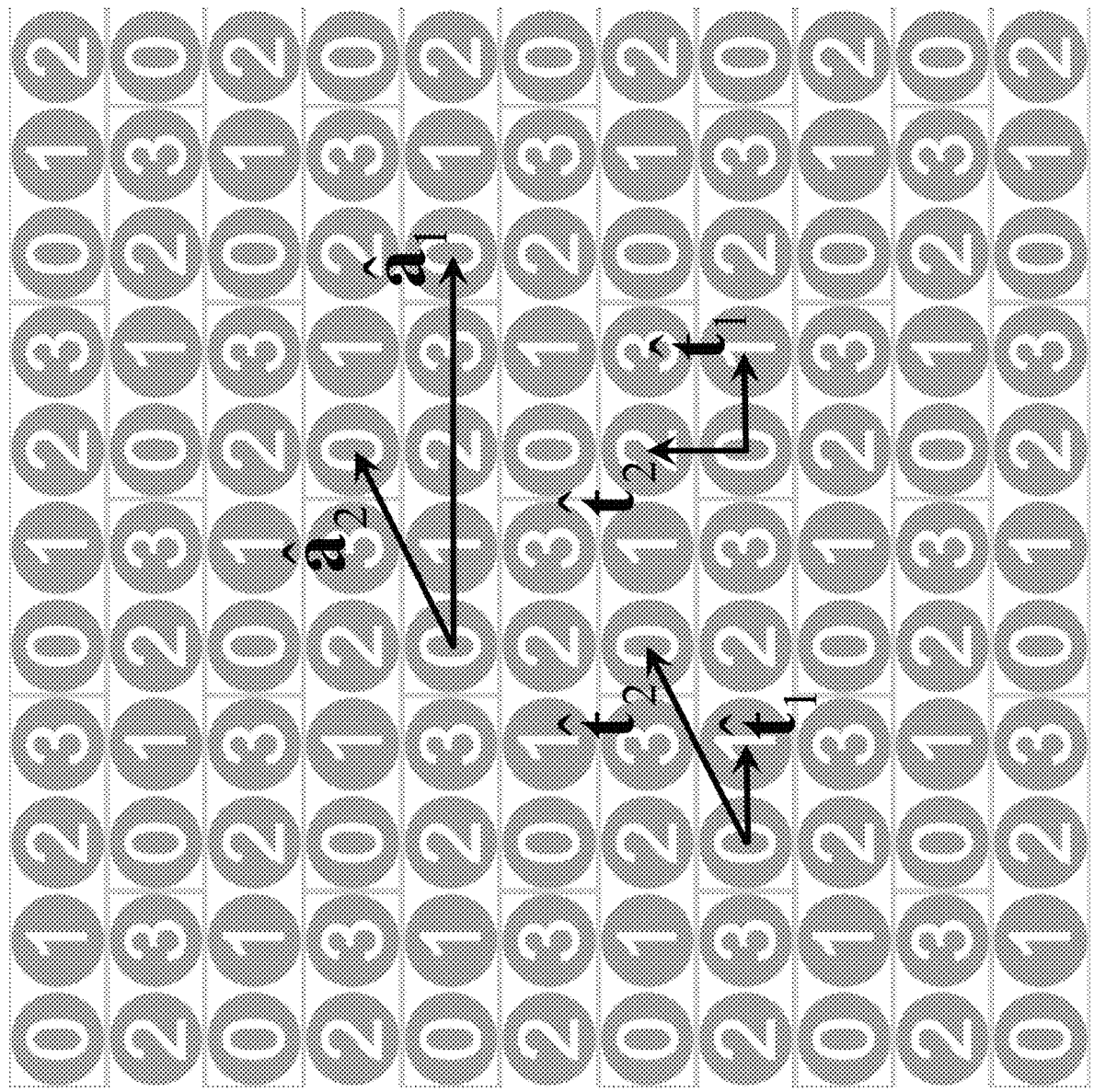
Figure 40:
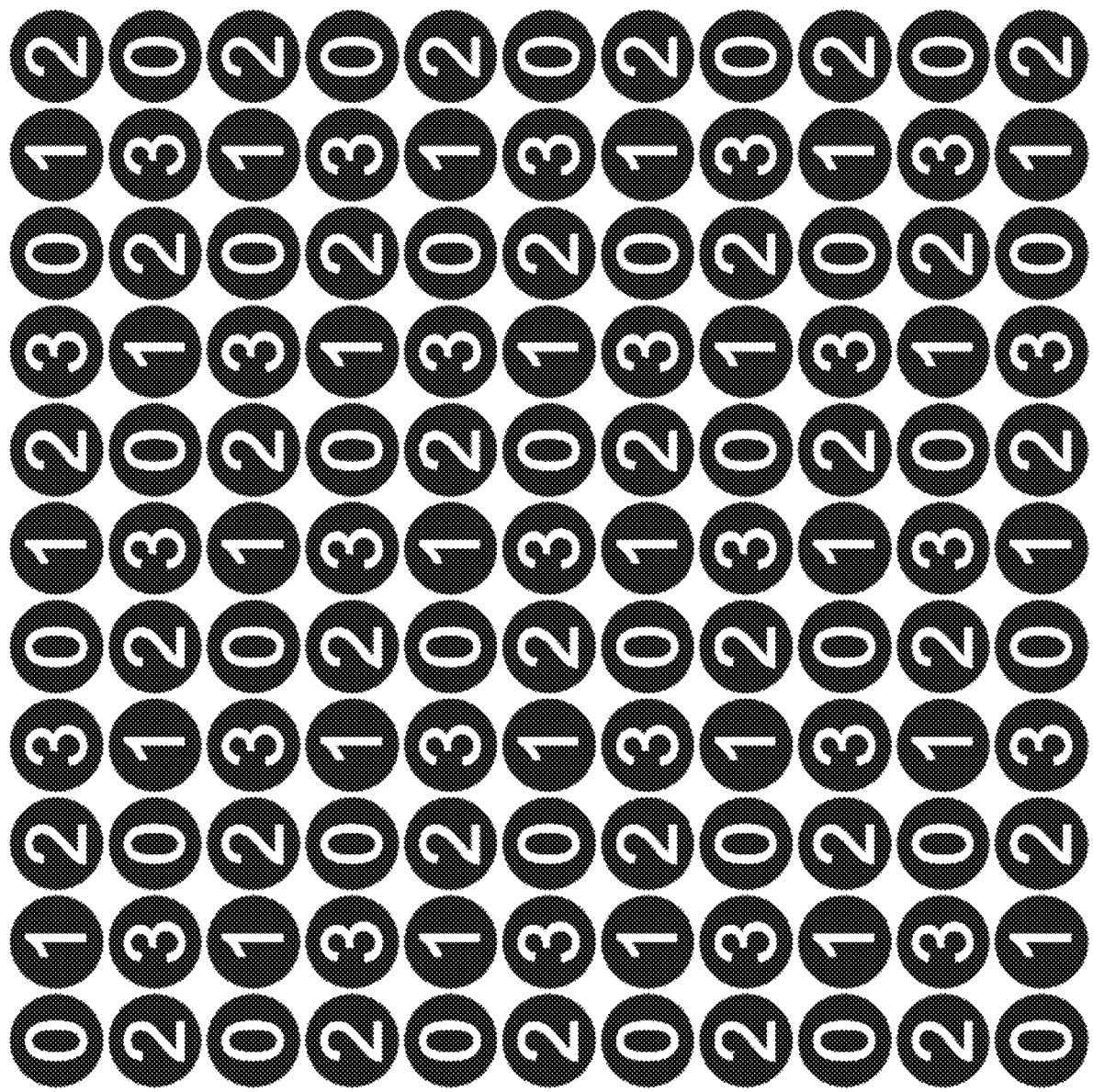
FIG. 40 illustrates the beamspace lattice of FIG. 39 sans the tessellation.
Figure 41:
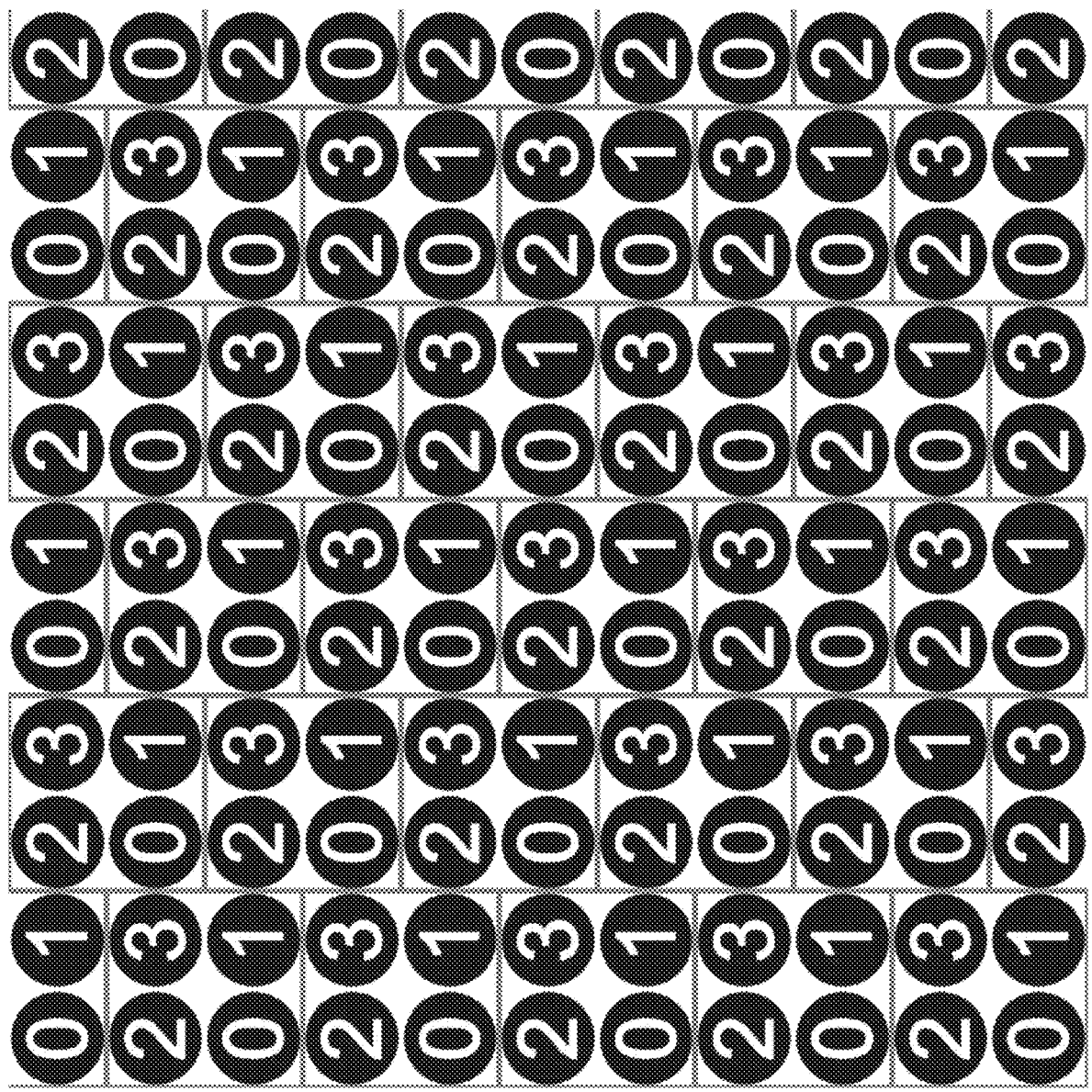
FIG. 41 illustrates an alternative tessellation of beamspace lattice with a two-dimensional 4-element beamspace array.

With the beamspace lattice constructed as in FIG. 39, an alternative 2D beamspace array may be sought. FIG. 40 shows the beamspace lattice sans the tessellation outlines whereas FIG. 41 shows an alternative tessellation using a two-dimensional beamspace array. To find arrays that may be used to produce the linear beamspace array of FIG. 38 or the 2D beamspace array used in tessellation of FIG. 41, we first construct the lattice using a basis reciprocal to the grating-lobe basis $\hat{a}_1$, $\hat{a}_2$ identified in FIG. 38C and FIG. 39B:

$$\left. \begin{array}{l} \hat{a}_1 = 2\pi\begin{pmatrix}4\\0\end{pmatrix},\ \hat{a}_2 = 2\pi\begin{pmatrix}2\\1\end{pmatrix} \\ \hat{a}_m \cdot a_n = 2\pi\delta_{mn} \end{array} \right\} \Rightarrow a_1 = \frac{1}{4}\begin{pmatrix}1\\-2\end{pmatrix},\ a_2 = \begin{pmatrix}0\\1\end{pmatrix}. \quad (23)$$

The tessellation basis $t_1$, $t_2$ is found from the beamspace basis $\hat{t}_1$, $\hat{t}_2$ identified in FIGS. 38E and 39B:

$$\left. \begin{array}{l} \hat{t}_1 = 2\pi\begin{pmatrix}1\\0\end{pmatrix},\ \hat{t}_2 = 2\pi\begin{pmatrix}2\\1\end{pmatrix} \\ \hat{t}_m \cdot t_n = 2\pi\delta_{mn} \end{array} \right\} \Rightarrow t_1 = \begin{pmatrix}1\\-2\end{pmatrix} = 4a_1,\ t_2 = \begin{pmatrix}0\\1\end{pmatrix} = a_2. \quad (24)$$

Note that the choice of $\hat{t}_1$, $\hat{t}_2$ as in FIG. 38E simplifies the relation between basis vectors $a_1$, $a_2$ and the tessellation basis $t_1$, $t_2$, which, in turn, simplifies the linear labeling of the array elements with numerals 0 through 3.

Figure 42A:
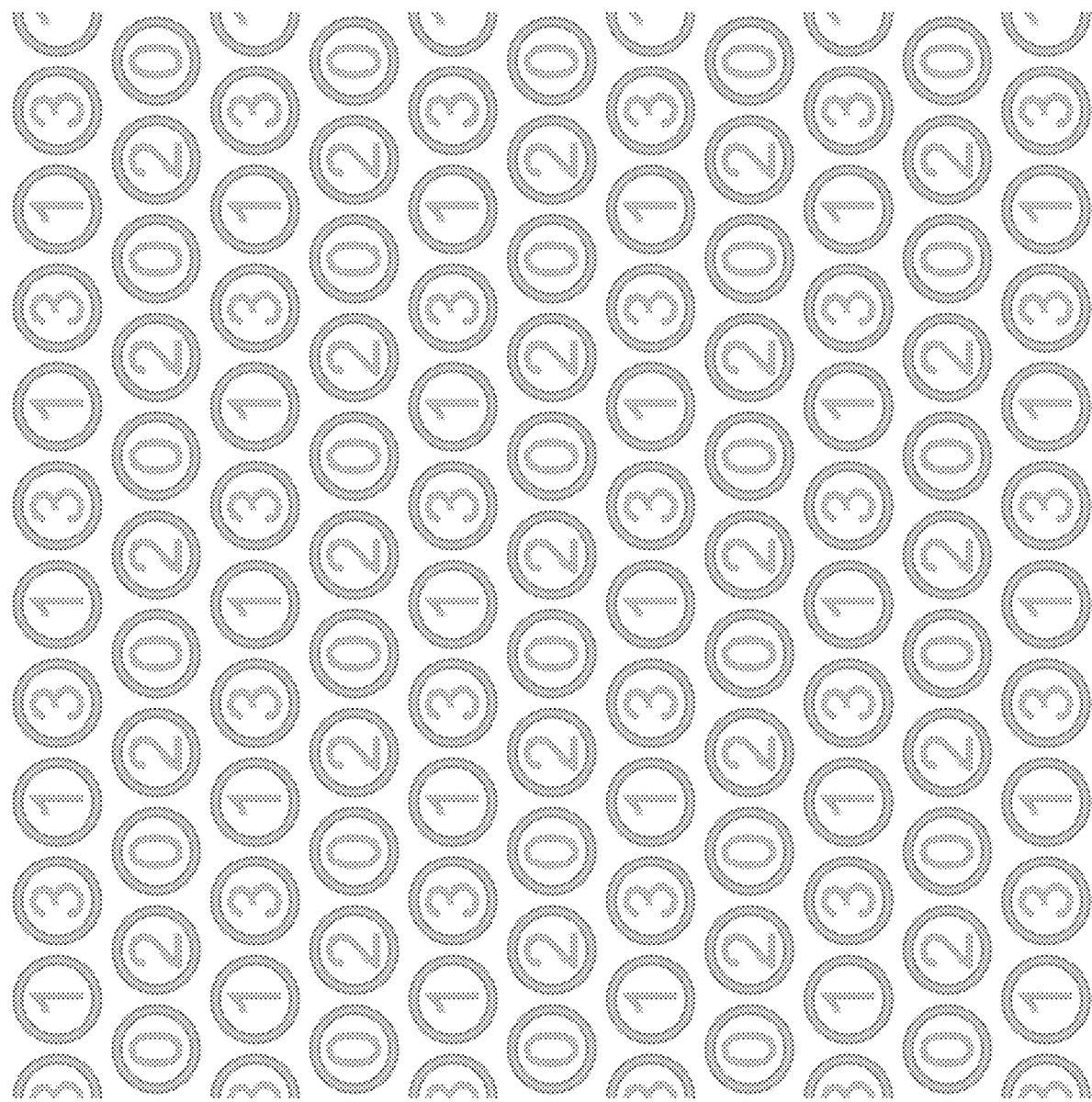
FIGS. 42A through 42D show the lattice corresponding to the beamspace lattice of FIGS. 39 through 41.
Figure 42B:
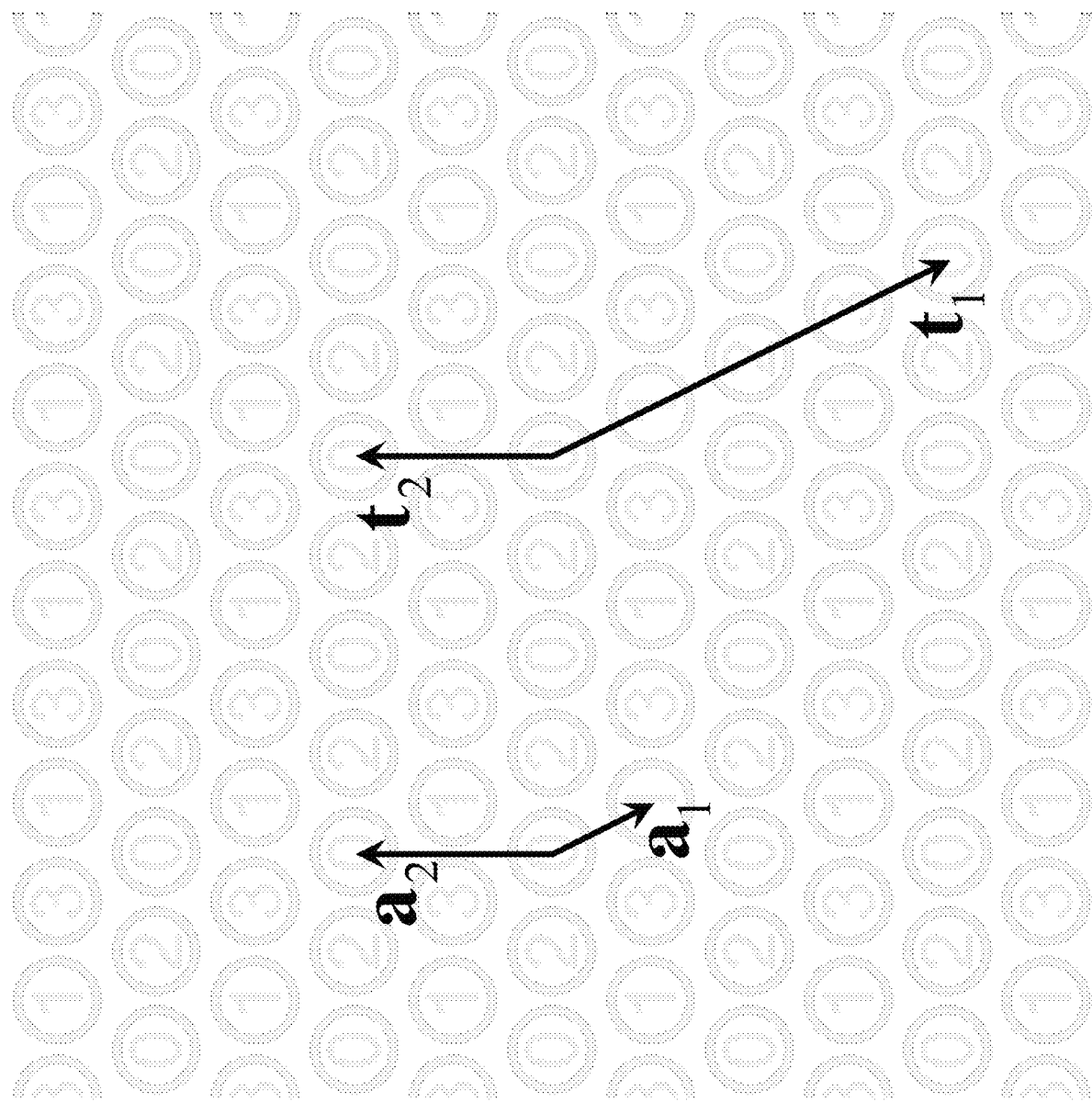

FIG. 42A shows a lattice obtained using basis $a_1$, $a_2$ and tessellation basis $t_1$, $t_2$ of (23) and (24), respectively, whereas FIG. 42B highlights the basis vectors. Numerical labels of the lattice elements are obtained by following the direction of the basis vector $a_1$ and the tessellation basis vector $t_1$, which are collinear according to (24). To this end, we first assign numeral 0 to one of the elements of the lattice. Adding vector $a_1$ to the position of element 0 yields element 1. Adding $2a_1$ to the position of element 0 yields element 2. Etc. Elements that differ from the labeled elements by a linear combination of the tessellation basis vectors $t_1$, $t_2$ of (24) with integer coefficients are assigned the same label.

Figure 42C:
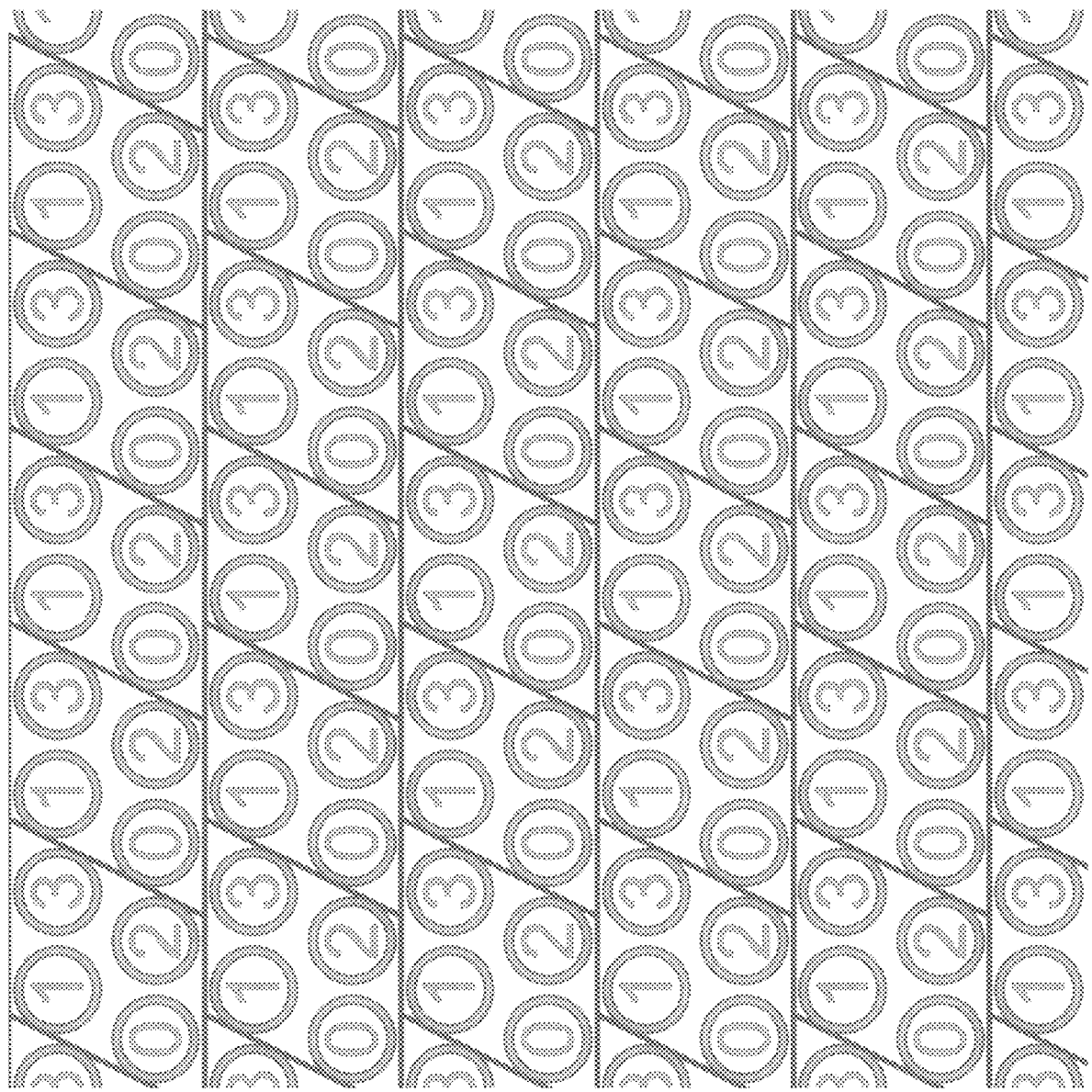
Figure 42D:
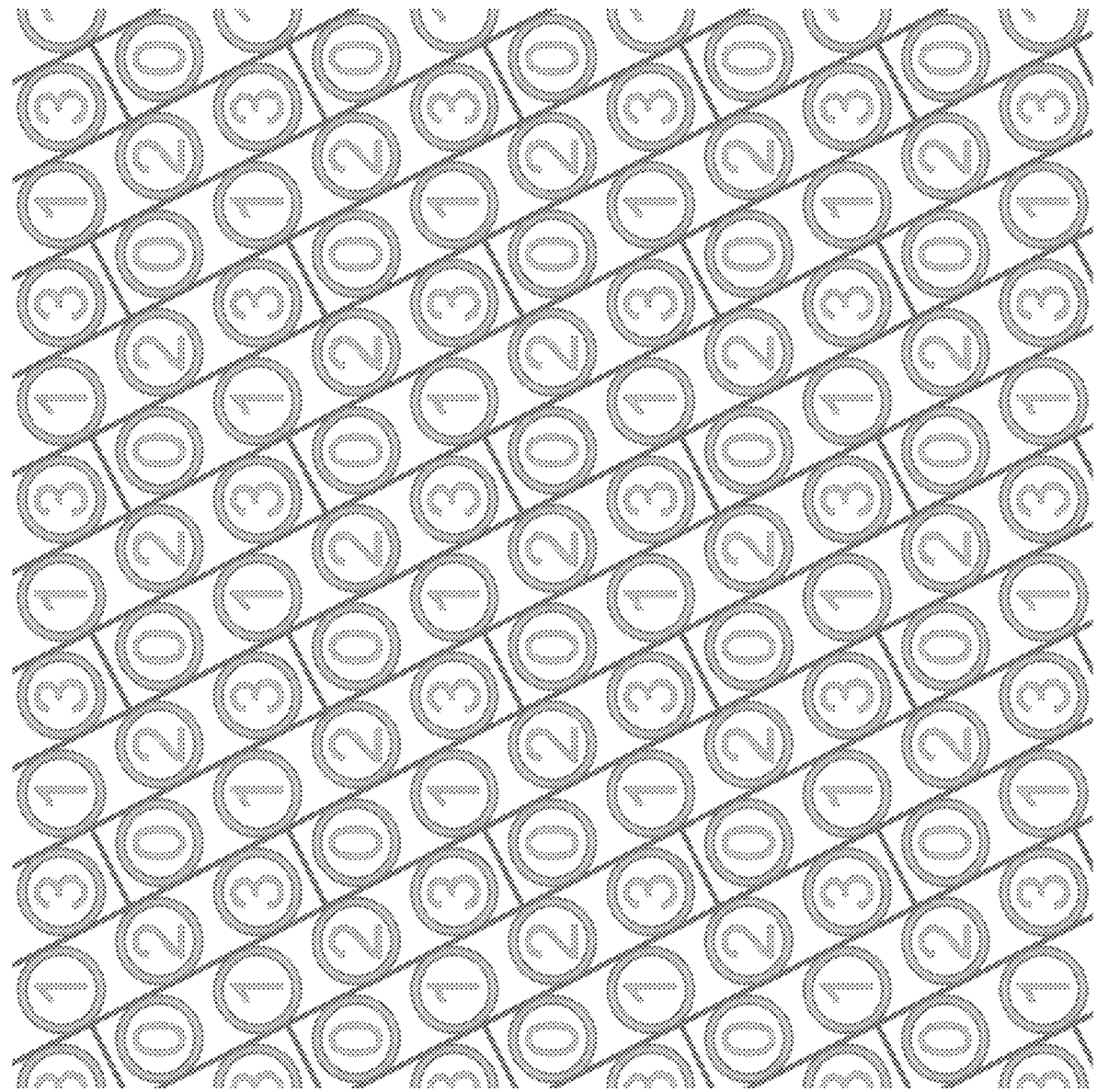

Having constructed the lattice as in FIG. 42A, we may identify possible tessellations by selecting an array from among lattice elements, the array containing each numeral exactly once. FIG. 42C shows a tessellation of the lattice using a four-element array distributed in two dimensions whereas FIG. 42D shows the same lattice tessellated using a linear array.

Accordingly, the construction disclosed above provides for mapping between a linear 4-element (beamspace) array and a two-dimensional 4-element (beamspace) array. As a result, it provides for two-dimensional beam steering (in, e.g., 2D antenna array) using one-dimensional beam forming (in, e.g., PLC).

General Construction

The detailed analysis of example arrays may be generalized to an arbitrary (finite) number of elements in the array or the beamspace array. This general construction of 2D-to-1D mapping may also encompass the cases of rectangular co-prime arrays and hexagonal arrays described separately above. The starting point for the construction may be a linear array or a linear beamspace array. The choice may depend on considerations that may include: the preference for array geometry versus the beamspace array geometry, the preference in terms of physical realization of the phased array, the construction cost, and/or other considerations. In some cases, it may be preferable to start with the beamspace array as such a procedure may yield beamspace mapping where adjacent resolvable elements of a linear beamspace array map to adjacent resolvable elements in the corresponding 2D beamspace array for more pairs of beamspace-array elements than when starting with an array instead.

For N elements in the phased array, the construction may proceed according to the following steps when the starting point is the array:

1. Arrange the N elements into a regular linear array, labeled sequentially from 0 to N−1; extract basis vector $a_1$ as a vector between element 0 and 1. (Compare FIGS. 25B and 34B.) The tessellation basis vector $t_1$ is $t_1=Na_1$. Formally, the array is a set $X=\{x_0, x_1, \ldots, x_{N-1}\}=\{x_0, x_0+a_1, x_0+2a_1, \ldots, x_0+(N-1)a_1\}$.

2. Choose a tessellation basis vector $t_2$, which is not collinear with $t_1$. Note: There is substantial flexibility in the choice of basis vector $t_2$. However, some choices may lead to more symmetric arrays than others. For example, if the length of the orthogonal projection of $t_2$ onto the direction of $t_1$ is an integer multiple of $|a_1|/2$, and the projection of $t_2$ on the direction orthogonal to $t_1$ has one of the lengths $|a_1|$, $|a_1|/2$, $|a_1|/\sqrt{2}$, $\sqrt{2}|a_1|$, or $\sqrt{3}|a_1|/2$, the resulting lattice may have a symmetry of a square lattice or a triangular lattice.

3. Using tessellation basis $t_1$, $t_2$ and array X, generate a (regular) lattice by adding all linear combinations of $t_1$, $t_2$ with integer coefficients to each element $x_n$ of X; label each element of the lattice with numeral 0 through N−1 so that element $x_n+n_1t_1+n_2t_2$ has a label n, the same as $x_n \in X$, for all integer values $n_1$, $n_2$. Formally, the lattice is the following set $X+\{n_1t_1+n_2t_2|n_1, n_2 \in \}$.

4. From the lattice generated in step 3 above, select an array X' having N elements and such that each label 0 through N−1 occurs in X' exactly once. Note that X and X' may share the same virtual beams. Therefore, orthogonal virtual beams associated with array X are in one-to-one correspondence with the orthogonal virtual beams associated with array X'. Note that if the distribution of the elements of array X' does not follow a straight line, then the array may be capable of forming beams in two dimensions.

5. Choose basis vector $a_2$ that in combination with $a_1$ and one of the elements of the array X generates the lattice of step 3 above; for example, $a_2=t_2$ is a valid choice. Formally, the lattice generated by $a_1$, $a_2$ and $x_0$ is the following set $x_0+^{\{a_1,a_2\}}=\{x_0+n_1a_1+n_2a_2|n_1,n_2 \in \}$; note that $x_n=x_0+na_1$, so $x_0+^{\{a_1,a_2\}}=x_n+^{\{a_1,a_2\}}$ for any $n \in \{0, 1, \ldots, N−1\}$.

6. Construct $\hat{a}_1$, $\hat{a}_2$ and $\hat{t}_1$, $\hat{t}_2$ using relations (20).

7. Linear combinations of $\hat{a}_1$, $\hat{a}_2$ with integer coefficients form a grating-lobe lattice in k-space; linear combinations of $\hat{t}_1$, $\hat{t}_2$ with integer coefficients form a beamspace lattice.

The linear array arranged in step 1 has a corresponding planar array selected in step 4, and the two arrays share the same orthogonal virtual beams. The virtual beams have corresponding k-vectors obtained in step 7, which may be arranged in line, following $\hat{t}_1$, constructed in step 6, for the linear array, or may be distributed in plane by using both $\hat{t}_1$ and $\hat{t}_2$.

The construction of the correspondence between linear and planar array that uses beamspace array as a starting point proceeds along analogous steps 1 through 7 with the roles of a/t and $\hat{t}/\hat{a}$ interchanged in the description above.

Additional Improvements

The method described above provides for additional improvements that may be desirable in certain embodiments. These improvements are described below.

Different Array Geometries

Figure 43:
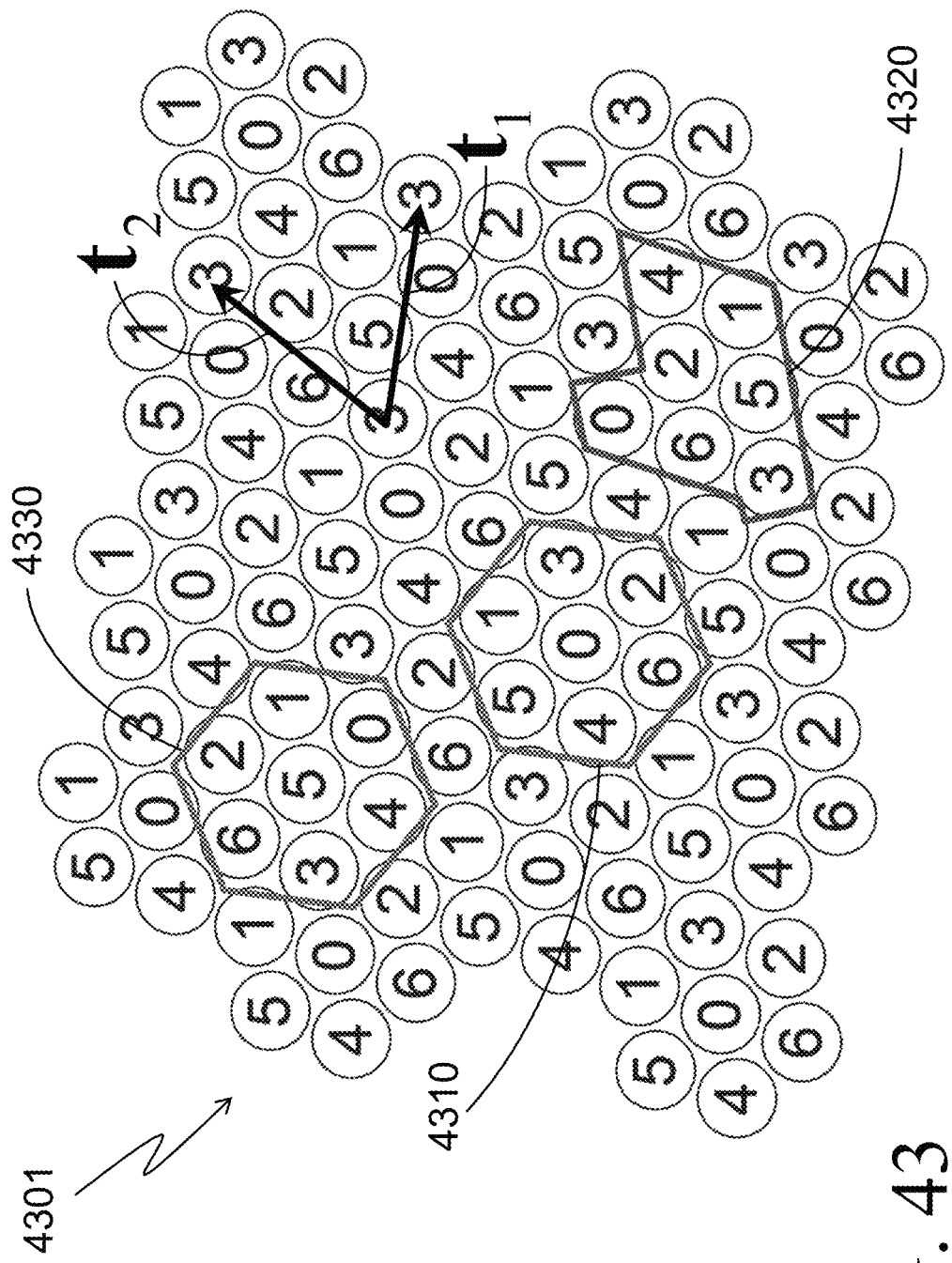
FIG. 43 shows alternative choices of a two-dimensional array from the same lattice.

In the descriptions above, mapping between linear arrays and two-dimensional arrays that preserved the orthogonal virtual beams was obtained. The mapping relies on the different choice of the arrays from the lattice. Note, however, that in such mapping both arrays selected from the lattice may be two-dimensional and have different geometries, or have the same geometry but different arrangement of elements within the array. FIG. 43 shows several possible alternatives for a seven-element array selected from a regular lattice 4301. Array 4310 is a regular hexagon similar to the one considered when discussing FIG. 18, whereas array 4320 has an irregular shape. Array 4330 has the same regular shape as array 4310, but the elements within the array are arranged differently: For example the central element in array 4310 is labeled "0" whereas the central element in array 4330 is "5". Note that each of the selection contains all seven numerals 0 through 6 exactly once, and that each selection may be tessellated over the entire lattice 4301 without gaps or overlaps using tessellation vectors $t_1$ and $t_1$ shown in FIG. 43. As such, each of these arrays may support the same seven orthogonal virtual beams and the arrays may be mapped one-to-one for beam forming. However, given the different shapes or element arrangement of these arrays, the point-spread function may differ between them.

Note that in the case of mapping between linear arrays, the 'geometry change' may correspond to cyclic permutation of the array elements.

Also, the array need not be contiguous: As long as it contains all numerals exactly once, it may be tessellated over the entire lattice and, therefore, the array may support the same seven orthogonal virtual beam and may be mapped one-to-one for beam forming.

Doubling Array Size for Better Coupling Efficiency and Channel Isolation.

Figure 44:
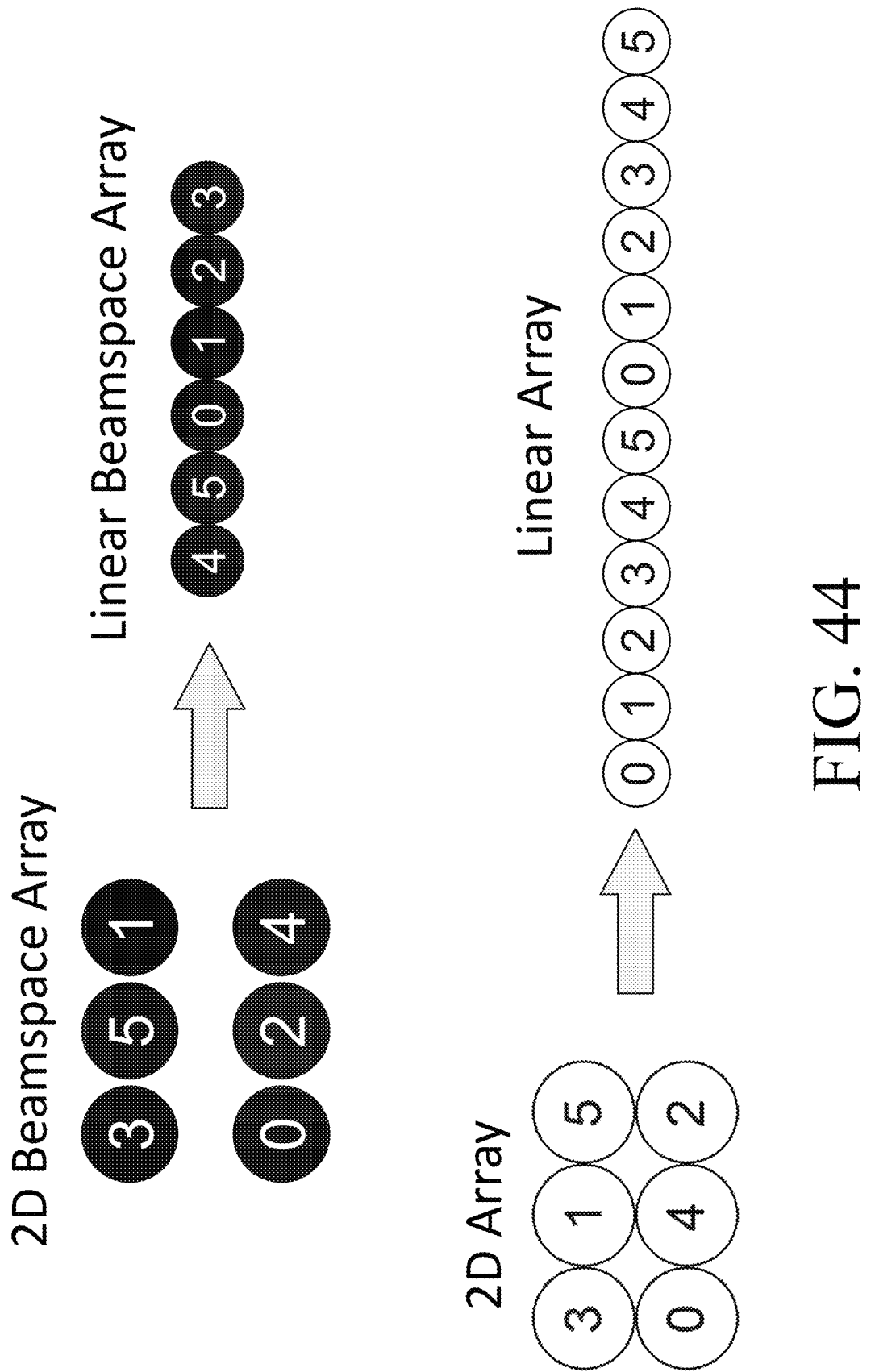
FIG. 44 shows an example of mapping where one element of a 2D array maps to two equivalent elements of a linear array.

In the cases considered above, mapping between array geometries, including between arrays having different dimensions, was one-to-one, that is: every element of one array was mapped to exactly one element of the other array. For example, in the mapping of FIG. 17, the element labeled "0" in the 2-by-3 2D array is mapped to element "0" of the linear array, element "1" of the 2D array is mapped to element "1" of the linear array, etc. However, in some applications it may be advantageous to map some elements, or each element, of one array to two, three, or more elements of the other array. FIG. 44 shows an example of such mapping where each element of the 2D array maps to two elements of the linear array. Notably, each pair of elements of the linear array, to which a single element of the 2D array is mapped, is separated by a (integer multiple of) the tessellation-basis vector, and as such each element of the pair is labeled by the same numeral. Similar assertion may hold for mapping between two 2D arrays where one-to-multiple elements mapping preserves the labeling of the elements in the respective array. In addition, for array mapping exemplified by that of FIG. 44, the respective mapping between beamspace arrays may be preserved, i.e., it may be identical to that of the one-to-one mapping depicted in FIG. 17 since the underlying lattice and beamspace lattice are the same as before.

The benefits of such one-to-multiple element mapping may include the change of the point-spread function. For example, the linear array of FIG. 44 is twice as wide as the linear array of FIG. 17. As a result, if such an array were to be used in an optical processor similar to that of FIGS. 3A to 3E then, all else being equivalent, the lateral extent of a focused spot formed by an array twice as wide may have half the lateral extent. The tighter focused spot may be coupled more efficiently to output fibers with less light leaking outside of the lenslet array. In addition, since less light may be leaking to adjacent lenslet of the output array, improved isolation between channels may result.

Using Multiple Processors with Different Mapping for Improved Interstitial-Beam Recovery Orthogonal virtual beams map faithfully between different arrays constructed according to the procedures described above. However, a plane wave captured by a phased array of antennas need not necessarily correspond exactly to one of the selected orthogonal virtual beams since the k-vector of an incoming plane wave need not correspond to one of the points on the beamspace lattice. Beams with k-vectors falling between the points of the beamspace lattice are called interstitial beams A virtual beam corresponding to an interstitial beam may be expressed as a linear combination of the set of orthogonal beams selected for the particular array. Examples of interstitial beams have been provided when discussing FIG. 9 where 901$b'$ and 901$c'$ illustrate such interstitial beams that don't fall exactly on the beamspace lattice. Since interstitial beams may excite several of the orthogonal virtual beams, finding the exact position of the beam in beamspace may be improved by having several different array mappings.

To see how such improvement may be realized, consider the following example of a three-element array. The three orthogonal virtual beams for one mapping may be chosen as $$B^0 = \frac{1}{\sqrt{3}}\begin{pmatrix} 1 \\ 1 \\ 1 \end{pmatrix}, B^1 = \frac{1}{\sqrt{3}}\begin{pmatrix} 1 \\ e^{2\pi i/3} \\ e^{-2\pi i/3} \end{pmatrix}, B^2 = \frac{1}{\sqrt{3}}\begin{pmatrix} 1 \\ e^{-2\pi i/3} \\ e^{2\pi i/3} \end{pmatrix}. \tag{25}$$

Consider now a plane wave intercepted by the 3-element phased array that induces the following virtual beam in the array $$B = \begin{pmatrix} 1 \\ e^{\pi i/3} \\ e^{2\pi i/3} \end{pmatrix}. \tag{26}$$

Then beam B may be expressed as the following linear combination of the orthogonal virtual beams $B^0$, $B^1$, $B^2$:

$$B = (i + 3^{-1/2})B^0 + (-i + 3^{-1/2})B^1 + 3^{-1/2}B^2, \tag{27}$$

which may require additional processing for beam's localization in the beamspace. However, for the purpose of aperture mapping, the three orthogonal beams may be alternatively chosen as $$B^0 = \frac{1}{\sqrt{3}}\begin{pmatrix} 1 \\ e^{\pi i/3} \\ e^{2\pi i/3} \end{pmatrix}, B^1 = \frac{1}{\sqrt{3}}\begin{pmatrix} 1 \\ -1 \\ 1 \end{pmatrix}, B^2 = \frac{1}{\sqrt{3}}\begin{pmatrix} 1 \\ e^{-\pi i/3} \\ e^{-2\pi i/3} \end{pmatrix}. \tag{28}$$

in which case beam B may be expressed as $$B=\sqrt{3}B^0, \quad (29)$$

and has a particularly simple form in terms of its localization in beamspace since it corresponds exactly to a point of the beamspace lattice. Having two array maps, one corresponding to virtual beams in (25) and the other corresponding to virtual beams in (28) operating in parallel would allow more convenient, and potentially more accurate, localization of incoming waves in beamspace. Note that the beams of (28) are obtained from the beams of (25) by applying additional phase shifts $\exp(\pi i/3)$ and $\exp(2\pi i/3)$ to the middle and last components. Such a phase adjustment may be implemented in optical processors of FIGS. 3A-3E by using optical phase shifters in the respective optical fibers.

Figure 45:
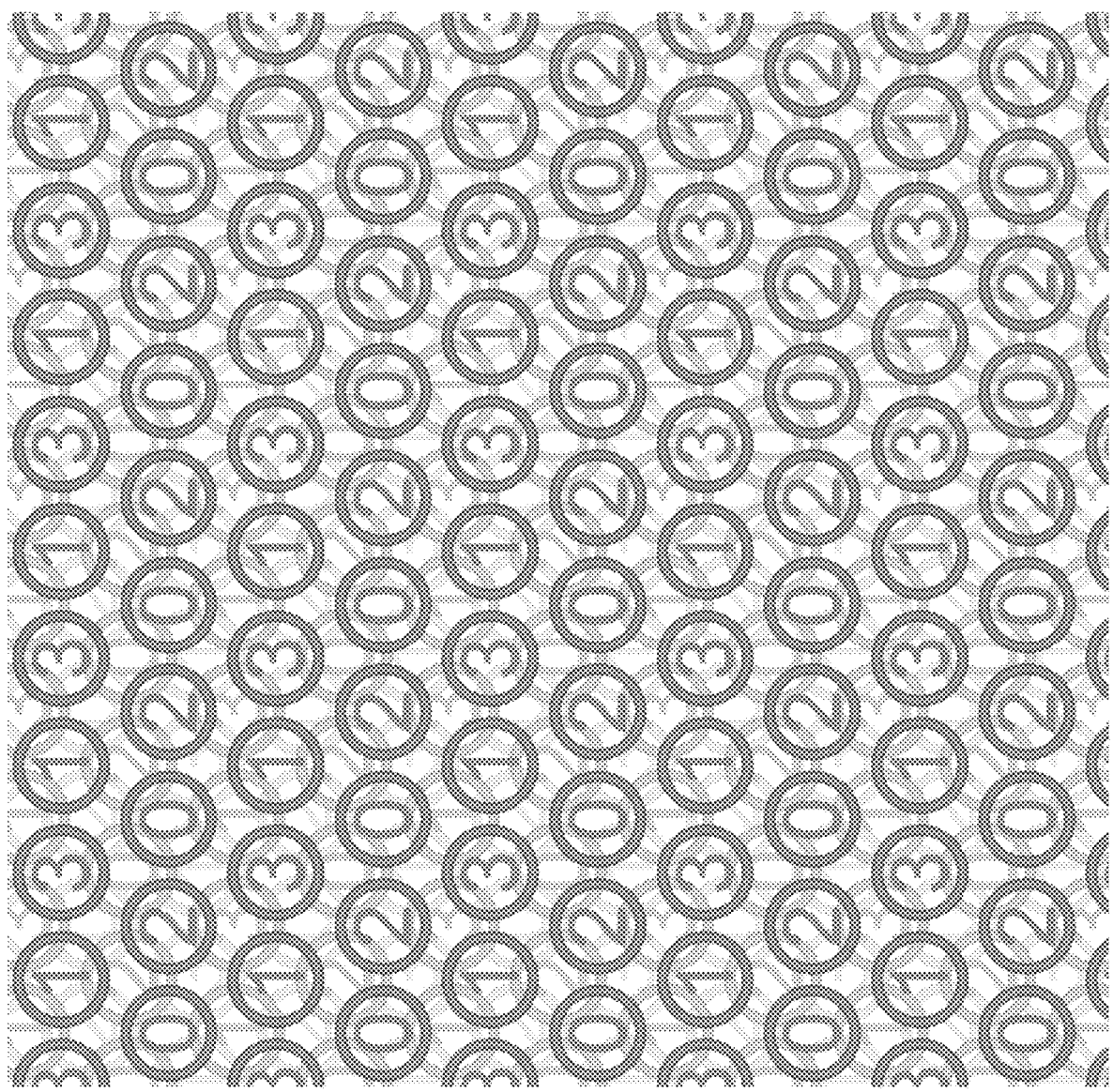
FIG. 45 shows an example of multiple mapping for better coverage of interstitial beams.

Although the example above analyzes a simple case of a three-element array, those skilled in the art will recognize that the method may be applied to larger arrays where several different array maps operate in parallel to cover more densely the beamspace with beamspace lattices and thereby allow more convenient and potentially more accurate recovery of the positions of interstitial beams in beamspace. FIG. 45 shows an example where three beamspace lattices corresponding to a four-element array are superimposed to more densely fill the interstitial spaces between the points of a single lattice.

Additionally, it is noted that the beamspace lattice may be shifted dynamically during operation (e.g., by adding phase offsets (e.g., a linear blaze) to the modulated signals 135 provided by channels 20) to shift its position to an RF scene intercepted by the phased array such that the incoming wave or waves correspond more closely to the points of the beamspace lattice. At the beamspace edge, the resulting optical spot of the corresponding beam 185 may thus be shifted to form a single discrete optical spot aligned with a sensor of sensor array 700. Such beamspace lattice shifting may be implemented for a single mapping or for multiple maps of the phased array.

In other examples, multiple optical processors 10 may be used with antenna array 110, with each optical processor providing a different shift amount of the beamspace lattice (as provided by phase offsets to modulated optical signals 135). Each optical processor 10 may be in communication with the same antenna array 110 and have the structure and operation as described elsewhere herein. The shifting of the beamspace lattice in each optical processor 10 need not be dynamic but may be fixed. In such an example, modulated optical signals 135 may be split m ways and provided to m 1D arrays at channel edges 34 of corresponding interference spaces 30 of corresponding m optical processors. It should be appreciated that each interference space 30 may allow for interference of optical signals of that optical processor only. Thus, an interstitial beam formed by one of the optical processors 10 may be shifted in another of the optical processors where it is not formed as an interstitial beam.

Oversampling Linear Detection for Improved Interstitial-Beam Recovery

Figure 46:
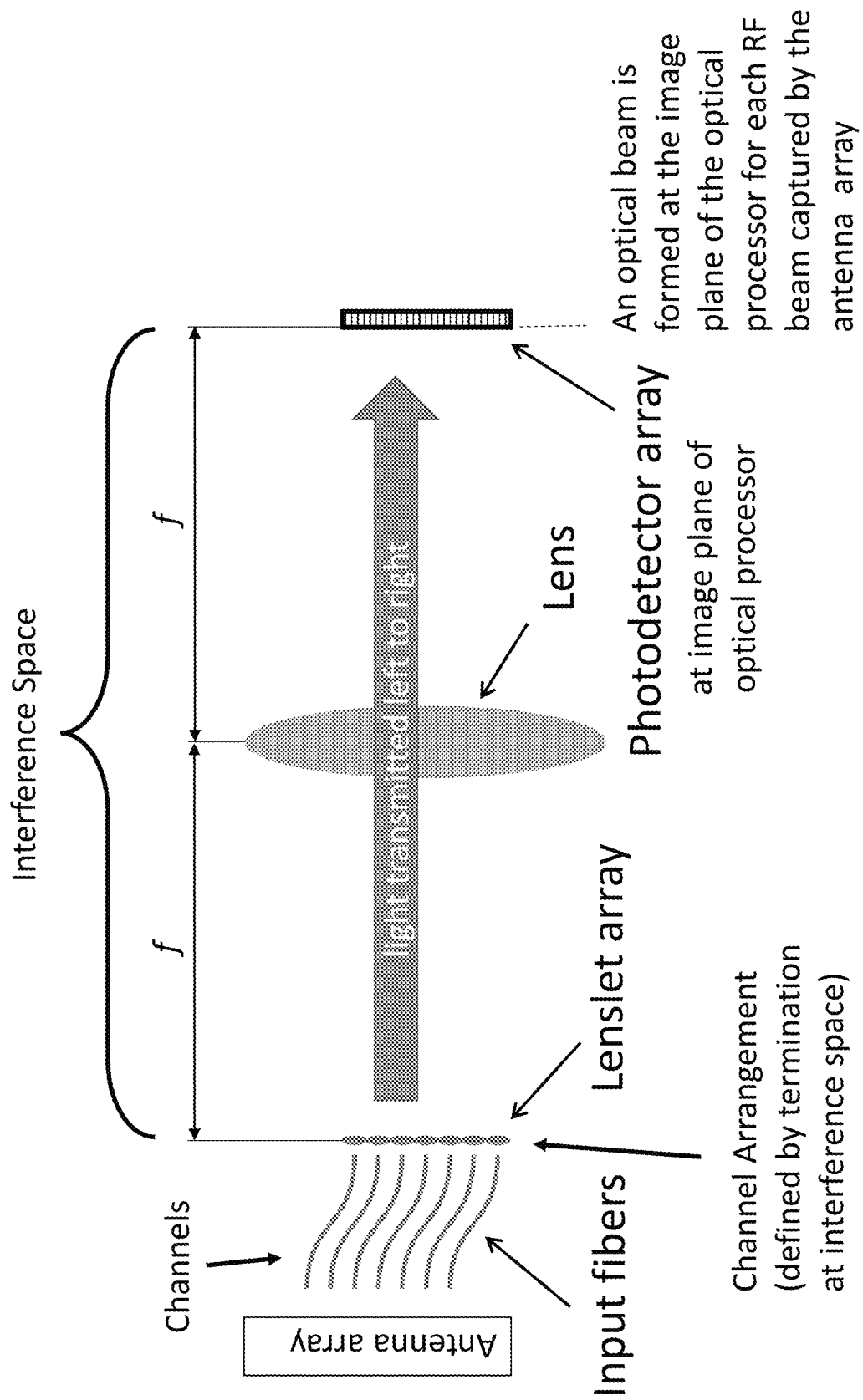
FIG. 46 shows a modified optical processor where an array of photodetectors is used at the output.

Another approach that may improve the recovery of interstitial beams relies on oversampling the detection plane, or line, where the detectors are distributed. In FIG. 3A, light transmitted by input fibers through the lenslet array and the lens impinges upon another lenslet array that focus it on output fibers. In FIG. 3A, the lenslet array, output fibers and photodetectors form an exemplary sensor array 700 (i.e., an array of detectors, with each detector comprising a lenslet coupled to a photodetector via an output fiber). However, the sensor array may take other forms. For example, in FIG. 46, a (linear) array of photodetectors may form the sensor array 700 and be located at the focal plane (i.e., at locations corresponding to those of the lenslets of the sensor array of FIG. 3A. The size of the individual photodetectors may be smaller than the size of the lenslets that they replace and the photodetectors may be distributed more densely. As a result, a spot of light formed at the output, that may correspond to an RF beam intercepted by the phased array, may cover more than one and preferably two or more photodetectors. As a result, a more precise position of the spot in the focal plane, and consequently of the intercepted beam in the beamspace, may be recovered. It should be appreciated that each of the photodetectors of FIG. 46 may also be integrated with a corresponding lenslet (e.g., within a semiconductor chip in some examples) such that the sensor array is formed of an array of detectors each formed of a lenslet and photodetector.

Irregular Arrays

The arrays considered above are regular and provide for tessellation of the entire regular lattice. Whereas such array properties may be desirable for the optimum performance of the phased array, other considerations including the cost, weight or power consumption may enter as important parameters in their design. Accordingly, some of the design features may be relaxed in some situations. For example, an array may be not fully populated, which would result in incomplete tessellation of the lattice with the array, or the positions of the elements in the array may be perturbed from the 'ideal' placement. In such situations, the array may still be suitable for mapping as described above, but would accommodate the 'missing' elements as empty slots or zero-amplitude signals. Although it may be reasonably anticipated that array mapping of such perturbed arrays may lead to some degradation in beam forming that may manifest as degraded signal to noise ratio, or reduced isolation between beams, or less-than-faithful beam forming or beamspace mapping, such degradation may be acceptable in some applications and therefore useful.

In addition, a different type of 'irregularity' may be employed in the array design. Note that in the constructions presented above, the set orthogonal virtual beams, when collected to a matrix and properly normalized, may form a discrete Fourier transform (DFT) matrix-allowing for the permutation of rows and/or columns as well as phase adjustment. A DFT matrix has the properties of: (1) it is unitary, (2) the absolute values of its elements are identical. Physically, these two conditions are the consequence of (1) the choice of orthogonal virtual beams, and (2) the virtual beams corresponding to free-space beams where the latter may be approximated by plane-waves in the vicinity of the array. However, notably, DFT matrices are not the only matrices that satisfy the two conditions. A wider class of such matrices is known as complex Hadamard matrices. Therefore, the columns of a complex Hadamard matrix may be chosen as orthogonal virtual beams that may correspond to free-space beams captured or transmitted by a phased array. For example, virtual beams $$\begin{pmatrix}1\\1\\1\\1\end{pmatrix}, \begin{pmatrix}1\\ie^{i\alpha}\\-1\\-ie^{i\alpha}\end{pmatrix}, \begin{pmatrix}1\\-1\\1\\-1\end{pmatrix}, \begin{pmatrix}1\\-ie^{i\alpha}\\-1\\ie^{i\alpha}\end{pmatrix} \quad (30)$$

where $\alpha$ is a real number, form an orthogonal set compatible with beam forming using a phased array since each component of each vector has an absolute value equal to one. For α=0, virtual beams (30) reduce to the virtual beams of the regular 4-element array considered when discussing FIGS. 34 through 42. For other values of α, virtual beams (30) may correspond to arrays with different, or 'irregular,' distributions of elements.

All-Electronic Implementation

As noted, the invention described herein is not limited to beam forming with optical processors. Indeed, the invention may be useful in purely electronic systems that do not implement optical processors. For example, using the methods described above, 2D beam forming in a conventional phased array may be achieved using a relatively simple 1D Rotman lens, or its equivalent. As a result, the phased-array 'plumbing' is simplified and the complex or bulky solutions such as Butler matrix or Luneburg lens may be avoided.

For example, in a receiver embodiment, RF plane waves captured by a 2D antenna array may be provided as RF signals to an RF interference space by RF waveguides (avoiding optical upconversion and an optical processor). RF signals provided in the RF interference space may interfere with one another and be captured by corresponding waveguides at an output of the RF interference space from which the captured RF plane wave (and its information) may be obtained. U.S. Pat. No. 10,313,012 issued Jun. 4, 2019 to Murakowski et al. is hereby incorporated by reference in its entirety as providing exemplary structure to replace an optical processor with an all-electronic system and operation of the same. It is noted that random distribution and/or lengths of RF signal paths (waveguides) described with respect to the RF coupler described in U.S. Pat. No. 10,313, 012 may instead be implemented with the arrangements of the inputs and outputs into the interference space described herein, as well as being implemented with the corresponding 2D arrangements of the antenna elements of the antenna array.

Figure 47:
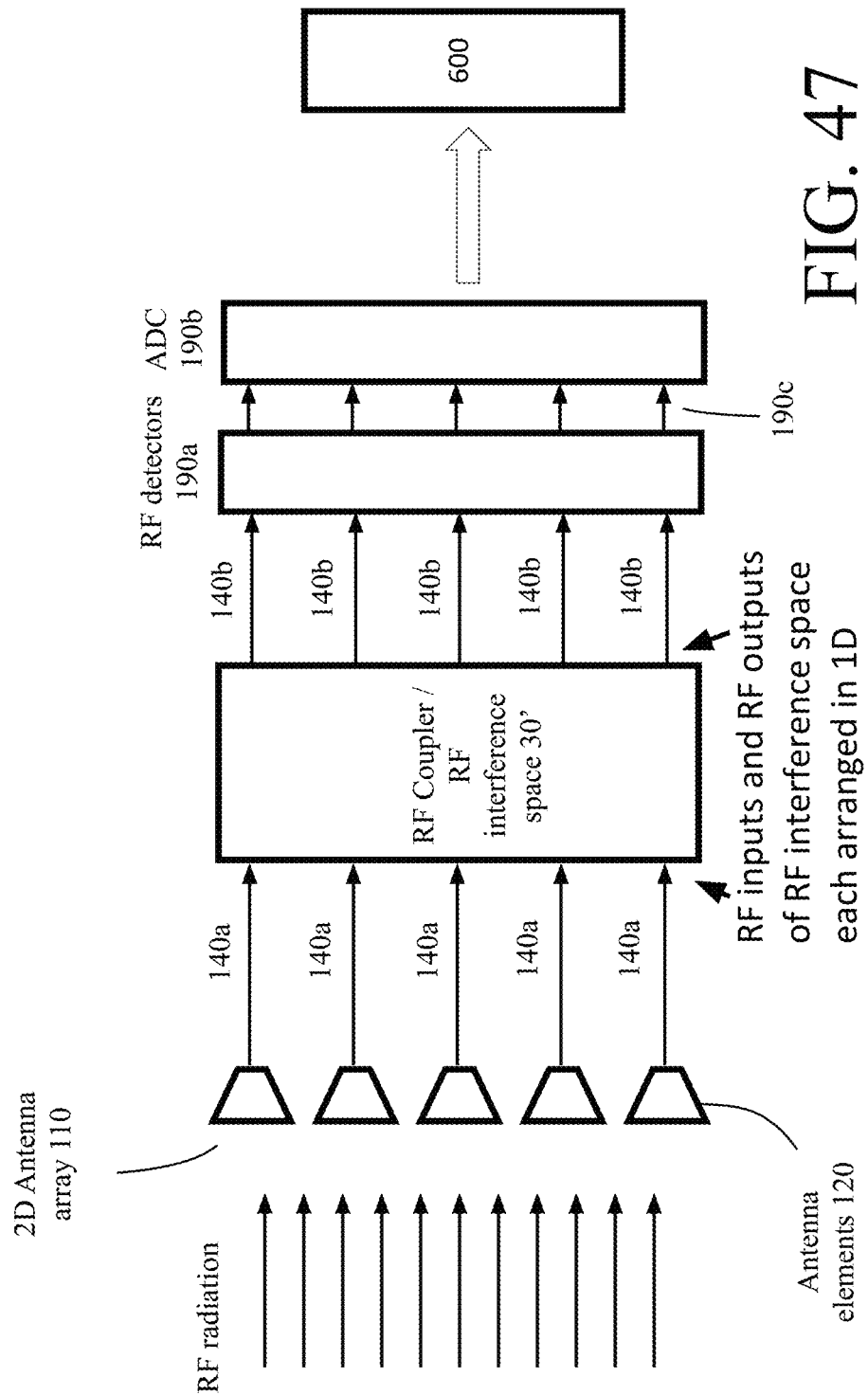
FIG. 47 shows a block diagram of the all-electronic receiver embodiment.
Figure 48:
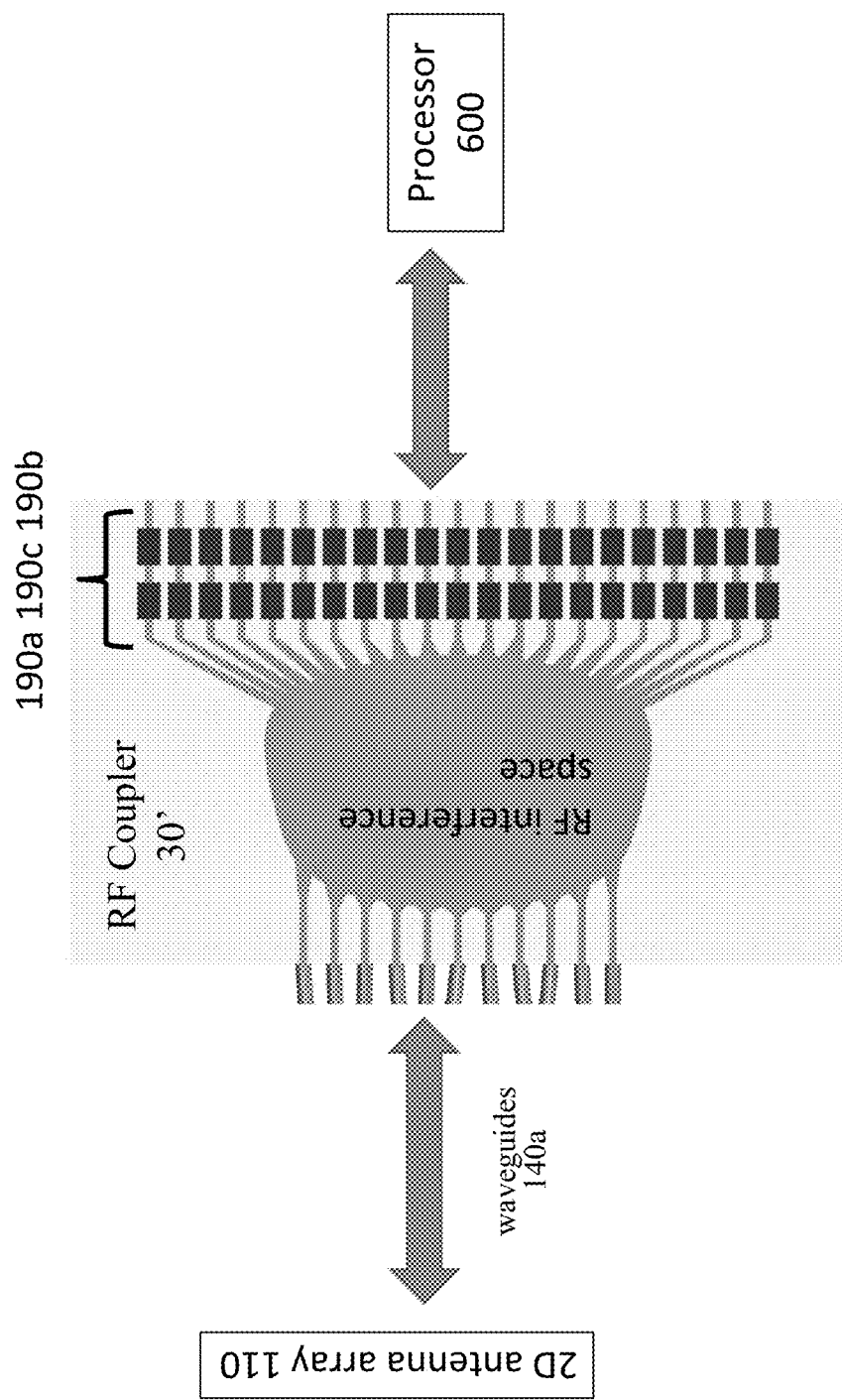
FIG. 48 illustrates an example of an RF interference space.
Figure 49:
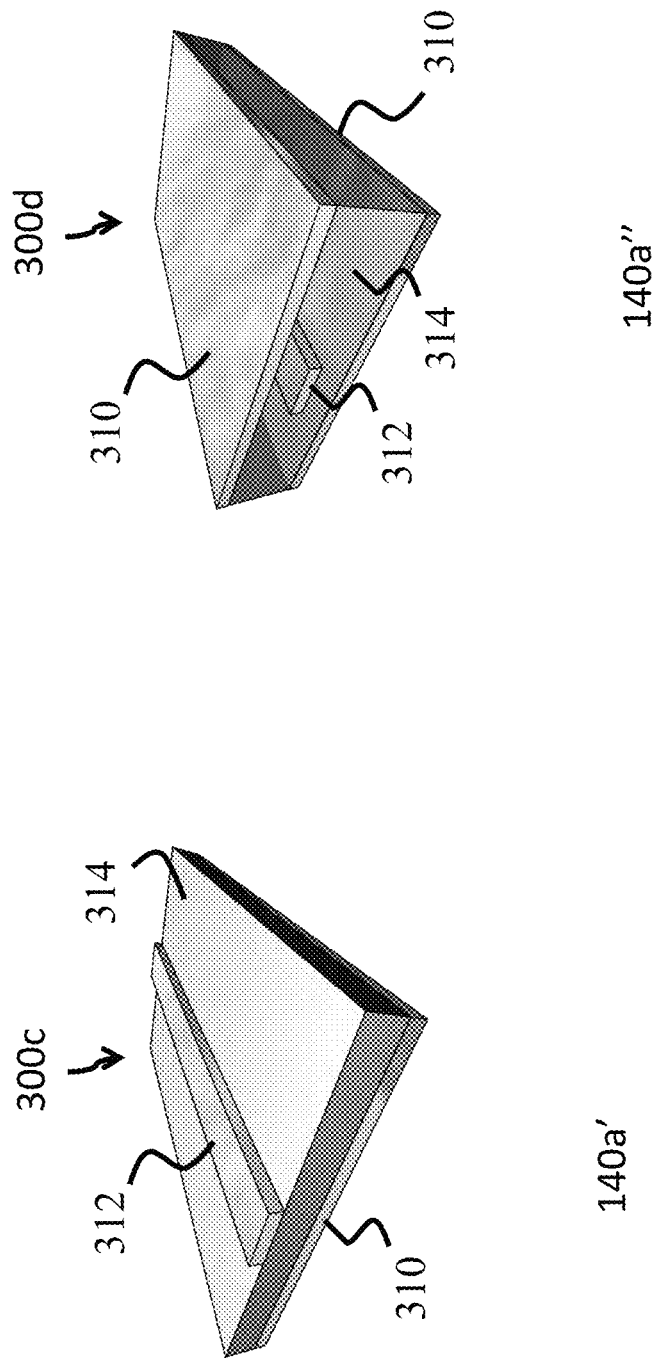
FIG. 49 illustrates examples of RF waveguides.

FIGS. 47-49 illustrate exemplary details of an all-electronic embodiment, with reference numerals corresponding to the same or similar structure disclosed in U.S. Patent No. 10,313,012. FIG. 47 is a block diagram of the all electronic embodiment, FIG. 48 illustrates an example of an RF interference space and FIG. 49 illustrates examples of RF waveguides 300c and 300d. Such RF waveguides, as well as the inputs and outputs to the RF interference space as RF signals may be the same as described in U.S. Pat. No. 10,313,012, such as removing a corresponding ground plane or shielding from a waveguide (with respect to its corresponding signal electrode) and provide the unshielded signal electrode to the RF interference space (also referred to as an RF coupler). RF signals input into the RF interference space provided by RF coupler 30' interfere with each other therein, with the resultant RF interference pattern being captured by RF detectors 190a (optionally transmitted thereto by RF waveguides 140b), converted to digital form by corresponding analog to digital converters 190b and processed by processor 600 (which may extract information encoded in the captured RF plane wave (the RF beam) captured by the antenna array 110). RF coupler 30' may be formed as a Rotman lens, Butler matrices or their equivalent (e.g., as described in U.S. Pat. No. 10,313,012).

Figure 50:
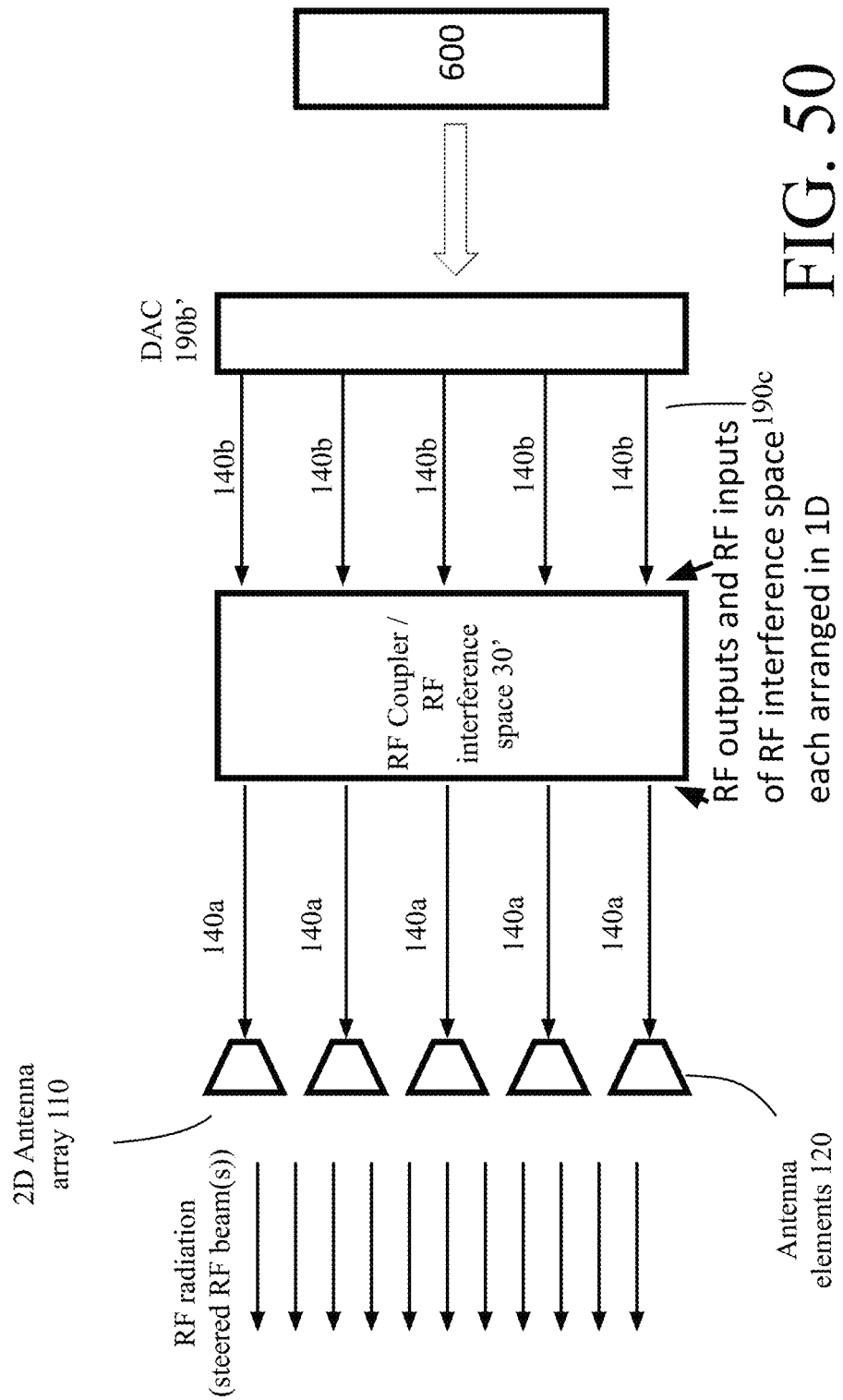
FIG. 50 shows a block diagram of the all electronic transmitter embodiment.

Although U.S. Pat. No. 10,313,012 describes a type of an RF receiver, the description is also applicable to an RF transmitter. It will be apparent that some components of the RF receiver should be modified in a manner similar to the differences between the RX and TX implemented with an optical processor as described herein. FIG. 50 illustrates an example showing the processor 600' providing digital signals to an array of digital to analog converters 190b', which provide corresponding RF electrical signals via RF waveguides 140b to RF coupler/RF interference space 30'. Outputs of the RF coupler/RF interference space are captured and transmitted to a 2D antenna array 110 by RF waveguides 140a which control the operation of the individual antenna elements 120 to radiate an RF beam. The direction of the RF beam may be controlled as described herein (e.g., in both azimuth and elevation directions).

RF amplifiers (not shown), baluns (not shown) and other conventional structure for RF receivers and transmitters may be provided as well. It should be appreciated that the signal processing and related structure to encode and modulate and demodulate and decode for the all electronic implementations may be the same as that described in the optical processor receivers and transmitters referenced herein.

Non-Uniform Element Weights for Improved Interstitial Beam Capture

Any RF field captured (RX) or generated (TX) by a finite-sized aperture necessarily has a finite spatial extent. If all the elements of a phased array within said aperture are equally weighted, this may lead to a large discontinuity in the field at the edge of the aperture. Such discontinuity in the aperture may lead to artifacts in the spatial-frequency content of the field that may impose important considerations on subsequent processing/analysis. One of the most significant of these may be the transfer of energy into spurious spatial frequencies, which manifests as sidelobes in the array's PSF (point spread function). These artifacts may be mitigated through the application of non-uniform element weighting that apodizes the transition between the middle of the aperture and its edges.

(Previous studies and U.S. patent application Ser. No. 16/401,072 established the ability of an orthogonally sampled beam space (OSBS), i.e. one critically sampled using single-mode pickups for modal filtering, to improve spatial isolation between beams. To be effective, the OSBS may require uniform element weighting, and may be effective only on beams aligned to the beamspace array grid, i.e. non-interstitial beams. The OSBS with uniform weights may be less effective in suppressing sidelobes or enhancing isolation for interstitial beams.)

Element weights can be applied to a phased array by a variety of means. For example, in the RX context, front-end LNA gain could be varied across the elements. Alternatively, attenuators could be used with the attenuation varying across the elements. Said attenuators could be either RF (electrical) or optical, since the power obtained from the upconversion process is proportional to both the incident RF power and the optical carrier power. For TX systems, attenuation or variable gain elements could likewise be used, in this case on the output side of the optical processor (beamformer), so as to apply the weights in the element space (rather than in the beamspace).

In principle, the weight of each element can be arbitrarily chosen, however as mentioned above, a class of element-weight distributions that is particularly useful for sidelobe mitigation is those that apodize the aperture boundaries, called tapered apertures, a.k.a. windows. (The assertion of the benefits of tapered aperture weighting is not intended to imply that any other weighting schemes are not useful.) The concept and practice of windowing is common in the context of harmonic analysis of discretely sampled time-domain signals, where it is used in conjunction with the Discrete Fourier transform (DFT). A useful discussion of the use of windows with the DFT can be found in the technical publication by Harris, F. J., "On the Use of Windows for Harmonic Analysis with the Discrete Fourier Transform", Proc. IEEE, vol. 66, no. 1, pp. 51-83 (January 1978). This paper's treatment of windows for frequency-domain analysis of 1D (time-domain) sampled signals may also be applied to the analysis of 2D spatially sampled apertures (phased arrays) in the spatial-frequency domain (the beamspace). Numerous functional forms of the taper profile have been studied and characterized to evaluate their relative merits and trade offs, especially trade-offs between sidelobe suppression and (temporal or spatial) frequency resolution. Well known taper functions include: Triangle, Raised Cosine, Hamming, Hanning, Gaussian, Bessel, Chebyshev, Riemann; Harris (1978) analyzes all these and many more.

Figure 51:
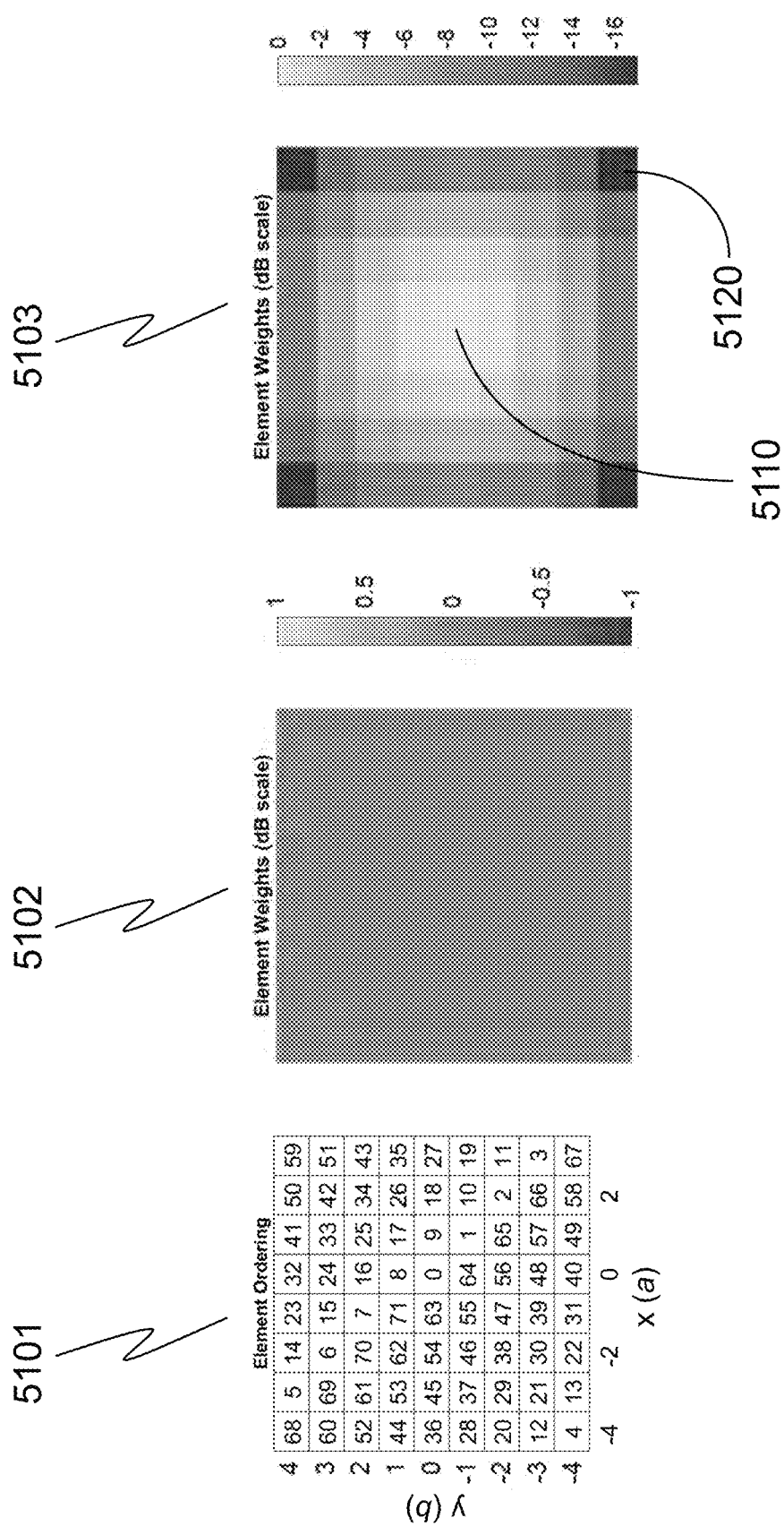
FIGS. 51, 52, 53, 54, 55 show the effect of array-element weighting on beam forming.

FIGS. 51 through 55 illustrate an example of the array-element-weighting application to improve the beam-forming of interstitial beams. Accordingly, FIG. 51 shows the labeling of array elements for aperture mapping between 2D and 1D in 5101, the application of uniform or flat element weights in 5102 and tapered aperture weighting in 5103. The array has 72 elements organized in an 8-by-9 array, which is suitable for array mapping to a linear array as described above since 8 and 9 are co-prime. The weights applied to the central elements 5110 is highest at 0 dB, whereas corner element 5120 receive the lowest weight of about −17 dB. The remaining array elements receive intermediate weights depending on their position relative to the center and the corners as shown using the accompanying color bar.

Figure 52:
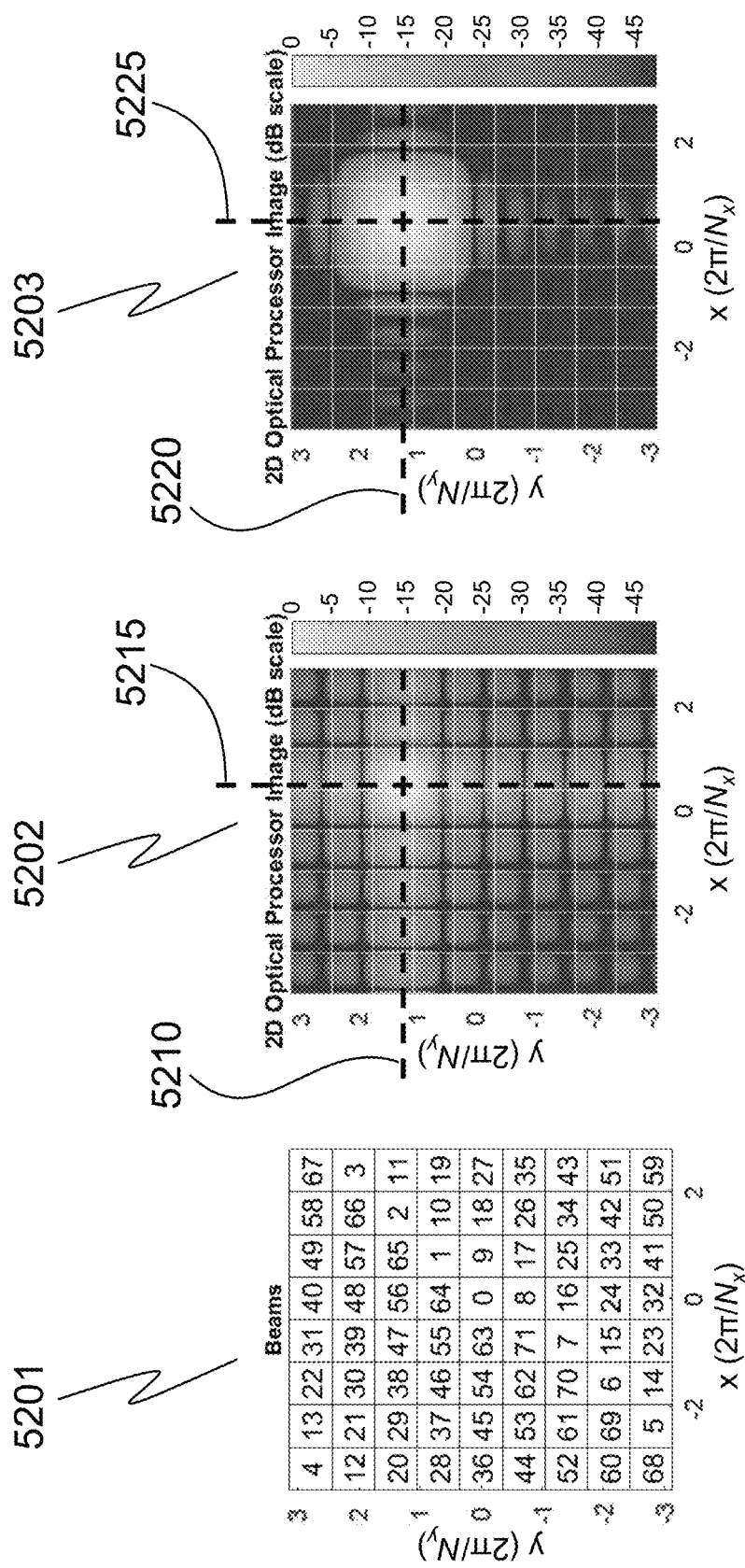

FIG. 52 shows the beam-forming for a single source present in the scene. Such beam-forming could be obtained using an optical processor similar to that illustrated in FIGS. 3A to 3E with the 72-element antenna array of FIG. 51 and a high-resolution photo-detector array in place of the 2D Fiber/Lenslet Array. In FIG. 52, 5201 shows the labeling of beamspace-array elements (resolvable beams) suitable for unrolling the 2D beamspace array to 1D. 5202 is the intensity map measured by the hypothetical photo-detector array placed one focal-distance away from the lens and represents the distribution of power detected in the beamspace when a single RF source is present in the scene. The RF source is at the intersection of lines 5210 and 5215. 5202 shows that in addition to a bright spot at the nominal RF-source position, numerous sidelobes are present that may obscure other sources that may be potentially present in the scene. The dominant sidelobes appear along the lines 5210 and 5215, although significant sidelobes appear throughout the image. Applying weights to array elements according to 5103 yields a cleaner beamspace image shown in 5203, which indicates considerable suppression of the sidelobes along lines 5220 and 5225, and even greater suppression of sidelobes elsewhere in the image. The sidelobe suppression comes at the cost of widening the main lobe. Nonetheless, 5203 may be the preferred representation of source(s) in the scene as compared to 5202.

Figure 53:
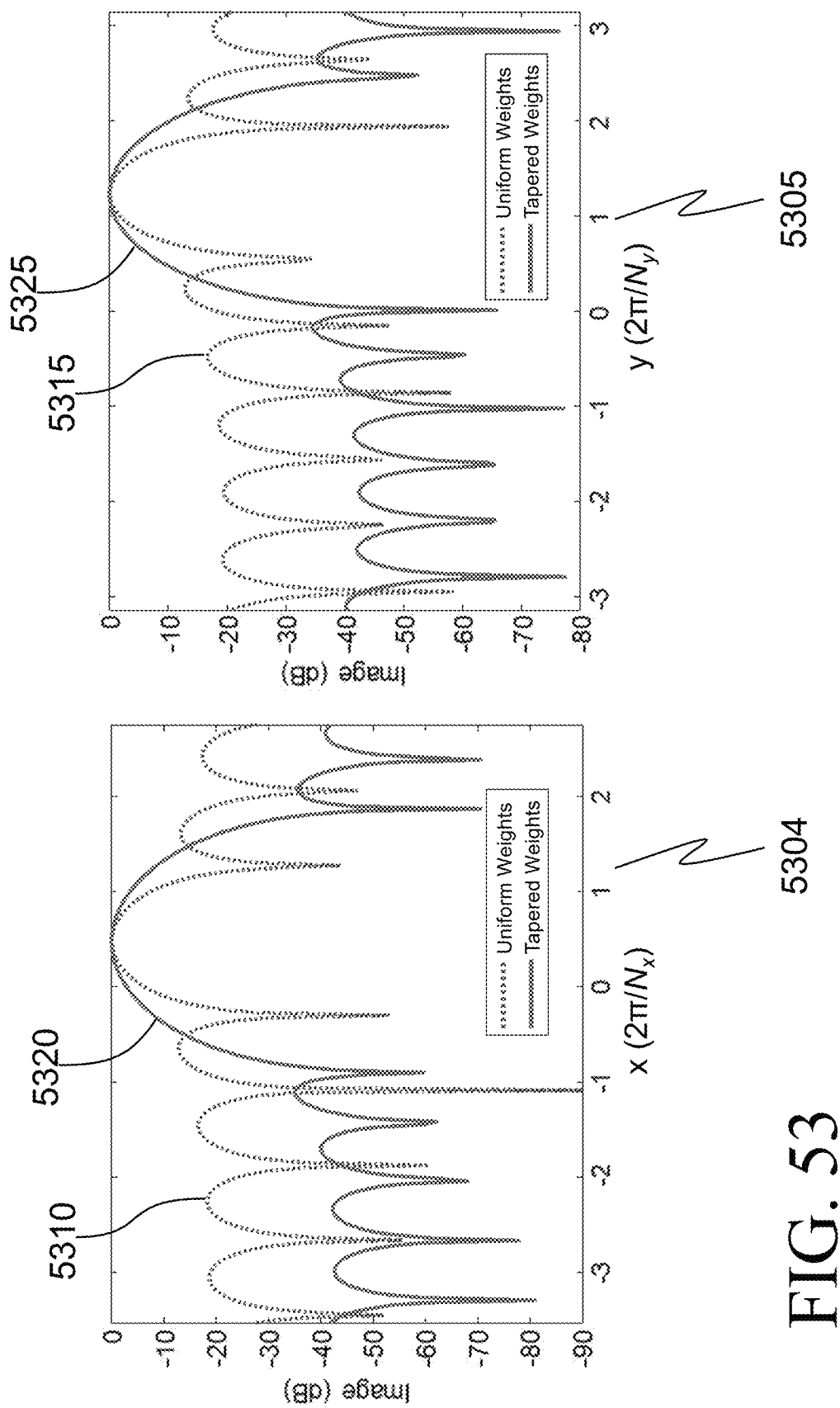

FIG. 53 shows a more quantitative picture of the sidelobe suppression and the widening of the main lobe. The curves in panels 5304 and 5305 represent the intensity distribution along lines 5210 through 5225 in FIG. 52. Accordingly, curve 5310 is a section of the 2D graph 5202 along line 5210, i.e., along the x direction and cutting through the main lobe; curve 5320 is the corresponding section along line 5220 in graph 5204; etc. Comparing curves 5210 and 5220 shows that the tapered aperture weighting may suppress the sidelobes by 20 dB or more along the x direction as compared to flat weighting. Similar sidelobe suppression may be observed along the y direction as illustrated in panel 5305 with curves 5315 and 5325. Such considerable suppression of sidelobes may be preferable even at the cost of widening the main-lobe profile observed in the same curves.

Figure 54:
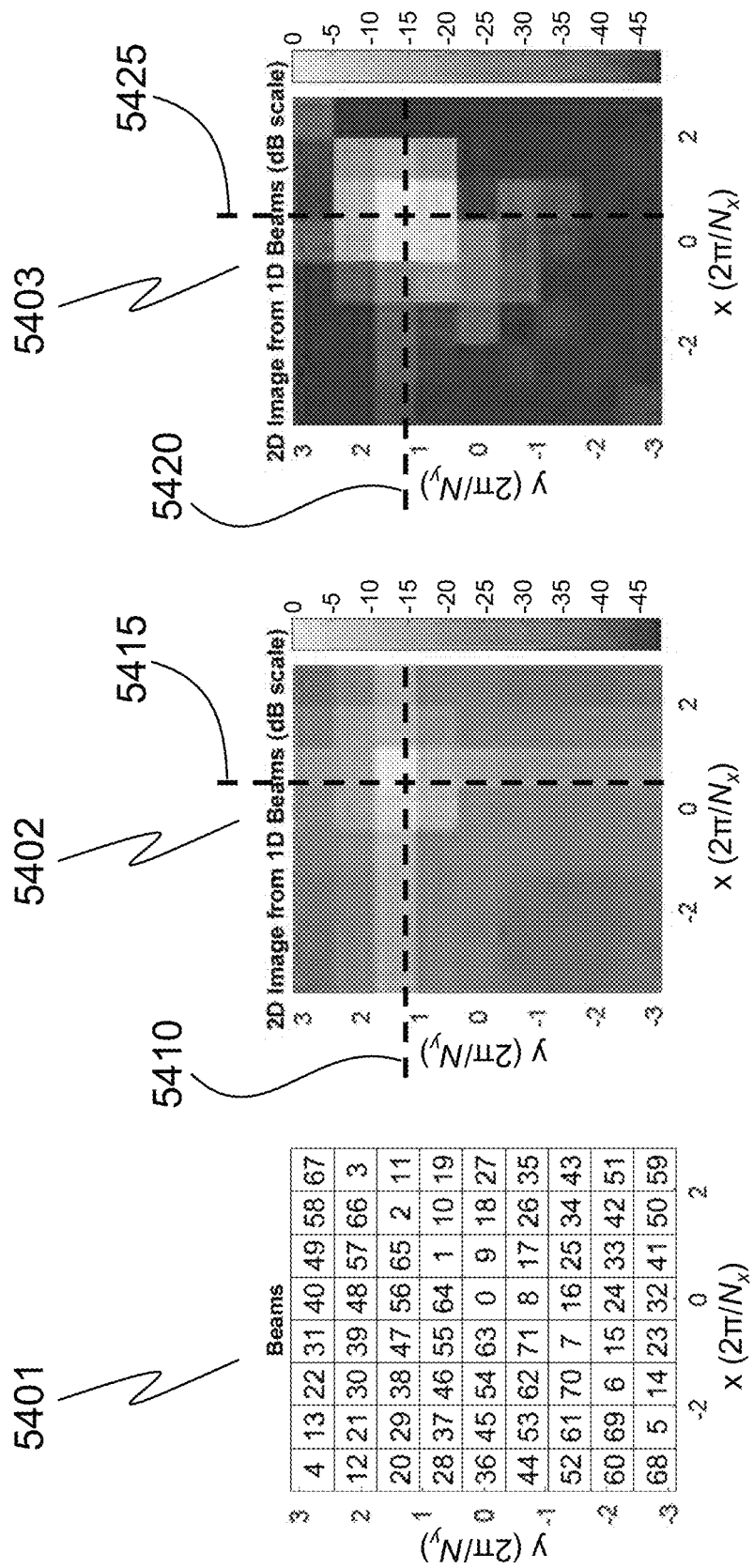
Figure 55:
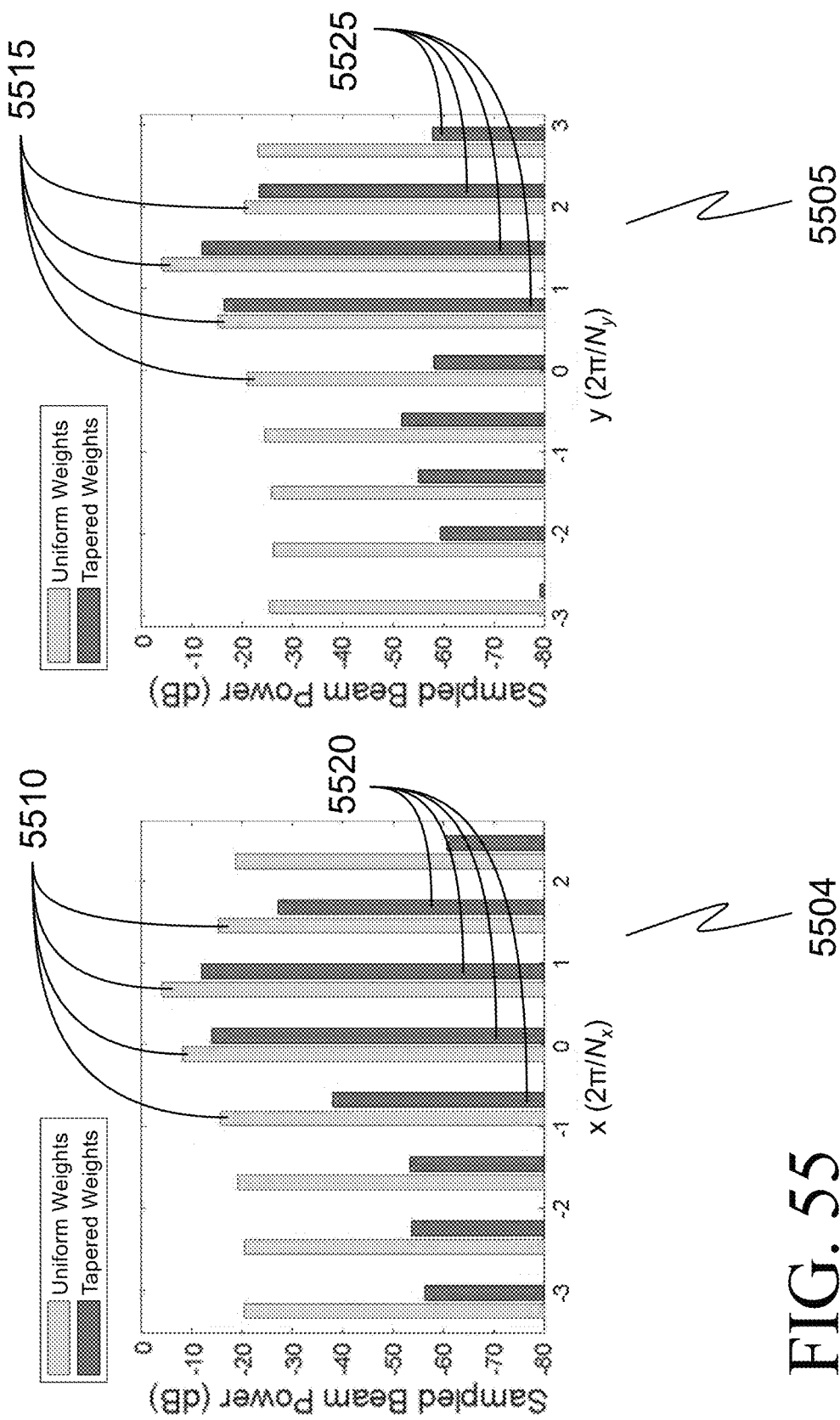

The sidelobe suppression by tapered aperture weighting in conventional beam forming carries over to the array and beamspace mapping approach disclosed here. FIG. 54 shows an analogue of FIG. 52 where 5402 and 5403 have been obtained by rearranging the intensity distribution amongst beams 0 through 71 in a linear array (e.g., a 1D Fiber/Lenslet Array as described with respect to FIGS. 2A-2C and 3A to 3E) according to resolvable-beam labeling of 5401. Thus, 5402 was obtained using a flat or uniform aperture weighting whereas 5403 used tapered aperture weighting. The comparison between 5402 and 5403 shows a cleaner intensity distribution in the latter, which therefore may be preferred for identifying and localizing RF sources in the scene. FIG. 55 provides a more quantitative illustration of sidelobe suppression wherein the lengths of bars 5510 represent the intensities in the pixels along the line 5410 in FIG. 54, the lengths of bars 5520 represent the intensities in pixels along the line 5420, etc. Accordingly, this figure shows spurious-signal suppression of 20, 30, and even 50 dB for tapered aperture weighting compared to uniform weighting. This spurious-signal suppression comes at the cost of widening the main lobe of the detected beam.

The example discussed above illustrates the utility of aperture weighting in improving beamforming when using the phased-array mapping for beamspace processing. It should be clear to those skilled in the art that various array-element weighting schemes, other than the one chosen for the illustration purposes above, may be implemented in conjunction with the array mapping approach disclosed herein.

Implementation of Processor in Semiconductor Chip

As discussed elsewhere herein, the optical processor 10 or other type of wave processor may be formed within a single semiconductor chip, such as being implemented with a planar optical circuit of a semiconductor chip 100 (as shown in FIG. 2C). As the AB transformer is able to correlate a 2D beamspace array to a 1D beamspace array, 3D optics and optical processing may be avoided, and planar optical processing within a semiconductor chip may be implemented.

FIG. 2C is a perspective view of optical processor 10 formed as part of a semiconductor chip 100. The optical processor 10 of FIG. 2C may comprise fibers 40, a planar optical circuit formed within the semiconductor chip. The planar optical circuit of the semiconductor chip may propagate optical signals in waveguides and interference space in a direction parallel to the substrate of the semiconductor chip (the propagation directions of the optical signals may be confined to two dimensions, e.g., confined to horizontal transmission when a direction perpendicular to the substrate of the semiconductor chip is considered to be the vertical direction).

Figure 56B:
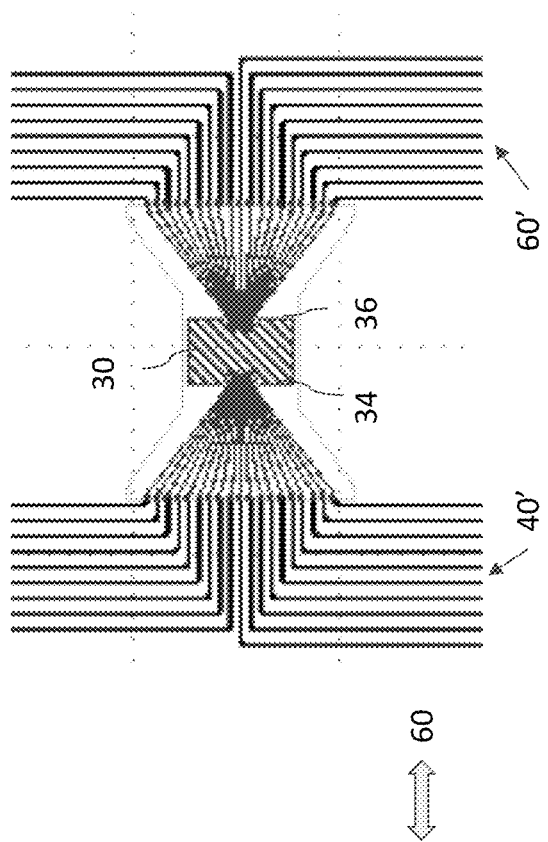
FIGS. 56A to 56E illustrate details regarding implementation of an optical processor in a semiconductor chip.
Figure 56C:
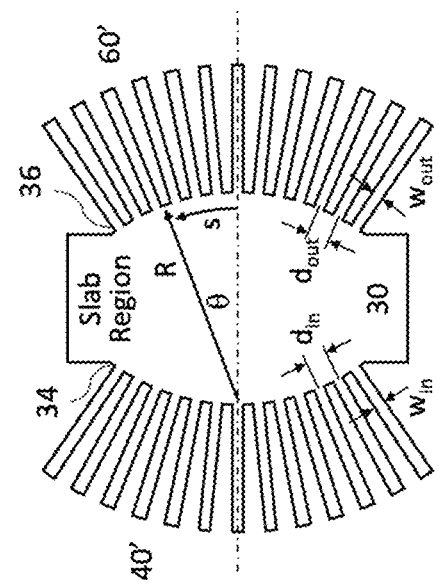
Figure 56A:
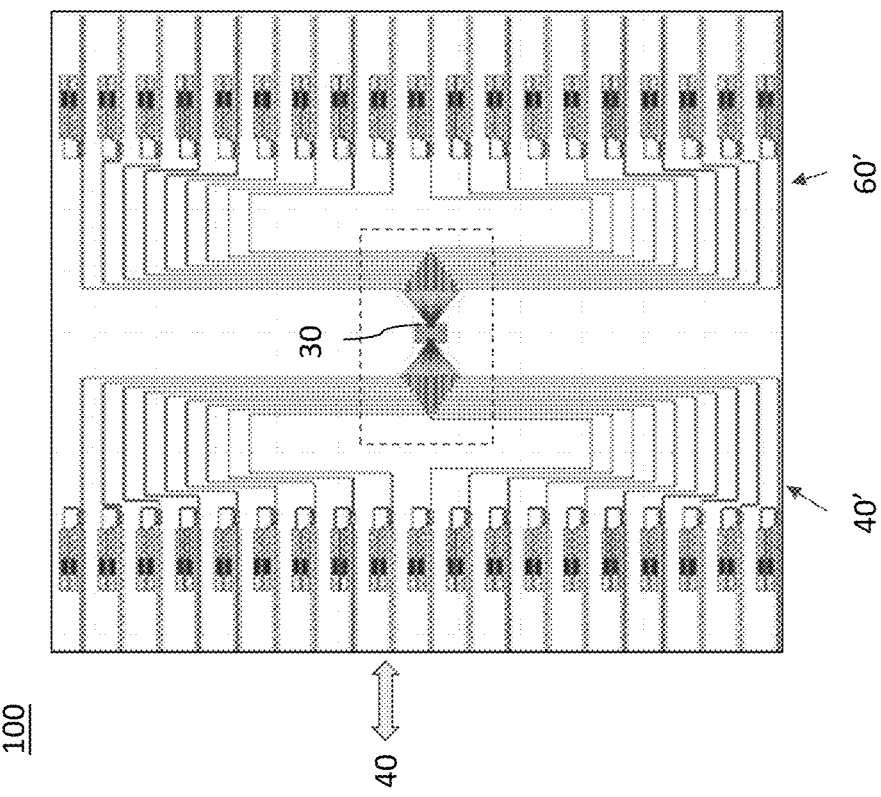
Figure 56E:
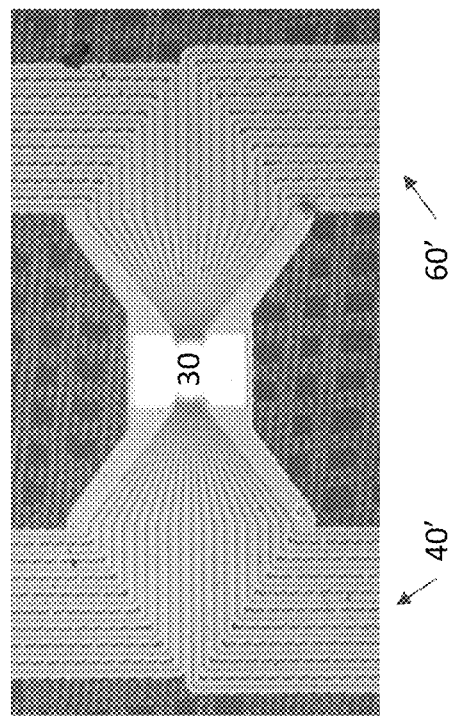
Figure 56D:
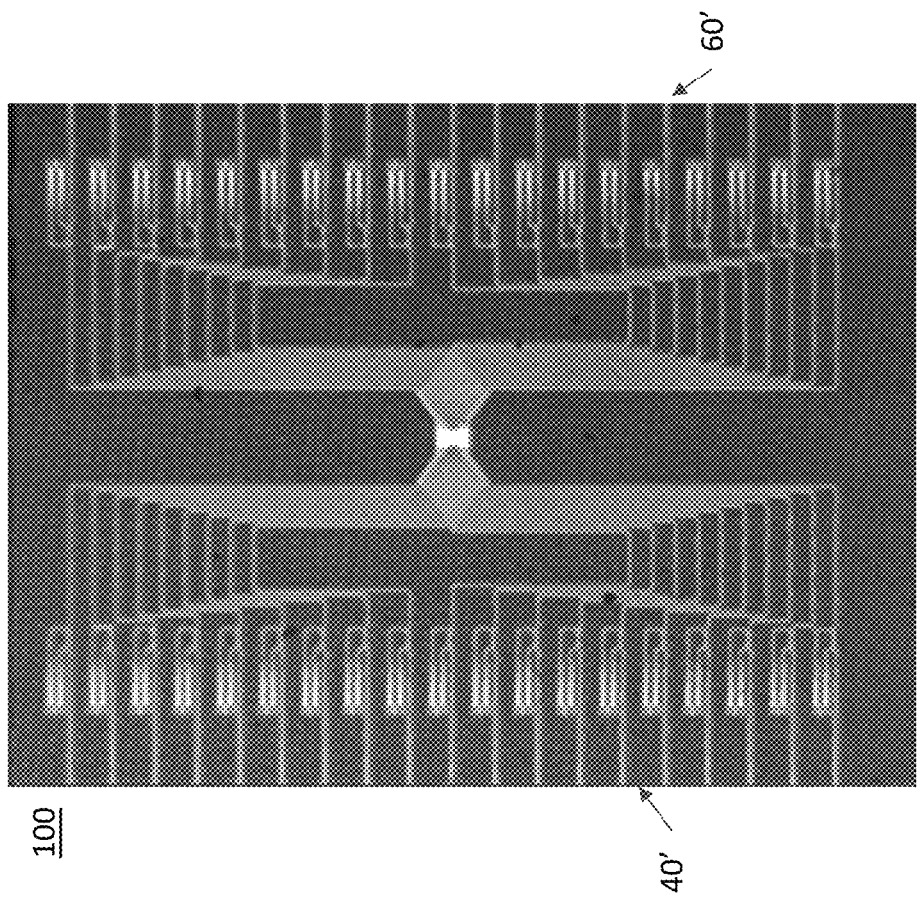

FIGS. 56A-56C are plan views illustrating exemplary details of a planar optical circuit which may be implemented in semiconductor chip 100, and which may correspond to the planar optical circuit of FIG. 2D. FIG. 56A is a top down view of the optical circuit of the semiconductor chip 100 connected between fibers 40 and fibers 60, FIG. 56B is an enlarged portion of the optical circuit corresponding to the dashed box of FIG. 56A, and FIG. 56C illustrates an exemplary interference space 30 that may be implemented with the optical circuit. FIGS. 56D and 56E respectively correspond to FIGS. 56A and 56 and are top down images of an exemplary semiconductor chip implementing the optical circuit shown in FIGS. 56A and 56B.

As shown in FIGS. 2D and 56A to 56C, the planar optical circuit may connect to and be in optical communication with fibers 40 of channels 20 at one side of the semiconductor chip 100 and optical fibers 60 at the other side of the semiconductor chip 100. Waveguides 40' and 60' of the planar optical circuit may connect to and be in optical communication with the fibers 40 and fibers 60, respectively.

The planar optical circuit of the semiconductor chip 100 may also include an interference space 30 which may have the structure and operation as described elsewhere herein. Waveguides 40' of the optical circuit connected to fibers 40 may form part of channels 20 and terminate at the channel edge 34 of the interference space 30, with such channel terminations being arranged in a 1D array, as described herein. Likewise, waveguides 60' of the optical circuit may terminate at the beamspace edge 36 of the interference space 30 having ends being arranged in a 1D array, as described elsewhere herein.

The planar optical circuit of the semiconductor chip 100 may thus be formed to process optical signals (e.g., optical signals 185 as described with respect to FIGS. 3A to 3E) to create and/or detect beams at a 1D array (at beamspace edge 36) that correspond to a 2D beamspace array (e.g., in communication with antenna array 110).

The planar optical circuit in a semiconductor chip may be manufactured with conventional semiconductor manufacturing processes. For example, a Si/SiO$_2$/Si may have a substrate of silicon (Si) having a thickness about 500 microns, an insulating layer of silicon oxide (SiO$_2$) (on the Si substrate) of about 500 nm, and an upper (device) silicon (Si) layer formed on the SiO$_2$ layer of about 200 nm. The materials forming the layers may be different than Si/SiO$_2$/Si. For example, the upper Si layer may be a silicon nitride (SiN) layer.

The wafer may be etched to pattern the upper Si layer such that the remaining portions of the upper Si layer forms the cores of waveguides 40' and 60'. The remaining Si layer may also form interference space 30. The patterning of the upper Si layer of the wafer may be performed by standard lithographic patterning, such as depositing a photoresist layer, patterning the photoresist layer via photolithographic exposure (selective exposure of the photoresist layer with a photolithographic mask) and developing (or dissolving in a chemical developer) the exposed photoresist layer to form a photoresist pattern. The photoresist pattern may then be used as a mask to etch the upper Si layer (below the photoresist pattern) to transfer the pattern of the photoresist pattern to the upper Si layer.

After patterning the upper Si layer of the wafer, a second layer of SiO$_2$ may be formed on the upper Si layer. The SiO$_2$ layer of the wafer and the second deposited SiO$_2$ layer may form cladding layers of the waveguides 40' and 60' surrounding respective cores of the waveguides (formed by the patterned upper Si layer).

It should be appreciated that electronic circuits including active components may also be formed with the semiconductor chip 100. For example, the electro optic modulators 130 and/or the photodetectors 190 and/or optical source 500 may be integrated into the semiconductor chip 100 with the planar optical circuit. For example, after formation of the electro optic modulators 130 and/or the photodetectors 190 and/or optical source 500 using conventional semiconductor manufacturing processes, layers of SiO$_2$ and Si (respectively corresponding to the SiO$_2$ layer and upper Si layer of the wafer) may be sequentially formed on the intermediate product. The upper Si layer may then be patterned and a second SiO$_2$ layer may then be deposited thereon in the manner describe with respect to the Si/SiO$_2$/Si wafer to form the planar optical circuit (e.g., formed by waveguides 40' and 60' and interference space 30). The planar optical circuit may be optically connected to the active components of the electronic circuits (which may include vertically transmitting optical signals via angled reflective surfaces at appropriate locations in the planar optical circuit and the corresponding active component). Alternatively, the modulators 130 and/or photodetectors 190 may be formed in the same layer as the waveguides 40' and 60 and the interference space 30 by selectively doping regions of the silicon device layer using n and/or p dopant such as phosphorous and boron.

Additional Considerations

As noted, reference to a two dimension (or 2D) arrangement of antennas includes arrangement of antenna elements in three dimensions. Projection of the antenna elements arranged in three dimensions in a two dimensional plane along an axis corresponding to a radiation transmission direction of the antenna element(s) may provide a geometric pattern corresponding to 2D arrays described and illustrated herein.

It should also be appreciated that reference to a one dimensional (1D) arrangement of channels, sensors, lenslets, waveguides, etc. at the interference space as described herein contemplates a geometric arrangement along a straight line or along a curve confined to a plane. Thus, the 1D arrangements described herein contemplates both linear arrangements, such as having the geometric relationships and ordering described herein, as well as similar arrangements where channels, sensors, lenslets, waveguides, etc. may be shifted in a direction along the direction of transmission (e.g., of the optical signal or RF signal as appropriate).

Furthermore, it should be appreciated by those skilled in the art that the constructions presented above extend beyond mapping two-dimensional (or 3D, or 4D, etc.) arrays to one dimension. For example, similar constructions may be used to map a three-dimensional array to a two dimensional array. To this end, the 3D beamspace array may be extended periodically, in analogy to the 2D extension shown FIG. 14, and a plane may take place of the straight line 1401 to cross each element, or its equivalent in the periodic extension, of the 3D beamspace array. Such 3D-to-2D mapping may be advantageous when recovering the angle of arrival (2D spatial beamforming) and frequency (1D temporal) using a 2D photo-detector array or lenslet/fiber array as in FIG. 1. Similarly, mapping between arrays of higher dimensions need not change the array dimension, but instead may be used to rearrange the elements in the array or to change the array shape, similar to those presented in FIG. 43. Accordingly, the methods presented above may be used for array mapping between arrays of dimensions one, two, three, etc., where said mapping may preserve or may change the dimension of the array.

Extending the array to temporal dimension may be accomplished by setting different delays between the location the signals are captured and their emission to the interference space or region. Such a spatio-temporal aperture has been disclosed previously in U.S. Pat. No. 10,313, 012 where it was used to discern the frequency of incoming radiation. Therein, the different delays may have been obtained by using optical fibers with different lengths to convey the signals captured by the antennas of the RF front end and the fiber array in the optical processor. Similarly, in the devices and methods disclosed here, the use of different signal delays between the front end and the processor may allow mapping different frequencies of incoming radiation to different beams in the beamspace processor used for beamspace mapping.

While the embodiments described above may refer to capturing, processing, and/or transmitting electromagnetic radiation or waves, including optical waves, the disclosed approach is applicable to other forms of radiation (e.g., energy radiated in the form of waves) or waves. For example, acoustic waves may be processed in a similar fashion. In the case of acoustic waves, the latter may be sensed using an array of microphones rather than radio antennas, the transmission in the corresponding channels may be electronic, or acoustic, or optical, and the beamspace processing (e.g., transmission to, interference within and sensing from an interference space) may be accomplished, for example, by using (surface) acoustic waves, or optical waves, or radio waves. Other wave phenomena that may be amenable to processing using the methods described here may include as wide a variety as ocean waves, de Broglie's (matter) waves associated with matter particles including electrons, protons, atoms, or atomic assemblies such as Bose-Einstein condensate, gravitational waves, magnetic waves, phonons, and others. To process the waves in the manner prescribed here, the array of antennas would be replaced with an array of sensors suitable for sensing the particular type of wave and converting the local time-variable field to a signal for transmission along a channel. In the case of an imaging receiver that uses optical up-conversion, a suitable wave sensor is an antenna coupled to an electro-optic modulator (as described herein with respect to receiver 1000) wherein the local, time-dependent electromagnetic field at the position of the antenna is converted to a signal that is the time-dependent modulation of an optical carrier conveyed by an optical fiber. However, a microphone may also be a suitable wave sensor (such that the phased array of 110 of antennas 120 is replaced with a 2D array of microphones), where acoustic signals captured by the microphones may be upconverted (e.g., optical up-conversion, or RF up-conversion) and processed by a beamspace processor as described herein. Similarly, the channels used for transmission of signals may be chosen according to the signal modality. For example, optical signals may be conveyed using optical fibers, electronic signals may be conveyed using electrical wires, cables, or waveguides, etc. Also, the radiating elements that generate the beams depend on the wave modality. Thus, optical waves may be generated using optical-fiber outputs coupled to lenslets, acoustic waves may be generated using speakers or electro-acoustic transducers, and RF waves may be radiated using RF antenna elements.

The present invention may also be used for beam forming waves transmitted into free space. In this case, the sensing element may be an optical fiber with a lenslet that captures the incoming optical beam and sends it along an optical fiber. The radiating element could be a radio antenna coupled to a photo-detector: Light conveyed by the optical fiber impinges on the photo-detector where the optical signals is converted to an electrical signal, which energizes an antenna, potentially after amplification of the electrical signal. The lenslets and optical fibers form an array as do the radio antennas, but the geometries of the two arrays are different as described herein.

Thus, the general structure of the device disclosed here may be such as depicted in FIG. 2D. Therein, incoming beams of radiation, or waves, which are space- and time-dependent magnitude of a field, are sensed by an array of sensors. These incoming waves may propagate in any suitable medium that may include free space, or material such as dielectric, air, water, glass, metal, semiconductor, vacuum, and others. The region where the waves propagate may be referred to as an interference region as it allows different waves to interfere or combine to form a resultant wave or field. The region where the incoming waves propagate is shown as the first interference region in FIG. 2D. In the context of the embodiments of FIGS. 2A to 2C and 3A to 3E, first interference region may correspond to the interference space 30 described herein or may correspond to a space (e.g., atmosphere) outside the beamspace processor (e.g., correspond to space communicating RF beams to the antenna array 110 of the beamspace processor which forms receiver 1000). The sensors convert the local, time-dependent magnitude of the field into a corresponding time-dependent signal that is conveyed by a corresponding channel coupled to said sensors. This way, the continuous distribution of the sensed field is converted to a discrete, finite number of signals conveyed by the finite number of channels. Radiating elements receive the signals conveyed by the channels and convert them to radiation that is emitted to a second interference region disposed adjacent to the radiating elements. In the context of the embodiments of FIGS. 2A to 2C and 3A to 3E, the second interference region may correspond to the interference space 30 described herein or may correspond to a space (e.g., atmosphere) outside the beamspace processor (e.g., correspond to space communicating RF beams from the antenna array 110 when the beam space processor forms transmitter 2000). The radiation emitted by the plurality of radiating elements combine to form waves.

For the purpose of the present discussion, a beam may be understood as a wave that in the vicinity of the array of sensing elements, or the array of radiating elements, appears similar to a plane wave, where the surfaces (or contours) of constant phase are substantially planar (or linear). The devices and methods disclosed herein provide a prescription of how the distribution of sensing elements may relate to the distribution of radiating elements that may convert beams sensed in the first interference region to beams radiated into the second interference region. The distribution of sensing and radiating elements may be in space or in time wherein the latter may be effected by using delays of signals conveyed by the channels. Notably, U.S. Pat. No. 9,525,489 discloses a device that maps beams propagating in the first interference region to beams propagating in the second interference region, where the first interference region is free space where radio-frequency beams are captured by an array of antennas, and the second interference region is free space where optical beams are emitted by an array of optical fibers. However, in U.S. Pat. No. 9,525,489, the distribution of antennas in the antenna array is identical to the distribution of fibers in the fiber array, save the scale. However, in the present disclosure, the distribution of sensing elements may differ from the distribution of the radiating elements while the beam forming is preserved: Beams captured by the array of sensing element may be mapped to beams emitted by the array of radiating elements. Hence, the present invention may remove one of the restrictions of the existing art. Relaxing of the geometric requirement on the array correspondence may have the result in that the topology itself need not be preserved: A two-dimensional array may be mapped into a one-dimensional array while faithfully mapping beams between the two distinct interference regions.

The invention claimed is:

1. An apparatus for mapping radiation beams, the apparatus comprising:
a plurality of sensors distributed according to a first pattern and disposed adjacent to a first interference region, the plurality of sensors being configured to capture incoming radiation and convert the incoming radiation to a plurality of signals;
a plurality of radiating elements distributed according to a second pattern that differs from the first pattern and disposed adjacent to a second interference region; and
a plurality of channels connected between the sensors and the radiating elements, each channel connected to a corresponding sensor to receive a corresponding one of the plurality of signals,
wherein each of the radiating elements is in communication with a corresponding one of the plurality of channels to provide an outgoing radiation corresponding to the signal received by the channel, and
wherein the second pattern has a relationship to the first pattern such that first and second beams of incoming radiation in the first interference region captured by the plurality of sensors are respectively mapped to corresponding first and second beams of outgoing radiation emitted by the plurality of radiating elements into the second interference region.

2. The apparatus of claim 1, wherein the plurality of sensors comprise transducers.

3. The apparatus of claim 2, wherein the transducers comprise microphones or antennas.

4. The apparatus of claim 1,
wherein the first beam is provided by the channels to the radiating elements as a first virtual beam comprising a first plurality of discrete signals, and the second beam is provided by the channels to the radiating elements as a second virtual beam comprising a second plurality of discrete signals, and
wherein at least the first virtual beam and the second virtual beam are superimposed in the channels to form the plurality of signals.

5. The apparatus of claim 4,
wherein the channels are configured to transmit the first plurality of discrete signals and the second plurality of discrete signals in parallel.

6. The apparatus of claim 1, wherein the sensors are arranged regularly in a two dimensional array and wherein ends of the channels are arranged regularly in a one dimensional array adjacent the second interference region.

7. The apparatus of claim 1, wherein the sensors are distributed in a two dimensional array and the plurality of radiating elements are distributed in a one dimensional array.

8. The apparatus of claim 7, further comprising:
a second plurality of sensors;
wherein the plurality of radiating elements are arranged adjacent the second interference region at a first edge of the second interference region and the second plurality of sensors are arranged in a one dimensional array at a second edge of the second interference region.

9. The apparatus of claim 1, wherein the sensors are distributed in a one dimensional array and the plurality of radiating elements are distributed in a two dimensional array.

10. The apparatus of claim 9, further comprising:
a second plurality of radiating elements; and
wherein the plurality of sensors are arranged adjacent the first interference region at a first edge of the first interference region and the second plurality of radiating elements are arranged in a one dimensional array at a second edge of the first interference region.

11. An RF receiver, comprising:
an antenna array comprising a plurality of antenna elements configured to receive RF beams and provide corresponding RF electrical signals, the plurality of antenna elements being arranged in a first pattern;
a plurality of electro-optic modulators, each electro-optic modulator being in communication with a corresponding one of the plurality of antenna elements to receive a corresponding RF electrical signal, the plurality of electro-optic modulators being configured to generate a corresponding modulated optical signal by mixing the corresponding RF electrical signal with an optical carrier signal;
a plurality of channels, each channel being in communication with a corresponding one of the plurality of electro-optic modulators to receive and transmit a corresponding modulated optical signal, wherein ends of the channels are arranged in a second pattern;
an interference space to receive the plurality of modulated optical signals transmitted by the plurality of channels at a first edge of the interference space, the modulated optical signals forming a plurality of optical beams in the interference space, each optical beam corresponding to a received RF beam, the interference space having one or more lenses to spatially separate the plurality of optical beams; and
a sensor array comprising a plurality of sensors arranged at a second edge of the interference space to receive the spatially separate optical beams at respective sensors of the sensor array,
wherein the first pattern of the antenna elements is different from the second pattern of the ends of the channels.

12. The RF receiver of claim 11,
wherein the antenna elements are arranged in a two dimensional (2D) array as the first pattern, and
wherein the ends of the channels are arranged in a one dimensional (1D) array as the second pattern.

13. The RF receiver of claim 12, wherein the sensor array at the second edge of the interference space is arranged in a 1D array.

14. The RF receiver of claim 13, wherein the arrangement of the ends of the channels has a relationship with the arrangement of the plurality of antennas such that the modulated optical signals transmitted by the channels into the interference space result in the optical beams at the second edge of the interference space at positions with each position of the optical beam being determined by the propagation direction of the corresponding RF beam received at the antenna array to which the optical beam corresponds.

15. The RF receiver of claim 12, wherein the ends of the channels are arranged along a curved line.

16. The RF receiver of claim 12, the ends of the channels are arranged along a line that lies within a first plane and each of the modulated optical propagate in a direction along the first plane.

17. The RF receiver of claim 12, wherein at least the channels and the interference space are formed in a first semiconductor chip, wherein propagation directions of the modulated optical signals in the channels and propagation directions of the optical beams in the interference space are in directions parallel to the upper surface of a substrate of the first semiconductor chip.

18. The RF receiver of claim 12, further comprising a processor configured to decode encoded information provided by the RF beams and represented in the corresponding optical beams captured by the sensor array.

19. The RF receiver of claim 12, wherein the plurality of antenna elements and the plurality of channels form an array/beamspace transformer configured to correlate a 2D beamspace array to a 1D beamspace array, each beamspace array representing a set of resolvable beams of the receiver in reciprocal space.

20. The RF receiver of claim 19,
wherein each optical beam at the second edge of the interference space may be formed as a single continuous focused spot on a corresponding sensor of the sensor array, and
the 1D beamspace array may be represented in real space by the focused spots of the optical beams.

21. The RF receive of claim 12, wherein the sensor array comprises a lenslet/sensor array with lenslets of the lenslet/sensor array being arranged at the second edge of the interference space.

22. The RF receiver of claim 12, wherein the first and second edges of the interference space respectively correspond to an input focal plane and an output focal plane of the one or more lenses of the interference space.

23. The RF receiver of claim 22, wherein the one or more lenses comprises one or more cylindrical lenses.

24. The RF receiver of claim 22, wherein the interference space comprises a slab waveguide.

25. The RF receiver of claim 22, further comprising a filter that is positioned within the interference space, the filter being configured to isolate a sideband from each of the optical signals in the interference space.

26. The RF receiver of claim 22, further comprising an optical source configured to provide the optical carrier signal and a reference optical signal,
wherein the reference optical signal has a frequency offset from the optical carrier signal by a set amount and is phased locked with the optical carrier signal,
wherein the RF receiver further comprises one or more optical combiners to combine the reference optical signal with each of the optical beams of the interference space to allow heterodyne detection of a corresponding RF signal represented with each of the optical beams.

27. The RF receiver of claim 12, wherein the plurality of channels, the interference space and the sensor array form an optical processor, wherein the optical processor is configured to simultaneously process the RF beams each having a carrier frequency within a frequency range of about 3 kHz-300 GHz.

28. The RF receiver of claim 12,
wherein each of the RF beams is represented in the channels as a corresponding virtual beam comprising a plurality of discrete signals,
wherein the virtual beams are superimposed in the channels to form the modulated optical signals.

29. The RF receiver of claim 12, wherein the sensor array is formed as a plurality of photodetectors arranged at the second edge of the interference space.

30. A method of RF signal processing, comprising:
providing an optical carrier signal of a first frequency and a reference optical signal of a second frequency, the first frequency and the second frequency differing by a set amount,
capturing a first RF beam by a plurality of antennas arranged in a two dimensional array to generate a corresponding plurality of RF electrical signals;
generating a plurality of modulated optical signals by mixing the RF electrical signals with the optical carrier signal;
forming a plurality of optical beams by simultaneously transmitting into an interference space each of the modulated optical signals out of plurality of channels terminating at a first edge of the interference space, the termination of the channels being arranged in a one dimensional array;
focusing the optical beams to form separate discrete focused beams at a second edge of the interference space; and
simultaneously receiving the separate discrete focused beams and extracting encoded information contained therein.

31. An RF transmitter, comprising:
an interference space configured to receive N modulated optical signals transmitted at a first edge of the interference space to a second edge of the interference space, the N modulated optical signals forming N optical beams in the interference space that are superimposed with each other at the second edge of the interference space;
a plurality of channels at the second edge of the interference space to capture the N optical beams as corresponding virtual beams within the channels;
a plurality of photodetector each in communication with a corresponding channel to convert an optical signal received by the corresponding channel to a corresponding RF electrical signal; and
an antenna array comprising a plurality of antenna elements each connected to a corresponding photodetector and configured to receive the corresponding RF electrical signal of the photodetector to generate a corresponding electromagnetic RF signal,
wherein N is an integer greater than 1,
wherein the antenna elements of the antenna array are arranged in a first pattern, and
wherein ends of the channels are positioned at the second edge of the interference space and are arranged in a second pattern that is different from the first pattern.

* * * * *